US007899208B2

(12) United States Patent
Kondo et al.

(10) Patent No.: US 7,899,208 B2
(45) Date of Patent: Mar. 1, 2011

(54) IMAGE PROCESSING DEVICE AND METHOD, RECORDING MEDIUM, AND PROGRAM FOR TRACKING A DESIRED POINT IN A MOVING IMAGE

(75) Inventors: Tetsujiro Kondo, Tokyo (JP); Tsutomu Watanabe, Kanagawa (JP); Tomoyuki Ohtsuki, Kanagawa (JP); Hitoshi Mukai, Kanagawa (JP); Nobuyuki Yamaguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 1052 days.

(21) Appl. No.: 10/585,255

(22) PCT Filed: Jan. 6, 2005

(86) PCT No.: PCT/JP2005/000063

§ 371 (c)(1),
(2), (4) Date: Jul. 5, 2006

(87) PCT Pub. No.: WO2005/066897

PCT Pub. Date: Jul. 21, 2005

(65) Prior Publication Data

US 2009/0175496 A1 Jul. 9, 2009

(30) Foreign Application Priority Data

Jan. 6, 2004 (JP) ............................. 2004-000752
Mar. 18, 2004 (JP) ............................. 2004-077398
Mar. 18, 2004 (JP) ............................. 2004-077399

(51) Int. Cl.
*G06K 9/00* (2006.01)

(52) U.S. Cl. ..................... 382/103; 382/107; 382/254; 382/266; 348/169; 348/135; 348/155

(58) Field of Classification Search ......... 348/169–172, 348/152–155, 143, 403.1, 404.1, 407.1, 409.1, 348/410.1, 411.1, 412.1, 413.1, 414.1, 415.1, 348/416.1, 417.1, 418.1, 420.1, 421.1, 422.1; 382/100, 103, 107, 164, 165, 168, 170–172, 382/173, 181, 199, 203, 215, 254, 266
See application file for complete search history.

(56) References Cited

U.S. PATENT DOCUMENTS 5,838,365 A * 11/1998 Sawasaki et al. ............ 348/169

(Continued)

FOREIGN PATENT DOCUMENTS

JP 61-182389 8/1986

(Continued)

OTHER PUBLICATIONS

Nakagawa, Masao et al., "Three Dimensional Reconstruction of Room Environment by Correcting EPI From Image Sequence Taken With Handy Camera", The Information and Systems Society/The Institute of Electronics, Information and Communication Engineers, vol. J84-D-II., No. 2, pp. 229-438, Feb. 1, 2001.

*Primary Examiner*—Sath V Perungavoor
*Assistant Examiner*—Jason Heidemann
(74) *Attorney, Agent, or Firm*—Oblon, Spivak, McClelland, Maier & Neustadt, L.L.P.

(57) ABSTRACT

The present invention relates to image processing apparatus and method, a recording medium, and a program for providing reliable tracking of a tracking point. When a right eye 502 of a human face 504 serving as a tracking point is tracked in a frame n−1 and when a tracking point 501 appears as in a frame n, the tracking point 501 continues to be tracked. When, as in a frame n+1, the right eye 502 serving as the tracking point 501 disappears due to the rotation of the face 504 of an object to be tracked, the tracking point is transferred to a left eye 503, which is a different point of the face 504 serving as the object including the right eye 502. The present invention is applicable to a security camera system.

43 Claims, 91 Drawing Sheets

U.S. PATENT DOCUMENTS

| | | | |
|---|---|---|---|
| 5,878,166 A * | 3/1999 | Legall | 382/232 |
| 5,923,365 A * | 7/1999 | Tamir et al. | 348/169 |
| 6,335,985 B1 * | 1/2002 | Sambonsugi et al. | 382/190 |
| 6,473,459 B1 * | 10/2002 | Sugano et al. | 375/240.16 |
| 6,643,387 B1 * | 11/2003 | Sethuraman et al. | 382/107 |
| 6,665,423 B1 * | 12/2003 | Mehrotra et al. | 382/107 |
| 6,731,799 B1 * | 5/2004 | Sun et al. | 382/173 |
| 6,738,424 B1 * | 5/2004 | Allmen et al. | 375/240.08 |
| 6,985,172 B1 * | 1/2006 | Rigney et al. | 348/149 |
| 7,024,040 B1 * | 4/2006 | Itokawa | 382/199 |
| 7,095,786 B1 * | 8/2006 | Schonfeld et al. | 375/240.16 |
| 7,142,600 B1 * | 11/2006 | Schonfeld et al. | 375/240.16 |
| 2002/0191841 A1 * | 12/2002 | Harman | 382/154 |
| 2003/0053661 A1 * | 3/2003 | Magarey | 382/103 |
| 2003/0156203 A1 * | 8/2003 | Kondo et al. | 348/222.1 |
| 2003/0219146 A1 * | 11/2003 | Jepson et al. | 382/103 |

FOREIGN PATENT DOCUMENTS

| | | |
|---|---|---|
| JP | 62-127976 | 6/1987 |
| JP | 05-083712 | 4/1993 |
| JP | 11 120364 | 4/1999 |
| JP | 11-120364 | 4/1999 |
| JP | 2001 43382 | 2/2001 |
| JP | 2002-369071 | 12/2002 |
| JP | 2003 256846 | 9/2003 |
| WO | 01 97510 | 12/2001 |
| WO | WO 03/079902 A1 | 10/2003 |

\* cited by examiner

FIG. 14A  n
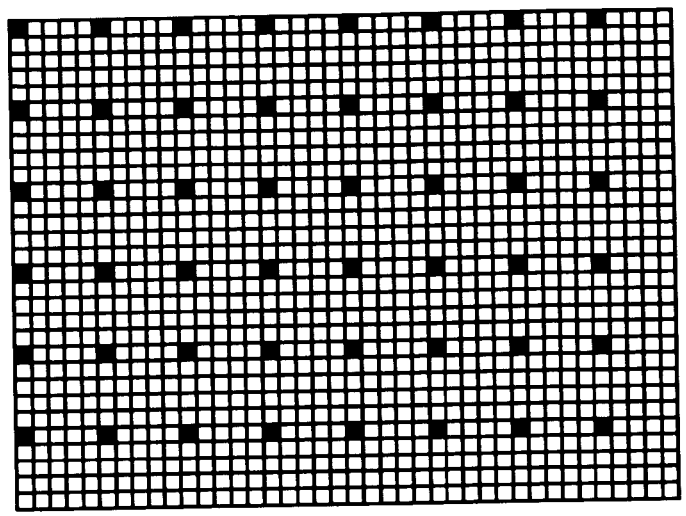
FIG. 14B  n+1
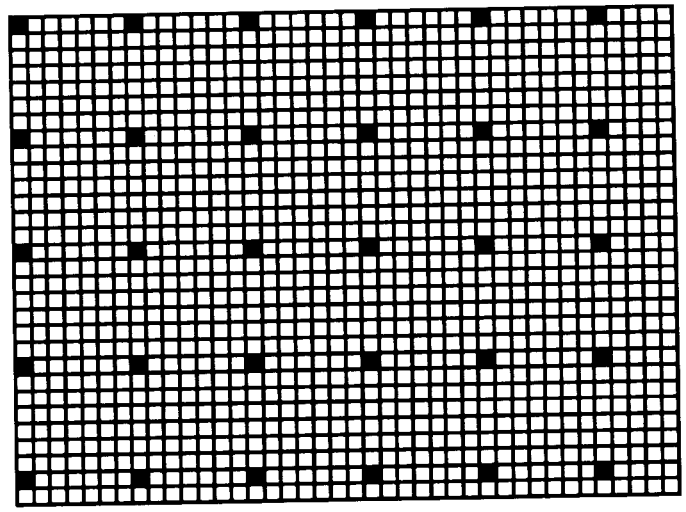

n

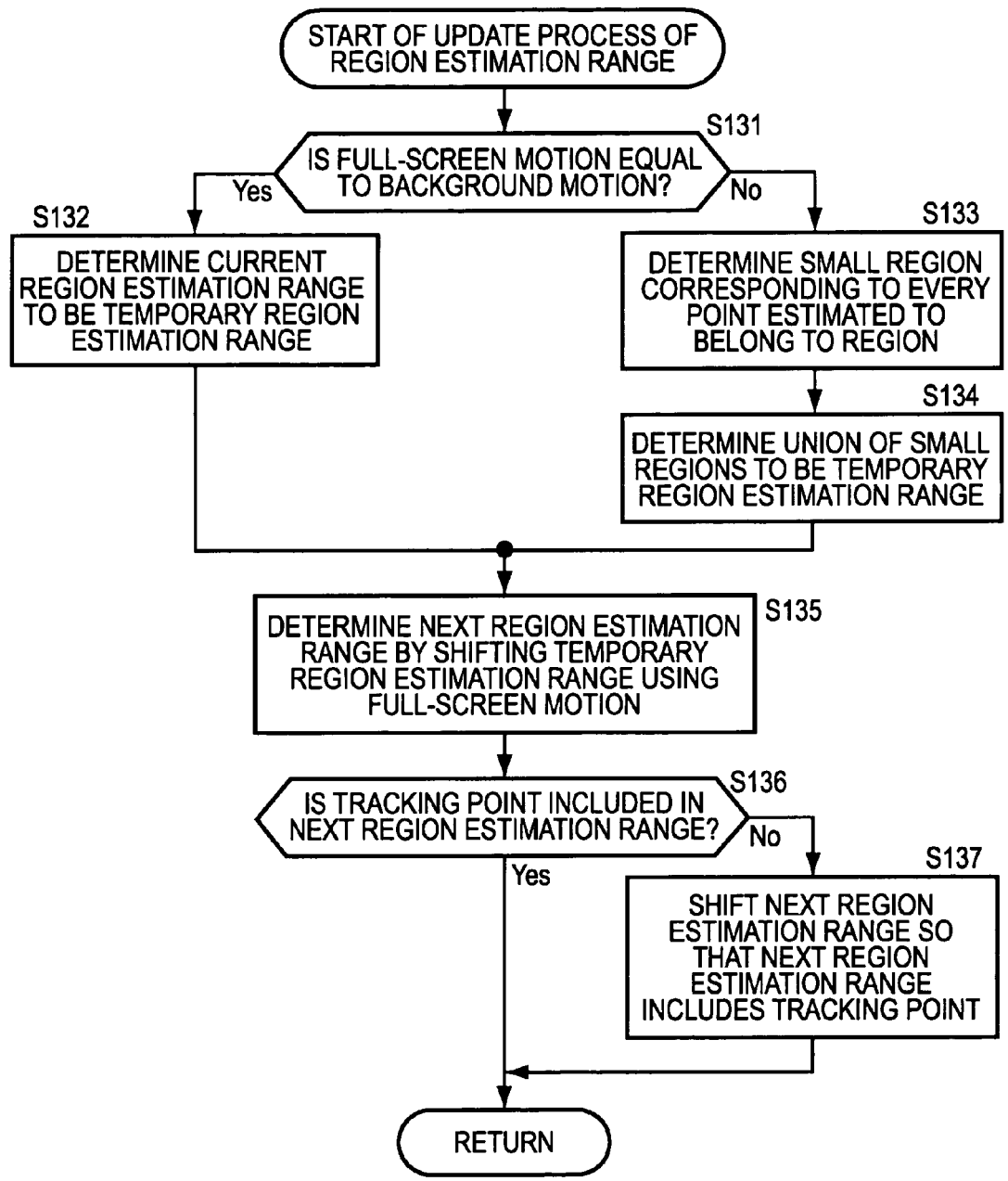

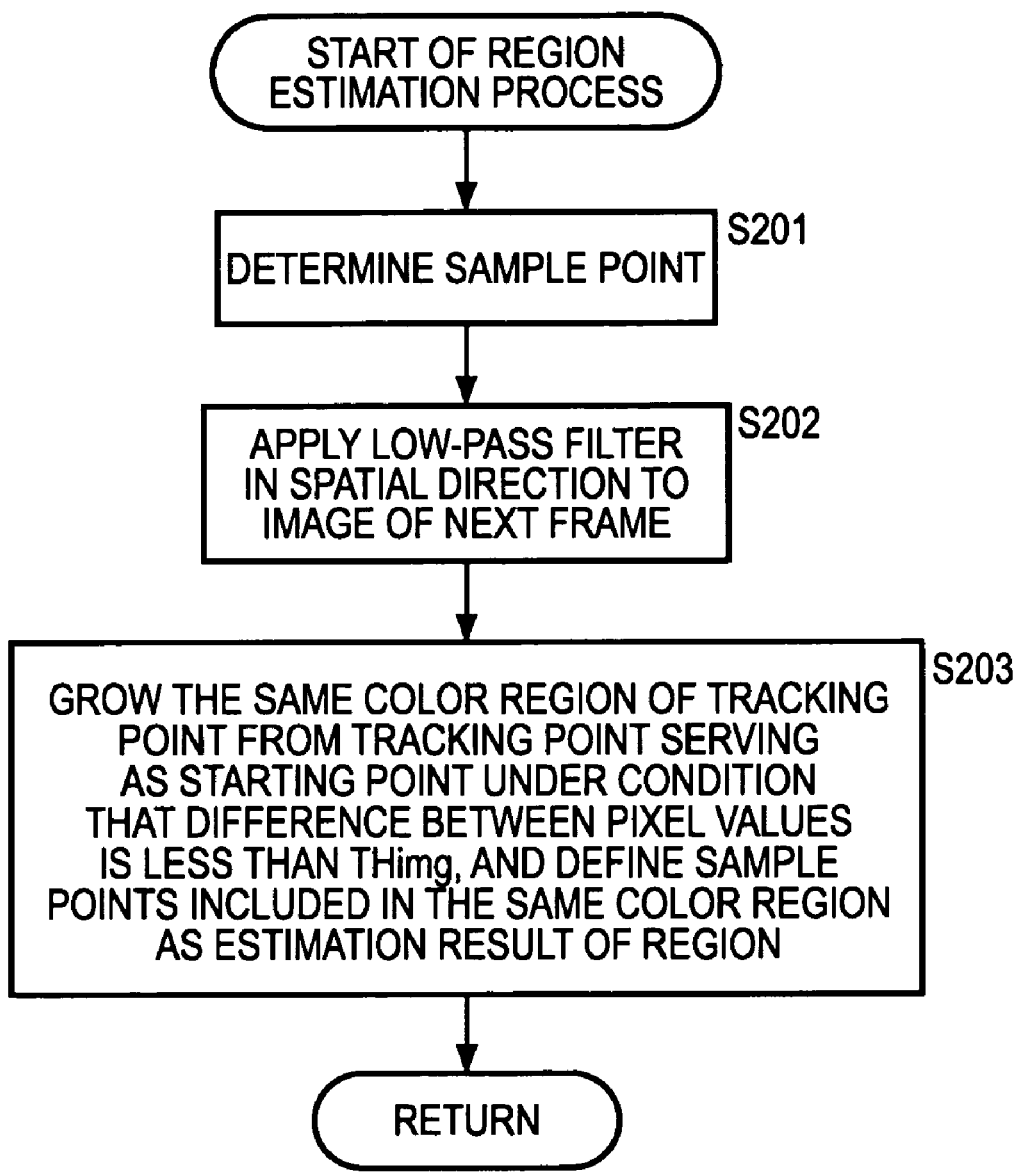

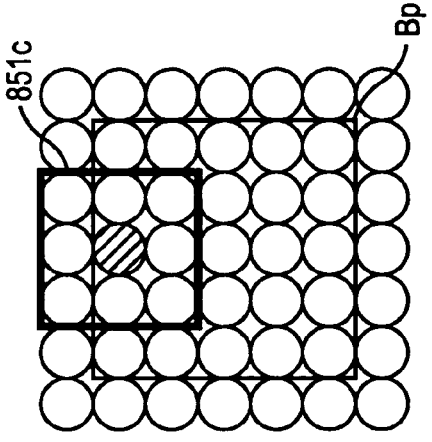
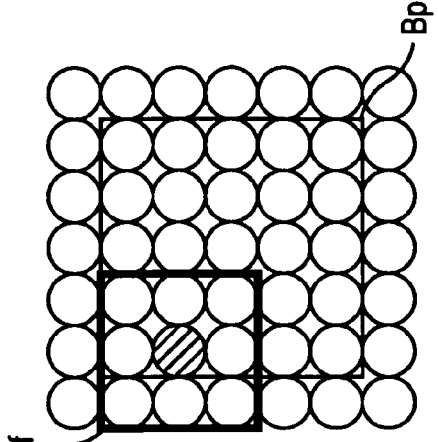
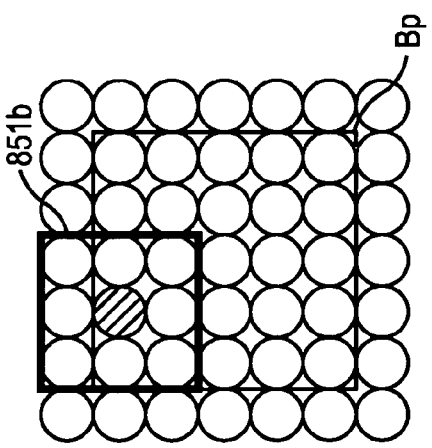
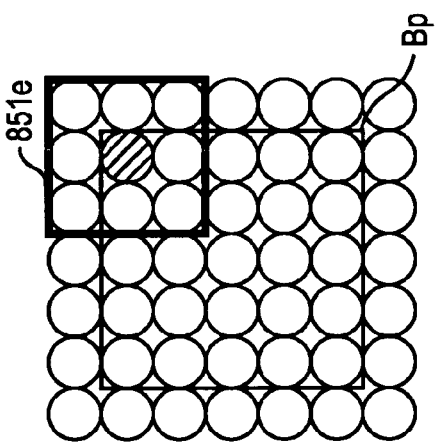
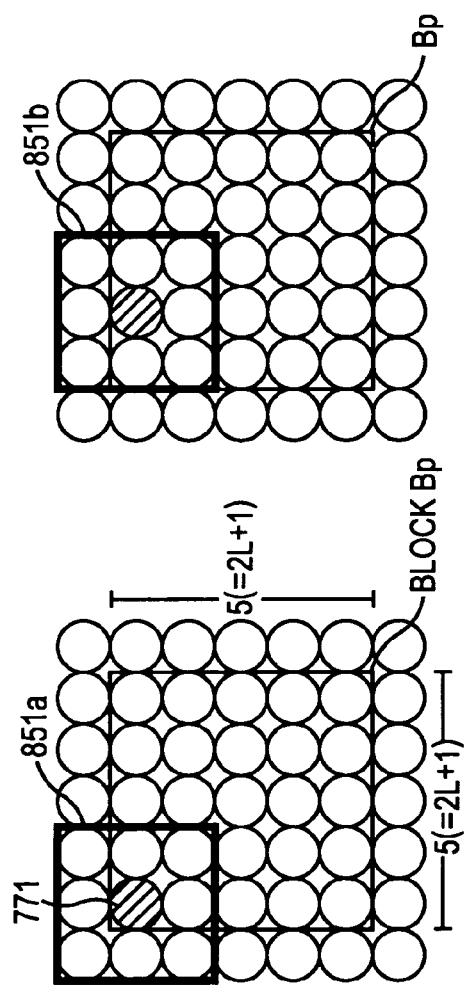
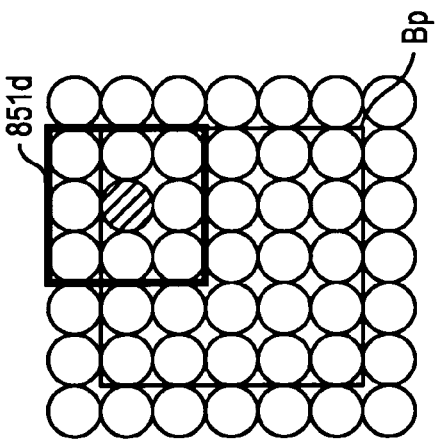

FIG. 85

| NAME | RELATED BLOCK | DEFINITION |
|---|---|---|
| CONTROL SIGNAL A | IMAGE COMBINING UNIT, REGION EXTRACTION UNIT | PULSE FOR IDENTIFYING PROCESSING AREA |
| CONTROL SIGNAL B | ADDRESS COMPUTING UNIT | PARAMETER $\sigma$ INDICATING LEVEL OF BLURRING |
| CONTROL SIGNAL C | ADDRESS COMPUTING UNIT | SWITCHING OF WEIGHT Wa OF RELATIONAL EXPRESSION |
| CONTROL SIGNAL D | IMAGE FEATURE DETECTION UNIT | SWITCHING OF THRESHOLD VALUE |

FIG. 90

| PARAMETER CODE $p_2$ | $W_1$ | $W_2$ | $W_3$ | $W_4$ |
|---|---|---|---|---|
| 0001 | 0.1 | 0.1 | 0.1 | 5.4 |
| 0010 | 0.1 | 0.1 | 5.4 | 0.1 |
| 0100 | 0.1 | 5.4 | 0.1 | 0.1 |
| 1000 | 5.4 | 0.1 | 0.1 | 0.1 |
| 0011 | 0.1 | 0.1 | 2.6 | 2.6 |
| 0101 | 0.1 | 2.6 | 0.1 | 2.6 |
| 0110 | 0.1 | 2.6 | 2.6 | 0.1 |
| 1001 | 2.6 | 0.1 | 0.1 | 2.6 |
| 1010 | 2.6 | 0.1 | 2.6 | 0.1 |
| 1100 | 2.6 | 2.6 | 0.1 | 0.1 |
| 0111 | 0.3 | 1.7 | 1.7 | 1.7 |
| 1011 | 1.7 | 0.3 | 1.7 | 1.7 |
| 1101 | 1.7 | 1.7 | 0.3 | 1.7 |
| 1110 | 1.7 | 1.7 | 1.7 | 0.3 |
| 1111 | 1.3 | 1.7 | 1.3 | 1.3 |

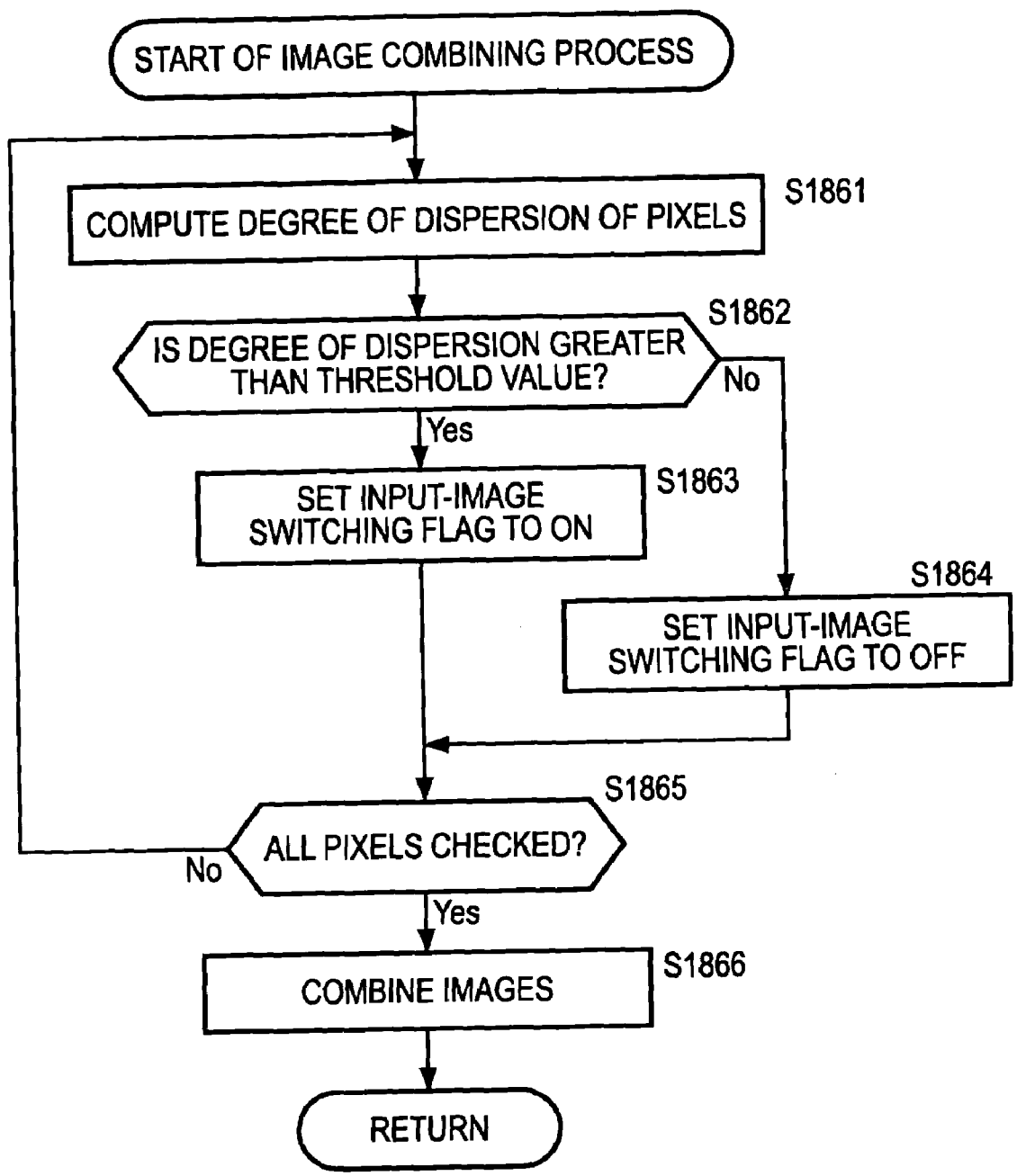

IMAGE PROCESSING DEVICE AND METHOD, RECORDING MEDIUM, AND PROGRAM FOR TRACKING A DESIRED POINT IN A MOVING IMAGE

TECHNICAL FIELD

The present invention relates to an image processing apparatus and method, a recording medium, and a program, and, in particular, to an image processing apparatus and method, a recording medium, and a program capable of reliably tracking a desired point in a moving image varying from time to time.

BACKGROUND ART

A variety of methods for automatically tracking a desired point in a moving image have been proposed.

For example, Patent Document 1 proposes technology in which tracking is performed using a motion vector related to a block corresponding to an object to be tracked.

Patent Document 2 proposes technology in which a region related to an object to be tracked is estimated and the region is tracked on the basis of the estimation result of the motion of the region.

[Patent Document 1] Japanese Unexamined Patent Application Publication No. 6-143235

[Patent Document 2] Japanese Unexamined Patent Application Publication No. 5-304065

DISCLOSURE OF INVENTION

Problems to be Solved by the Invention

However, in the technology described in Patent Document 1, tracking is performed using only one motion vector. Accordingly, sufficient robust performance is not provided. In addition, when the object to be tracked disappears from user's sight due to, for example, the rotation of an image containing the object, and subsequently, the tracking point appears again, the tracking point cannot be tracked any more, which is a problem.

In the technology described in Patent Document 2, a region is utilized. Thus, the robust performance is increased. However, when the region is too large in order to increase the robust performance and when, for example, the image of a face of a child captured by a home video recorder is tracked and zoomed in, the body of the child, which has a larger area than the face, is sometimes tracked and zoomed in.

Additionally, in the both technologies, if occlusion occurs (i.e., if the object to be tracked is temporarily covered by another object) or the object to be tracked temporarily disappears due to, for example, a scene change, a robust tracking is difficult.

Accordingly, it is an object of the present invention to provide reliable tracking of the tracking point even when an object is rotated, occlusion occurs, or a scene change occurs.

Means for Solving the Problems

According to the present invention, an image processing apparatus includes position estimating means for estimating the position of a second point representing a tracking point in an image of a temporally next unit of processing, the second point corresponding to a first point representing the tracking point in an image of a temporally previous unit of processing, generating means for generating estimated points serving as candidates of the first point when the position of the second point is inestimable, determining means for determining the second point in the next unit of processing on the basis of the estimation result of the position estimating means when the position of the second point in the next unit of processing is estimable, and selecting means for selecting the first point from among the estimated points when the position of the second point is inestimable.

The unit of processing can be a frame.

The position estimating means can further compute the accuracy of the estimation of the position and, if the computed accuracy is greater than a reference value, the position estimating means determines that the position of the second point is estimable.

If the position of the second point in the next unit of processing is inestimable, the position estimating means can estimate the position of the second point on the basis of the first point selected by the selecting means.

If the position of the second point is estimable, the position estimating means can consider the position of the second point to be a new first point and can estimate the position of the tracking point in the image of the next unit of processing.

The generating means can include region estimating means for estimating a set of at least one point, the set belonging to an object including the first point, to be a target region in the previous unit of processing or in a more previous unit of processing than the previous unit of processing and estimated point generating means for generating the estimated point on the basis of the target region.

The region estimating means can find a position that overlaps at least the target region serving as an object to be estimated by prediction, can determine a region estimation range at the predicted point including the tracking point in the unit of processing for estimating the target region, can set sample points in the determined region estimation range, and can estimate a region consisting of a set of the sample points having the same motion and having the largest dimensions among the sample points to be the target region.

The shape of the region estimation range can be fixed.

The shape of the region estimation range can be variable.

The region estimating means can estimate the target region in a more previous unit of processing than the previous unit of processing, and the generating means can generate a point in the estimated target region in the more previous unit of processing than the previous unit of processing as the estimated point.

The region estimating means can estimate the target region in the previous unit of processing, and the generating means can generate a point forming the target region as the estimated point.

The region estimating means can estimate points that are adjacent to the first point and that have pixel values similar to the pixel value of the first point and points that are adjacent to the points adjacent to the first point to be the target region.

The region estimating means can extract sample points in a region having a predetermined size and including the first point in a more previous unit of processing than the previous unit of processing, and the region estimating means can estimate a region including the points in the previous unit of processing obtained by shifting a region of the sample points having the same motion and having the largest dimensions by an amount of the same motion to be the target region.

The image processing apparatus can further include template generating means for generating a template and correlation computing means for computing a correlation between a block representing a predetermined region in the next unit of processing and a block representing a predetermined region of the template in a unit of processing more previous than the unit of processing of the block by one or more units of processing when the second point is not determined on the basis of the estimated point. The tracking point can be detected by using at least the determining means when the correlation is determined to be high on the basis of the correlation computed by the correlation computing means.

The template generating means can determine a predetermined region around the tracking point to be the template.

The template generating means can generate the template on the basis of the target region.

When the correlation is determined to be high on the basis of the correlation computed by the correlation computing means, the second point can be determined on the basis of a relationship between the block representing the predetermined region of the template in a unit of processing more previous than a block representing the predetermined region in the next unit of processing by one or more units of processing and the tracking point and on the basis of the position of the block having the correlation determined to be high.

The template generating means can determine a region formed from a sample point in the target region and a predetermined area around the sample point to be the template.

the correlation computing means can determine the correlation by computing an error between the block in the next unit of processing and a block of the template in a unit of processing more previous than the unit of processing of the block by one or more units of processing.

The image processing apparatus can further include detecting means for detecting a scene change. The position estimating means and the selecting means terminate the processes thereof on the basis of a predetermined condition and change the condition on the basis of the presence of the scene change when the position estimating means and the selecting means are unable to select the second point from among the estimated points.

The determining means can further include evaluation value computing means for computing an evaluation value representing a correlation between pixels of interest representing at least one pixel including the first point in the temporally previous unit of processing and the corresponding pixels representing at least one pixel in the temporally next unit of processing and defined on the basis of a motion vector of the pixels of interest, variable value computing means for computing a variable value representing the variation of a pixel value with respect to the pixels of interest, and accuracy computing means for computing the accuracy of the motion vector.

The number of the pixels of interest can be equal to the number of the corresponding pixels.

The variable value can be a value for indicating the variation of a pixel value in the spatial direction.

The variable value can indicate one of a degree of dispersion and a dynamic range.

The unit of processing can be one of a frame and a field.

The accuracy computing means can compute the accuracy of the motion vector on the basis of a value normalized from the evaluation value with respect to the variable value.

The accuracy computing means can determine a value normalized from the evaluation value with respect to the variable value to be the accuracy of the motion vector when the variable value is greater than a predetermined threshold value, and the accuracy computing means can determine a fixed value indicating that the accuracy of the motion vector is low when the variable value is less than the predetermined threshold value.

The evaluation value computing means can compute the evaluation value representing the sum of absolute differences between pixels in a block including the pixels of interest and pixels in a block including the corresponding pixels.

The variable value computing means can compute the variable value representing the sum of values obtained by dividing the sum of absolute differences between the pixels of interest and the adjacent pixels that are adjacent to the pixels of interest in a block including the pixels of interest by the number of the adjacent pixels.

The accuracy computing means can include comparing means for comparing the variable value with a first reference value, difference computing means for computing the difference between a second reference value and the value normalized from the evaluation value with respect to the variable value, and outputting means for computing the accuracy of the motion vector on the basis of the comparison result of the comparing means and the difference computed by the difference computing means and outputting the accuracy of the motion vector.

The image processing apparatus can further include motion vector detecting means for detecting the motion vector from an input image and delivering the motion vector to the evaluation value computing means, motion compensating means for motion-compensating the input image on the basis of the motion vector detected by the motion vector detecting means, selecting means for selecting one of the image that is motion-compensated by the motion compensating means and the image that is not motion-compensated on the basis of the accuracy of the motion vector, and encoding means for encoding the image selected by the selecting means.

The image processing apparatus can further include frequency distribution computing means for computing a frequency distribution weighted with the accuracy of the motion vector and maximum value detecting means for detecting a maximum value of the frequency distribution computed by the frequency distribution computing means and detecting a background motion on the basis of the detected maximum value.

The image processing apparatus can further include average value computing means for computing the average of the accuracy of the motion vectors in the unit of processing and determining means for comparing the average computed by the average value computing means with a reference value and determining the presence of a scene change on the basis of the comparison result.

The average value computing means can compute one average for one unit of processing.

The image processing apparatus can further include first-point detecting means for detecting the first point of a moving object in an image, correction area setting means for setting a correction area having a predetermined size around the object in the image on the basis of the estimation result, correcting means for correcting the image in the correction area in the image, and display control means for controlling the display of the image including the image in the correction area corrected by the correcting means.

The correcting means can correct blurring of the image.

The correcting means can include delivering means for delivering a control signal for identifying an image in the correction area and a parameter indicating the level of blurring of the image, feature detecting means for detecting the feature of the image in the correction area identified on the basis of the control signal and outputting a feature code representing the detected feature, storage means for storing the parameter representing the level of blurring of the image and a coefficient corresponding to the feature code output from the feature detecting means, readout means for reading out the parameter and the coefficient corresponding to the feature code output from the feature detecting means from the storage means, inner-product computing means for computing the inner product of the values of pixels in the input image on the basis of the coefficient read out by the readout means, and selectively-outputting means for selecting one of the computation result from the inner-product computing means and the value of the pixel of the input image and outputting the selected one. The image in the correction area can be corrected so that blurring of the image is removed.

The first-point detecting means can include first extracting means for extracting a plurality of pixels around the pixel to be subjected to the inner product computation in a predetermined first area from the input image, second extracting means for extracting a plurality of pixels in each of a plurality of second areas contiguous to the first area in a plurality of vertical and horizontal directions, block difference computing means for computing a plurality of block differences by computing the sum of absolute differences between the values of the pixels extracted by the first extracting means and the values of the corresponding pixels extracted by the second extracting means, and difference determining means for determining whether the block difference is greater than a predetermined threshold value.

The parameter can be a parameter of the Gaussian function in a model expression representing a relationship between a pixel of a blurred image and a pixel of an unblurred image.

The coefficient stored by the storage means can be a coefficient obtained by computing the inverse matrix of the model expression.

The selectively-outputting means can include first extracting means for extracting a plurality of pixels subjected to the inner product computation by the inner-product computing means, dispersion computing means for computing the degree of dispersion representing the level of dispersion of the plurality of pixels extracted by the first extracting means, and dispersion determining means for determining whether the degree of dispersion computed by the dispersion computing means is greater than a predetermined threshold value.

The selectively-outputting means can further include pixel selecting means for selecting one of the computation result of the inner-product computing means and the value of the pixel of the input image as an output value of the pixel on the basis of the determination result of the dispersion determining means.

According to the present invention, an image processing method includes an estimating step for estimating the position of a second point representing a tracking point in an image of a temporally next unit of processing, the second point corresponding to a first point representing the tracking point in an image of a temporally previous unit of processing, a generating step for generating estimated points serving as candidates of the first point when the position of the second point is inestimable, a determining step for determining the second point in the next unit of processing on the basis of the estimation result of the position estimating step when the position of the second point in the next unit of processing is estimable, and a selecting step for selecting the first point from among the estimated points when the position of the second point is inestimable.

The determining step can include an evaluation value computing step for computing an evaluation value representing a correlation between pixels of interest representing at least one pixel including the first point in the temporally previous unit of processing and the corresponding pixels representing at least one pixel in the temporally next unit of processing and defined on the basis of a motion vector of the pixel of interest, a variable value computing step for computing a variable value representing the variation of a pixel value with respect to the pixel of interest, and an accuracy computing step for computing the accuracy of the motion vector.

The image processing method can further include a first-point detecting step for detecting the first point of a moving object in an image, a correction area setting step for setting a correction area having a predetermined size around the object in the image on the basis of the estimation result, a correcting step for correcting the image in the correction area in the image, and a display control step for controlling the display of the image including the image in the correction area corrected by the correcting step.

According to the present invention, a recording medium stores a computer-readable program including an estimating step for estimating the position of a second point representing a tracking point in an image of a temporally next unit of processing, the second point corresponding to a first point representing the tracking point in an image of a temporally previous unit of processing, a generating step for generating estimated points serving as candidates of the first point when the position of the second point is inestimable, a determining step for determining the second point in the next unit of processing on the basis of the estimation result of the position estimating step when the position of the second point in the next unit of processing is estimable, and a selecting step for selecting the first point from among the estimated points when the position of the second point is inestimable.

According to the present invention, a program includes program code causing a computer to execute an estimating step for estimating the position of a second point representing a tracking point in an image of a temporally next unit of processing, the second point corresponding to a first point representing the tracking point in an image of a temporally previous unit of processing, a generating step for generating estimated points serving as candidates of the first point when the position of the second point is inestimable, a determining step for determining the second point in the next unit of processing on the basis of the estimation result of the position estimating step when the position of the second point in the next unit of processing is estimable, and a selecting step for selecting the first point from among the estimated points when the position of the second point is inestimable.

According to the present invention, if the position of the second point in the subsequent unit of processing is estimable, the second point in the subsequent unit of processing is determined on the basis of the estimation result of the position. If the position of the second point in the subsequent unit of processing is inestimable, the first point is selected from among the estimated points generated.

Advantages

According to the present invention, tracking of a tracking point in an image can be provided. In particular, the robust performance of tracking can be improved. As a result, the tracking point can be reliably tracked even when the tracking point temporarily disappears due to the rotation of an object to be tracked or even when occlusion or a scene change occurs.

BRIEF DESCRIPTION OF THE DRAWINGS

FIG. 14A is a diagram illustrating the process to determine sample points at step S81 shown in FIG. 11;

FIG. 14B is a diagram illustrating the process to determine sample points at step S81 shown in FIG. 11;

FIG. 21 is a flow chart illustrating another example of the process to update a region estimation range at step S86 shown in FIG. 11;

FIG. 29 is a flow chart illustrating another example of the region estimation process at step S61 shown in FIG. 10;

FIG. 53A is a diagram illustrating a method for computing the block activity;

FIG. 53B is a diagram illustrating a method for computing the block activity;

FIG. 53C is a diagram illustrating a method for computing the block activity;

FIG. 53D is a diagram illustrating a method for computing the block activity;

FIG. 53E is a diagram illustrating a method for computing the block activity;

FIG. 53F is a diagram illustrating a method for computing the block activity;

FIG. 85 is a block diagram of an example of a control signal of the image correction unit;

FIG. 90 is a diagram illustrating an example of the combination of parameter codes;

FIG. 95 is a diagram illustrating an exemplary configuration of an image feature detection unit;

FIG. 96A is a diagram illustrating a block of an image extracted by a block cutout unit;

FIG. 96B is a diagram illustrating a block of an image extracted by the block cutout unit;

FIG. 96C is a diagram illustrating a block of an image extracted by the block cutout unit;

FIG. 96D is a diagram illustrating a block of an image extracted by the block cutout unit;

FIG. 96E is a diagram illustrating a block of an image extracted by the block cutout unit;

FIG. 97 is a flow chart illustrating an image combining process;

FIG. 98 is a block diagram illustrating an exemplary configuration of an image combining unit; and FIG. 99 is a diagram illustrating the dispersion computation.

BEST MODE FOR CARRYING OUT THE INVENTION

Exemplary Embodiments of the present invention are now herein described with reference to the accompanying drawings.

Figure 1:
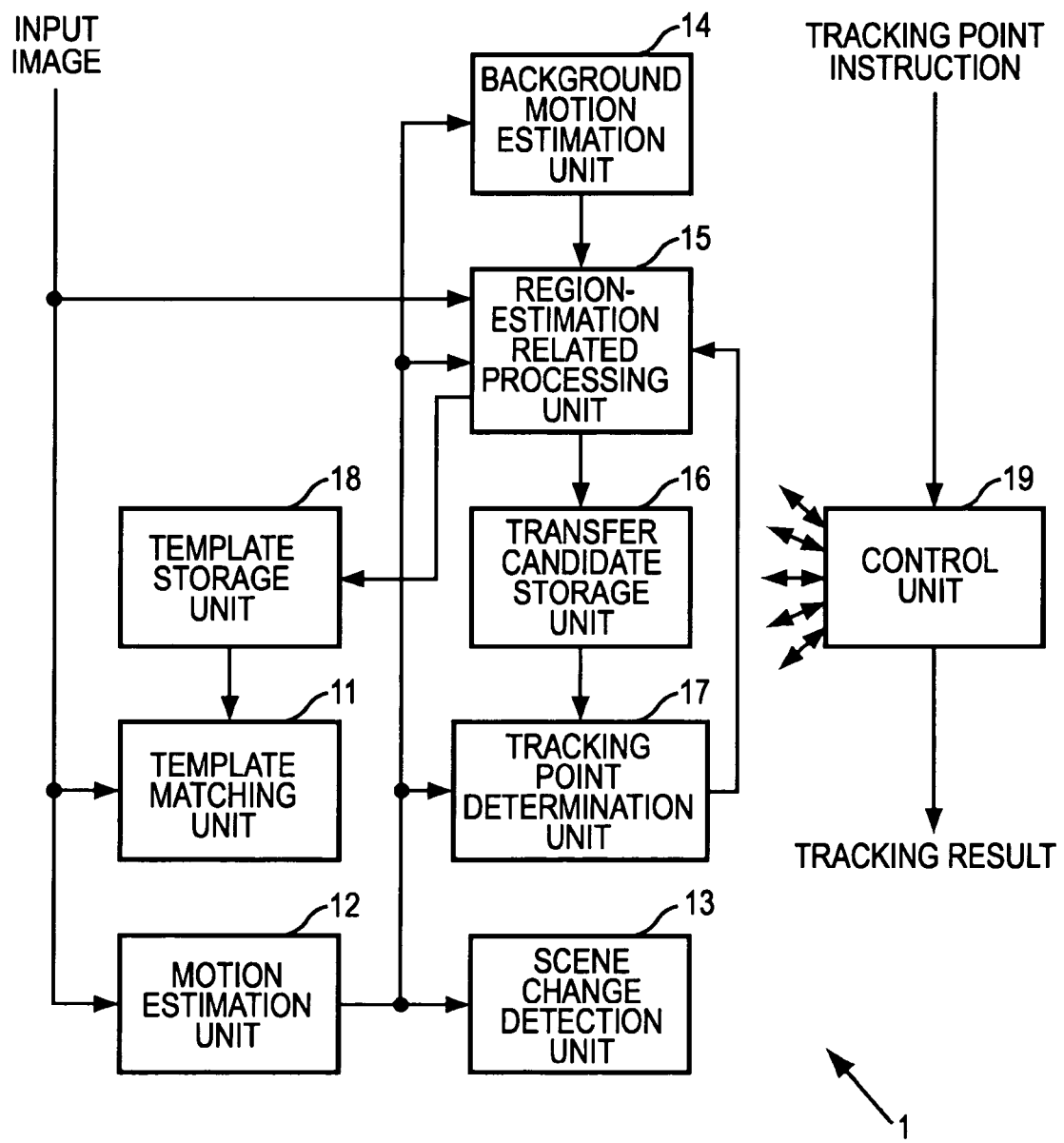
FIG. 1 is a block diagram of an exemplary configuration of an object tracking apparatus according to the present invention.

FIG. 1 is a functional block diagram of an object tracking apparatus including an image processing apparatus according to the present invention. An object tracking apparatus 1 includes a template matching unit 11, a motion estimation unit 12, a scene change detection unit 13, a background motion estimation unit 14, a region-estimation related processing unit 15, a transfer candidate storage unit 16, a tracking point determination unit 17, a template storage unit 18, and a control unit 19.

The template matching unit 11 performs a matching process between an input image and a template image stored in the template storage unit 18. The motion estimation unit estimates the motion of the input image and outputs a motion vector obtained from the estimation and the accuracy of the motion vector to the scene change detection unit 13, the background motion estimation unit 14, the region-estimation related processing unit 15, and the tracking point determination unit 17. The configuration of the motion estimation unit 12 is described in detail below with reference to FIG. 43.

The scene change detection unit 13 detects a scene change on the basis of the accuracy received from the motion estimation unit 12. The configuration of the scene change detection unit 13 is described in detail below with reference to FIG. 50.

The background motion estimation unit 14 estimates the motion of a background on the basis of the motion vector and the accuracy received from the motion estimation unit 12 and delivers the estimation result to the region-estimation related processing unit 15. The configuration of the background motion estimation unit 14 is described in detail below with reference to FIG. 48.

The region-estimation related processing unit 15 performs a region estimation process on the basis of the motion vector and the accuracy delivered from the motion estimation unit 12, the motion of the background delivered from the background motion estimation unit 14, and the tracking point information delivered from the tracking point determination unit 17. The region-estimation related processing unit 15 also generates a transfer candidate on the basis of the input information and delivers the transfer candidate to the transfer candidate storage unit 16, which stores the transfer candidate. Furthermore, the region-estimation related processing unit 15 generates a template on the basis of the input image and delivers the template to the template storage unit 18, which stores the template. The configuration of the region-estimation related processing unit 15 is described in detail below with reference to FIG. 9.

The tracking point determination unit 17 determines a tracking point on the basis of the motion vector and the accuracy delivered from the motion estimation unit 12 and the transfer candidate delivered from the transfer candidate storage unit 16 and outputs information about the determined tracking point to the region-estimation related processing unit 15.

The control unit 19 is connected to each of the units from the template matching unit 11 through the template storage unit 18. The control unit 19 controls each unit on the basis of a tracking point instruction input by a user so as to output the tracking result to a device (not shown).

The operation of the object tracking apparatus 1 is described next.

Figure 2:
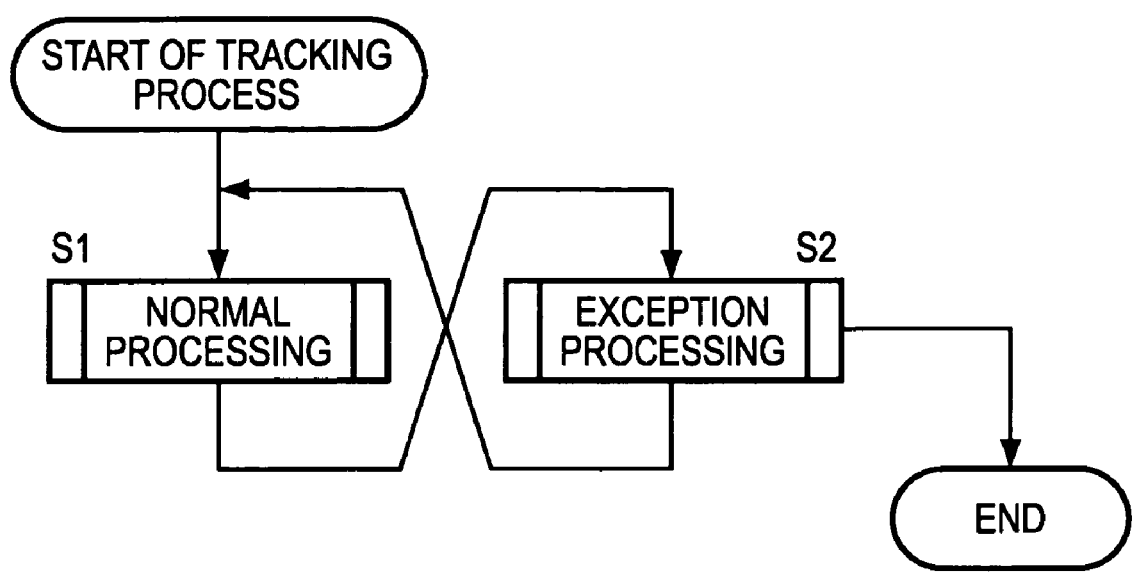
FIG. 2 is a flow chart illustrating a tracking process performed by the object tracking apparatus shown in FIG. 1.

As shown in FIG. 2, the object tracking apparatus 1 basically performs normal processing and exception processing. That is, the object tracking apparatus 1 performs the normal processing at step S1. The normal processing is described below with reference to FIG. 6. In this processing, a process for tracking a tracking point specified by the user is performed. If the object tracking apparatus 1 cannot transfer the tracking point to a new tracking point in this normal processing at step S1, the exception processing is performed at step S2. The exception processing is described in detail below with reference to FIG. 33. When the tracking point disappears from the image, the exception processing performs an operation to return to the normal processing by using a template matching operation. In the exception processing, if it is determined that the tracking operation cannot continue (i.e., the processing cannot return to the normal processing), the processing is completed. However, if it is determined that the processing can return to the normal processing as a result of the returning process using the template, the processing returns to step S1 again. Thus, the normal processing at step S1 and the exception processing at step S2 are alternately repeated for each frame.

Figure 3:
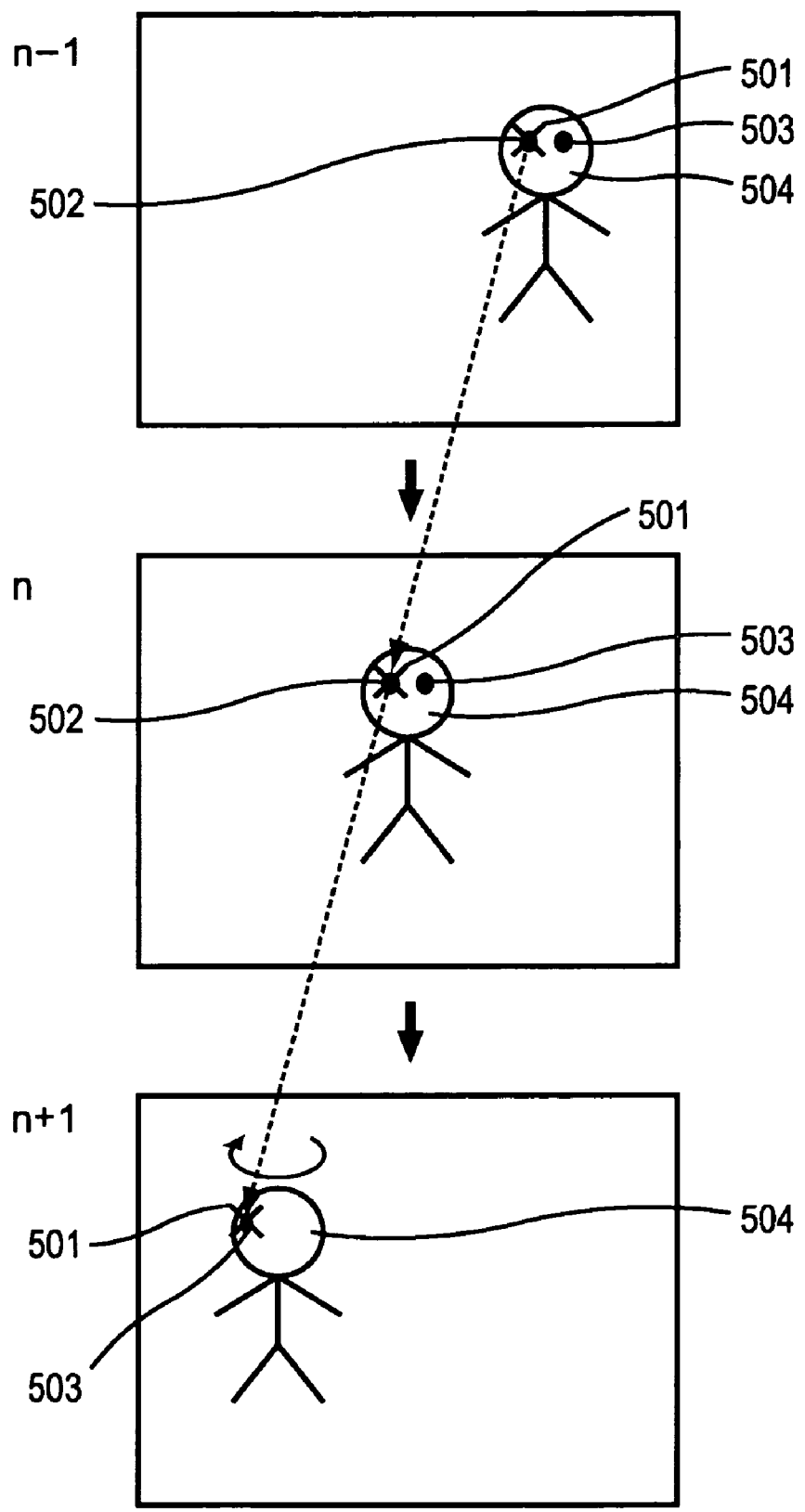
FIG. 3 is a diagram illustrating a tracking process when an object to be tracked rotates.
Figure 4:
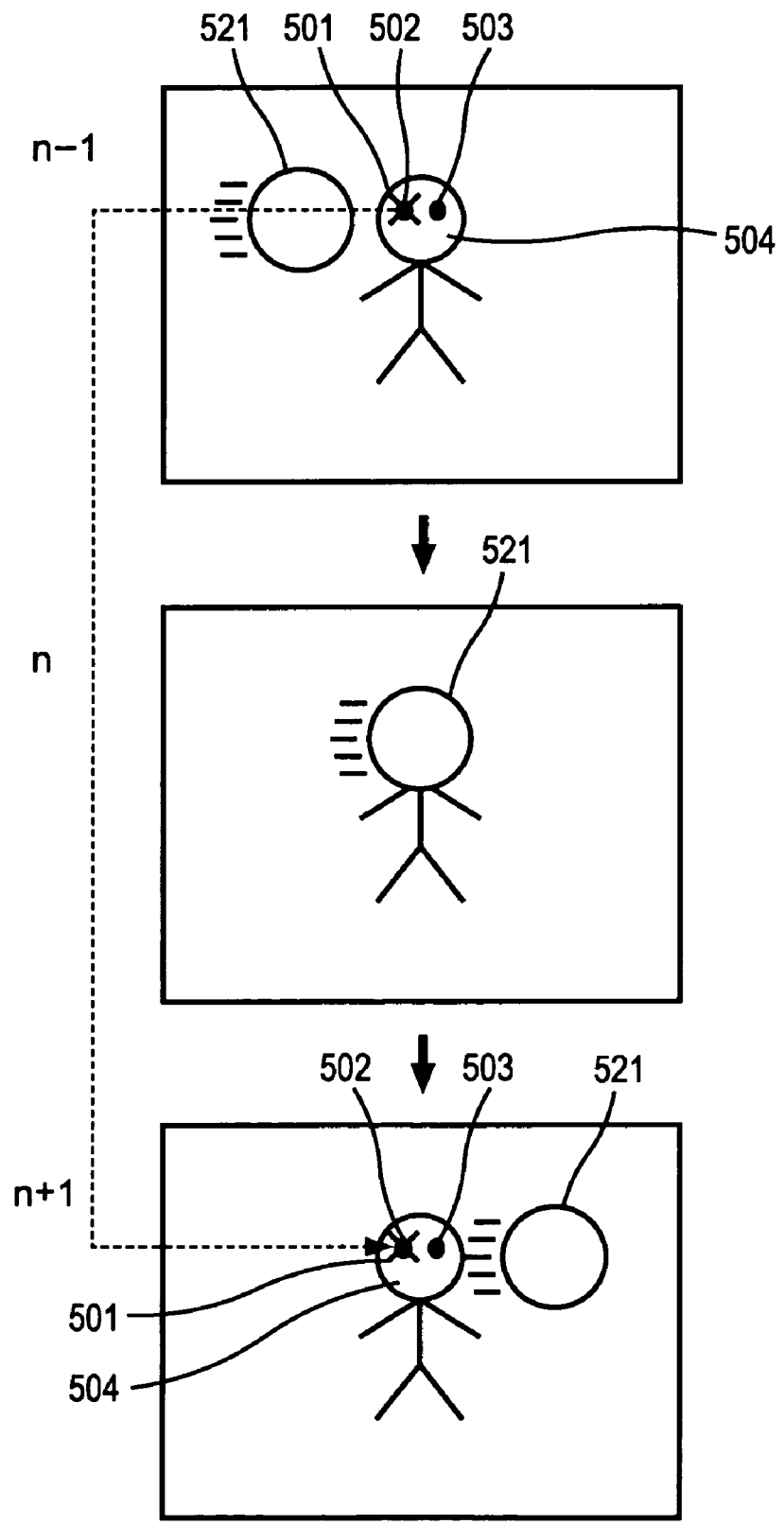
FIG. 4 is a diagram illustrating a tracking process when occlusion occurs.
Figure 5:
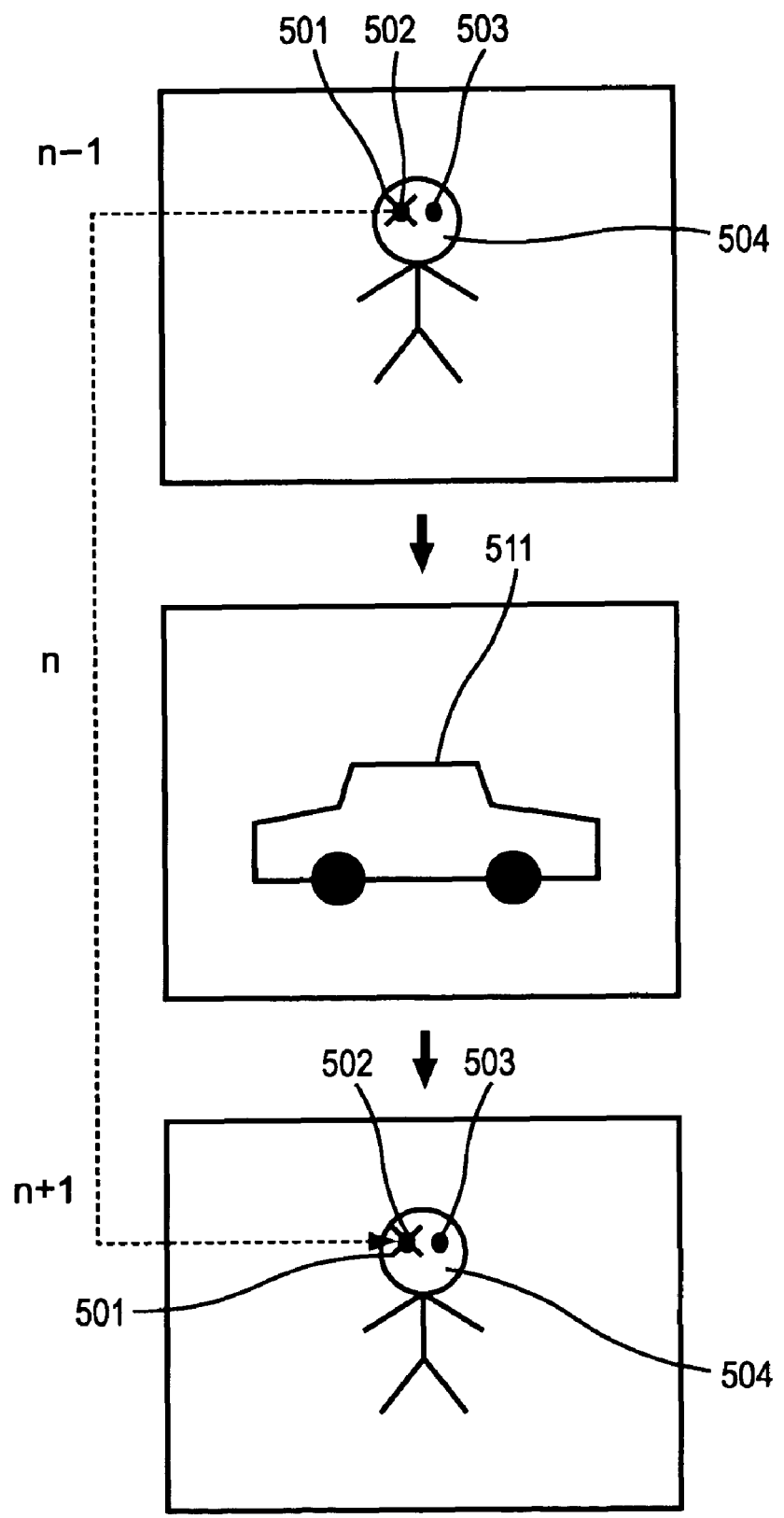
FIG. 5 is a diagram illustrating a tracking process when a scene change occurs.

According to the present invention, as shown in FIGS. 3 to 5, by performing the normal processing and the exception processing, the object tracking apparatus 1 can track the tracking point even when the tracking point temporarily disappears due to the rotation of the object to be tracked, the occurrence of occlusion, and the occurrence of a scene change.

That is, for example, as shown in FIG. 3, a human face 504, which is an object to be tracked, is displayed in a frame n−1. The human face 504 includes a right eye 502 and a left eye 503. The user specifies, for example, the right eye 502 (precisely speaking, one pixel in the right eye 502) as a tracking point 501. In an example shown in FIG. 3, the person moves to the left in the drawing in the next frame n. Furthermore, the human face 504 rotates clockwise in the next frame n+1. As a result, the right eye 502 that has been visible disappears. Thus, in a known method, the tracking cannot be performed. Therefore, in the normal processing at step S1, the left eye 503 of the human face 504 is considered to be an object similar to the right eye and is selected so that the tracking point is transferred (set) to the left eye 503. Thus, the tracking can be continued.

In an example shown in FIG. 4, in a frame n−1, a ball moves from the left of the human face 504. In the next frame n, the ball 521 exactly covers the human face 504. In this state, the human face 504 including the right eye 502, which is specified as the tracking point 501, is not displayed. If such occlusion occurs and the human face 504, which is the object to be tracked, is not displayed, the transfer point in place of the tracking point 501 disappears. Accordingly, it is difficult to maintain tracking of the tracking point. However, according to the present invention, the image of the right eye 502 serving as the tracking point in the frame n−1 (in practice, temporally more previous frame) is stored as a template in advance. When the ball further moves to the right and the right eye 502 serving as the tracking point 501 appears again in the frame n+1, the object tracking apparatus 1 detects that the right eye serving as the tracking point 501 is displayed again through the exception processing at step S2. Thus, the right eye 502 is tracked as the tracking point 501 again.

In an example shown in FIG. 5, the human face 504 is displayed in the frame n−1. However, in the next frame n, a motor vehicle 511 covers the whole body including the human face. That is, in this case, a scene change occurs. According to the present invention, even when such a scene change occurs and the tracking point 501 disappears from the image, the object tracking apparatus 1 can detect that the right eye 502 serving as the tracking point 501 is displayed again in the exception processing at step S2 using the template when the motor vehicle 511 moves and the right eye is displayed again in a frame n+1. Thus, the right eye 502 can be tracked as the tracking point 501 again.

The normal processing at step S1 shown in FIG. 2 is described in detail next with reference to a flow chart shown in FIG. 6. At step S21, the tracking point determination unit 17 executes the initialization process of the normal processing. The initialization process is described below with reference to a flow chart shown in FIG. 7. In this initialization process, a region estimation range with respect to a tracking point specified by the user is selected. This region estimation range is used to estimate the range of points belonging to an object that is the same as the user-specified tracking point (e.g., a human face or body serving as a rigid-body that moves along with an eye when the tracking point is the eye). The transfer point is selected from among the points in the region estimation range.

At step S22, the control unit 19 controls each unit to wait for the input of an image of the next frame. At step S23, the motion estimation unit 12 estimates the motion of the tracking point. That is, by receiving a frame (next frame) temporally next to a frame (previous frame) that includes a user-specified tracking point at step S22, the control unit 19 can acquire the images in two consecutive frames. Accordingly, at step S23, by estimating the position of the tracking point in the next frame corresponding to the tracking point in the previous frame, the motion of the tracking point can be estimated.

As used herein, the term "temporally previous" refers to the order of processing (the order of input). In general, images of frames are input in the order of capturing the images. In this case, the frame captured earlier is defined as a previous frame. However, when the frame captured later is processed (input) first, the frame captured later is defined as a previous frame.

At step S24, the motion estimation unit 12 (an integration processing unit 605 shown in FIG. 43, which is described below) determines whether the tracking point can be estimated on the basis of the processing result at step S23. It can be determined whether the tracking point can be estimated or not by, for example, comparing the accuracy of a motion vector generated and output from the motion estimation unit 12 (which is described below with reference to FIG. 43) with a predetermined threshold value. More specifically, if the accuracy of the motion vector is greater than or equal to the predetermined threshold value, the tracking point can be estimated. However, if the accuracy of the motion vector is less than the predetermined threshold value, it is determined that the tracking point cannot be estimated. That is, the possibility of the estimation here is relatively strictly determined. Even when the estimation is possible in practice, the estimation is determined to be impossible if the accuracy is low. Thus, a more reliable tracking process can be provided.

It can be determined at step S24 that the estimation is possible if the estimation result of the motion of the tracking point and the estimation results of the motion of the points in the vicinity of the tracking point coincide with the numerically predominant motions; if otherwise, the estimation is not possible.

If it is determined that the motion of the tracking point can be estimated, that is, if it is determined that the probability that the tracking point is correctly set on the same object (the probability of correctly tracking the right eye 502 when the right eye 502 is specified as the tracking point 501) is relatively high, the process proceeds to step S25. At step S25, the tracking point determination unit 17 shifts the tracking point by the estimated motion (motion vector) obtained at step S23. That is, after this operation is executed, the tracking point in the next frame that is the tracking point corresponding to the tracking point in the previous frame can be determined.

After the process at step S25 is executed, a region estimation related process is carried out at step S26. This region estimation related process is described in detail below with reference to FIG. 10. By carrying out this process, the region estimation range determined by the initialization process of the normal processing at step S21 is updated. Furthermore, when the tracking point is not displayed due to, for example, the rotation of the target object, candidates of a transfer point to which the tracking point is to be transferred (transfer candidates) are extracted (generated) in advance in this state (i.e., in the state in which tracking the tracking point is still maintained). When even the transfer to the transfer candidate is not possible, the tracking is temporarily stopped. However, a template is created in advance in order to confirm that the tracking is possible again (i.e., the tracking point appears again).

After the region estimation related process at step S26 is completed, the processing returns to step S22 and the processes subsequent to step S22 are repeated.

That is, as long as the motion of the user-specified tracking point can be estimated, the processes from step S22 through S26 are repeated for each frame so that the tracking is carried out.

However, if, at step S24, it is determined that the motion of the tracking point cannot be estimated (the estimation is impossible), that is, if it is determined that, for example, the accuracy of the motion vector is less than or equal to the threshold value, the process proceeds to step S27. At step S27, since the transfer candidates generated by the region estimation related process at step S26 are stored in the transfer candidate storage unit 16, the tracking point determination unit 17 selects one candidate that is the closest to the original tracking point from among the candidates stored in the transfer candidate storage unit 16. At step S28, the tracking point determination unit 17 determines whether a transfer candidate can be selected. If a transfer candidate can be selected, the process proceeds to step S29, where the tracking point is transferred (changed) to the transfer candidate selected at step S27. That is, the point indicated by the transfer candidate is set as a new tracking point. Thereafter, the processing returns to step S23, where the motion of the tracking point selected from the transfer candidates is estimated.

At step S24, it is determined whether the motion of the newly set tracking point can be estimated. If the estimation is possible, the tracking point is sifted by the amount of the estimated motion at step S25. At step S26, the region estimation related process is carried out. Thereafter, the processing returns to step S22 again and the processes subsequent to step S22 are repeated.

If, at step S24, it is determined that the motion of the newly set tracking point cannot be estimated, the processing returns to step S27 again. At step S27, a transfer candidate that is the next closest to the original tracking point is selected. At step S29, the selected transfer candidate is set to a new tracking point. The processes subsequent to step S23 are repeated again for the newly set tracking point.

If the motion of the tracking point cannot be estimated after every prepared transfer candidate is set to a new tracking point, it is determined at step S28 that the transfer candidate cannot be selected. Thus, the normal processing is completed. Thereafter, the process proceeds to the exception processing at step S2 shown in FIG. 2.

Figure 6:
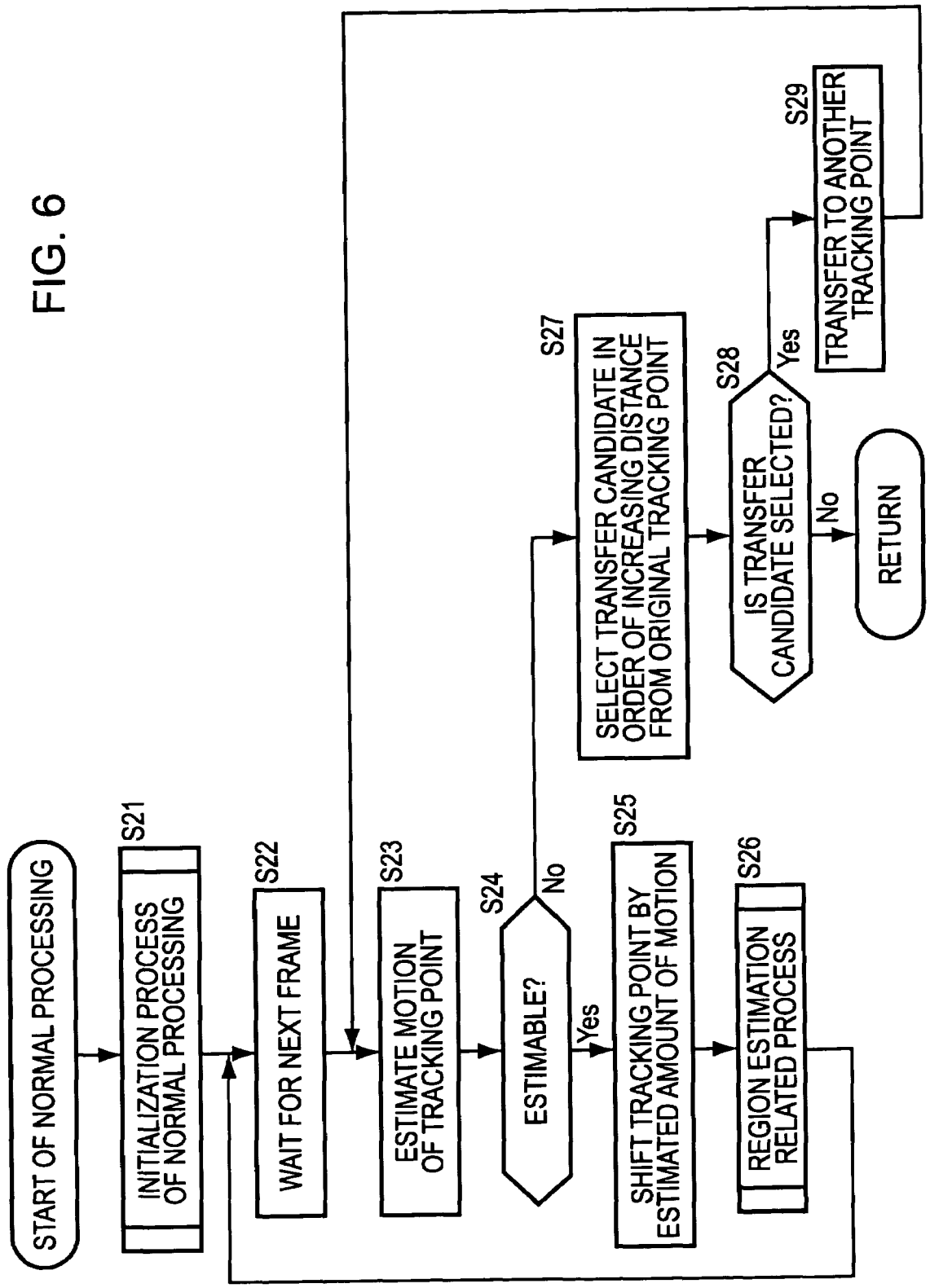
FIG. 6 is a flow chart illustrating normal processing at step S1 shown in FIG. 2.
Figure 7:
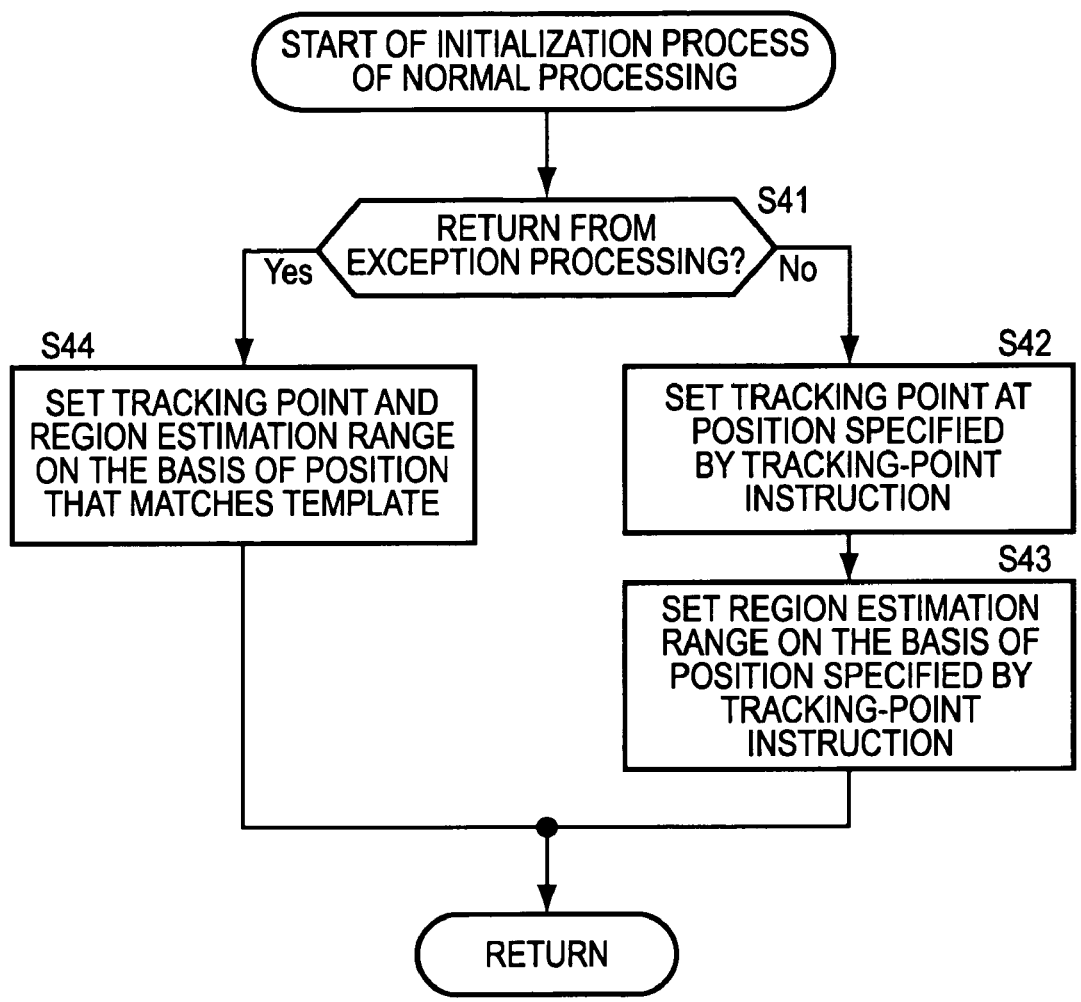
FIG. 7 is a flow chart illustrating an initialization process of the normal processing at step S21 shown in FIG. 6.

The initialization operation of the normal processing at step S21 shown in FIG. 6 is described in detail with reference to a flow chart shown in FIG. 7.

At step S41, the control unit 19 determines whether the current processing is a return processing from the exception processing. That is, the control unit 19 determines whether the processing has returned to the normal processing again after the exception processing at step S2 was completed. Since the exception processing at step S2 has not been executed for the first frame, it is determined that the processing is not a return processing from the exception processing. Thus, the process proceeds to step S42. At step S42, the tracking point determination unit 17 sets the tracking point to the point specified as a tracking point. That is, the user specifies a predetermined point in the input image as the tracking point for the control unit 19 by operating a mouse or another input unit (not shown). On the basis of this instruction, the control unit 19 controls the tracking point determination unit 17 to determine the point specified by the user to be the tracking point. Alternatively, the tracking point may be determined by using another method. For example, the point having the highest brightness may be determined to be the tracking point. The tracking point determination unit 17 delivers information about the determined tracking point to the region-estimation related processing unit 15.

At step S43, the region-estimation related processing unit 15 determines the region estimation range on the basis of the position of the tracking point determined at step S42. The region estimation range is a range that is referenced when points on the solid body including the tracking point are estimated. The region estimation range is determined in advance so that the solid body including the tracking point dominantly occupies the region estimation range. More specifically, the region estimation range is determined so that the position and the size follow the solid body including the tracking point, and therefore, the portion in the region estimation range that exhibits the numerically predominant movements can be estimated to belong to the solid body including the tracking point. At step S43, for example, a predetermined constant area at the center of which is the tracking point is determined to be the region estimation range as an initial value.

Subsequently, the process proceeds to step S22 shown in FIG. 3.

In contrast, if, at step S41, it is determined that the current processing is a return processing from the exception processing at step S2, the process proceeds to step S44. At step S44, the tracking point determination unit 17 determines the tracking point and the region estimation range on the basis of the position that matches the template in a process at step S303 shown in FIG. 33, which is described below. For example, a point in the current frame that matches the tracking point in the template is determined to be the tracking point. Also, the predetermined constant area around that point is determined to be the region estimation range. Thereafter, the process proceeds to step S22 shown in FIG. 3.

Figure 8:
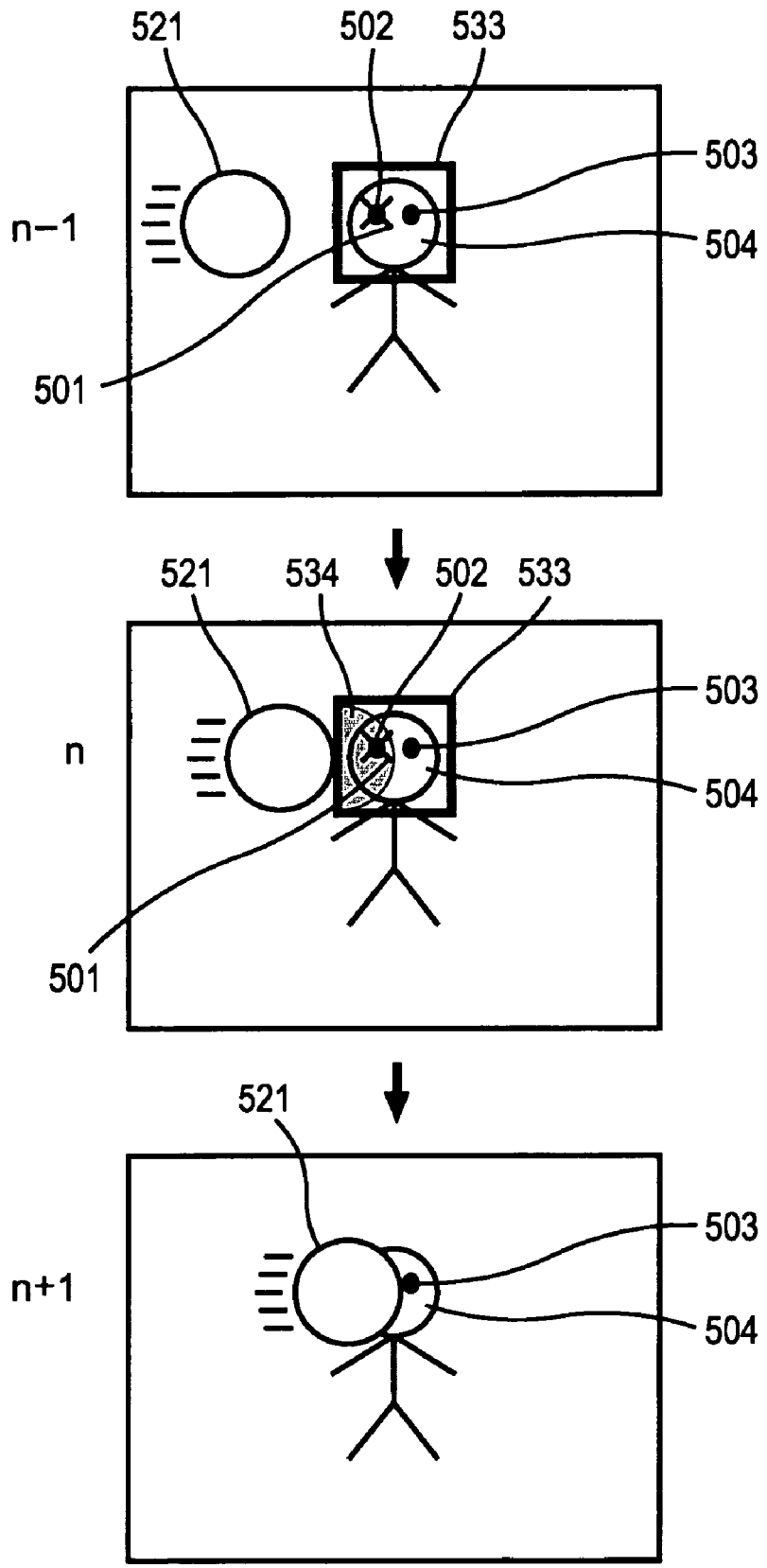
FIG. 8 is a diagram illustrating a transfer candidate extracting process.

The above-described processing is described next with reference to FIG. 8. That is, at step S42 shown in FIG. 7, as shown in FIG. 8, if the right eye 502 in a frame n−1, for example, is specified as the tracking point 501, a predetermined area including the tracking point 501 is specified as a region estimation range 533 at step S43. At step S24, it is determined whether a sample point within the region estimation range 533 can be estimated in the next frame. In the example shown in FIG. 8, in the frame n+1 subsequent to the frame n, since the left half area 534 including the right eye 502 is covered by the ball 521, the motion of the tracking point 501 in the frame n cannot be estimated in the next frame n+1. Therefore, in such a case, one point is selected from among points in the region estimation range 533 (the face 504 as a solid body including the right eye 502) prepared as the transfer candidates in advance in the temporary previous frame n−1. For example, the left eye 503 contained in the human face 504 and, more precisely, one pixel in the left eye 503 is selected here. The selected point is determined to be the tracking point in the frame n+1.

Figure 9:
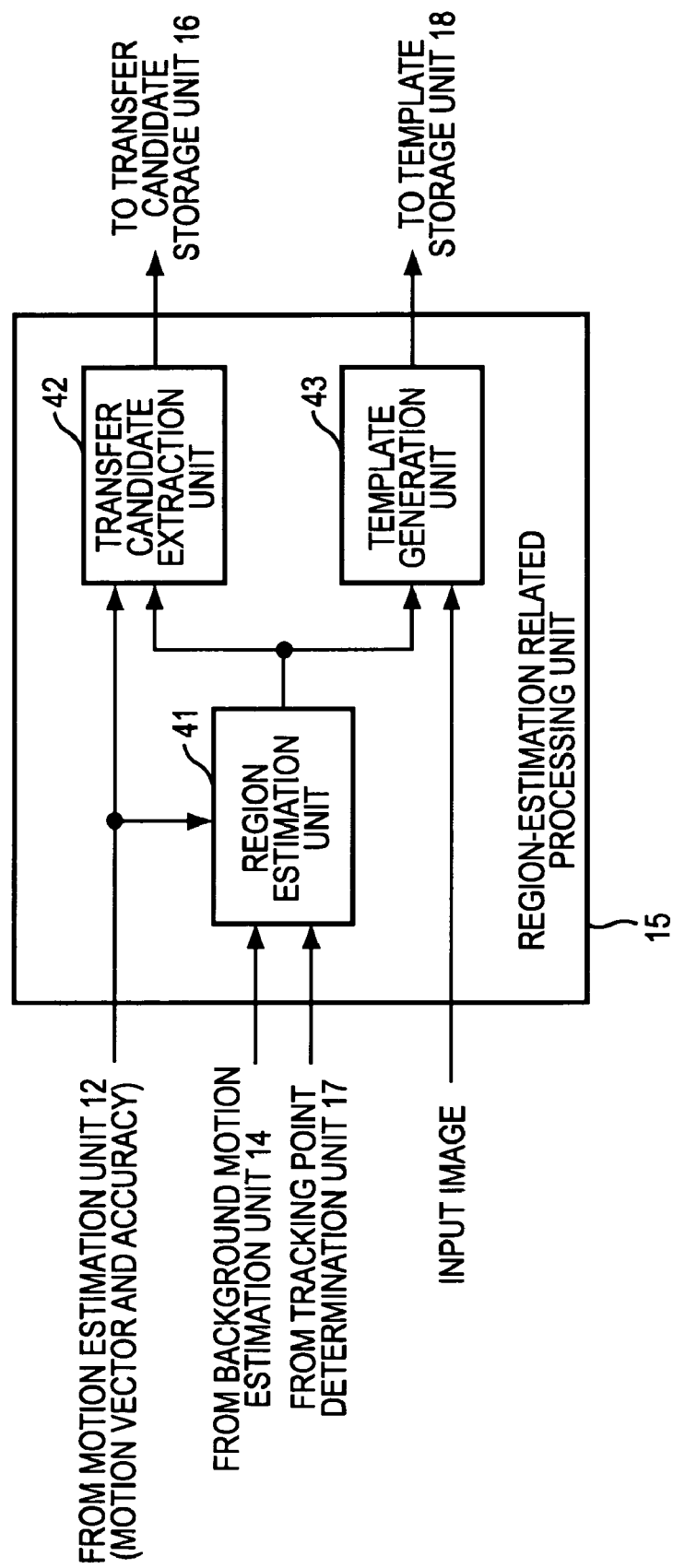
FIG. 9 is a block diagram of an exemplary configuration of a region-estimation related processing unit.

The region-estimation related processing unit 15 has a configuration shown in FIG. 9 in order to carry out the region-estimation related processing at step S26 shown in FIG. 6. That is, a region estimation unit 41 of the region-estimation related processing unit 15 receives a motion vector and the accuracy from the motion estimation unit 12, receives the background motion from the background motion estimation unit 14, and receives the positional information about the tracking point from the tracking point determination unit 17. A transfer candidate extraction unit 42 receives the motion vector and the accuracy from the motion estimation unit 12. The transfer candidate extraction unit 42 also receives the output from the region estimation unit 41. A template generation unit 43 receives the input image and the output from the region estimation unit 41.

The region estimation unit 41 estimates the region of the solid body including the tracking point on the basis of the inputs and, subsequently, outputs the estimation result to the transfer candidate extraction unit 42 and the template generation unit 43. The transfer candidate extraction unit 42 extracts the transfer candidates on the basis of the inputs and, subsequently, delivers the extracted transfer candidates to the transfer candidate storage unit 16. The template generation unit 43 generates a template on the basis of the inputs and, subsequently, delivers the generated template to the template storage unit 18.

Figure 10:
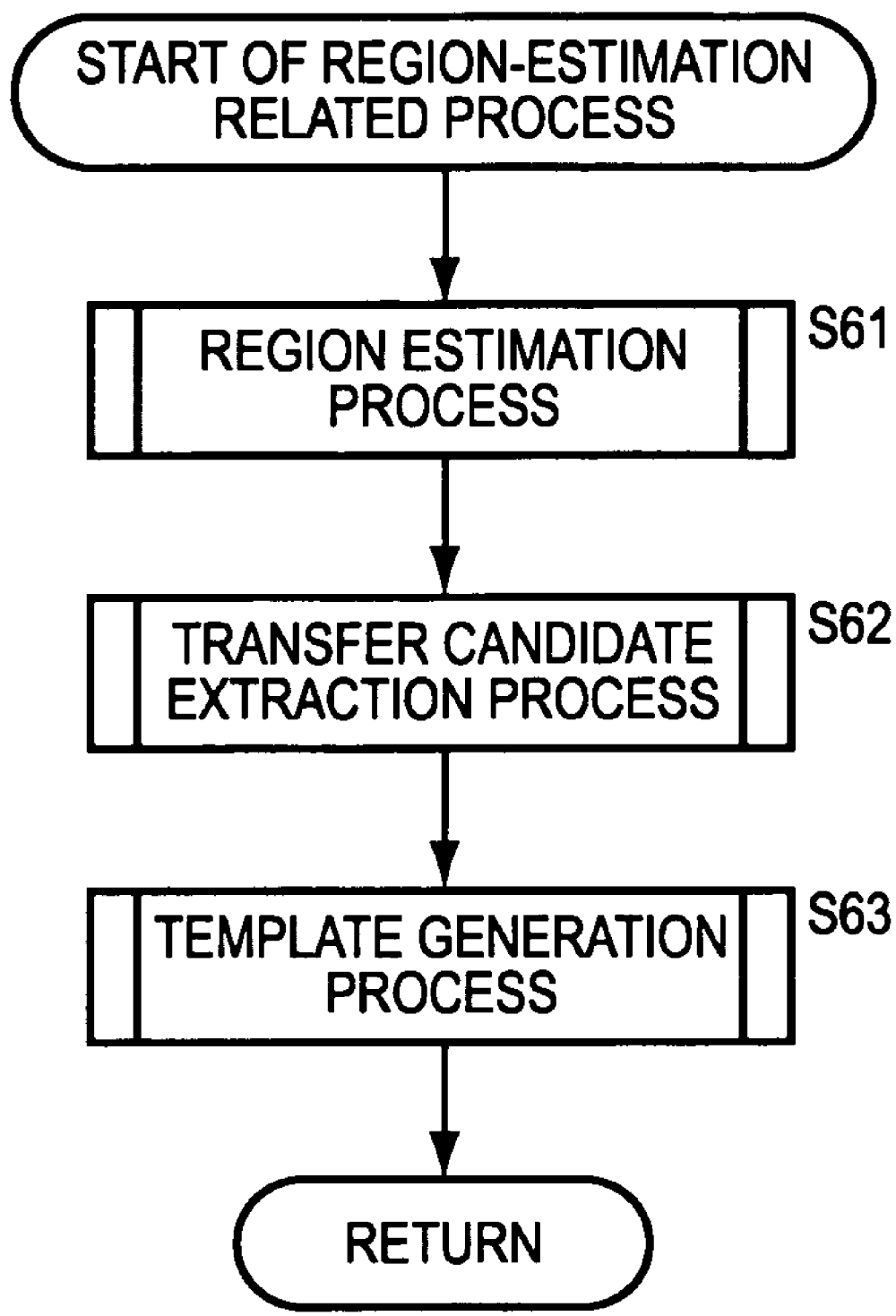
FIG. 10 is a flow chart illustrating a region-estimation related process at step S26 shown in FIG. 6.

FIG. 10 illustrates the region-estimation related process performed by the region-estimation related processing unit 15 (the process at step S26 shown in FIG. 6) in detail. At step S61, the region estimation process is executed by the region estimation unit 41. The detailed operation is described below with reference to a flow chart shown in FIG. 11. In this process, points in a region of an image estimated to belong to an object that is the same as the object to which the tracking point belongs (a solid body moving in synchronization with the tracking point) are extracted as a region estimation range (a region estimation range 81 in FIG. 17 described below).

At step S62, a transfer candidate extraction process is executed by the transfer candidate extraction unit 42. This process is described in detail below with reference to a flow chart shown in FIG. 23. The points of the transfer candidate are extracted from the points in the range estimated to be the region estimation range by the region estimation unit 41. The extracted points are stored in the transfer candidate storage unit 16.

At step S63, a template generation process is executed by the template generation unit 43. This process is described in detail below with reference to a flow chart shown in FIG. 24. A template is generated by this process.

The region estimation process at step S61 shown in FIG. 10 is described next with reference to a flow chart shown in FIG. 11.

At step S81, the region estimation unit 41 determines sample points serving as candidate points estimated to be the points belonging to the object including the tracking point.

Figure 12A:
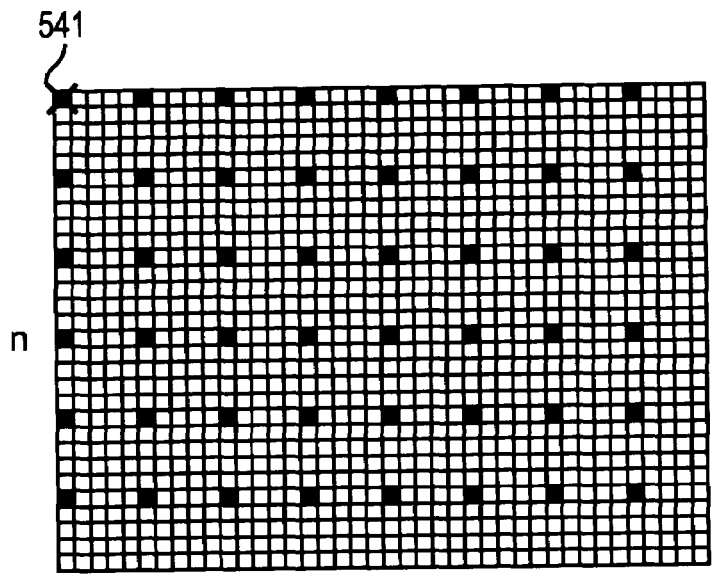
FIG. 12A is a diagram illustrating a process to determine sample points at step S81 shown in FIG. 11.
Figure 12B:
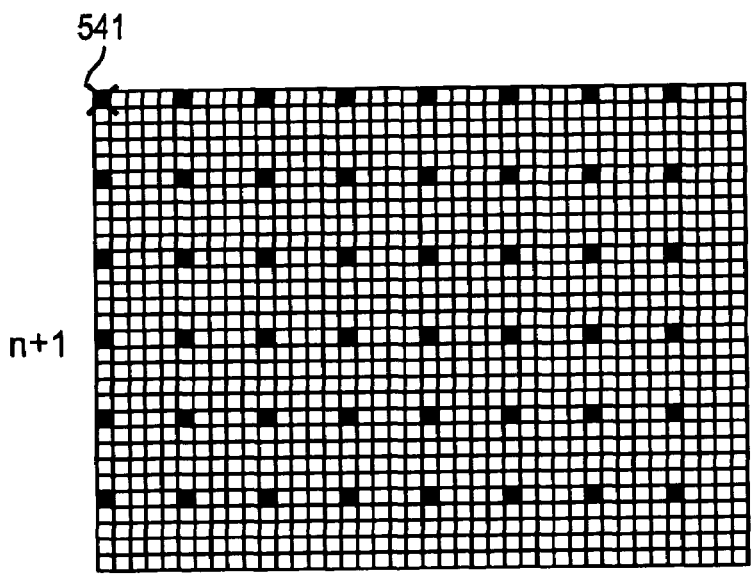
FIG. 12B is a diagram illustrating the process to determine sample points at step S81 shown in FIG. 11.

For example, as shown in FIG. 12, the sample points (indicated by black squares) can be the pixels at positions spaced from each other by predetermined pixels in the horizontal direction and the vertical direction starting from a fixed reference point 541. In the example shown in FIG. 12, the pixel at the upper left corner of each frame is defined as the reference point 541 (indicated by the symbol "x" in the drawing). The sample points are pixels at positions spaced from each other by 5 pixels in the horizontal direction and by 5 pixels in the vertical direction starting from the reference point 541. That is, in this example, pixels dispersed in the entire screen are defined as the sample points. Also, in this example, the reference points in the frames n and n+1 are the same at a fixed position.

Figure 13A:
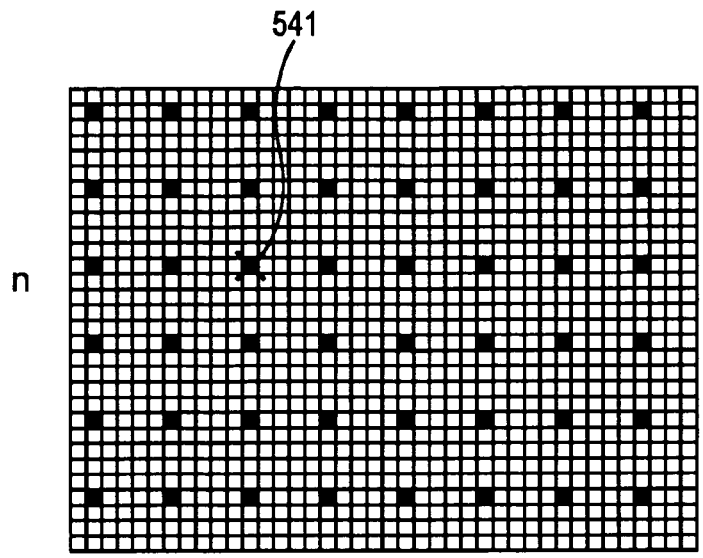
FIG. 13A is a diagram illustrating the process to determine sample points at step S81 shown in FIG. 11.
Figure 13B:
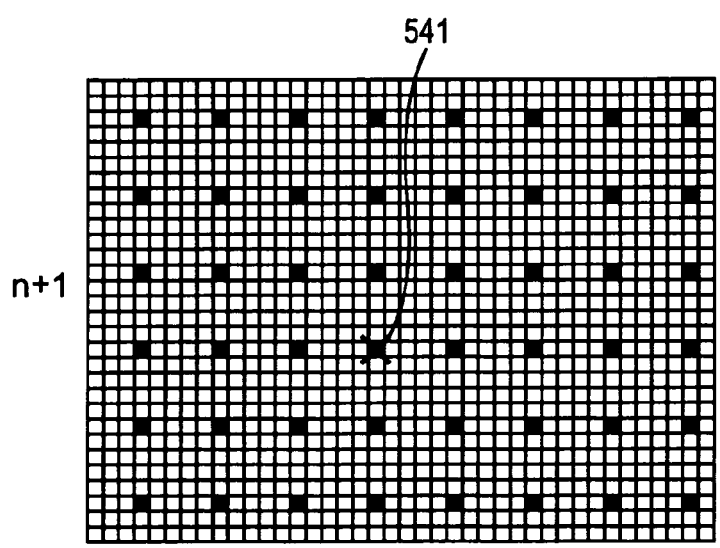
FIG. 13B is a diagram illustrating the process to determine sample points at step S81 shown in FIG. 11.

For example, as shown in FIG. 13, the reference point 541 may be dynamically changed so that the reference point in the frame n and the reference point in the frame n+1 are located at different positions.

In the examples shown in FIGS. 12 and 13, the distance between the sample points is constant for each frame. However, as shown in FIG. 14, the distance between the sample points may be changed for each frame. In the example shown in FIG. 14, the distance between the sample points is 5 pixels in the frame n, whereas the distance between the sample points is 8 pixels in the frame n+1. At that time, the dimensions of the region estimated to belong to the object including the tracking point can be used as a reference distance. More specifically, as the dimensions of the region estimation range decrease, the distance decreases.

Figure 15:
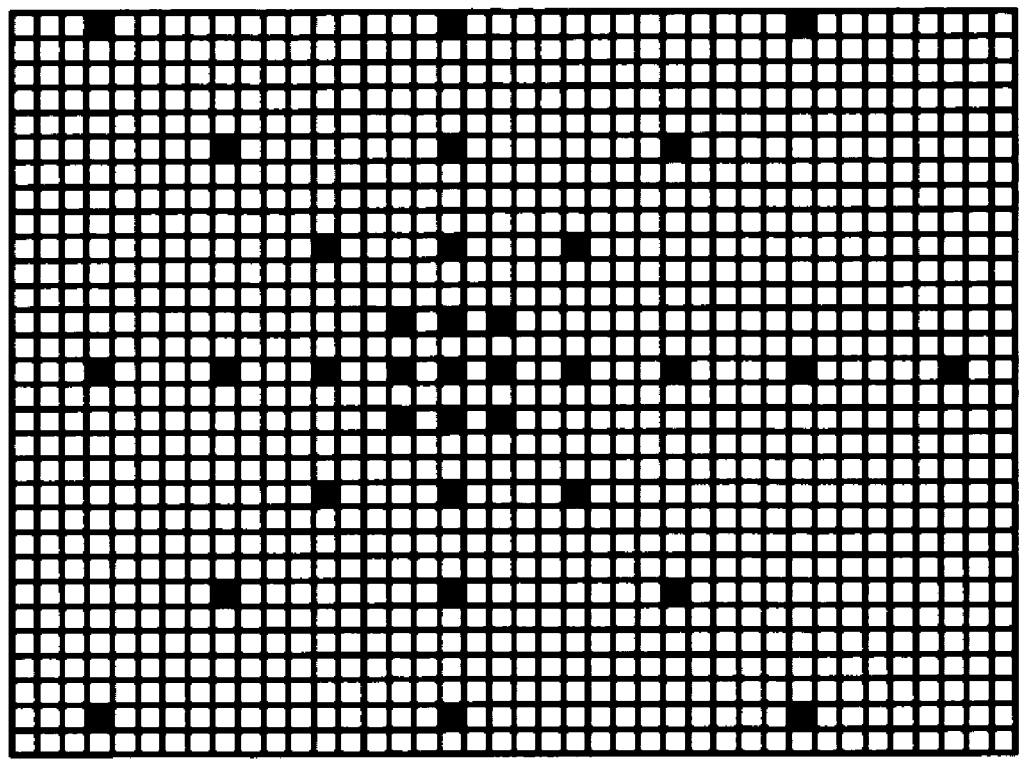
FIG. 15 is a diagram illustrating the process to determine sample points at step S81 shown in FIG. 11.

Alternatively, as shown in FIG. 15, the distances between the sample points may be changed from each other in one frame. At that time, the distance between the sample point and the tracking point may be used as a reference distance. That is, as the sample points are closer to the tracking point, the distance between the sample points decreases. In contrast, as the sample points are more distant from the tracking point, the distance between the sample points increases.

Thus, the sample points are determined. Subsequently, at step S82, the region estimation unit 41 executes a process for estimating the motions of the sample points in the region estimation range (determined at steps S43 and S44 in FIG. 7 or at steps S106 and S108 in FIG. 16, which is described below). That is, the region estimation unit 41 extracts points in the next frame corresponding to the sample points in the region estimation range on the basis of the motion vector delivered from the motion estimation unit 12.

At step S83, the region estimation unit 41 executes a process for removing points based on the motion vectors having the accuracy lower than a predetermined threshold value from the sample points estimated at step S82. The accuracy of motion vectors required for executing this process is provided by the motion estimation unit 12. Thus, from among the sample points in the region estimation range, only the points estimated on the basis of the motion vectors having high accuracy are extracted.

At step S84, the region estimation unit 41 extracts the full-screen motion on the basis of the estimation result of the motions in the region estimation range. As used herein, the term "full-screen motion" refers to a motion of a region having the largest size among regions having the same motion. More specifically, to the motion of each sample point, a weight that is proportional to the intersample distance of the sample point is assigned so that the histogram of the motion is created. The motion (one motion vector) that maximizes the frequency of weighting is extracted as the full-screen motion. When creating the histogram, for example, the representative value of the motion may be prepared in consideration of the pixel resolution. The motion having a difference by one pixel resolution may be added to the histogram.

At step S85, the region estimation unit 41 extracts sample points in the region estimation range having the full-screen motion as a result of the region estimation. Here, as the sample points having a full-screen motion, not only the sample point having the same motion as the full-screen motion is extracted, but also a sample point having a motion different from the full-screen motion by less than or equal to a predetermined threshold value can be extracted.

Thus, of the sample points in the region estimation range determined at step S43, S44, S44, S106, or S108, sample points having the full-screen motion is finally extracted (generated) as the points estimated to belong to the object including the tracking point.

Thereafter, at step S86, the region estimation unit 41 executes a process for updating the region estimation range. The processing then proceeds to step S22 shown in FIG. 6.

Figure 11:
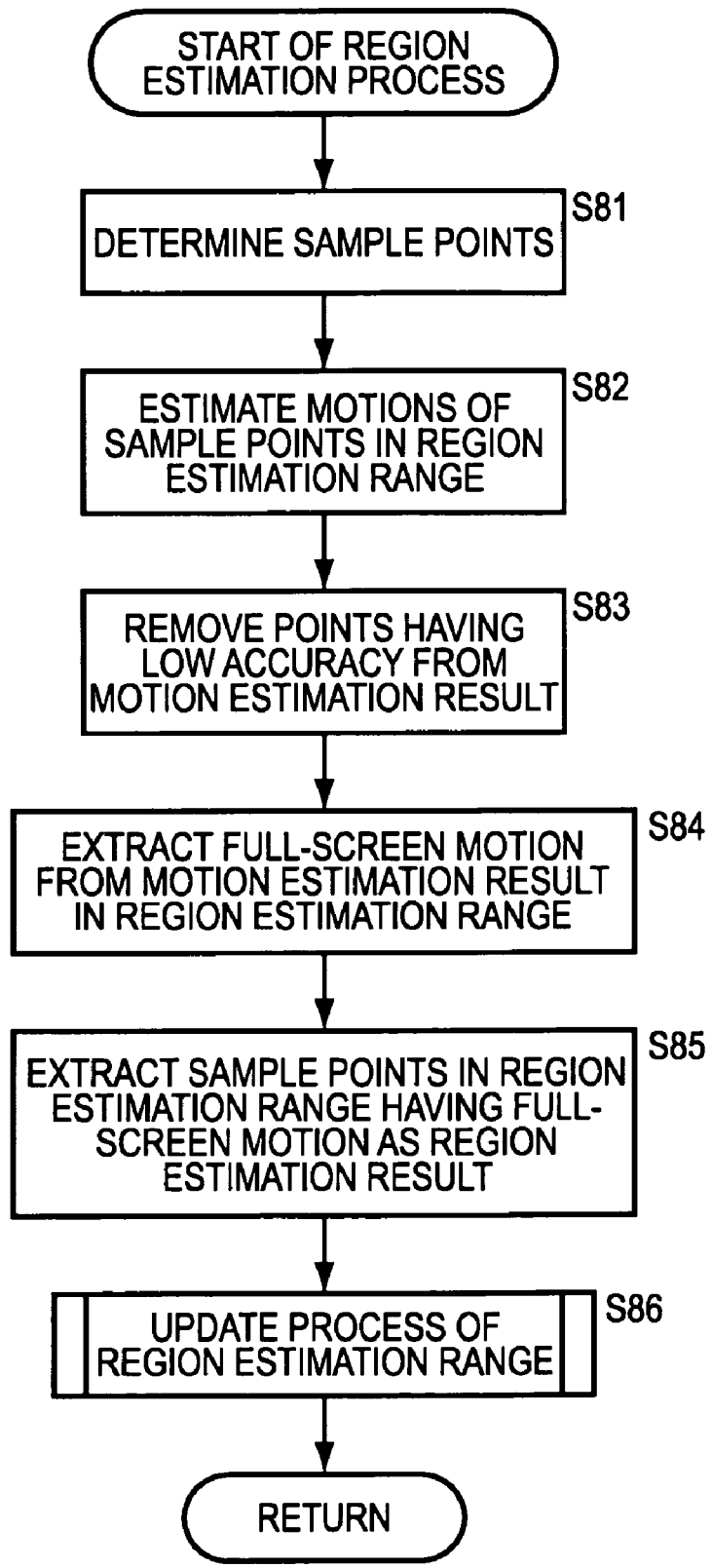
FIG. 11 is a flow chart illustrating a region estimation process at step S61 shown in FIG. 10.
Figure 16:
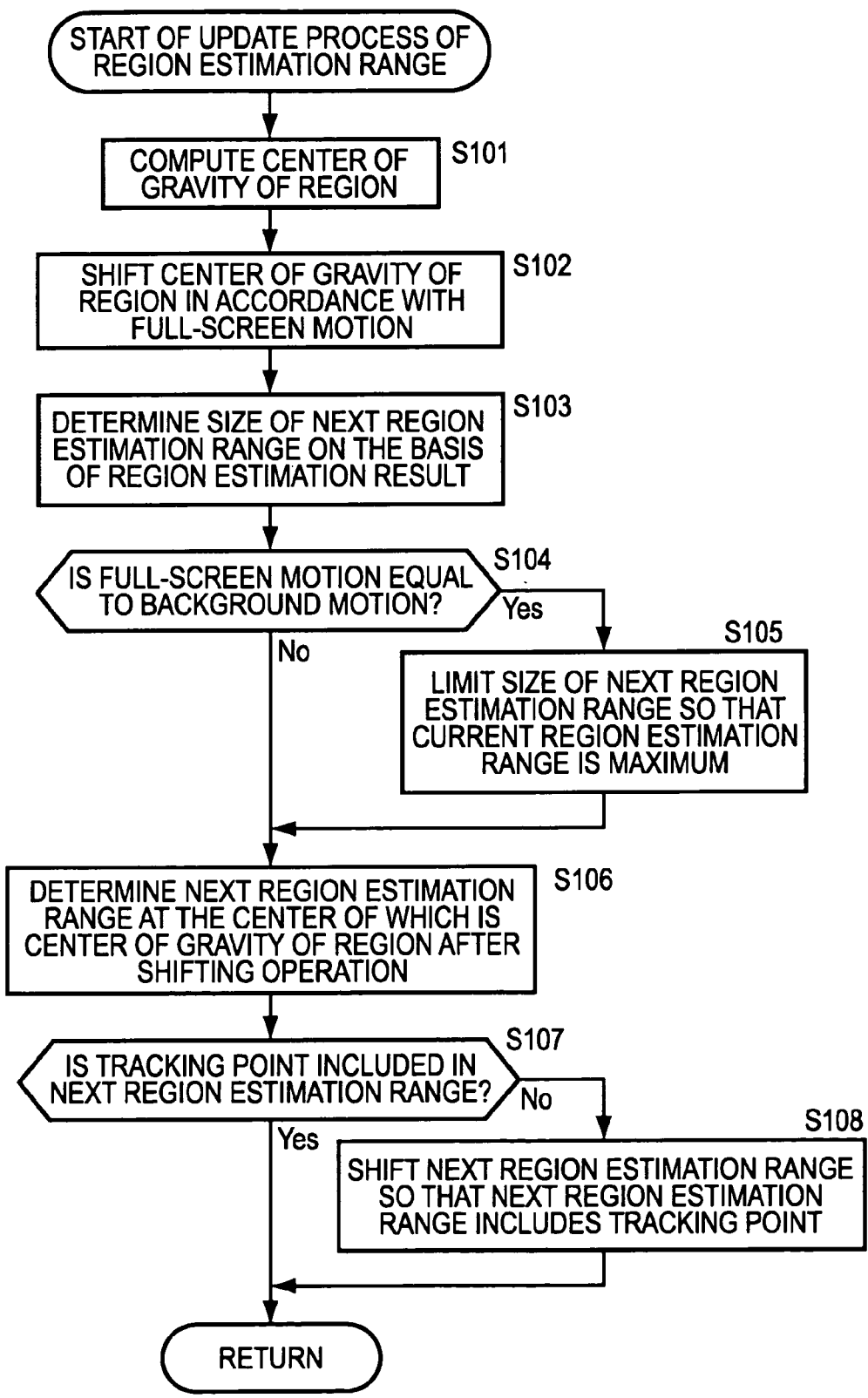
FIG. 16 is a flow chart illustrating a process to update a region estimation range at step S86 shown in FIG. 11.
Figure 17A:
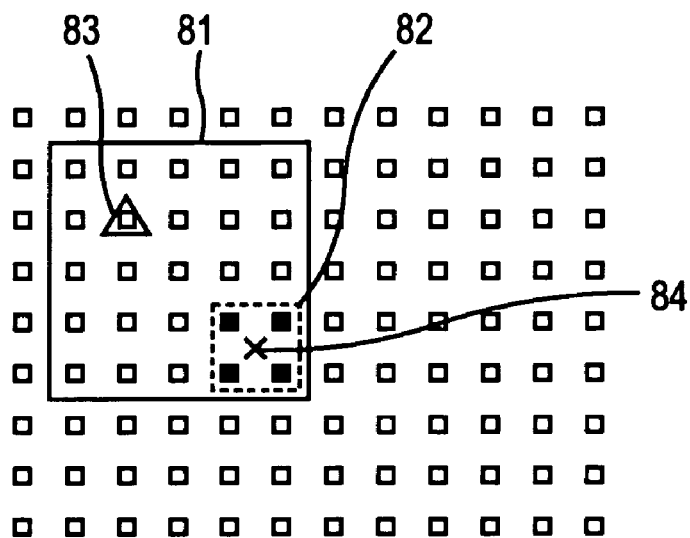
FIG. 17A is a diagram illustrating the process to update a region estimation range.

FIG. 16 illustrates the process to update the region estimation range at step S86 shown in FIG. 11 in detail. At step S101, the region estimation unit 41 computes the center of gravity of a region. This region refers to the region defined by the sample points extracted at step S85 shown in FIG. 11 (i.e., the region defined by the points estimated to belong to the object including the tracking point). That is, there is a one-to-one correspondence between a motion vector (full-screen motion) and this region. For example, as shown in FIG. 17A, from among sample points indicated by white squares within a region estimation range 81, sample points indicated by black squares are extracted as sample points having the full-screen motion at step S85 shown in FIG. 11. The region defined by these sample points is extracted (estimated) as a region 82. Thereafter, the center of gravity 84 of the region 82 is computed. More specifically, a weight according to the intersample distance is assigned to each sample point, and a sample point gravity is computed as the center of gravity of the region. This process is executed to find the position of the region in the current frame.

Figure 17B:
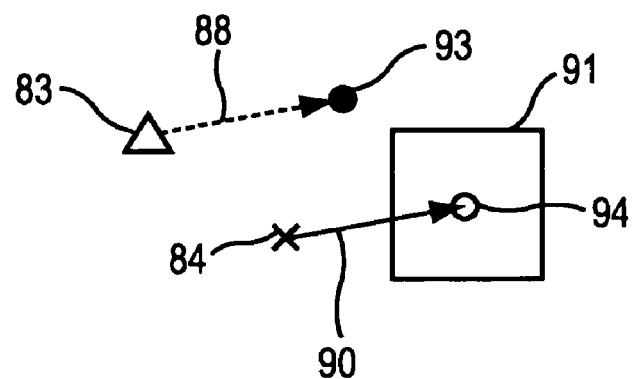
FIG. 17B is a diagram illustrating the process to update a region estimation range.

At step S102, the region estimation unit 41 shifts the center of gravity of the region in accordance with the full-screen motion. This process is executed so that the region estimation range 81 follows the motion of the position of the region and moves the region to the estimated position in the next frame. As shown in FIG. 17B, when the tracking point 83 in the current frame appears as a tracking point 93 in the next frame in accordance with a motion vector 88 of the tracking point 83, a motion vector 90 of the full-screen motion substantially corresponds to the motion vector 88. Accordingly, by shifting the center of gravity 84 in the current frame on the basis of the motion vector (full-screen motion) 90, a point 94 in the frame same as that of the tracking point 93 (the next frame) can be obtained. By setting a region estimation range 91 at the center of which is the point 94, the region estimation range 81 can follow the motion of the position of the region 82 so as to move to the estimated position in the next frame.

At step S103, the region estimation unit 41 determines the size of the next region estimation range on the basis of the region estimation result. More specifically, square sum of the distances between all the sample points estimated to be the region (the distances between the black squares in the region 82 shown in FIG. 17) is considered to be the dimensions of the region 82. The size of a region estimation range 91 in the next frame is determined so as to be slightly larger than the dimensions of the region 82. That is, as the number of sample points in the region 82 increases, the size of the region estimation range 91 increases. In contrast, as the number of sample points in the region 82 decreases, the size of the region estimation range 91 decreases. Thus, the size of the region estimation range 91 can not only follow the enlargement and reduction of the region 82 but also prevent the full screen region in the region estimation range 81 from being the peripheral area of the tracking object.

If the full-screen motion extracted at step S84 shown in FIG. 11 is equal to the background motion, the tracking object cannot be distinguished from the background by the motion. Therefore, the background motion estimation unit 14 executes a process for estimating a background motion at all times (the details are described below with reference to FIG. 49). At step S104, the region estimation unit 41 determines whether the background motion delivered from the background motion estimation unit 14 is equal to the full-screen motion extracted at step S84 shown in FIG. 11. If the full-screen motion is equal to the background motion, the region estimation unit 41, at step S105, limits the size of the next region estimation range so that the size of the current region estimation range is maximized. Consequently, the background is not erroneously identified as the tracking object. Thus, the size of the region estimation range is controlled so as not to be enlarged.

If, at step S104, it is determined that the full-screen motion is not equal to the background motion, the process at step S105 is not necessary, and therefore, the process at step S105 is skipped.

At step S106, the region estimation unit 41 determines the size of the next region estimation range at the center of which is the center of gravity of the region after the shift. Thus, the region estimation range is determined so that the center of gravity of the region estimation range is equal to the obtained center of gravity of the region after the shift and the size of the region estimation range is proportional to the size of the region.

In an example shown in FIG. 17B, the size of the region estimation range 91 at the center of which is the center of gravity 94 after the shift based on the motion vector (full-screen motion) 90 is determined in accordance with the dimensions of the region 82.

It should be ensured that the region having the full-screen motion inside the region estimation range 91 is a region of the object to be tracked (e.g., the face 504 shown in FIG. 8). Therefore, at step S107, the region estimation unit 41 determines whether the tracking point is included in the next region estimation range. If the tracking point is not included in the next region estimation range, the region estimation unit 41, at step S108, executes a process to shift the next region estimation range so that the next region estimation range includes the tracking point. If the tracking point is included in the next region estimation range, the process at step S108 is not necessary, and therefore, the process at step S108 is skipped.

More specifically, in this case, the next region estimation range may be shifted so that the moving distance is minimal. Alternatively, the next region estimation range may be shifted along a vector from the center of gravity of region estimation range to the tracking point by the minimal distance so that the tracking point is included in the next region estimation range.

In order to maintain the robust performance of the tracking, the shift of the region to include the tracking point may be skipped.

Figure 17C:
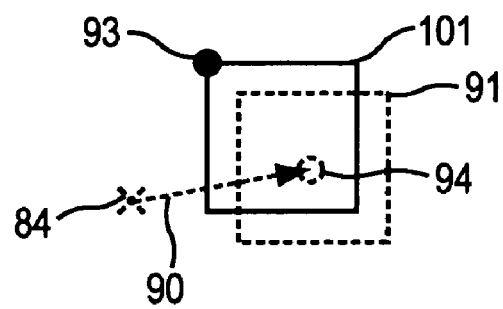
FIG. 17C is a diagram illustrating the process to update a region estimation range.

In the example shown in FIG. 17C, since the region estimation range 91 does not include the tracking point 93, the region estimation range 91 is shifted to the position indicated by a region estimation range 101 (the position that includes the tracking point 93 at the upper left corner)

FIGS. 17A to 17C illustrate the examples in which the shifting process at step S108 is required. In contrast, FIGS. 18A to 18C illustrate the examples in which the shifting process at step S108 is not required (i.e., the examples when it is determined at step S107 that the tracking point is included in the next region estimation range).

Figure 18A:
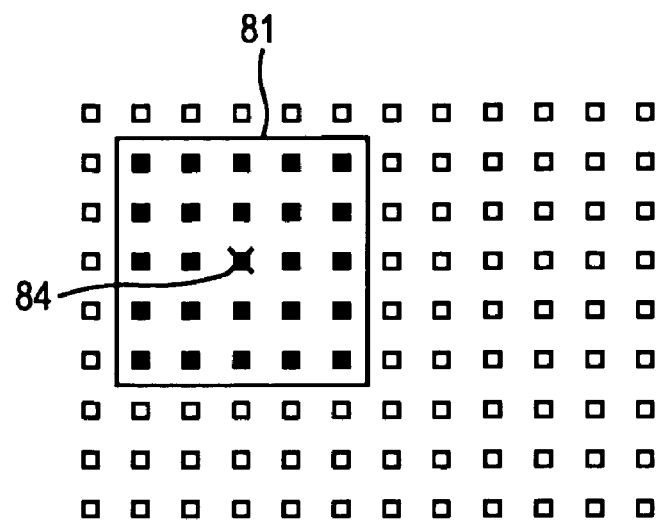
FIG. 18A is a diagram illustrating the process to update a region estimation range.
Figure 18B:
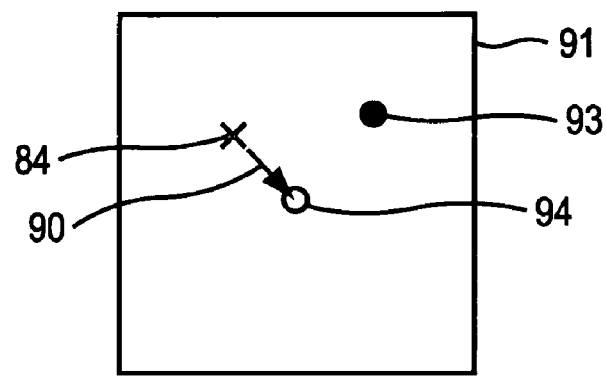
FIG. 18B is a diagram illustrating the process to update a region estimation range.
Figure 18C:
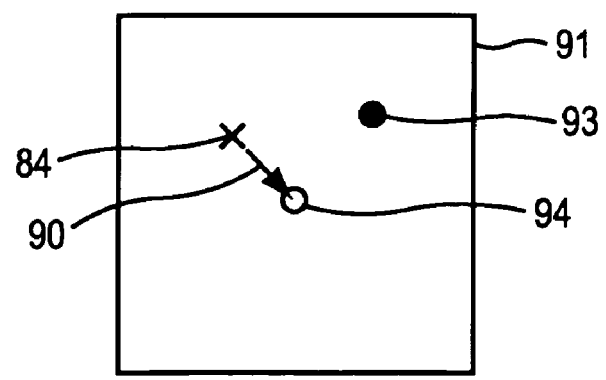
FIG. 18C is a diagram illustrating the process to update a region estimation range.

As shown in FIGS. 18A to 18C, when all the sample points in the region estimation range 81 are points of the region, the need for the shifting process at step S108 shown in FIG. 16 is eliminated.

Figure 19A:
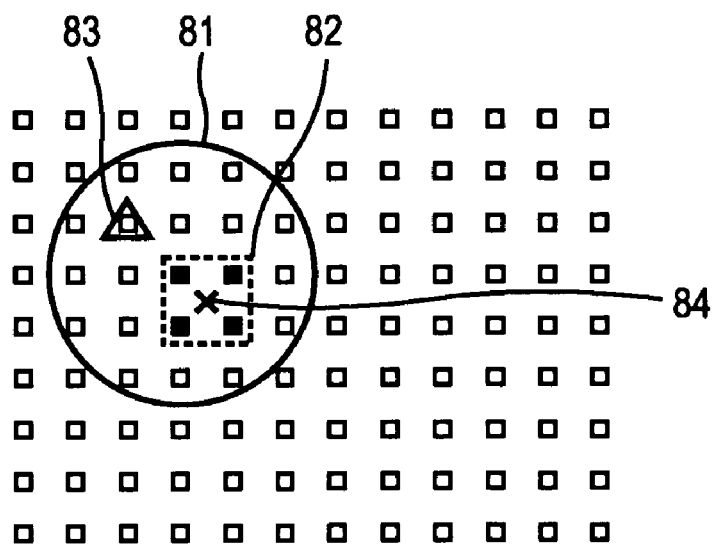
FIG. 19A is a diagram illustrating the process to update a region estimation range.
Figure 19B:
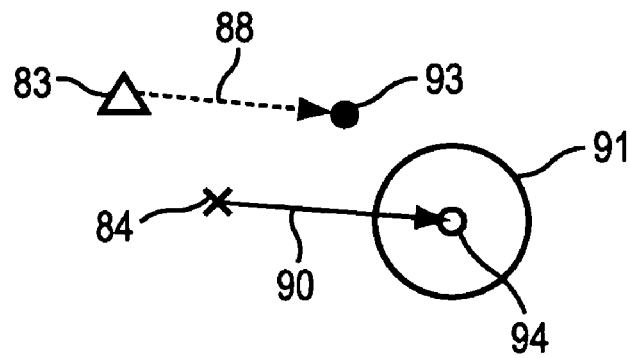
FIG. 19B is a diagram illustrating the process to update a region estimation range.
Figure 19C:
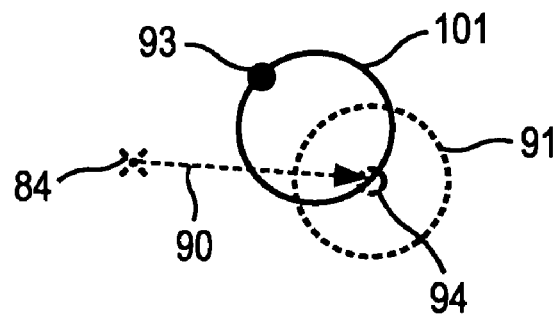
FIG. 19C is a diagram illustrating the process to update a region estimation range.
Figure 20A:
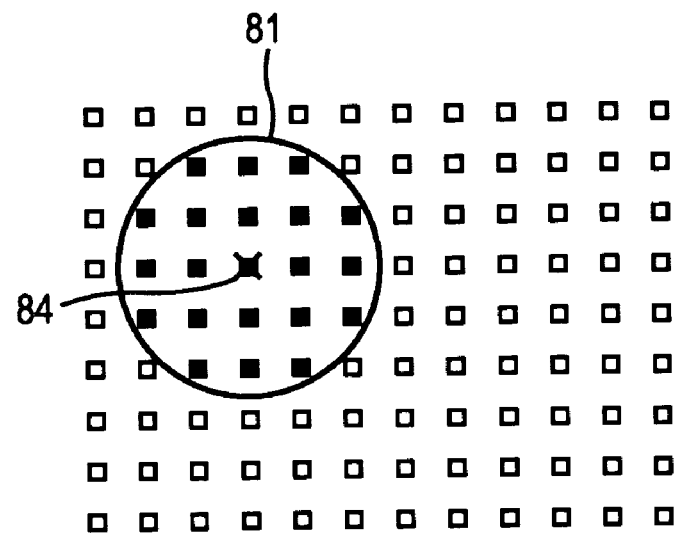
FIG. 20A is a diagram illustrating the process to update a region estimation range.
Figure 20B:
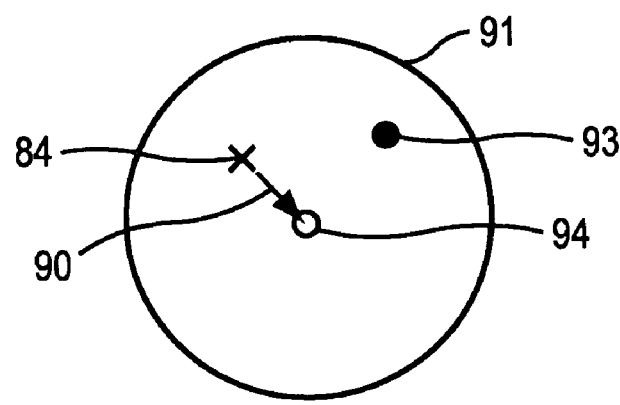
FIG. 20B is a diagram illustrating the process to update a region estimation range.
Figure 20C:
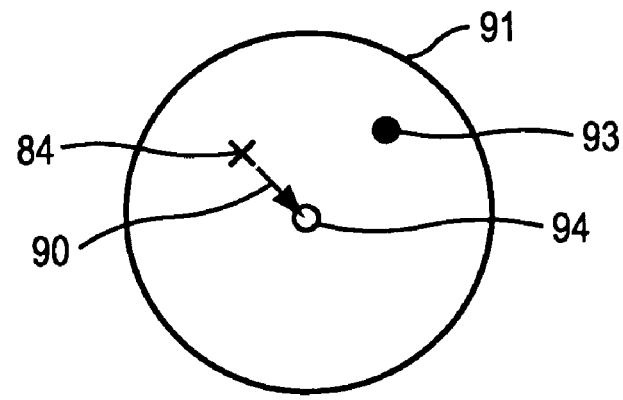
FIG. 20C is a diagram illustrating the process to update a region estimation range.

FIGS. 17A to 17C and FIGS. 18A to 18C illustrate the examples in which the region estimation range is rectangular. However, as shown in FIGS. 19A to 19C and FIGS. 20A to 20C, the region estimation range can be circular. FIGS. 19A to 19C correspond to FIGS. 17A to 17C, respectively, in which the shifting process at step S108 is required. In contrast, FIGS. 20A to 20C correspond to FIGS. 18A to 18C, respectively, in which the shifting process at step S108 is not required.

Thus, by executing the process for updating the region estimation range shown in FIG. 16 (at step S86 shown in FIG. 11), the position and the size of the region estimation range for the next frame are determined so that the region estimation range includes the tracking point.

In the process for updating the region estimation range shown in FIG. 16, the shape of the region estimation range is a fixed rectangle or circle. However, the shape of the region estimation range may be variable. In such an example, a process for updating the region estimation range at step S86 shown in FIG. 11 is described next with reference to FIG. 21.

Figure 22A:
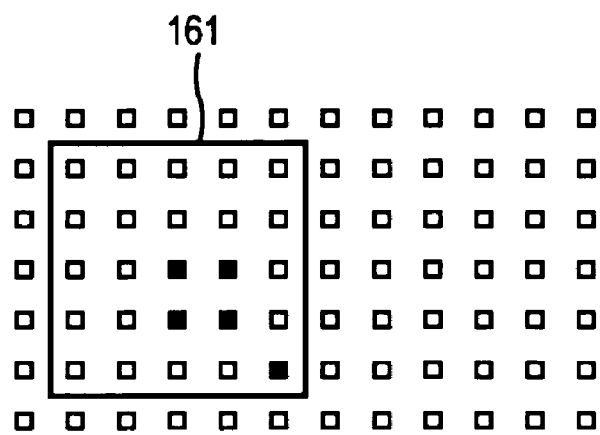
FIG. 22A is a diagram illustrating the process to update a region estimation range.
Figure 22B:
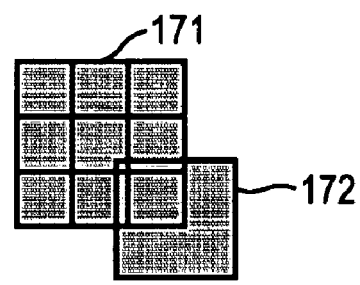
FIG. 22B is a diagram illustrating the process to update a region estimation range.

At step S131, the region estimation unit 41 determines whether the full-screen motion extracted at step S84 shown in FIG. 11 is equal to the background motion estimated by the background motion estimation unit 14. If the two are not equal, the process proceeds to step S133, where the region estimation unit 41 determines a small region corresponding to every point estimated to belong to the region (the region composed of pixels having a motion equal to the full-screen motion) (i.e., one small region is determined for one point). In the examples shown in FIGS. 22A and 22B, in a region estimation range 161, small regions 171 and 172 are determined which correspond to the points in the region indicated by black squares. In the drawing, reference numeral 171 represents an example in which four small regions corresponding to the four points overlap each other. The size of the small region may be determined so as to, for example, be proportional to the distance between the sample points.

Figure 22C:
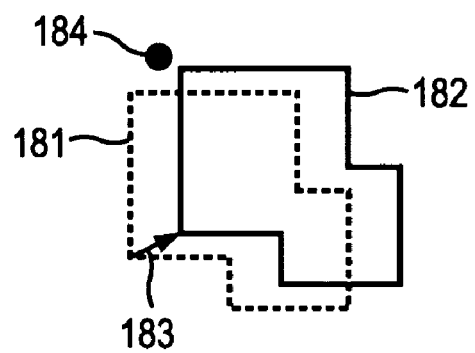
FIG. 22C is a diagram illustrating the process to update a region estimation range.

At step S134, the region estimation unit 41 determines the union of the small regions determined at step S133 to be a temporary region estimation range. In an example shown in FIG. 22C, a region 182, which is a union of the regions 171 and 172 is determined to be the temporary region estimation range. If a plurality of noncontiguous regions are created after the union of the small regions is obtained, only the region having the largest dimensions may be determined to be the temporary region estimation range.

If, at step S131, it is determined that the full-screen motion is equal to the background motion, the region estimation unit 41, at step S132, determines the current region estimation range to be the temporary region estimation range. The reason why the current region estimation range is determined to be the temporary region estimation range is that the current region estimation range is kept unchanged since the background cannot be distinguished from the object to be tracked by the motions when the estimation result of the background motion is equal to the full-screen motion.

After the process at step S134 or S132 is completed, the region estimation unit 41, at step 135, determines the next region estimation range by shifting the temporary region estimation range determined at step S134 or S132 using the full-screen motion. In the example shown in FIG. 22C, a temporary region estimation range 181 is shifted on the basis of a motion vector 183 of the full-screen motion and is determined to be the temporary region estimation range 182.

Figure 22D:
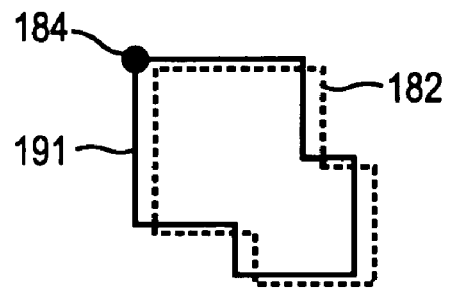
FIG. 22D is a diagram illustrating the process to update a region estimation range.

At step S136, the region estimation unit 41 determines whether the tracking point is included in the next region estimation range determined at step S135. If the tracking point is not included in the next region estimation range, the process proceeds to step S137, where the region estimation unit 41 shifts the next region estimation range so that the next region estimation range includes the tracking point. In the examples shown in FIGS. 22C and 22D, since the region estimation range 182 does not include a tracking point 184, the region estimation range 182 is shifted so as to include the tracking point 184 at the upper left corner and is determined to be a region estimation range 191.

If, at step S136, it is determined that the tracking point is included in the next region estimation range, the shifting process at step S137 is not necessary, and therefore, the shifting process at step S137 is skipped.

A process for extracting a transfer candidate at step S62 shown in FIG. 10 is described with reference to a flow chart shown in FIG. 23.

At step S161, the transfer candidate extraction unit 42 holds the shifting result of a point shifted by the estimated motion for every point estimated to belong to the region of the full-screen motion as transfer candidates. That is, the points obtained as the region estimation result are not directly used. In order to use these points in the next frame, the process to extract the shifting result on the basis of the motion estimation result thereof is executed. The extracted transfer candidates are then delivered to the transfer candidate storage unit 16 and are stored in the transfer candidate storage unit 16.

This process is described next with reference to FIG. 8. That is, in the example shown in FIG. 8, the tracking point 501 is present in the frames n−1 and n. However, in the frame n+1, the tracking point 501 is covered by the ball 521 coming from the left in the drawing, and therefore, the tracking point 501 disappears. Accordingly, in the frame n+1, the tracking point is required to be transferred to a different point in the face 504 serving as the object to be tracked (for example, transferred to the left eye 503, and more precisely, the point that is the closest to the right eye 502). Therefore, the transfer candidate is prepared in advance in the previous frame before the transfer is actually required.

More specifically, in the example shown in FIG. 8, it is predictable that, in most cases, the estimation result of the motion in the region estimation range 533 from the frame n to the frame n+1 is not correctly estimated since the transfer is required in the region estimation range 533. That is, in the example shown in FIG. 8, the transfer occurs since the tracking point and part of the object including the tracking point disappear. Thus, for a portion 534 of the region estimation range 533 in the frame n where the object is hidden in the frame n+1 (the portion indicated by cross-hatching in FIG. 8), the motion is not correctly estimated, and therefore, the accuracy of the motion is estimated to be low or not to be low and the estimation result of the motion is meaningless.

In this case, since the motion estimation result that can be used for the region estimation decreases or an incorrect motion estimation result get mixed, the possibility increases that the region estimation is incorrect. Additionally, in general, this possibility in the temporally more previous region estimation from the frame n−1 to frame n is lower than that in the region estimation from the frame n to frame n+1.

Accordingly, to reduce the risk of the incorrect estimation and increase performance, it is desirable that the region estimation result is not directly used, but the region estimation result obtained in the frame n−1 (or temporally more previous frame) is used as the transfer candidate of the moving target.

However, the region estimation result can be directly used. The processing in such a case is described with reference to FIG. 38.

Figure 24:
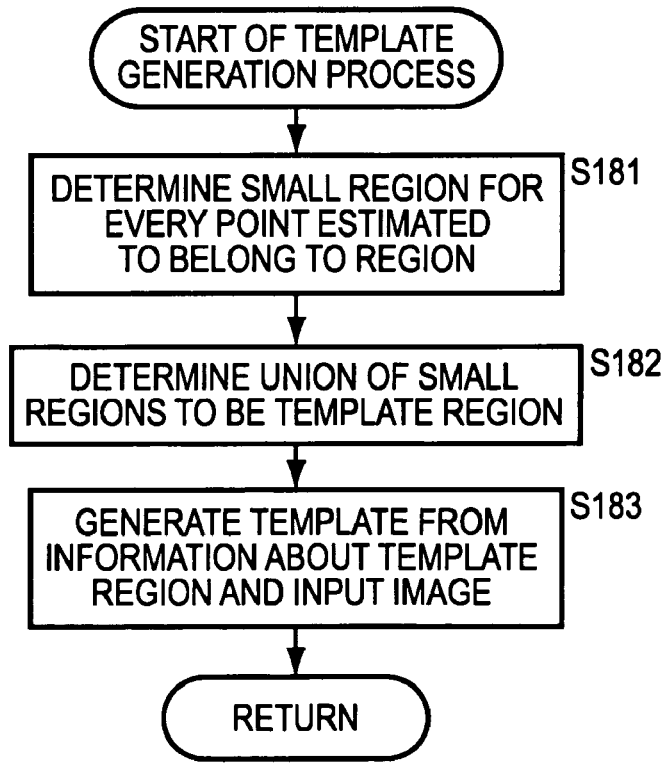
FIG. 24 is a flow chart illustrating a template generating process at step S63 shown in FIG. 10.

FIG. 24 illustrates a detailed process for generating a template at step S63 shown in FIG. 10. At step S181, the template generation unit 43 determines a small region for every point estimated to belong to the region (the region of the full-screen motion). In an example shown in FIG. 25, a small region 222 is determined for a point 221 of the region.

At step S182, the template generation unit 43 determines the union of the small regions determined at step S181 to be a template region. In the example shown in FIG. 25, the union of the small regions 222 is determined to be a template region 231.

Subsequently, at step S183, the template generation unit 43 generates a template from information about the template region determined at step S182 and image information and delivers the template to the template storage unit 18, which stores the template. More specifically, pixel data in the template region 231 is determined to be the template.

Figure 25:
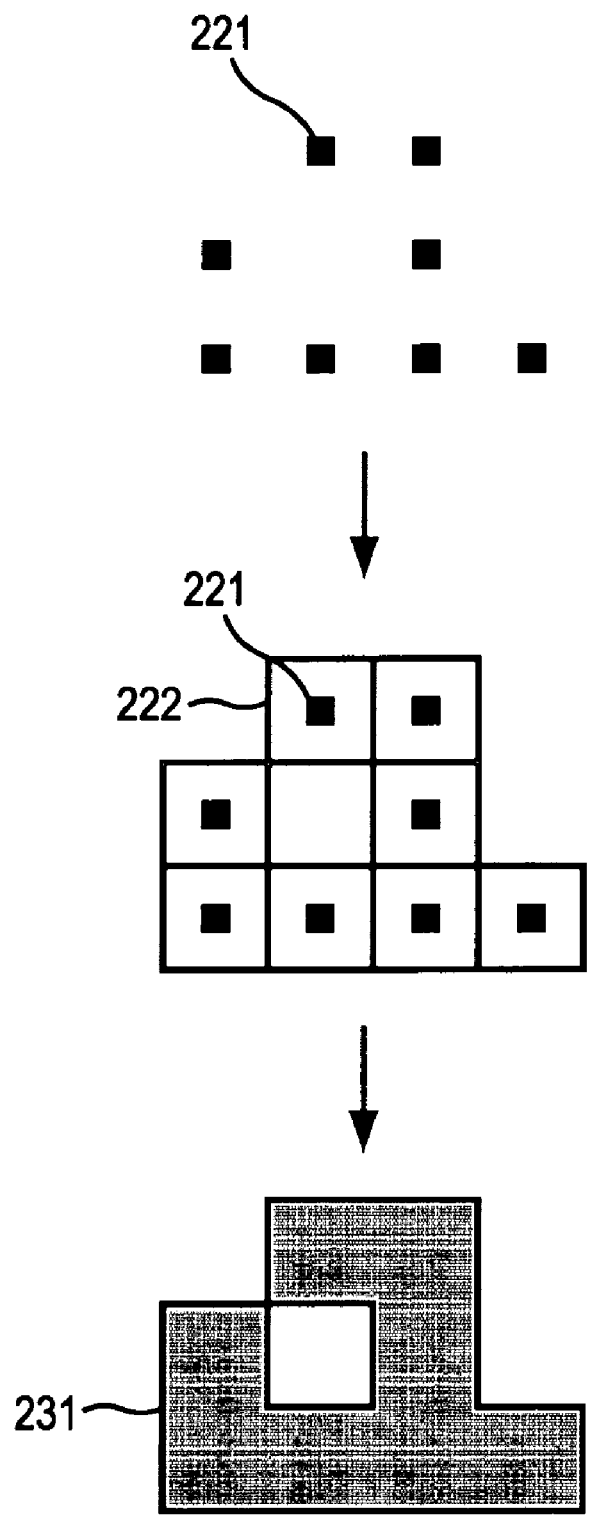
FIG. 25 is a diagram illustrating the template generation.
Figure 26:
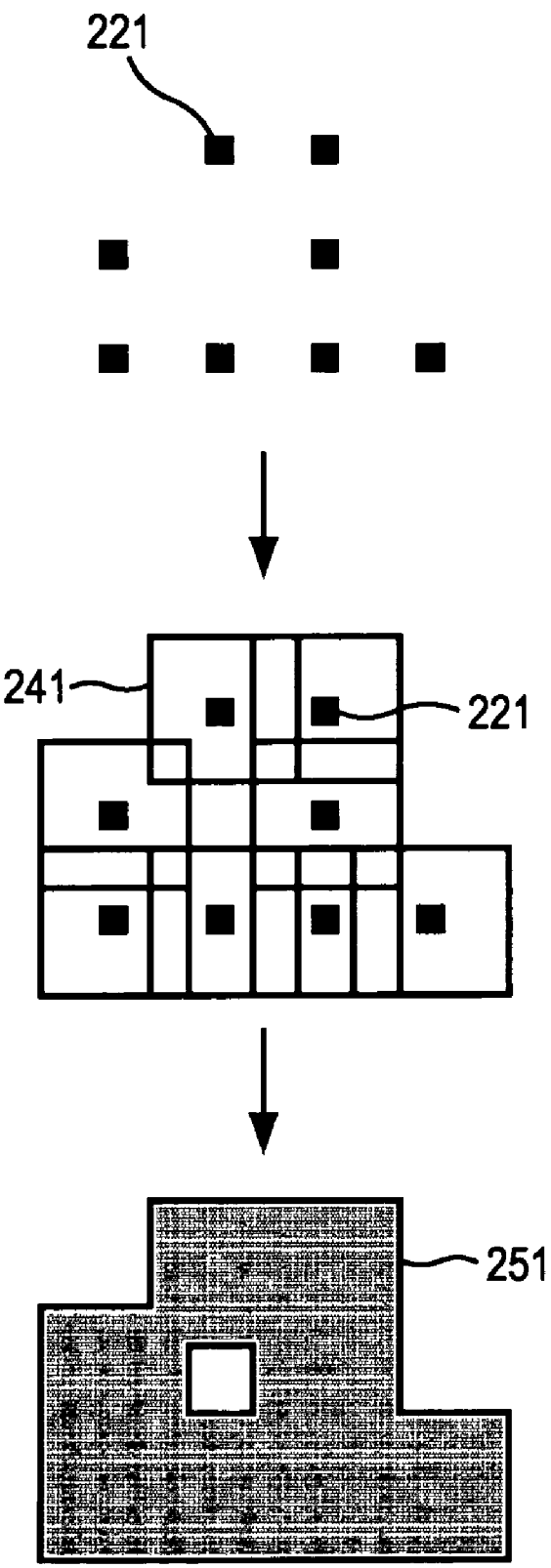
FIG. 26 is a diagram illustrating the template generation.

As shown in FIG. 26, a small region 241 corresponding to the point 221 of the region is larger than the small region 222 shown in FIG. 25. Consequently, a template region 251, which is the union of the small regions 241, is also larger than the template region 231 shown in FIG. 25.

The size of the small region may be proportional to the distance between the sample points. In this case, the constant of proportion can be determined so that the dimensions are equal to the square of the distance between the sample points. Alternatively, the constant of proportion can be determined so that the dimensions are greater than or less than the square of the distance between the sample points.

In addition, in place of the region estimation result, a region having a fixed size and shape at the center of which is the tracking point, for example, may be used as the template region.

Figure 27:
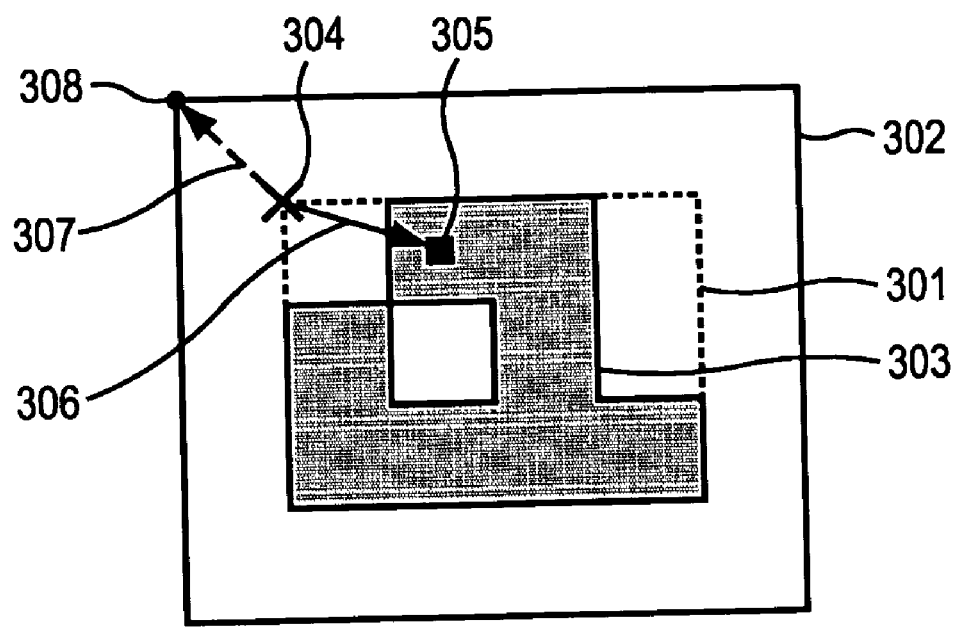
FIG. 27 is a diagram illustrating a positional relationship between a template and a tracking point.

FIG. 27 illustrates a positional relationship between the template and the region estimation range. A template region 303 includes a tracking point 305. The upper left corner point of a circumscribed rectangle 301 that is circumscribed about the template region 303 is defined as a template reference point 304. A vector 306 from the template reference point 304 to the tracking point 305 and a vector 307 from the template reference point 304 to a reference point 308 at the upper left corner of a region estimation range 302 serves as information about the template region 303. The template is composed of pixels included in the template region 303. The vectors 306 and 307 are used for the process to return to the normal processing when an image that is the same as the template is detected.

In the above-described processes, unlike the transfer candidate, the range and pixels corresponding to the current frame are determined to be the template. However, like the transfer candidate, the moving target points in the next frame may be used as the template.

Thus, like the transfer candidate, the template composed of pixel data including the tracking point is generated in advance during the normal processing.

Figure 28:
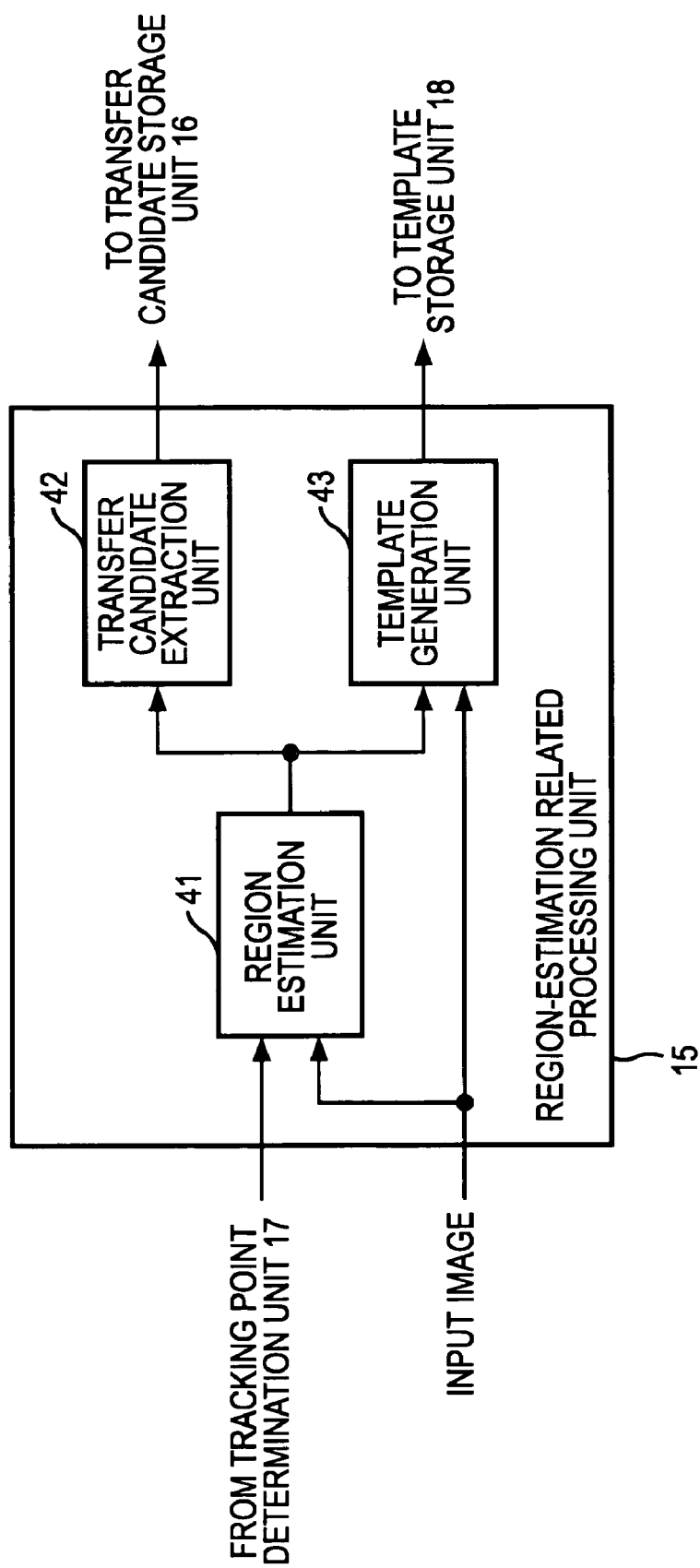
FIG. 28 is a block diagram of another example of the configuration of a region-estimation related processing unit shown in FIG. 1.

The region estimation related process at step S26 shown in FIG. 6 can be executed by the region-estimation related processing unit 15 having, for example, the configuration shown in FIG. 28.

In this case, like the region-estimation related processing unit 15 shown in FIG. 9, the region-estimation related processing unit 15 includes the region estimation unit 41, the transfer candidate extraction unit 42, and the template generation unit 43. In this embodiment, information about a tracking point and an input image are input from the tracking point determination unit 17 to the region estimation unit 41. Only the output of the region estimation unit 41 is input to the transfer candidate extraction unit 42. The output of the region estimation unit 41 and the input image are input to the template generation unit 43.

In this case, like the process shown in FIG. 10, the region estimation process is performed at step S61, the transfer candidate extraction process is performed at step S62, and the template generation process is performed at step S63. Since the template generation process performed at step S63 is identical to the process shown in FIG. 24, only the region estimation process at step S61 and the transfer candidate extraction process at step S62 are described next.

First, the region estimation process at step S61 is described in detail with reference to a flow chart shown in FIG. 29. At step S201, the region estimation unit 41 shown in FIG. 28 determines a sample point in order to estimate a region in an image that belongs to an object including the tracking point. This process is identical to the process at step S81 shown in FIG. 11.

However, the frame to be processed at step S201 is the frame in which the tracking point has been determined (the frame including the tracking point after tracking is completed). This is different from step S81 shown in FIG. 11 in which the frame used for determining sample points is the previous frame.

Subsequently, at step S202, the region estimation unit 41 executes a process to apply a low-pass filter in the spatial direction to an image of the next frame (the frame in which the sample points are determined at step S201). That is, by applying a low-pass filter, a high-frequency component is removed from the image and the image is smoothed. Thus, a growth process of the same color region at subsequent step S203 is facilitated.

At step S203, the region estimation unit 41 executes a process for growing the same color region including the tracking point from the tracking point serving as a starting point under the condition that the difference between pixel values is less than a threshold value THimg and defines sample points included in the same color region as an estimation result of the region. The sample points included in the resultant grown same color region are used as the estimation result of the region.

Figure 30A:
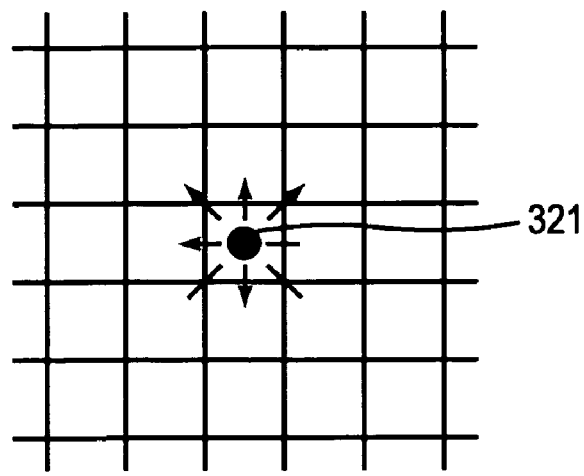
FIG. 30A is a diagram illustrating the growth of the same color region.

More specifically, for example, as shown in FIG. 30A, pixel values of pixels adjacent to the tracking point in eight directions are read out. That is, pixel values of pixels adjacent to the tracking point in the upward direction, upper right direction, right direction, lower right direction, downward direction, lower left direction, left direction, and upper left direction are read out. The difference between the readout pixel value and the pixel value of a tracking point 321 is computed. Thereafter, it is determined whether the computed difference is greater than or equal to the threshold value THimg. In an example shown in FIG. 30A, each of the differences between the pixel values of the pixels in the directions indicated by arrows (i.e., the pixels in the upward direction, upper right direction, downward direction, left direction, and upper left direction) and the tracking point 321 is less than the threshold value THimg. In contrast, each of the differences between the pixel values of the pixels in the directions not indicated by arrows (i.e., the pixels in the right direction, lower right direction, and lower left direction) and the tracking point 321 is greater than or equal to the threshold value THimg.

Figure 30B:
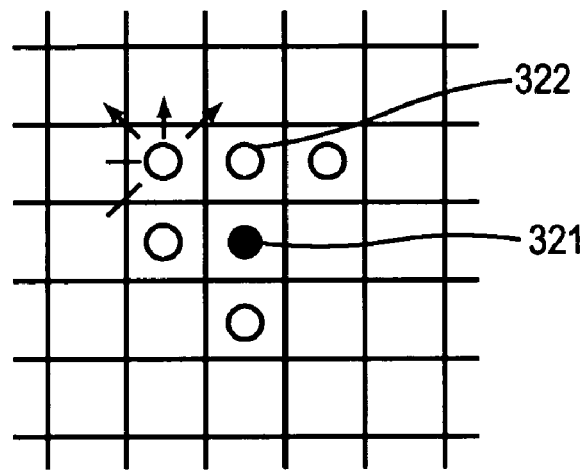
FIG. 30B is a diagram illustrating the growth of the same color region.
Figure 30C:
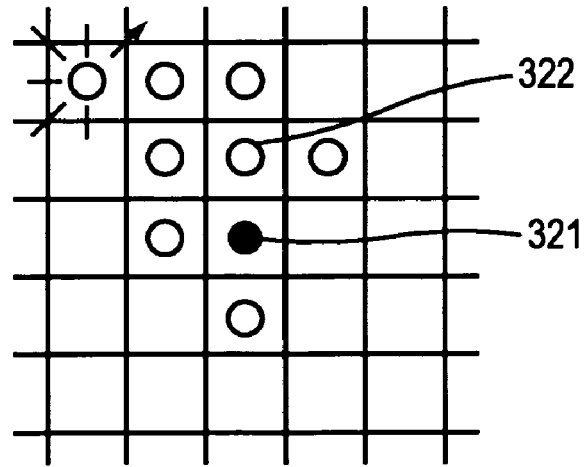
FIG. 30C is a diagram illustrating the growth of the same color region.

In this case, as shown in FIG. 30B, the pixels having the difference less than the threshold value THimg (the pixels indicated by arrows from the tracking point 321) are registered as pixels 322 in the same color region including the tracking point 321. The same process is performed for the pixels 322 registered in the same color region. In an example shown in FIG. 30B, the difference between the pixel value of the pixel 322 indicated by a white circle at the upper left and the pixel value of the pixel adjacent to the pixel 322 (except for the pixel already determined to be the same color region) is computed. It is then determined whether the difference is greater than or equal to the threshold value THimg. In the example shown in FIG. 30B, the determination process of the same color region for the pixels in the right direction, lower right direction, and downward direction have been already executed. Accordingly, the differences in the upward direction, upper right direction, lower left direction, left direction, and upper left direction are computed. Also, in this example, the differences in the upward direction, upper right direction, and upper left direction are less than the threshold value THimg. As shown in FIG. 30C, the pixels in these directions are registered as pixels of the same color region including the tracking point 321.

Figure 31:
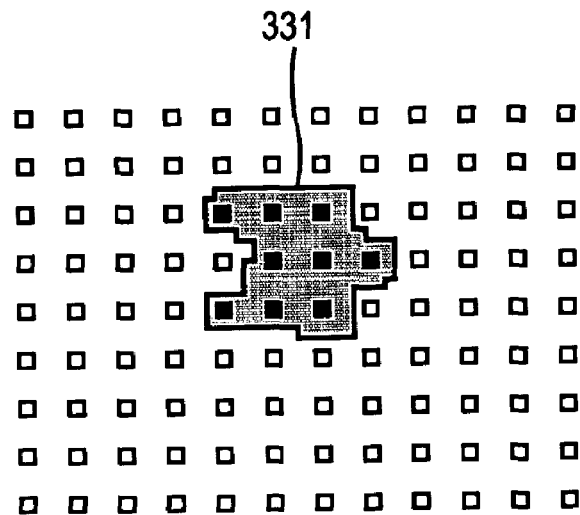
FIG. 31 is a diagram illustrating the same color region of the tracking point and a region estimation result.

Such a process is sequentially repeated. Thus, as shown in FIG. 31, of the sample points, the points included in the same color region 331 are estimated to be the points of the object including the tracking point 321.

After the region estimation process shown in FIG. 29 (step S61 shown in FIG. 10) is completed, a transfer candidate extraction process is executed at step S62 shown in FIG. 10 by the transfer candidate extraction unit 42 shown in FIG. 28. This transfer candidate extraction process is illustrated by a flow chart shown in FIG. 32.

That is, at step S231, the transfer candidate extraction unit 42 determines all the points that are estimated to be the region (the same color region) to be the transfer candidates without change. The transfer candidate extraction unit 42 then delivers the transfer candidates to the transfer candidate storage unit 16, which stores the transfer candidates.

Figure 32:
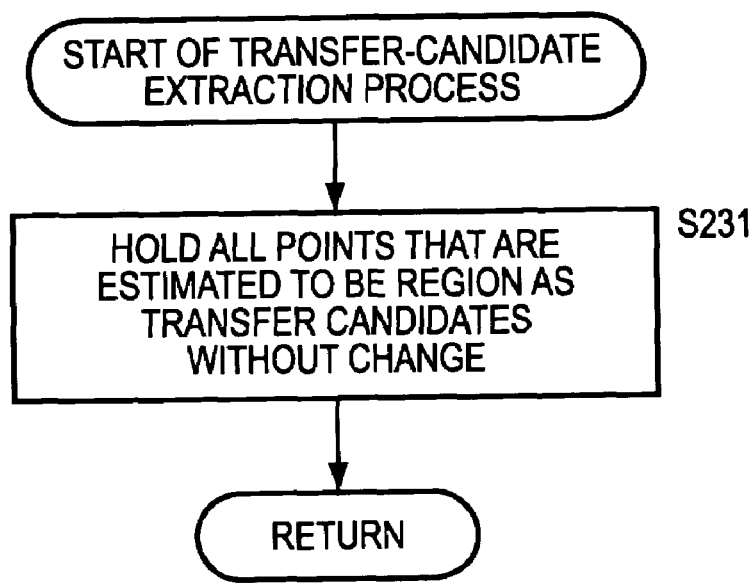
FIG. 32 is a flow chart illustrating another example of the transfer candidate extracting process at step S62 shown in FIG. 10.

In the region-estimation related processing unit 15 shown in FIG. 28, a template generation process performed by the template generation unit 43 shown in FIG. 28 at step S63 shown in FIG. 10 after the transfer candidate extraction process shown in FIG. 32 (step S62 shown in FIG. 10) is completed is the same as the process shown in FIG. 24. Thus, description is not repeated.

However, in this case, the same color region including the tracking point may be directly determined to be the template region.

The exception processing at step S2 performed after the above-described normal processing at step S1 shown in FIG. 2 is completed is described in detail next with reference to a flow chart shown in FIG. 33. As noted above, this processing is performed when it is determined at step S24 shown in FIG. 6 that the motion of the tracking point cannot be estimated and when it is determined at step S28 that a transfer candidate to which the tracking point is transferred cannot be selected.

At step S301, the control unit 19 performs an initialization process of the exception processing. The details of this process are illustrated by a flow chart shown in FIG. 34.

At step S321, the control unit 19 determines whether a scene change occurs when the control unit 19 cannot track the tracking point (when the control unit 19 cannot estimate the motion of the tracking point and cannot select a transfer candidate to which the tracking point is transferred). The scene change detection unit 13 monitors whether a scene change occurs on the basis of the estimation result from the motion estimation unit 12 at all times. The control unit 19 makes the determination at step S321 on the basis of the detection result from the scene change detection unit 13. The detailed process of the scene change detection unit 13 is described below with reference to FIGS. 50 and 51.

If the scene change occurs, the control unit 19 estimates that the occurrence of the scene change prevents the tracking of the tracking point. Thus, at step S322, the control unit 19 sets the mode to a scene change. In contrast, if it is determined at step S321 that the scene change does not occur, the control unit 19 sets the mode to another mode at step S323.

After the process at step S322 or S323 is completed, the template matching unit 11, at step S324, executes a process for selecting the temporally oldest template. More specifically, as shown in FIG. 35, for example, when the frame n is changed to the frame n+1 and the exception processing is performed, the template matching unit 11 selects a template generated for a frame n−m+1, which is the temporally oldest template among m templates generated for the frame n−m+1 to the frame n stored in the template storage unit 18.

Figure 35:
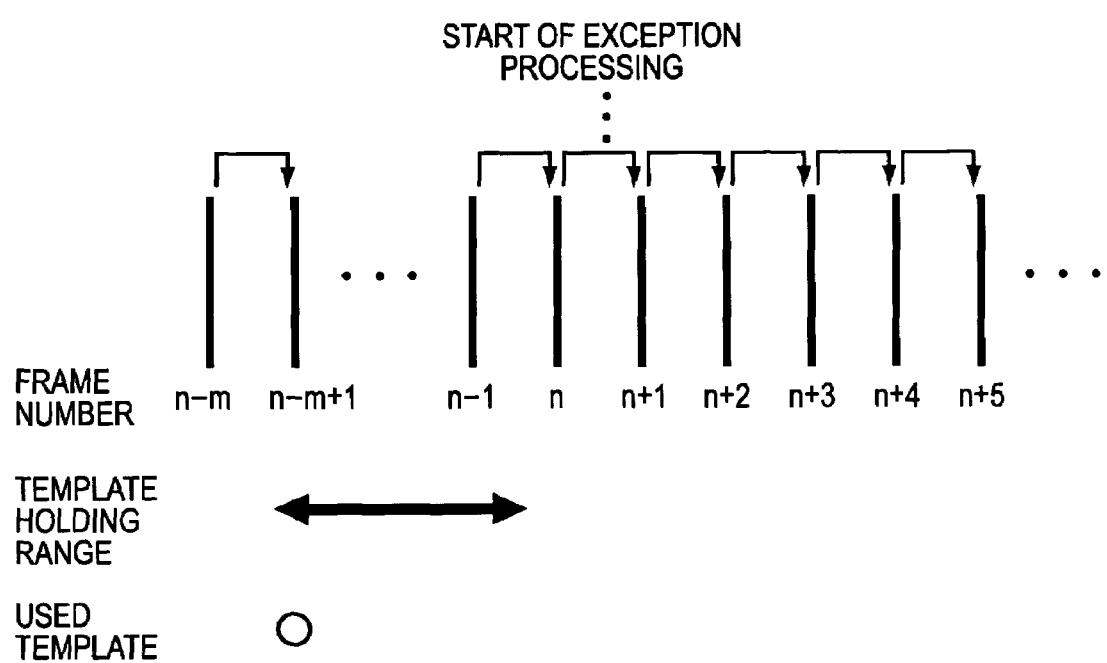
FIG. 35 is a diagram illustrating template selection.

Thus, the reason why, in place of the template immediately before the transition to the exception processing (the template generated for the frame n in the example shown in FIG. 35), the template at some time ahead of the transition is used is that when transition to the exception processing occurs due to, for example, occlusion of the object to be tracked, most of the object is already hidden immediately before the transition occurs, and therefore, the template at that time is highly likely not to capture a sufficiently large image of the object. Accordingly, by selecting a template at a time slightly ahead of the transition, reliable tracking can be provided.

At step S325, the template matching unit 11 executes a process for determining a template search area. For example, the template search area is determined so that the position of the tracking point immediately before the transition to the exception processing becomes a center of the template search area.

Figure 36:
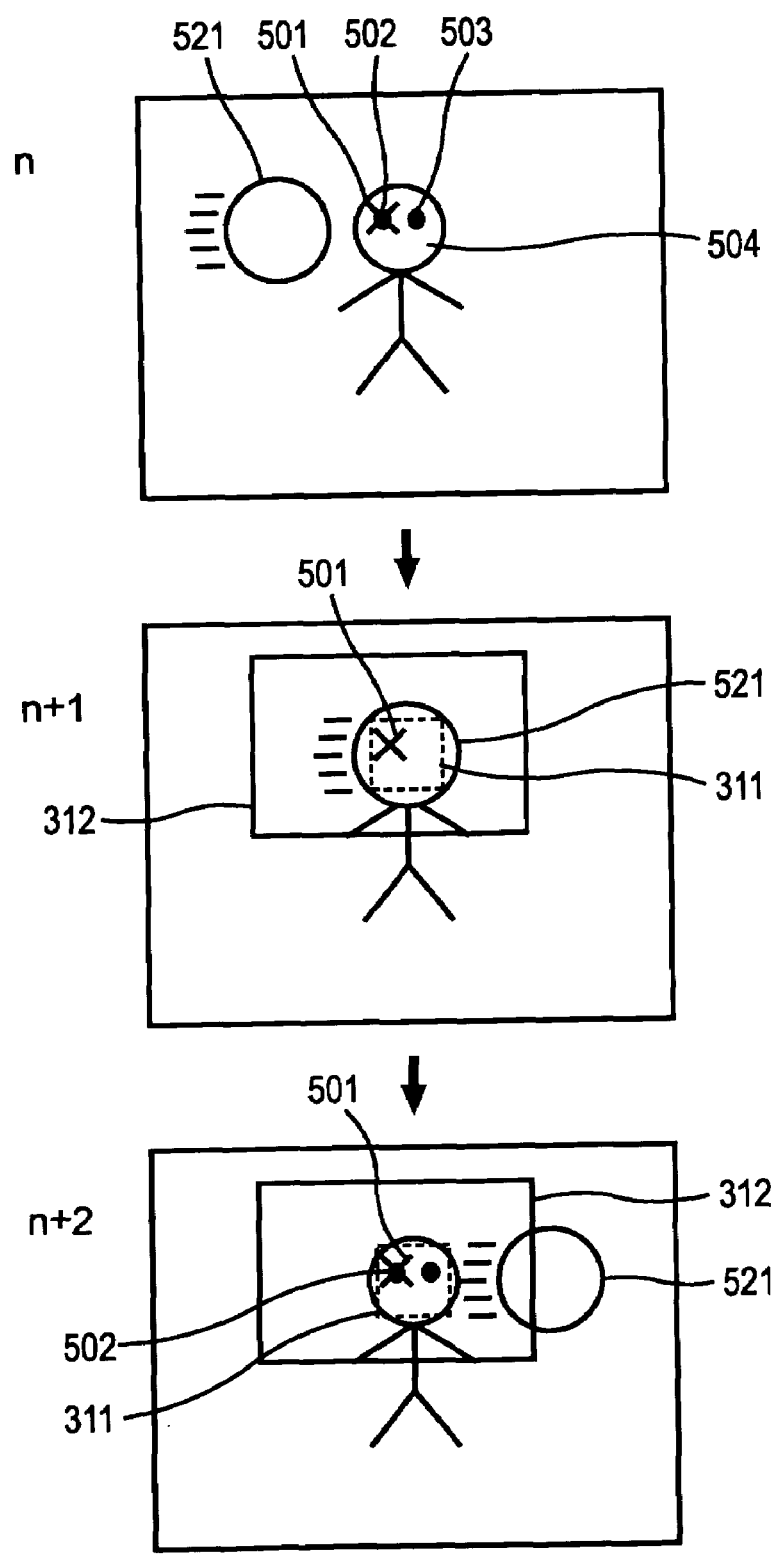
FIG. 36 is a diagram illustrating a search area.

That is, as shown in FIG. 36, suppose that the right eye 502 of the face 504 of a subject in the frame n is specified as the tracking point 501. In the frame n+1, the ball 521 coming from the left covers the face 504 including the tracking point 501. In the frame n+2, the tracking point 501 reappears. In this case, the area at the center of which is the tracking point 501 (included in a template region 311) is determined to be a template search area 312.

At step S326, the template matching unit 11 resets the number of passed frames and the number of scene changes after the transition to the exception processing to zero. The number of passed frames and the number of scene changes are used in a continuation determination process at step S305 shown in FIG. 33 (at steps S361, S363, S365, and S367 shown in FIG. 37), which is described below.

As described above, the initialization process of the exception processing is completed. Thereafter, at step S302 shown in FIG. 33, the control unit 19 executes a process to wait for the next frame. At step S303, the template matching unit 11 executes a template matching process inside the template search area. At step S304, the template matching unit 11 determines whether the return to the normal processing is possible.

More specifically, in the template matching process, the sum of the absolute values of the differences between a template in a frame several frames ahead (pixels in the template region 311 shown in FIG. 36) and pixels to be matched in the template search area is computed. More precisely, the sum of absolute values of differences between pixels of a predetermined block in the template region 311 and pixels of a predetermined block in the template search area is computed. The position of the block is sequentially moved in the template region 311 and the sum of absolute values of differences is added and is defined as the value at the position of the template. Thereafter, a position having a minimum sum of absolute differences and the value of the position when the template is sequentially moved in the template search area are searched for. At step S304, the minimum sum of absolute values of differences is compared with a predetermined threshold value. If the minimum sum of absolute differences is less than or equal to the threshold value, it is determined that the image including the tracking point (included in the template) reappears, and therefore, it is determined that the return to the normal processing is possible. The process then returns to the normal processing at step S1 shown in FIG. 2.

Subsequently, as described above, at step S41 shown in FIG. 7, it is determined that the process has returned to the normal processing. At step S44, the position having the minimum sum of absolute differences is considered to be the position at which the template is matched. Thereafter, the tracking point and the region estimation range are determined on the basis of the positional relationship among the matched position, the position of the template stored in association with the template, and the region estimation range of the tracking point. That is, as described above in relation to FIG. 27, the region estimation range 302 is determined on the basis of the vectors 306 and 307 with respect to the tracking point 305.

However, when a method in which the region estimation range is not used is employed in the region estimation process at step S61 shown in FIG. 10 (e.g., the region estimation process shown in FIG. 29), the region estimation range is not determined.

Figure 33:
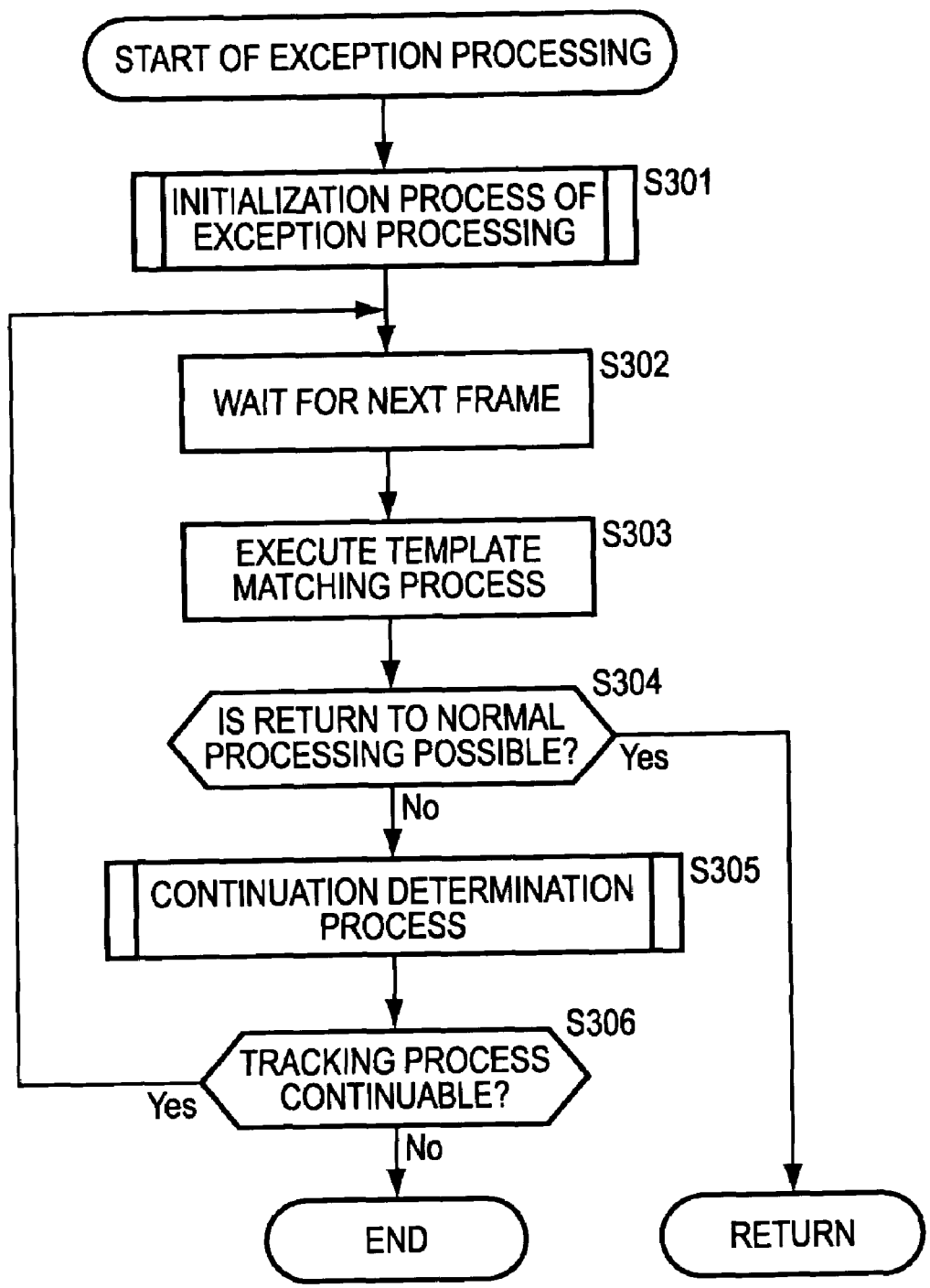
FIG. 33 is a flow chart illustrating exception processing at step S2 shown in FIG. 2.

To determine, at step S304 shown in FIG. 33, whether the return to the normal processing is possible, a value obtained by dividing the minimum sum of absolute differences by the activity of the template may be compared with a threshold value. In this case, the value computed by an activity computing unit 602 at step S532 shown in FIG. 49 can be used as the activity.

Alternatively, to determine whether the return to the normal processing is possible, a value obtained by dividing the minimum sum of absolute differences by the minimum sum of absolute differences one frame ahead may be compared with a threshold value. In this case, the need for computing the activity is eliminated.

That is, at step S304, the correlation between the template and the template search area is computed. The determination is made on the basis of the comparison between the correlation and the threshold value.

If, at step S304, it is determined that the return to the normal processing is not possible, the process proceeds to step S305, where the continuation determination process is executed. The continuation determination process is described in detail below with reference to a flow chart shown in FIG. 37. In this process, it is determined whether the tracking process can be continued or not.

At step S306, the control unit 19 determines whether to continue to track the tracking point on the basis of the result of the continuation determination process (on the basis of flags set at step S366 or S368 shown in FIG. 37, which is described below). If the tracking process of the tracking point can be continued, the process returns to step S302 and the processes subsequent to step S302 are repeated. That is, the process to wait until the tracking point reappears is repeatedly executed.

However, if, at step S306, it is determined that the tracking process of the tracking point cannot be continued (i.e., it is determined at step S365 shown in FIG. 37 that the number of passed frames after the tracking point disappeared is greater than or equal to a threshold value THfr or it is determined at step S367 that the number of scene changes is greater than or equal to a threshold value THsc), it is determined that the tracking process cannot be executed. Thus, the tracking process is completed.

Figure 37:
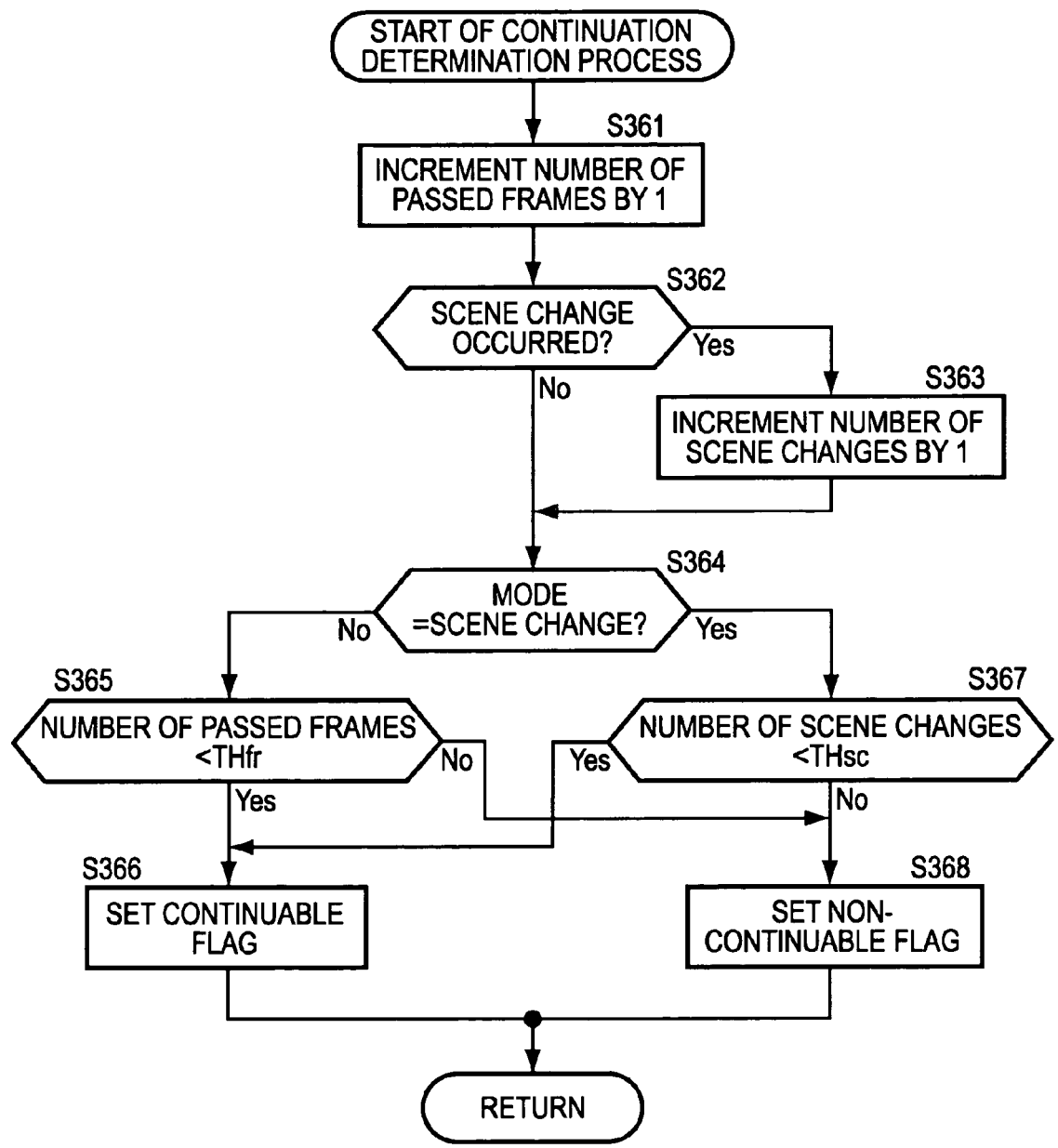
FIG. 37 is a flow chart illustrating a continuation determination process at step S305 shown in FIG. 33.

FIG. 37 illustrates the continuation determination process at step S305 shown in FIG. 33 in detail. At step S361, the control unit 19 executes a process to increment the number of passed frames serving as a variable by one. The number of passed frames is reset to zero in advance in the initialization process (at step S326 shown in FIG. 34) of the exception processing at step S301 shown in FIG. 33.

At step S362, the control unit 19 determines whether a scene change occurs or not. Since the scene change detection unit 13 executes a process to detect a scene change at all times, it can be determined whether a scene change occurs or not on the basis of the detection result of the scene change detection unit 13. If a scene change occurs, the process proceeds to step S363, where the control unit 19 increments the number of scene changes serving as a variable. The number of scene changes is also reset to zero in advance in the initialization process at step S326 shown in FIG. 34. If a scene change does not occurs in the case where the normal processing is transferred to the exception processing, the process at step S363 is skipped.

Subsequently, at step S364, the control unit 19 determines whether the mode currently being set is a scene change mode or not. This mode is set at step S322 or S323 shown in FIG. 34. If the mode currently being set is a scene change mode, the process proceeds to step S367, where the control unit 19 determines whether the number of scene changes is less than the predetermined threshold value THsc. If the number of scene changes is less than the predetermined threshold value THsc, the process proceeds to step S366, where the control unit 19 sets a flag indicating that the continuation is possible. If the number of scene changes is greater than or equal to the predetermined threshold value THsc, the process proceeds to step S368, where the control unit 19 sets a flag indicating that the continuation is not possible.

In contrast, if, at step S364, it is determined that the mode currently being set is not a scene change mode (if it is determined that the mode is another mode), the process proceeds to step S365, where the control unit 19 determines whether the number of passed frames is less than the predetermined threshold value THfr. The number of passed frames is also reset to zero in advance in the initialization process at step S326 of the exception processing shown in FIG. 32. If it is determined that the number of passed frames is less than the predetermined threshold value THfr, the flag indicating that the continuation is possible is set at step S366. However, if it is determined that the number of passed frames is greater than or equal to the predetermined threshold value THfr, the flag indicating that the continuation is not possible is set at step S368.

As described above, if the number of scene changes in the template matching process is greater than or equal to the threshold value THsc or if the number of passed frames is greater than or equal to the threshold value THfr, it is determined that the execution of a further tracking process is impossible.

If the mode is another mode, it may be determined whether the continuation is possible or not while taking into account the condition that the number of scene changes is zero.

In the foregoing description, the process is executed on a frame basis of the image and all the frames are used for the process. However, the process may be executed on a field basis. In addition, in place of using all the frames or all the fields, frames or fields extracted by thinning out frames or fields in predetermined intervals may be used for the process.

Furthermore, in the foregoing description, a destination point in the estimated region is used as the transfer candidate, a point in the estimated region can be directly used. In this case, the normal processing at step S1 shown in FIG. 2 is changed to the process shown in FIG. 38 in place of the process shown in FIG. 6.

Figure 38:
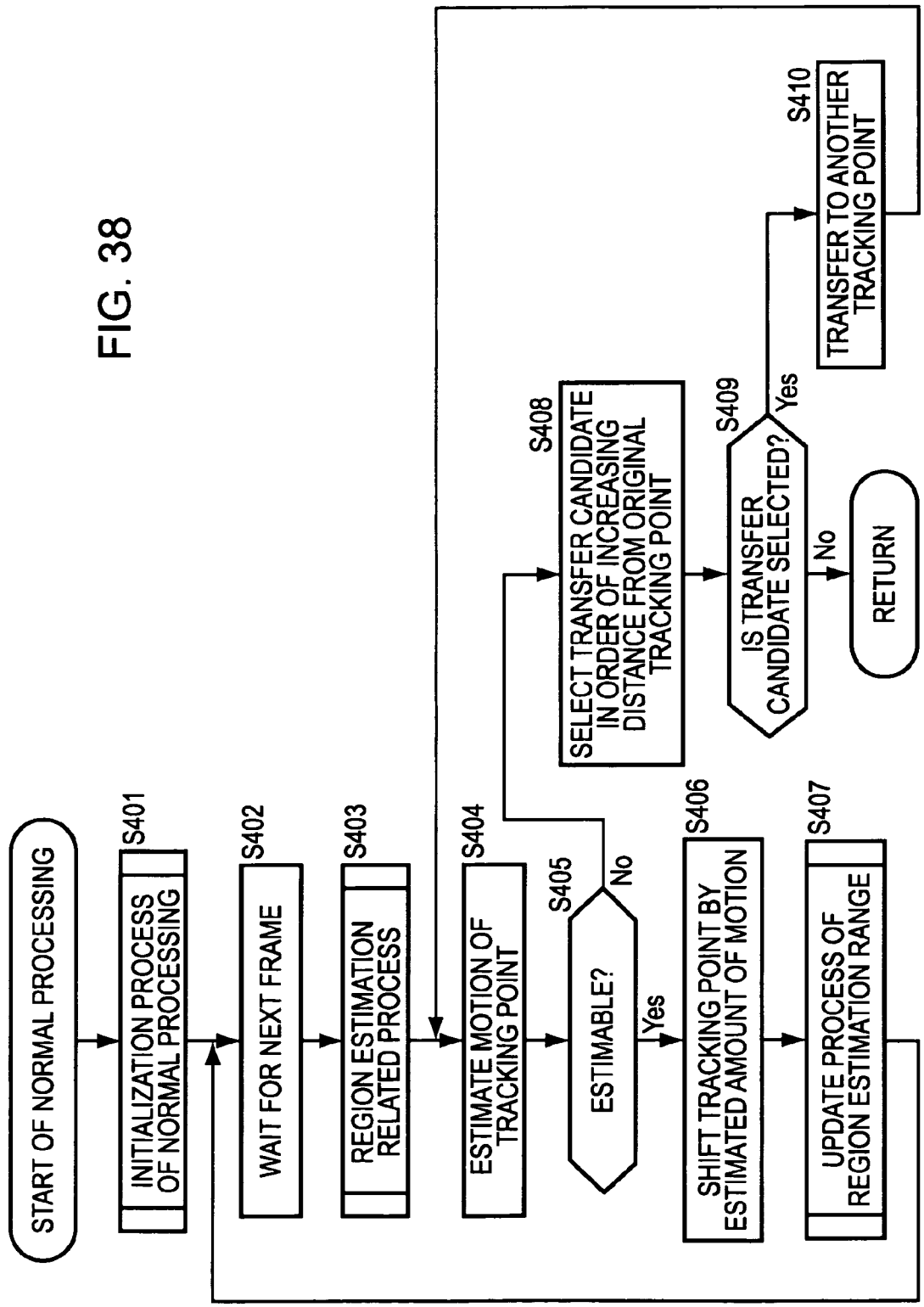
FIG. 38 is a flow chart illustrating another example of the normal processing at step S1 shown in FIG. 2.

The process from step S401 to step S410 shown in FIG. 38 is basically the same as the process from step S21 to step S29 shown in FIG. 6. However, it differs in that the region estimation related process at step S403 is inserted next to the process to wait for the next frame at step S402 shown in FIG. 38, which corresponds to step S22 shown in FIG. 6, and the update process of the region estimation range at step S407 is executed in place of the region estimation related process at step S26 shown in FIG. 6. The other processes are the same as those in FIG. 6, and therefore, the descriptions are not repeated.

The detailed region estimation related process at step S403 shown in FIG. 38 is the same as that described in relation to FIG. 10. The update process of the region estimation range at step S407 is the same as that described in relation to FIG. 16.

Figure 39:
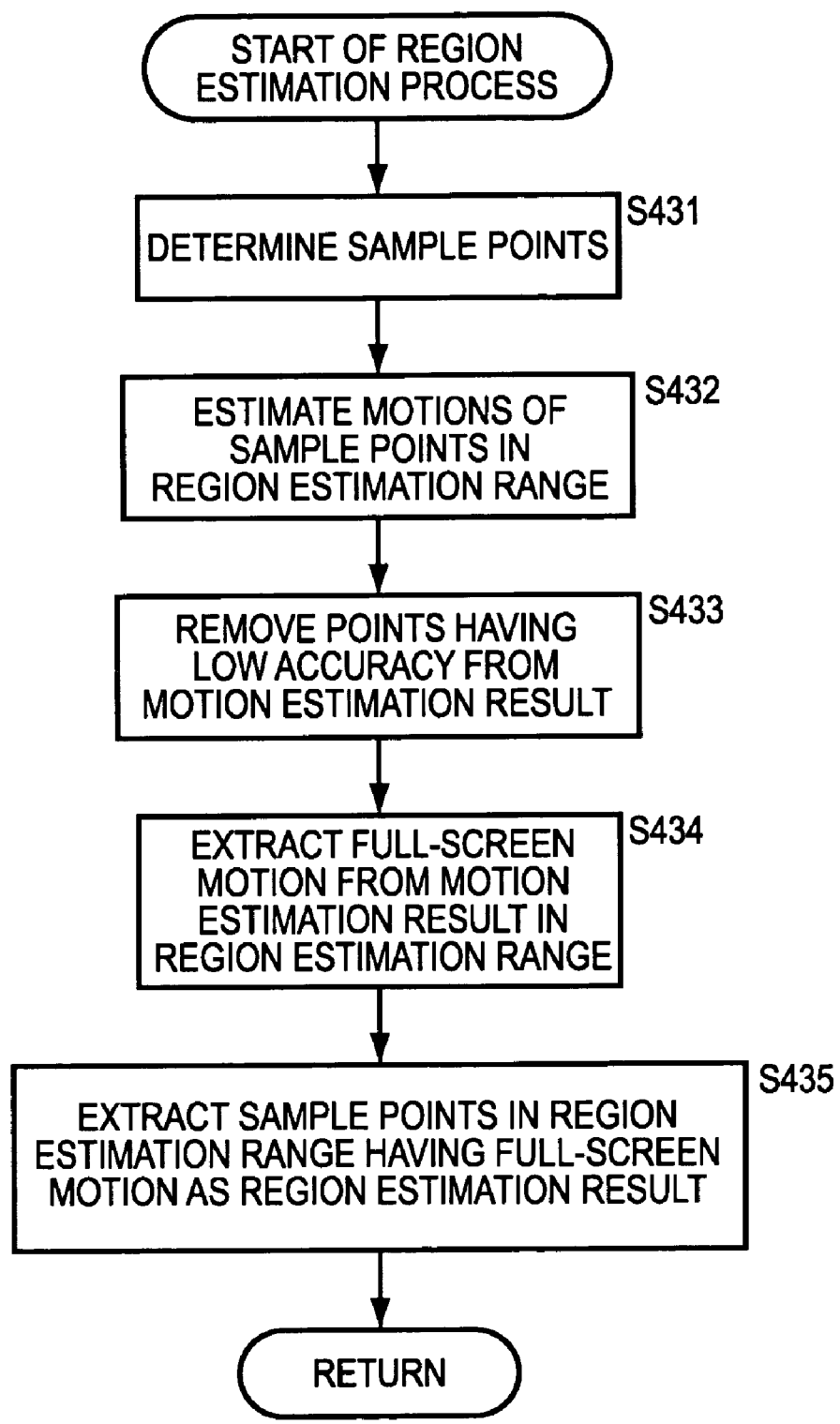
FIG. 39 is a flow chart illustrating another example of the region estimation process at step S61 shown in FIG. 10.

When the normal processing is executed according to the flow chart shown in FIG. 38, the region estimation process (the region estimation process at step S61 shown in FIG. 10) of the region estimation related process at step S403 (the region estimation related process shown in FIG. 10) is illustrated by the flow chart shown in FIG. 39.

The process from step S431 through step S435 is basically the same as the process from step S81 to step S86 shown in FIG. 11. However, the update process of the region estimation range at step S86 shown in FIG. 11 is removed from the process shown in FIG. 39. The other processes are the same as those in FIG. 11. That is, since the update process of the region estimation range is executed at step S407 shown in FIG. 38, it is not necessary in the region estimation process shown in FIG. 39.

Figure 40:
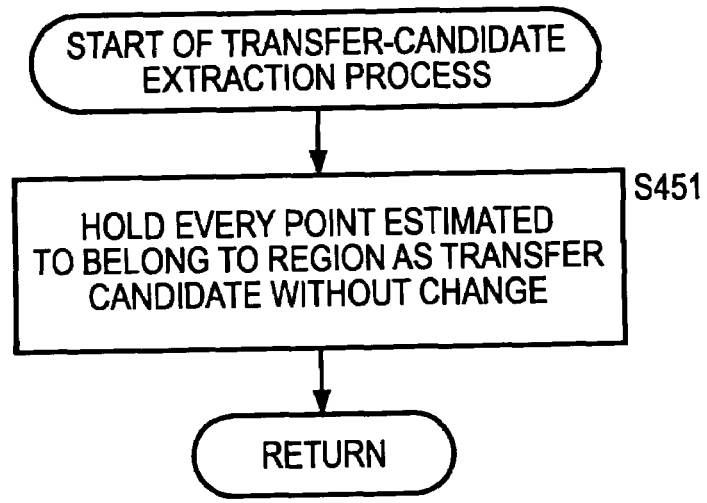
FIG. 40 is a flow chart illustrating another example of the transfer candidate extracting process at step S62 shown in FIG. 10.

Furthermore, when the normal processing shown in FIG. 38 is executed, the transfer candidate extraction process (the transfer candidate extraction process at step S62 shown in FIG. 10) of the region estimation related process (the region estimation related process shown in FIG. 10) at step S403 is illustrated in FIG. 40. The process at step S451 is the same as the transfer candidate extraction process at step S231 shown in FIG. 32.

Figure 41:
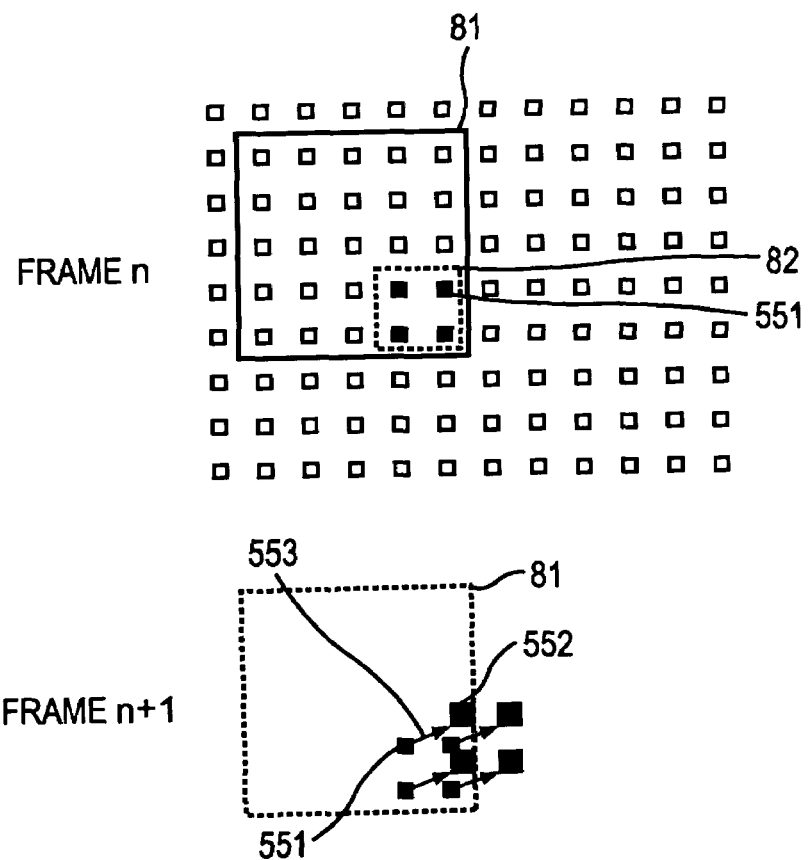
FIG. 41 is a diagram illustrating a transfer candidate when the normal processing shown in FIG. 6 is executed.
Figure 42:
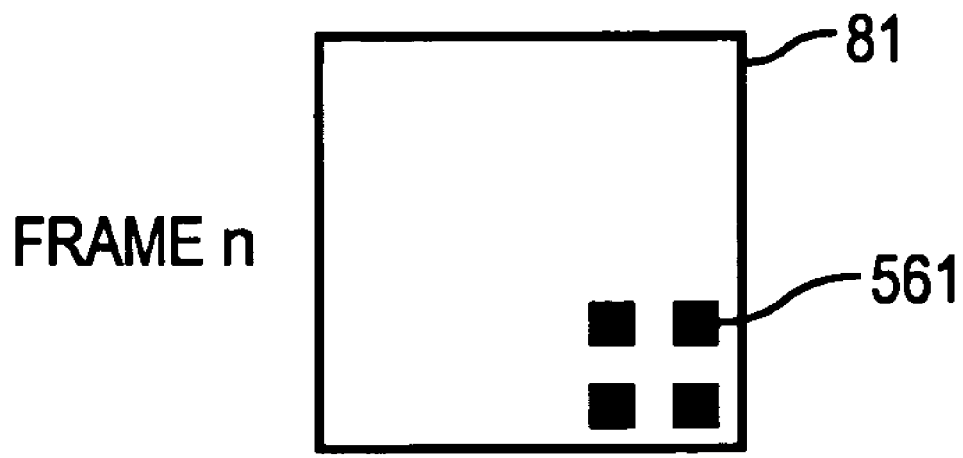
FIG. 42 is a diagram illustrating a transfer candidate when the normal processing shown in FIG. 38 is executed.

As described above, the difference between the process when the normal processing is executed according to the flow chart shown in FIG. 38 and the process when the normal processing is executed according to the flow chart shown in FIG. 6 is illustrated in FIGS. 41 and 42.

Figure 23:
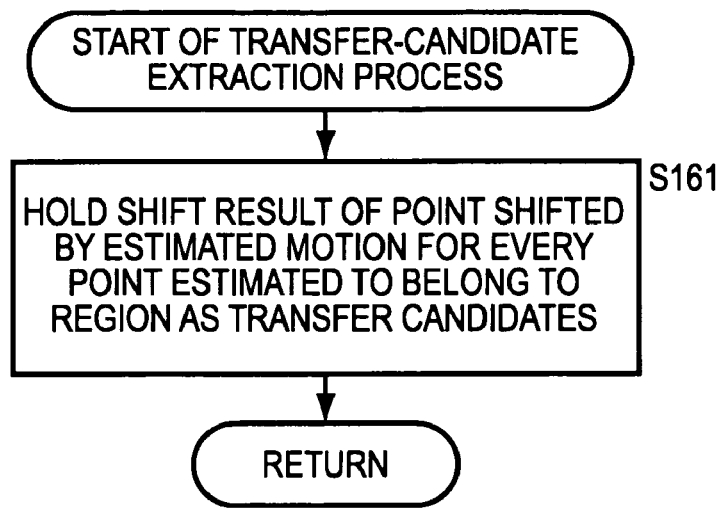
FIG. 23 is a flow chart illustrating the transfer candidate extracting process at step S62 shown in FIG. 10.

When the normal processing is executed according to the flow chart shown in FIG. 6 and when, as shown in FIG. 41, the region 82 is composed of points 551 indicated by black squares in the region estimation range 81 in the frame n, points 552 at positions to which the points 551 in the region 82 in the previous frame n are shifted on the basis of motion vectors 553 are determined to be the transfer candidates in the frame n+1 (process at step S161 in FIG. 23).

The motion vector 553 of each point 551 is sometimes equal to the motion vector of the full-screen motion. However, the estimated motions of the points are slightly different from each other depending on the precision involving in determining whether the motion of each point is equal to the full-screen motion. For example, if it is determined that motions having one-dot difference are the same in the horizontal direction and the vertical direction, the motion of (0, 0) includes the motion of (−1, 1) and the motion of (1, 0). In this case, even when the full-screen motion is (0, 0), each point 551 having the motion of (−1, 1) or (1, 0) is shifted by the amount of the motion. Instead of directly using the destination point as a transfer candidate, the closest point among the sample points obtained in advance may be determined to be the transfer candidate. Off course, to reduce the processing load, each point 551 may be shifted by the amount of the full-screen motion.

In contrast, when the normal processing is executed according to the flow chart shown in FIG. 38, points 561 inside the region estimation range 81 in the frame n is determined to be the transfer candidates, as shown in FIG. 42.

An exemplary configuration of the motion estimation unit 12 shown in FIG. 1 is described next with reference to FIG. 43. The motion estimation unit 12 includes a motion vector detection unit 606-1 and a motion vector accuracy computing unit 606-2. In this embodiment, an input image is delivered to an evaluation value computing unit 601, the activity computing unit 602, and the motion vector detection unit 606-1.

The motion vector detection unit 606-1 detects a motion vector from an input image and delivers the detected motion vector and the input image to the motion vector accuracy computing unit 606-2. If the input image already contains a motion vector, the motion vector detection unit 606-1 separates the image data from the motion vector and delivers the image data and the motion vector to the motion vector accuracy computing unit 606-2. If the input data and the motion vector are separately input, the need for the motion vector detection unit 606-1 can be eliminated.

The motion vector accuracy computing unit 606-2 computes the accuracy of the corresponding motion vector on the basis of the input image (image data) (hereinafter referred to as "motion vector accuracy") and outputs the obtained accuracy together with the motion vector delivered from the motion vector detection unit 606-1.

In this embodiment, the motion vector accuracy computing unit 606-2 includes the evaluation value computing unit 601, the activity computing unit 602, and a computing unit 606-3. The computing unit 606-3 includes a threshold-value determination unit 603, a normalization processing unit 604, and the integration processing unit 605.

Figure 43:
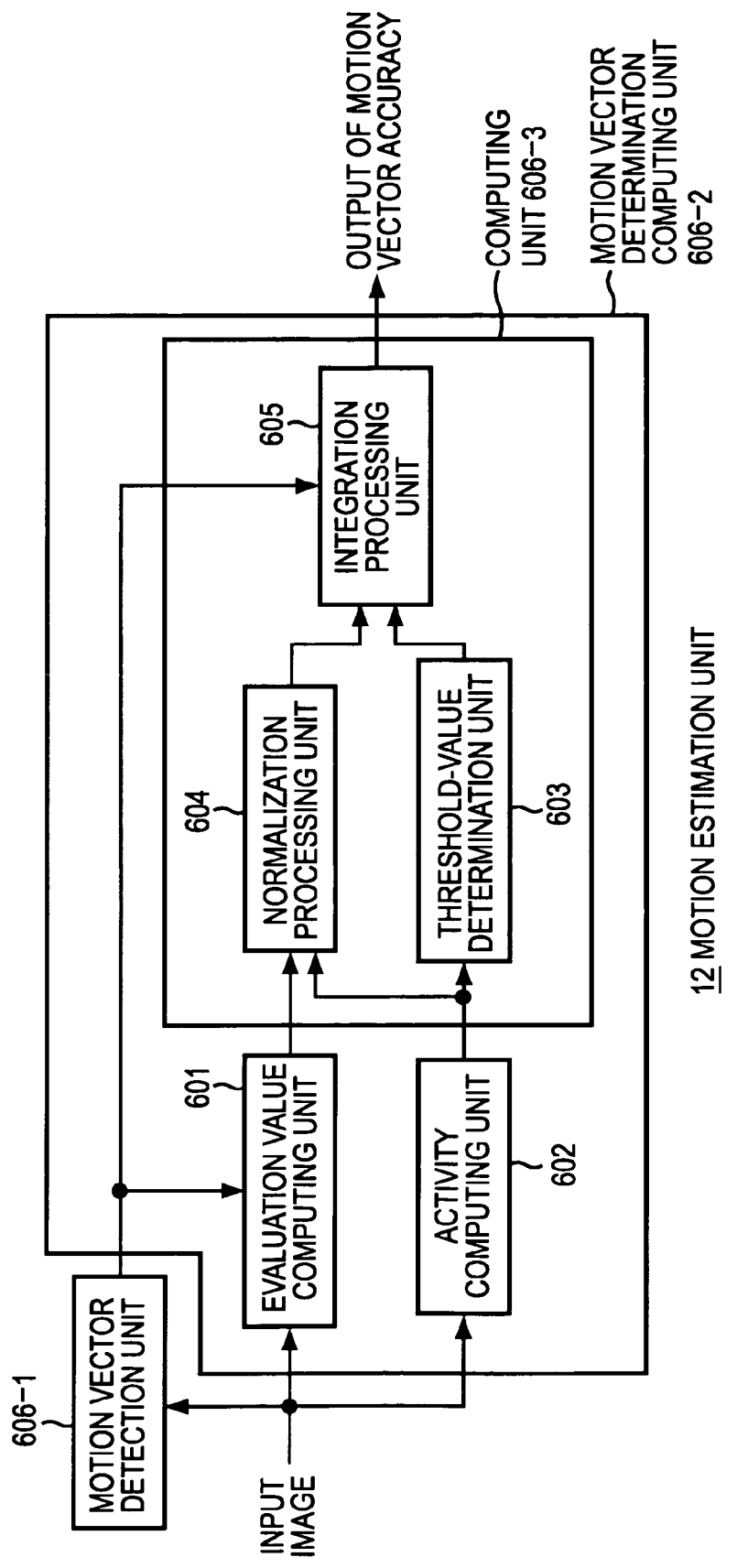
FIG. 43 is a block diagram of an exemplary configuration of a motion estimation unit shown in FIG. 1.

The motion vector delivered from the motion vector detection unit 606-1 shown in FIG. 43 is input to the evaluation value computing unit 601. The input image (image data) is input to the evaluation value computing unit 601 and the activity computing unit 602.

The evaluation value computing unit 601 computes the evaluation value of the input image and delivers the evaluation value to the normalization processing unit 604. The activity computing unit 602 computes the activity of the input image and delivers the activity to the threshold-value determination unit 603 and the normalization processing unit 604 of the computing unit 606-3.

The normalization processing unit 604 normalizes the evaluation value delivered from the evaluation value computing unit 601 on the basis of the activity delivered from the activity computing unit 602 and delivers the obtained value to the integration processing unit 605. The threshold-value determination unit 603 compares the activity delivered from the activity computing unit 602 with a predetermined threshold value and delivers the determination result to the integration processing unit 605. The integration processing unit 605 computes the motion vector accuracy on the basis of the normalization information delivered from the normalization processing unit 604 and the determination result delivered from the threshold-value determination unit 603 so as to compute the motion vector accuracy. The integration processing unit 605 then outputs the obtained motion vector accuracy to an apparatus. At that time, the integration processing unit 605 may also output the motion vector delivered from the motion vector detection unit 606-1.

The motion computing process performed by the motion estimation unit 12 is described in detail next with reference to a flow chart shown in FIG. 44. The motion vector detection unit 606-1 acquires an input image at step S501, divides the frame of the input image into predetermined blocks at step S502, and compares the frame with the temporally subsequent (or preceding) frame so as to detect a motion vector at step 503. More specifically, the motion vector is detected by using a block matching method. The detected motion vector is delivered to the evaluation value computing unit 601.

Figure 45:
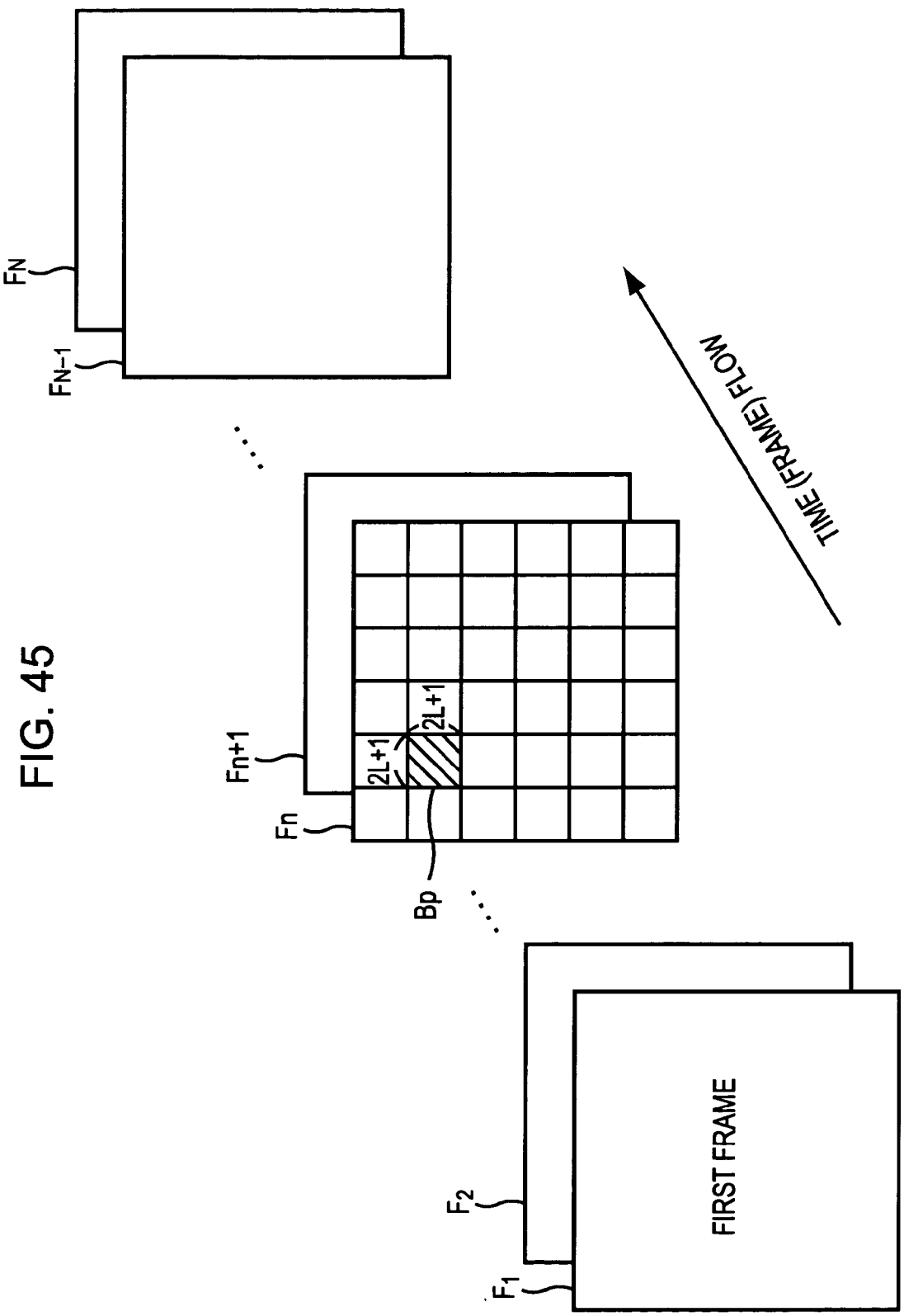
FIG. 45 is a diagram illustrating a temporal flow of a frame.
Figure 46:
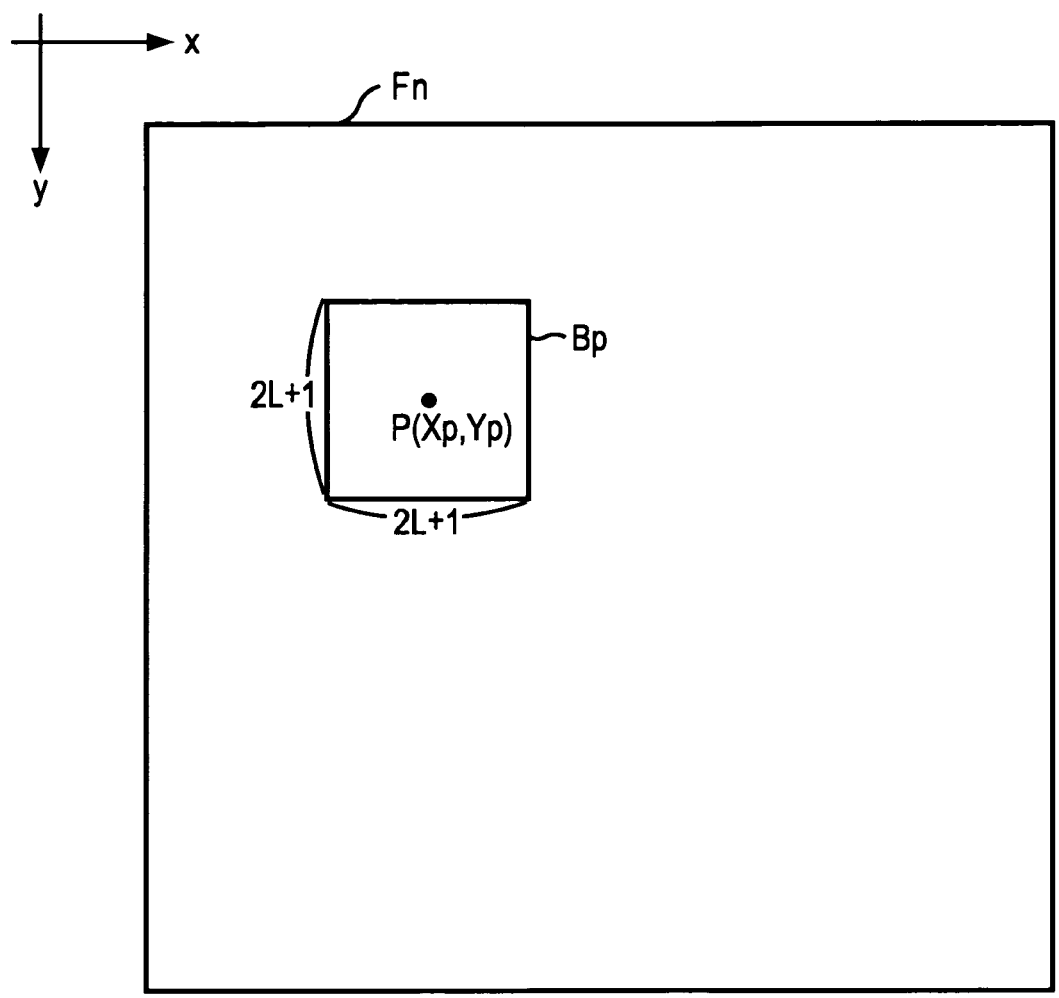
FIG. 46 is a diagram illustrating a block of the frame.

This process is described next with reference to FIGS. 45 to 48. That is, at step S501 shown in FIG. 44, for example, as shown in FIG. 45, N frames $F_1$ (a first frame) to $F_N$ (a Nth frame) are sequentially acquired. At step S502, an image in one frame is divided into square blocks, each having sides of 2L+1 pixels. Here, let any block in a frame $F_n$ be a block $B_p$ and, as shown in FIG. 46, let the center coordinates (pixel) of the block $B_p$ be a point $P(X_p, Y_p)$.

Figure 47:
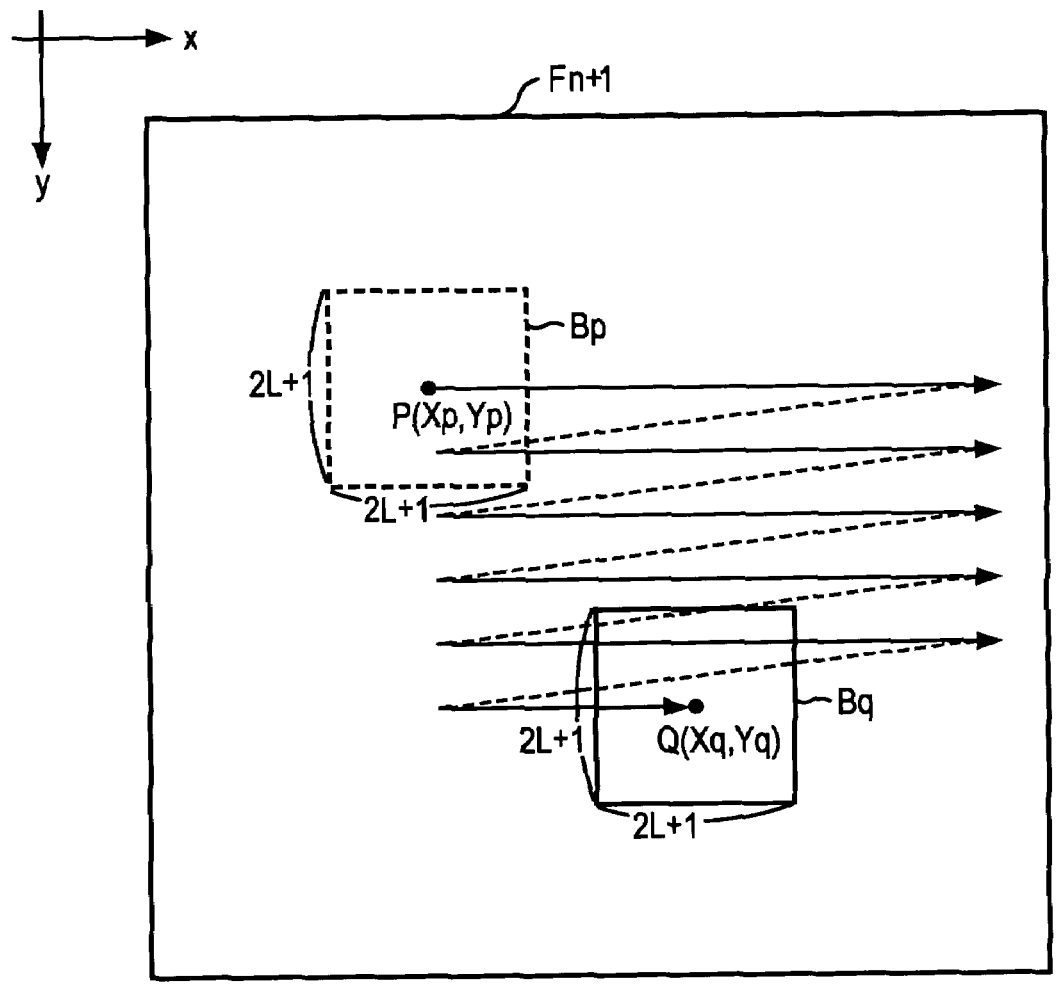
FIG. 47 is a diagram illustrating a block matching method.

At step S503, for example, as shown in FIG. 47, in a frame $F_{n+1}$, which is a frame next to the frame $F_n$, the block $B_p$ scans a predetermined scanning area in the frame $F_{n+1}$ so as to examine the position that minimizes the sum of absolute differences of the corresponding pixels. Thus, the block (block $B_q$) located at the position that minimizes the sum of absolute differences of the corresponding pixels is detected. The center point $Q(X_q, Y_q)$ of the detected block is determined to be a point corresponding to the point $P(X_p, Y_p)$ of the block $B_p$.

Figure 48:
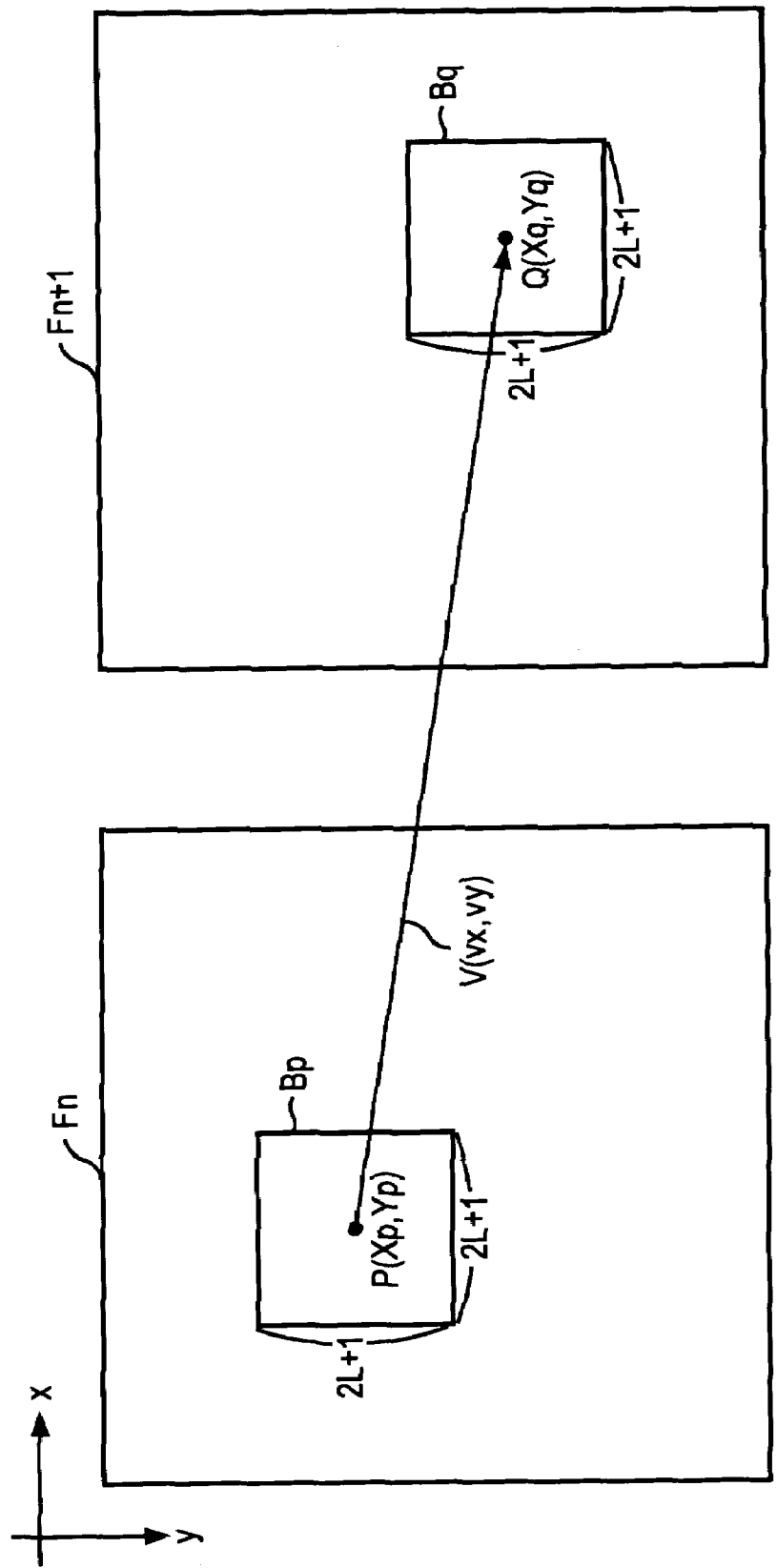
FIG. 48 is a diagram illustrating a motion vector.

As shown in FIG. 48, a line (arrow) between the center point $P(X_p, Y_p)$ of the block $B_p$ and the center point $Q(X_q, Y_q)$ of the block $B_q$ is detected as a motion vector $V(vx, vy)$. That is, the motion vector $V(vx, vy)$ is computed according to the following equation:

$$V(vx,vy)=Q(X_q,Y_q)-P(X_p,Y_p) \tag{1}$$

Figure 44:
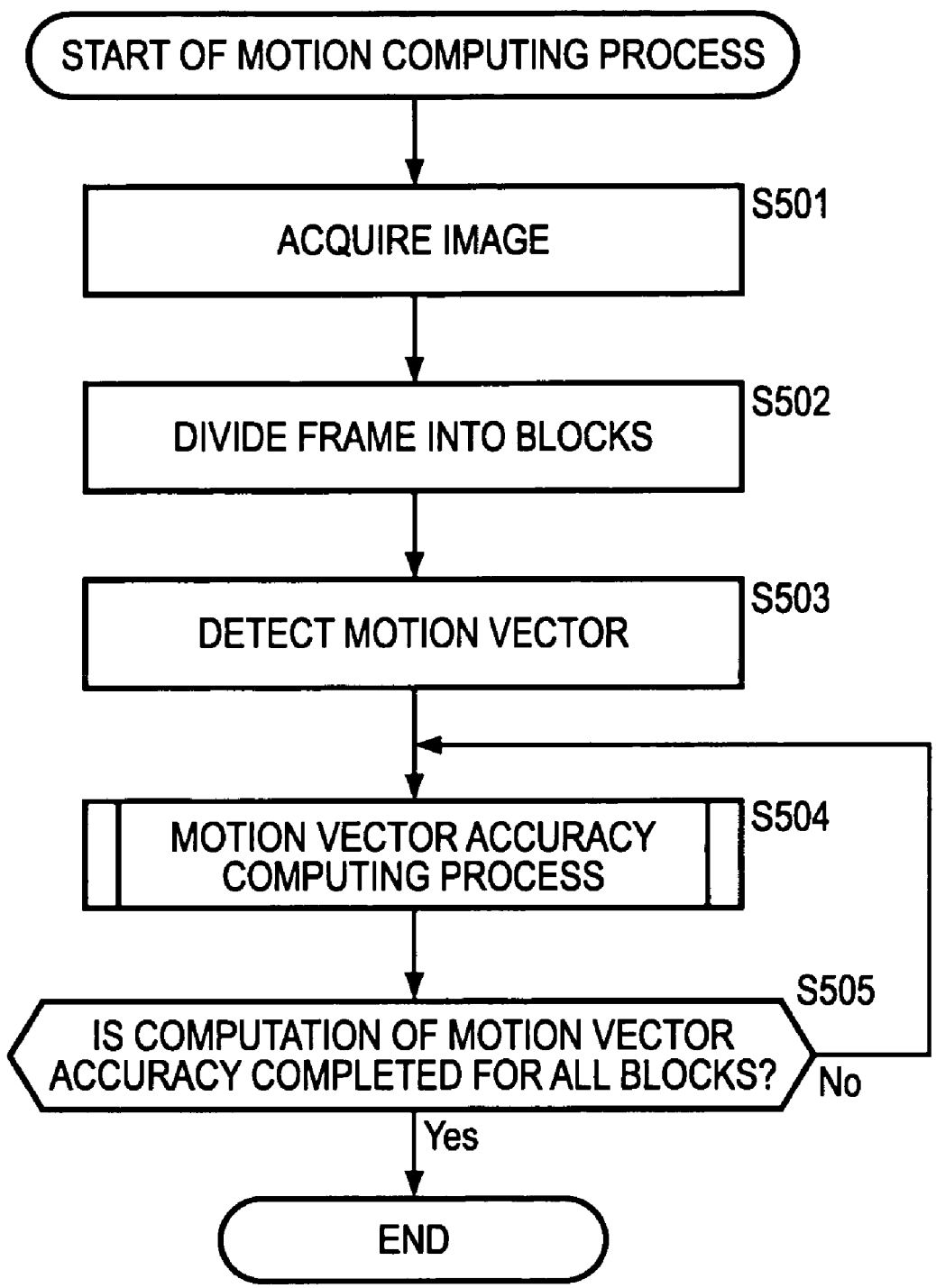
FIG. 44 is a flow chart illustrating a motion computing process.

At step S504 shown in FIG. 44, the attribute information storage unit 22 executes a motion vector accuracy computing process. This process is described in detail below with reference to FIG. 49. The motion vector accuracy is computed as a quantitative value by this process.

At step S505, the motion vector accuracy computing unit 606-2 determines whether the computation of motion vector accuracy is completed for all the blocks in one frame.

If, at step S505, the motion vector accuracy computing unit 606-2 determines that the computation of motion vector accuracy is not completed for all the blocks in the frame, the process returns to step S504 and the processes subsequent to step S504 are repeatedly executed. If the motion vector accuracy computing unit 606-2 determines that the computation of motion vector accuracy is completed for all the blocks, the process for that frame is completed. The above-described process is executed for each frame.

The motion vector accuracy computing process at step S504 shown in FIG. 44 is described in detail next with reference to a flow chart shown in FIG. 49. At step S531, the evaluation value computing unit 601 computes an evaluation value Eval(P, Q, i, j) according to the following equation:

$$\mathrm{Eval}(P,Q,i,j)=\Sigma\Sigma|F_j(X_q+x,Y_q+y)-Fi(X_p+x,Y_p+y)| \tag{2}$$

Figure 50:
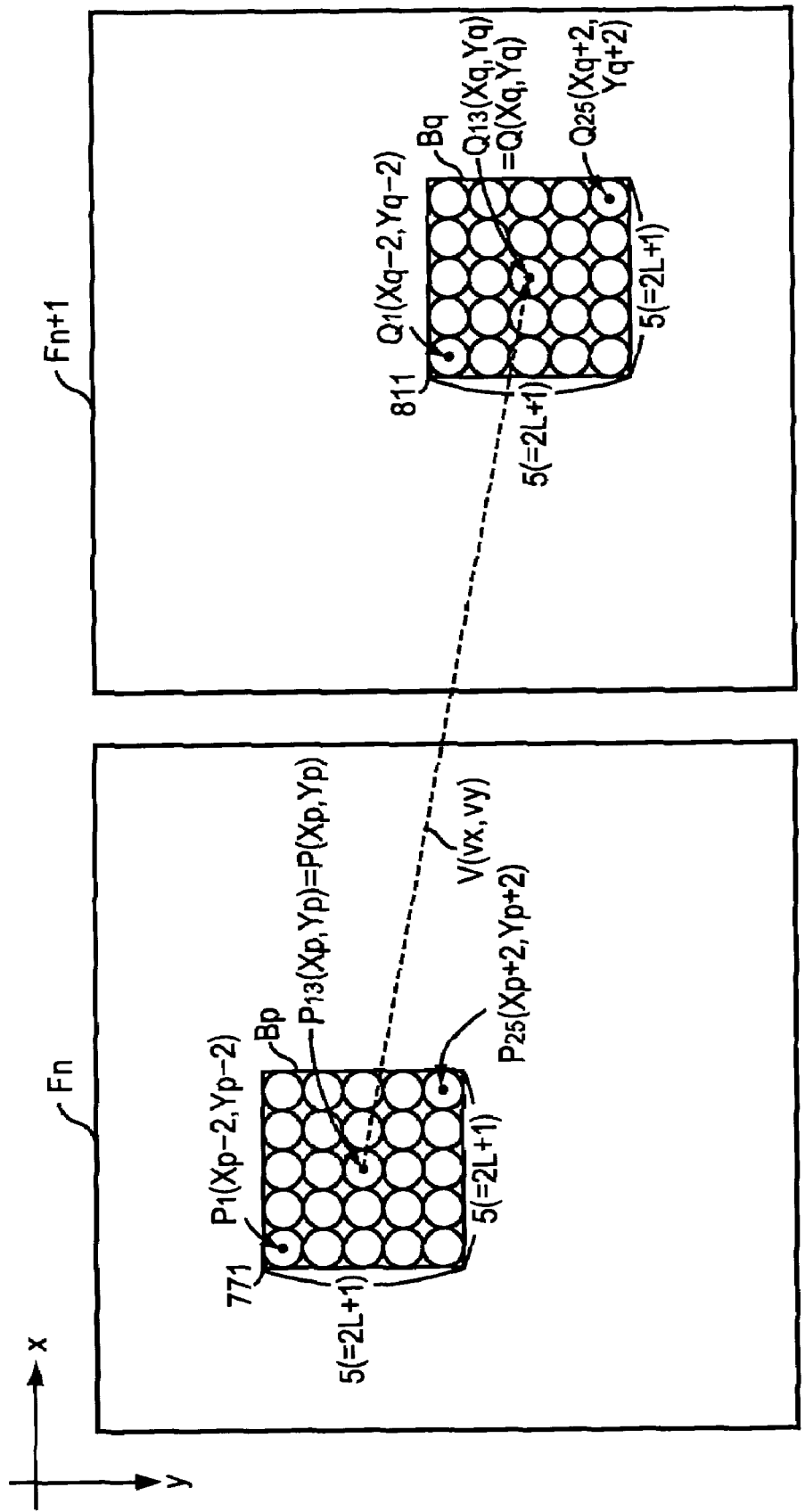
FIG. 50 is a diagram illustrating a method for computing an evaluation value.

The total sum $\Sigma\Sigma$ in equation (2) is computed for x in the range from −L to L and for y in the range from −L to L. That is, for simplicity, suppose, as shown in FIG. 50, the block $B_p$ and the block $B_q$ have the sides of 5 (=2L+1=2×2+1) pixels. Then, the difference between the pixel value of a pixel 71 located at the coordinates (point $P_1(X_p-2, Y_p-2)$) at the upper left corner of the block $B_p$ in the frame $F_n$ and the pixel value of a pixel 881 located at the coordinates (point $Q_1(X_q-2, Y_q-2)$) of the block $B_q$ in the frame $F_{n+1}$ corresponding to the pixel 771 is computed. Similarly, the difference between the pixel value of each pixel located between the point $P_1(X_p-2, Y_p-2)$ and $P_{25}(X_p+2, Y_p+2)$ and the pixel value of the corresponding pixel of the block $B_q$ located between $Q_1(X_q-2, Y_q-2)$ to $Q_{25}(X_q+2, Y_q+2)$ is computed. When L=2, 25 differences are obtained and the total sum of the absolute differences is computed.

The number of pixels (pixels of interest) located at $P(X_p, Y_p)$, which is the center coordinates of the above-described block $B_p$ in the frame $F_n$, and the number of the pixels (the corresponding pixels) located at Q $(X_q, Y_q)$ which is the center coordinates of the block $B_q$ in the frame $F_{n+1}$ and which corresponds to the center point of the block $B_p$ may be at least one. However, when a plurality of the pixels are used, the numbers are required to be the same.

This evaluation value indicates the evaluation value between a block at the center of which is each point in one frame and a block at the center of which is that point in the other frame (i.e., the evaluation value of the motion vector). As the evaluation value is closer to zero, the blocks become more similar to each other. It is noted that, in equation (2), $F_i$ and $F_j$ represent temporally different frames. In the foregoing description, $F_n$ corresponds to $F_i$ and $F_{n+1}$ corresponds to $F_j$. In equation (2), although the sum of absolute differences serves as the evaluation value, the sum of squared differences may be determined to be the evaluation value.

In place of the block matching method, a gradient method or a vector detection method can be employed.

The evaluation value computing unit 601 delivers the generated evaluation value to the normalization processing unit 604.

Figure 51:
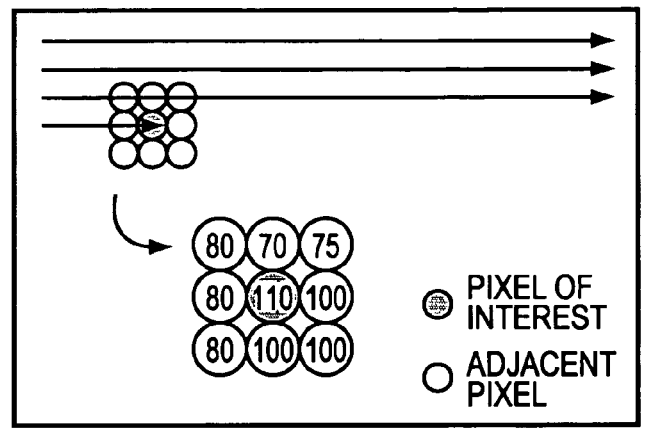
FIG. 51 is a diagram illustrating an activity computing process.
Figure 52:
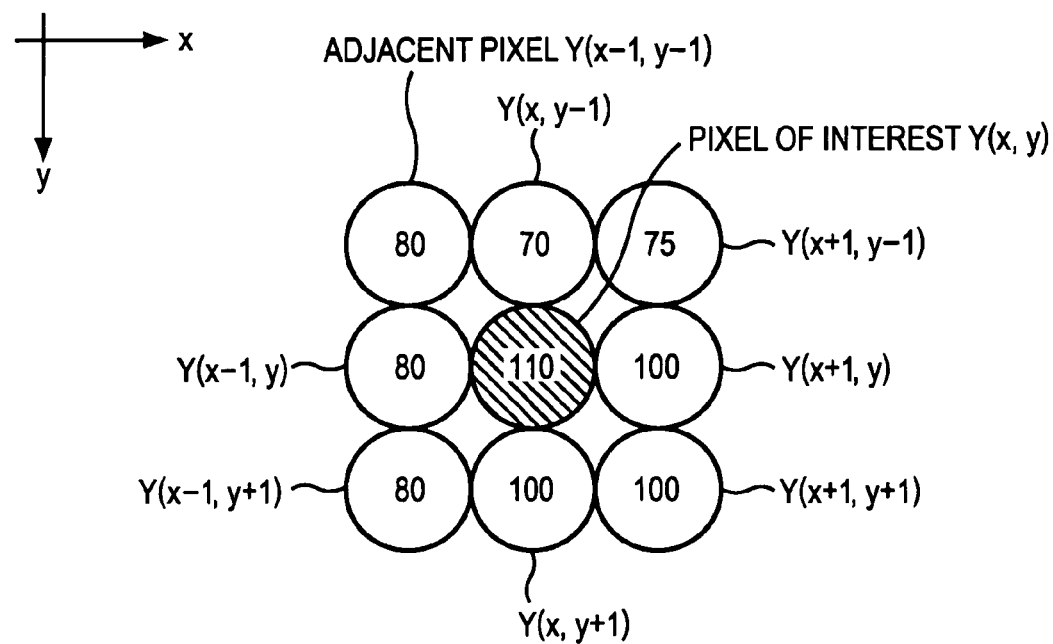
FIG. 52 is a diagram illustrating a method for computing the activity.

At step S532, the activity computing unit 602 computes the activity from the input image. The activity refers to the feature quantity that indicates the complexity of an image. As shown in FIGS. 51 and 52, the average of absolute sum of differences between a pixel of interest Y(x, y) for each pixel and the adjacent 8 pixels, that is, adjacent pixels Y(x−1, y−1), Y(x, y−1), Y(x+1, y−1), Y(x+1, y), Y(x+1, y+1), Y(x, y+1), Y(x−1, y+1), and Y(x−1, y), is computed as the activity of the pixel of interest according to the following equation:

$$\text{Activity}(x, y) = \frac{\sum_{j=-1}^{1}\sum_{i=-1}^{1}|Y(x+i, y+j) - Y(x, y)|}{8} \quad (3)$$

In an example shown in FIG. 52, the value of the pixel of interest Y(x, y), which is located at the center of 3-by-3 pixels, is 110. The values of the eight pixels adjacent to the pixel of interest Y(x, y) (adjacent pixels Y(x−1, y−1), Y(x, y−1), Y(x+1, y−1), Y(x+1, y), Y(x+1, y+1), Y(x, y+1), Y(x−1, y+1), and Y(x−1, y)) are 80, 70, 75, 100, 100, 100, 80, and 80, respectively. Thus, the activity is expressed by the following equation:

Activity(x,y)={|80−110|+|70−110|+|75−110|++|100−110|+|100−110|+|80−110|+|80−110|}/8=24.375

When the motion vector accuracy is computed on a pixel basis, this activity is directly used for computing the motion vector accuracy. When the motion vector accuracy is computed on a block basis (a block including a plurality of pixels), the activity of a block is further computed.

To compute the motion vector accuracy on a block basis, for example, as shown in FIG. 53A, for the block BP having sides of 5 (=2L+1=2×2+1), a pixel 771 included at the center of an activity computing area 851a is defined as a pixel of interest. Thereafter, the activity is computed using the value of the pixel 771 and the values of eight pixels adjacent to the pixel 771.

Additionally, as shown in FIGS. 53B to F, pixels in the block $B_p$ are sequentially scanned to compute the activity of the pixel of interest with respect to the adjacent pixels included in each of the activity computing areas 851b to 851f. The total sum of the activities computed for all the pixels in the block $B_p$ is defined as the activity of block for the block $B_p$.

Accordingly, the total sum of the activities computed for all the pixels in the block expressed by the following equation is defined as the activity of a block (the block activity) Block-activity(i, j):

$$\text{Block}_a\text{ctivity}(i,j) = \Sigma\Sigma|\text{Activity}(x,y)| \quad (4)$$

The total sum given by equation (4) is computed for x in the range from −L to L and for y in the range from −L to L. "i" and "j" in equation (4) represent the center position of a block, thus being different from i and j in equation (3).

It is noted that the variance of the block, the dynamic range, or other values for indicating the variation of pixel value in the spatial direction can be used for the activity.

At step S534, the threshold-value determination unit 603 determines whether the block activity computed by the activity computing unit 602 at step S532 is greater than a predetermined threshold value (a threshold value THa, which is described below with reference to FIG. 53). This process is described in detail below with reference to a flow chart shown in FIG. 54. In this process, a flag indicating whether the block activity is greater than the threshold value THa is set.

At step S534, the normalization processing unit 604 executes a normalization process. This process is described in detail below with reference to FIG. 56. In this process, the motion vector accuracy is computed on the basis of the evaluation value computed at step S31, the block activity computed at step S532, and a threshold value (the gradient of a line 903, which is described below with reference to FIG. 55).

At step S535, the integration processing unit 605 executes an integrating process. This process is described in detail below with reference to FIG. 57. In this process, the motion vector accuracy output to an apparatus (not shown) is determined on the basis of the flag set at step S533 (step S552 or step S553 shown in FIG. 54).

Figure 49:
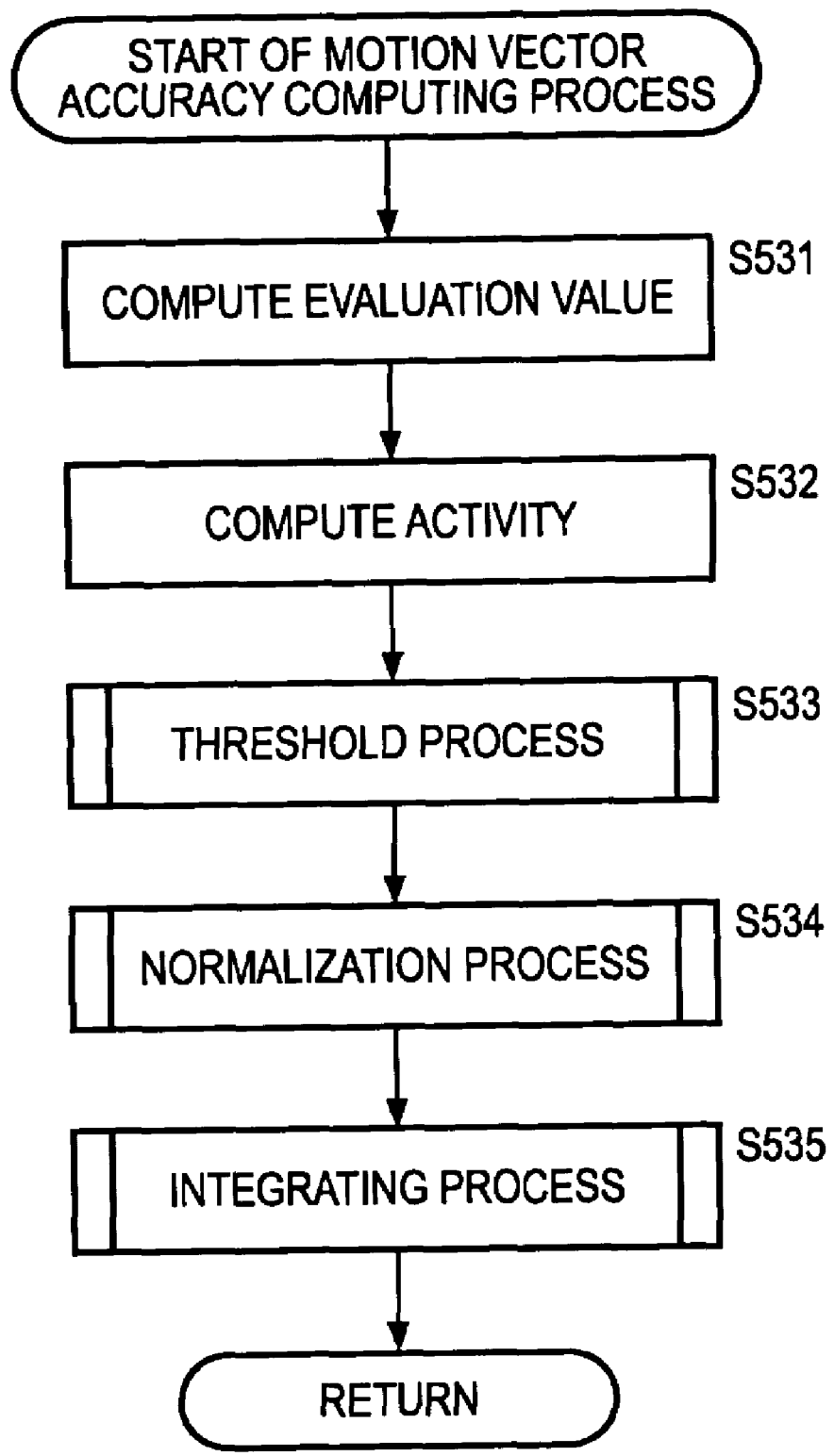
FIG. 49 is a flow chart illustrating a motion-vector accuracy computing process.
Figure 54:
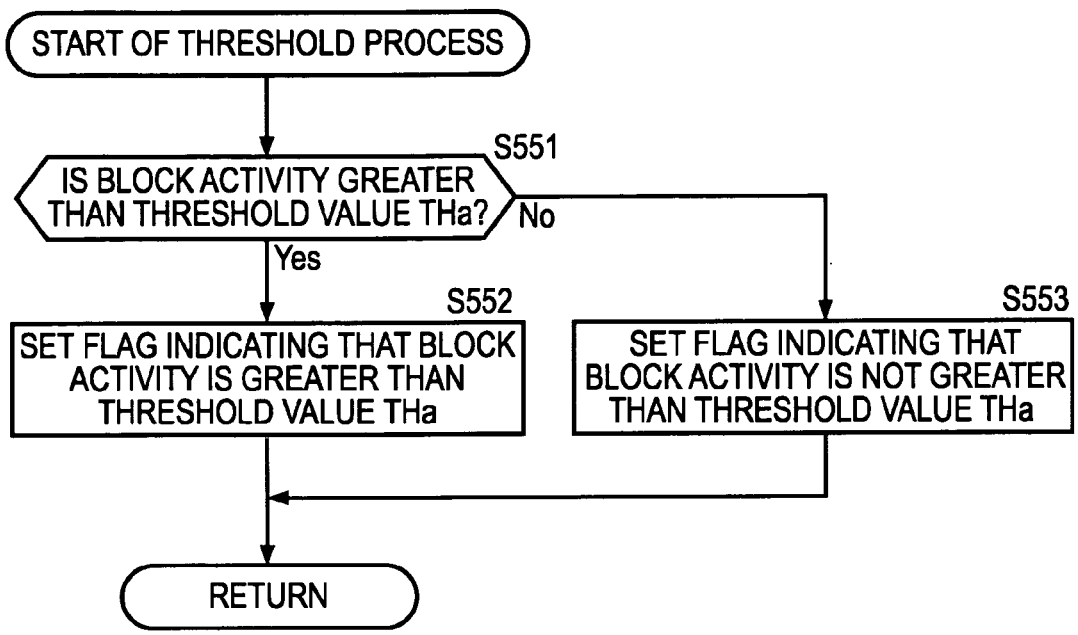
FIG. 54 is a flow chart illustrating a threshold process.

A threshold process at step S533 shown in FIG. 49 is described in detail with reference to FIG. 54. At step S551, the threshold-value determination unit 603 determines whether the computed block activity is greater than the threshold value THa on the basis of the result of the process at step S532 shown in FIG. 49.

Figure 55:
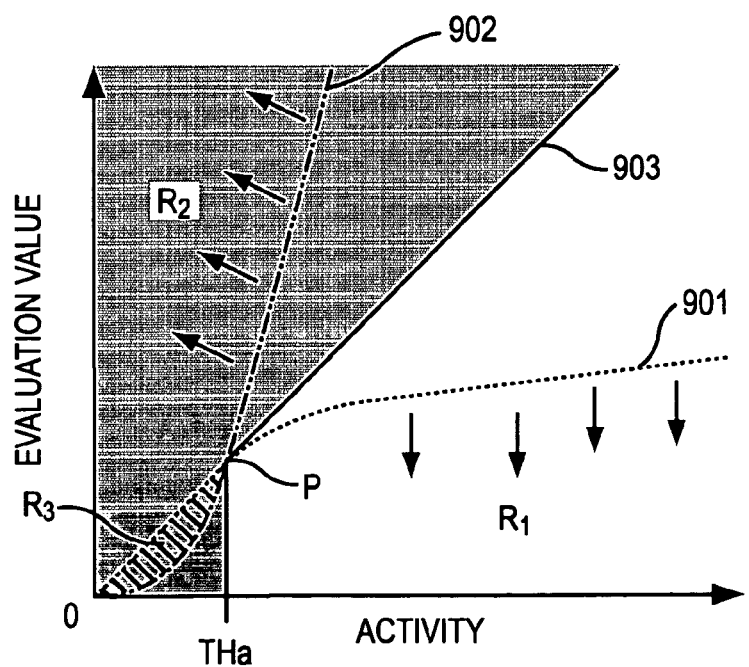
FIG. 55 is a diagram illustrating a relationship between an evaluation value and the activity.

More specifically, the experimental results indicate that the block activity has a relation with the evaluation value using the motion vector as a parameter, as shown in FIG. 55. In FIG. 55, the abscissa represents the block activity blockactivity(i, j) and the ordinate represents the evaluation value Eval. If a motion is correctly detected (if a correct motion vector is given), the values of the block activity and the values of the evaluation value are distributed in a lower region R1 below a curve 901. In contrast, if an erroneous motion (wrong motion vector) is given, the values of the block activity and the values of the evaluation value are distributed in a left region R2 of a curve 902 (the values are rarely dispersed in an area other than the region R2 above the curve 902 and the region R1 below the curve 901). The curve 901 crosses the curve 902 at a point P. The value of the block activity at the point P is defined as the threshold value THa. The threshold value THa indicates that, if the value of the block activity is less than the threshold value THa, there is a possibility that the corresponding motion vector is incorrect (this is described in detail below). The threshold-value determination unit 603 outputs a flag indicating whether the value of the block activity input from the activity computing unit 602 is greater than the threshold value THa to the integration processing unit 605.

If, at step S551, it is determined that the block activity is greater than the threshold value THa (the corresponding motion vector is highly likely to be correct), the process proceeds to step S552. At step S552, the threshold-value determination unit 603 sets the flag indicating that the block activity is greater than the threshold value THa.

In contrast, if, at step S551, it is determined that the block activity is not greater than (i.e., less than) the threshold value THa (there is the possibility that the corresponding motion vector is incorrect), the process proceeds to step S553. At step S553, the flag indicating that the block activity is not greater than (i.e., less than) the threshold value THa is set.

Thereafter, the threshold-value determination unit 603 outputs the flag indicating whether the input block activity is greater than the threshold value to the integration processing unit 605.

Figure 56:
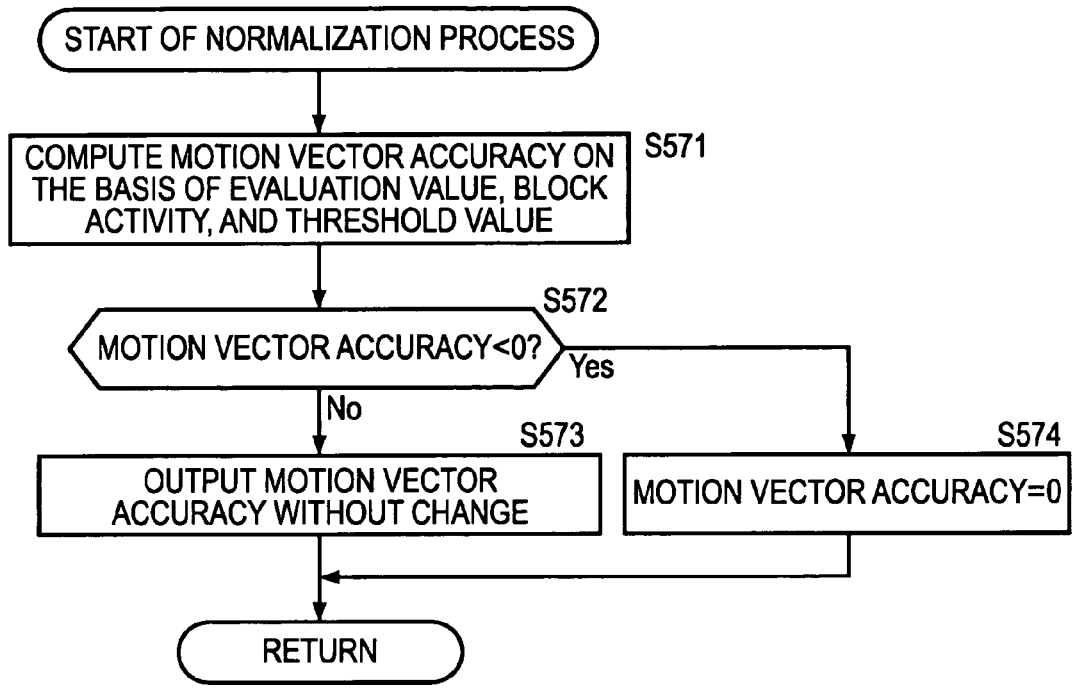
FIG. 56 is a flow chart illustrating a normalization process.

The normalization process at step S534 shown in FIG. 49 is described in detail next with reference to a flow chart shown in FIG. 56. At step S571, the normalization processing unit 604 computes the motion vector accuracy VC on the basis of the evaluation value computed at step S531, the block activity computed at step S532, and the predetermined threshold value (the gradient of the line 903 shown in FIG. 55) according to the following equation:

$$VC = 1 - \text{evaluation value/block activity} \quad (5)$$

In the motion vector accuracy VC, the value obtained by dividing the evaluation value by the block activity determines a position in the graph shown in FIG. 55 and indicates whether the position is located in the lower region or upper region with respect to the line 903 between the original point O and the point P having a gradient of 1. That is, the gradient of the line 903 is 1. If the value obtained by dividing the evaluation value by the block activity is greater than 1, the point corresponding to this value is distributed in the region above the line 903. It means that, as the motion vector accuracy VC obtained by subtracting 1 from this value is smaller (greater for the negative value), the possibility that the corresponding point is distributed in the region R2 increases.

In contrast, if the value obtained by dividing the evaluation value by the block activity is less than 1, the point corresponding to this value is distributed in the region below the line 903. It means that, as the motion vector accuracy VC is larger (closer to 0), the possibility that the corresponding point is distributed in the region R1 increases. The normalization processing unit 604 outputs the motion vector accuracy VC obtained in this manner to the integration processing unit 605.

At step S572, the normalization processing unit 604 determines whether the motion vector accuracy VC computed according to equation (5) is less than 0 or not (whether the motion vector accuracy VC is negative or not). If the motion vector accuracy VC is greater than or equal to 0, the process of the normalization processing unit 604 proceeds to step S573. At step S573, the normalization processing unit 604 directly delivers the motion vector accuracy VC computed at step S571 to the integration processing unit 605.

However, if, at step S572, it is determined that the motion vector accuracy VC is less than 0 (the motion vector accuracy VC is negative), the process proceeds to step S574. At step S574, the normalization processing unit 604 sets the motion vector accuracy VC to a fixed value of 0 and delivers the motion vector accuracy VC to the integration processing unit 605.

Thus, if there is the possibility that the motion vector is incorrect (the motion vector is a wrong vector) (i.e., the motion vector accuracy VC is negative), the motion vector accuracy is set to 0.

Figure 57:
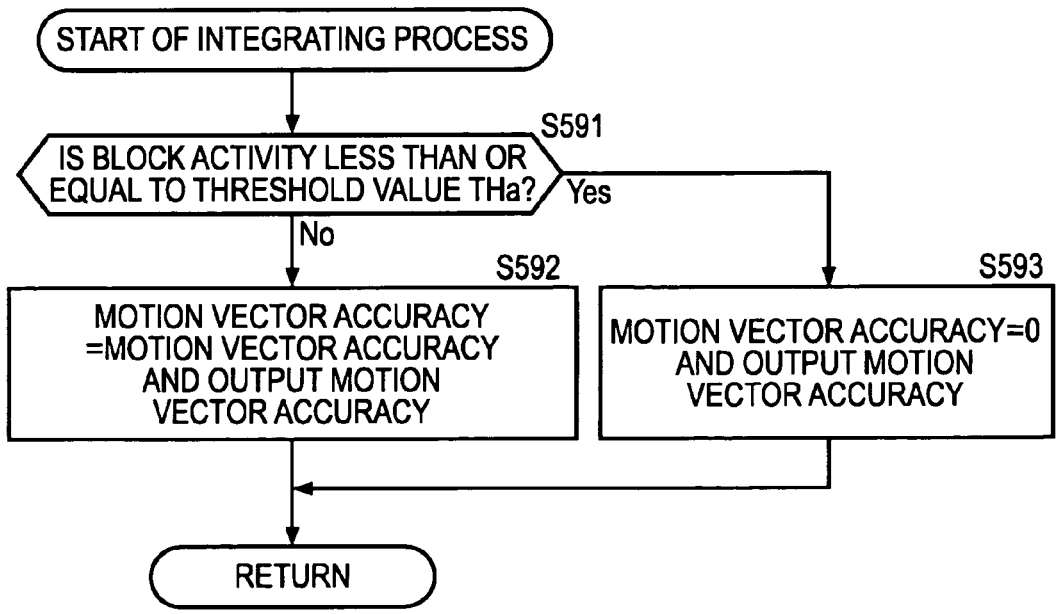
FIG. 57 is a flow chart illustrating an integrating process.

The integration process at step S535 shown in FIG. 49 is described in detail next with reference to a flow chart shown in FIG. 57.

At step S591, the integration processing unit 605 determines whether the block activity is less than or equal to the threshold value THa. This determination is made on the basis of the flag delivered from the threshold-value determination unit 603. If the block activity is greater than the threshold value THa, the integration processing unit 605, at step S592, directly outputs the motion vector accuracy VC computed by the normalization processing unit 604 together with the motion vector.

In contrast, if it is determined that the block activity is less than or equal to the threshold value THa, the motion vector accuracy VC computed by the normalization processing unit 604 is set to 0 and is output at step S593.

This is because, even when the motion vector accuracy VC computed by the normalization processing unit 604 is positive, there is a possibility that the correct motion vector is not obtained if the block activity value is less than the threshold value THa. That is, as shown in FIG. 55, between the original point O and the point P, a curve 202 extends downward past the curve 901 (downward past the line 903). In an area R3 enclosed by the curve 901 and the curve 902 where the block activity is less than the threshold value THa, the value obtained by dividing the evaluation value by the block activity is distributed in both regions R1 and R2, and therefore, it is highly likely that the correct motion vector will not be obtained. Accordingly, in such a distribution, the process is executed based on the assumption that the motion vector accuracy is low. Thus, when the motion vector accuracy VC is negative and even when the motion vector accuracy VC is positive, the motion vector accuracy VC is set to 0 if the threshold value THa is less than the threshold value THa. This design allows the positive motion vector accuracy VC to reliably represent that the correct motion vector is obtained. Furthermore, as the value of the motion vector accuracy VC increases, the possibility that the correct motion vector is obtained increases (the possibility that the distribution is included in the region R1 increases).

This result matches empirical laws suggesting that, in general, it is difficult to obtain a reliable motion vector in an area where the luminance change is low (area where the activity is low).

Thus, the motion vector accuracy is computed. Consequently, the motion vector accuracy can be represented by a quantitative value, and therefore, a reliable motion vector can be detected. While the process has been described with reference to an image of a frame, the process can be applied to an image of a field.

Figure 58:
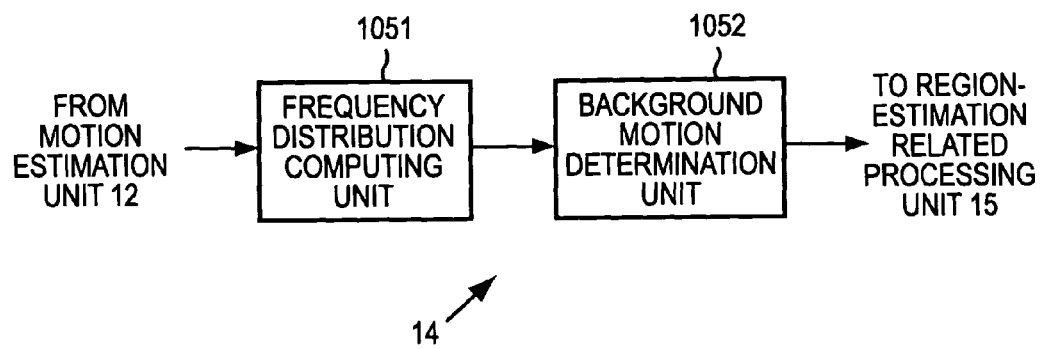
FIG. 58 is a block diagram of an exemplary configuration of a background motion estimation unit.

FIG. 58 illustrates an exemplary configuration of the background motion estimation unit 14 shown in FIG. 1. In this example, the background motion estimation unit 14 includes a frequency distribution computing unit 1051 and a background motion determination unit 1052.

The frequency distribution computing unit 1051 computes the frequency distribution of motion vectors. It is noted weighting is applied to the frequency by using the motion vector accuracy VC delivered from the motion estimation unit 12 so as to weight a motion that is likely to be reliable. The background motion determination unit 1052 determines a motion having a maximum frequency to be the background motion on the basis of the frequency distribution computed by the frequency distribution computing unit 1051. The background motion determination unit 1052 then outputs the motion to the region-estimation related processing unit 15.

Figure 59:
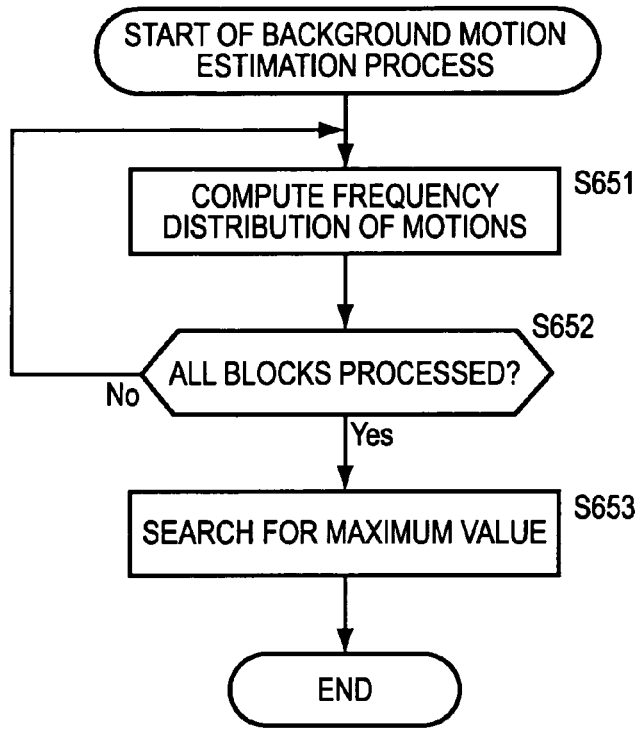
FIG. 59 is a flow chart illustrating a background motion estimation process.

A background motion estimation process performed by the background motion estimation unit 14 is now herein described with reference to FIG. 59.

At step S651, the frequency distribution computing unit 1051 computes the frequency distribution of motions. More specifically, when an x coordinate and a y coordinate of a motion vector serving as a candidate of a background motion are represented in the range of ±16 pixels from a reference point, the frequency distribution computing unit 1051 prepares 1089 (=16×2+1)×(16×2+1)) boxes, that is, boxes corresponding to the coordinates of the possible points of the motion vector. When a motion vector occurs, the frequency distribution computing unit 1051 increments the coordinates corresponding to the motion vector by 1. Thus, the frequency distribution of motion vectors can be computed.

However, if a value of 1 is added when one motion vector occurs and if the frequency of occurrence of a low-accuracy motion vector is high, that low-accuracy motion vector is possibly determined to be the background motion. Therefore, when a motion vector occurs, the frequency distribution computing unit 1051 does not add a value of 1 to the box (coordinates) corresponding to that motion vector, but adds a value of 1 multiplied by the motion vector accuracy VC (=the value of the motion vector accuracy VC) to the box. The value of the motion vector accuracy VC is normalized to a value in the range of 0 to 1. As this value is closer to 1, the accuracy is higher. Accordingly, the frequency distribution obtained using the above-described method becomes the frequency distribution in which a motion vector is weighted on the basis of the accuracy thereof. Thus, the risk that a low-accuracy motion is determined to be the background motion is reduced.

At step S652, the frequency distribution computing unit 1051 determines whether it has completed the process to compute the frequency distribution of motions for all the blocks. If an unprocessed block is present, the process returns to step S651, where the process at step S651 is executed for the next block.

Thus, the process to compute the frequency distribution of motions is executed for the full screen. If, at step S652, it is determined that the process for all the blocks has been completed, the process proceeds to step S653. At step S653, the background motion determination unit 1052 executes a process to search for a maximum value of the frequency distribution. That is, the background motion determination unit 1052 selects a maximum frequency from among the frequencies computed by the frequency distribution computing unit 1051 and determines the motion vector corresponding to the selected frequency to be the motion vector of background. This motion vector of the background motion is delivered to the region-estimation related processing unit 15 and is used for, for example, determining whether the motion of background is equal to the full-screen motion at step S104 shown in FIG. 16 and at step S131 shown in FIG. 21.

Figure 60:
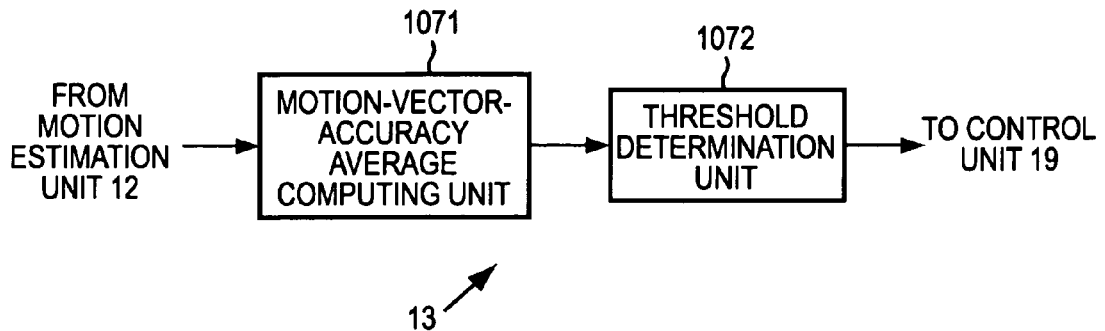
FIG. 60 is a block diagram of an exemplary configuration of a scene change detection unit.

FIG. 60 illustrates an exemplary configuration of the scene change detection unit 13 shown in FIG. 1 in detail. In this example, the scene change detection unit 13 includes a motion-vector-accuracy average computing unit 1071 and a threshold determination unit 1072.

The motion-vector-accuracy average computing unit 1071 computes the average of the motion vector accuracy VC delivered from the motion estimation unit 12 for the full screen and outputs the average to the threshold determination unit 1072. The threshold determination unit compares the average delivered from the motion-vector-accuracy average computing unit 1071 with a predetermined threshold value. The threshold determination unit 1072 then determines whether a scene change occurs on the basis of the comparison result and outputs the determination result to the control unit 19.

Figure 61:
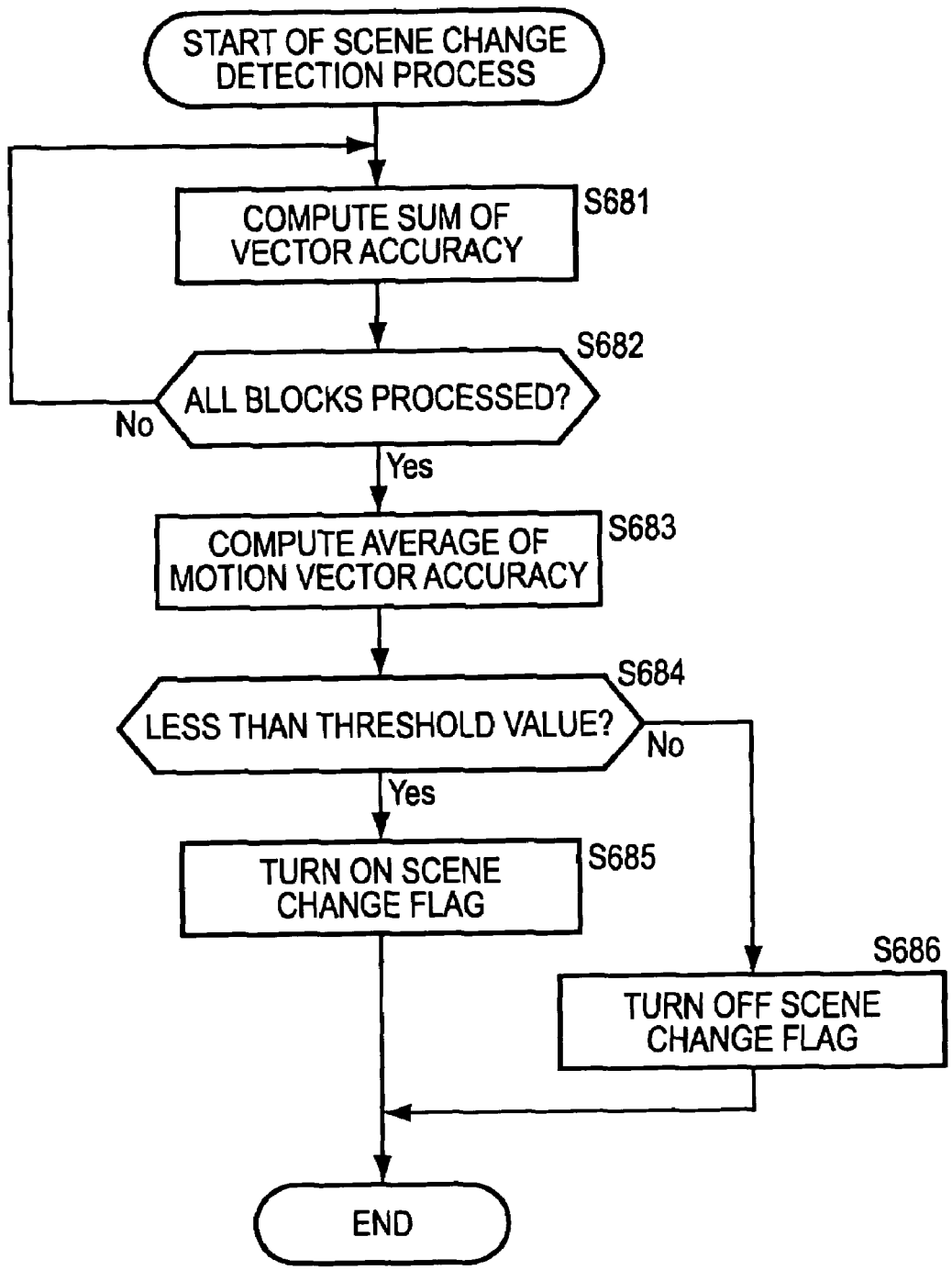
FIG. 61 is a flow chart illustrating a scene change detection process.

The operation of the scene change-detection unit 13 is described next with reference to a flow chart shown in FIG. 61. At step S681, the motion-vector-accuracy average computing unit 1071 computes the sum of the vector accuracy. More specifically, the motion-vector-accuracy average computing unit 1071 summarizes the values of the motion vector accuracy VC computed for each block output from the integration processing unit 605 of the motion estimation unit 12. At step S682, the motion-vector-accuracy average computing unit 1071 determines whether the process to compute the sum of the motion vector accuracy VC has been completed for all the blocks. If the process has not been completed for all the blocks, the motion-vector-accuracy average computing unit 1071 repeats the process at step S681. By repeating this process, the sum of the motion vector accuracy VC for all the blocks in one screen is computed. If, at step S682, it is determined that the process to compute the sum of the motion vector accuracy VC for all the blocks in one screen is completed, the process proceeds to step S683. At step S683, the motion-vector-accuracy average computing unit 1071 executes the process to compute the average of the motion vector accuracy VC. More specifically, the sum of the vector accuracy VC for one screen computed at step S681 is divided by the number of blocks used for the addition. The resultant value is defined as the average.

At step S684, the threshold determination unit 1072 compares the average of the motion vector accuracy VC computed by the motion-vector-accuracy average computing unit 1071 at step S683 with a predetermined threshold value to determine whether the threshold value is less than the average. In general, if a scene change occurs between two frames of a moving image at different times, the corresponding image disappears. Therefore, even though the motion vector is computed, the accuracy of that motion vector is low. Thus, if the average of the motion vector accuracy VC is less than the threshold value, the threshold determination unit 1072, at step S685, turns on a scene change flag. If the average of the motion vector accuracy VC is not less than (i.e., greater than or equal to) the threshold value, the threshold determination unit 1072, at step S686, turns off the scene change flag. The scene change flag that is turned on indicates that a scene change has occurred, whereas the scene change flag that is turned off indicates that a scene change has not occurred.

Figure 34:
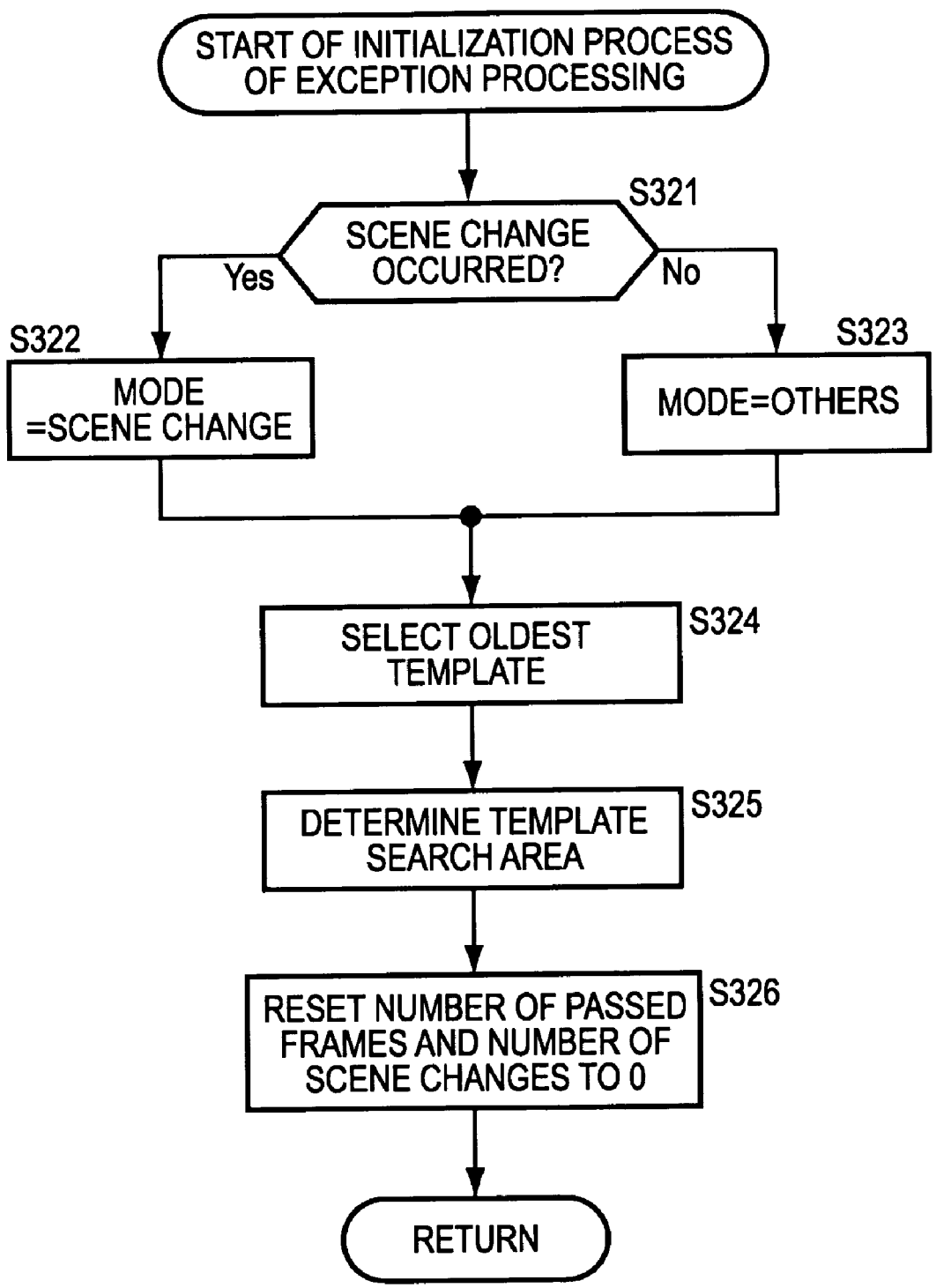
FIG. 34 is a flow chart illustrating an initialization process of the exception processing at step S301 shown in FIG. 33.

This scene change flag is delivered to the control unit 19 and is used for determining whether a scene change has occurred at step S321 shown in FIG. 34 and at step S362 shown in FIG. 37.

Figure 62:
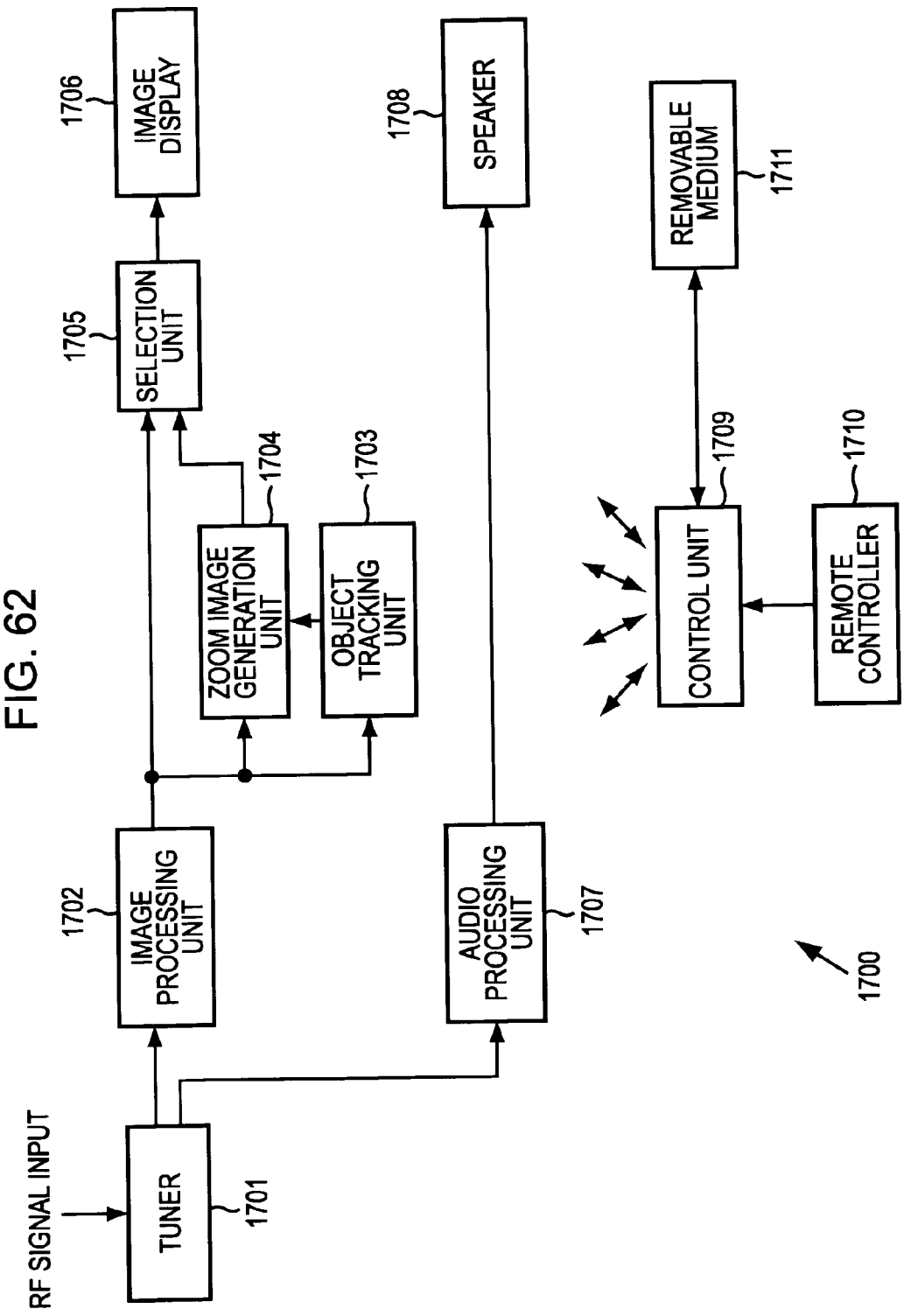
FIG. 62 is a block diagram of an exemplary configuration of a television receiver.

An image processing apparatus including the above-described object tracking apparatus is described next. FIG. 62 illustrates an example in which the object tracking apparatus is applied to a television receiver 1700. A tuner 1701 receives an RF signal, demodulates the RF signal into an image signal and a audio signal, outputs the image signal to an image processing unit 1702, and outputs the audio signal to an audio processing unit 1707.

The image processing unit 1702 demodulates the image signal input from the tuner 1701. The image processing unit 1702 then outputs the demodulated image signal to an object tracking unit 1703, a zoom image generation unit 1704, and a selection unit 1705. The object tracking unit 1703 has virtually the same configuration as the above-described object tracking apparatus 1 shown in FIG. 1. The object tracking unit 1703 executes a process to track a tracking point of an object specified by a user in the input image. The object tracking unit 1703 outputs the coordinate information about the tracking point to the zoom image generation unit 1704. The zoom image generation unit 1704 generates a zoom image at the center of which is the tracking point and outputs the zoom image to the selection unit 1705. The selection unit 1705 selects one of the image delivered from the image processing unit 1702 and the image delivered from the zoom image generation unit 1704 on the basis of a user instruction and outputs the selected image to an image display 1706, which displays the image.

The audio processing unit 1707 demodulates the audio signal input from the tuner 1701 and outputs the demodulated signal to a speaker 1708.

A remote controller 1710 is operated by the user. The remote controller 1710 outputs signals corresponding to the user operations to a control unit 1709. The control unit includes, for example, a microcomputer and controls all the components in response to the user instruction. A removable medium 1711 includes a semiconductor memory, a magnetic disk, an optical disk, or a magnetooptical disk. The removable medium 1711 is mounted as needed. The removable medium 1711 provides a program and various types of data to the control unit 1709.

Figure 63:
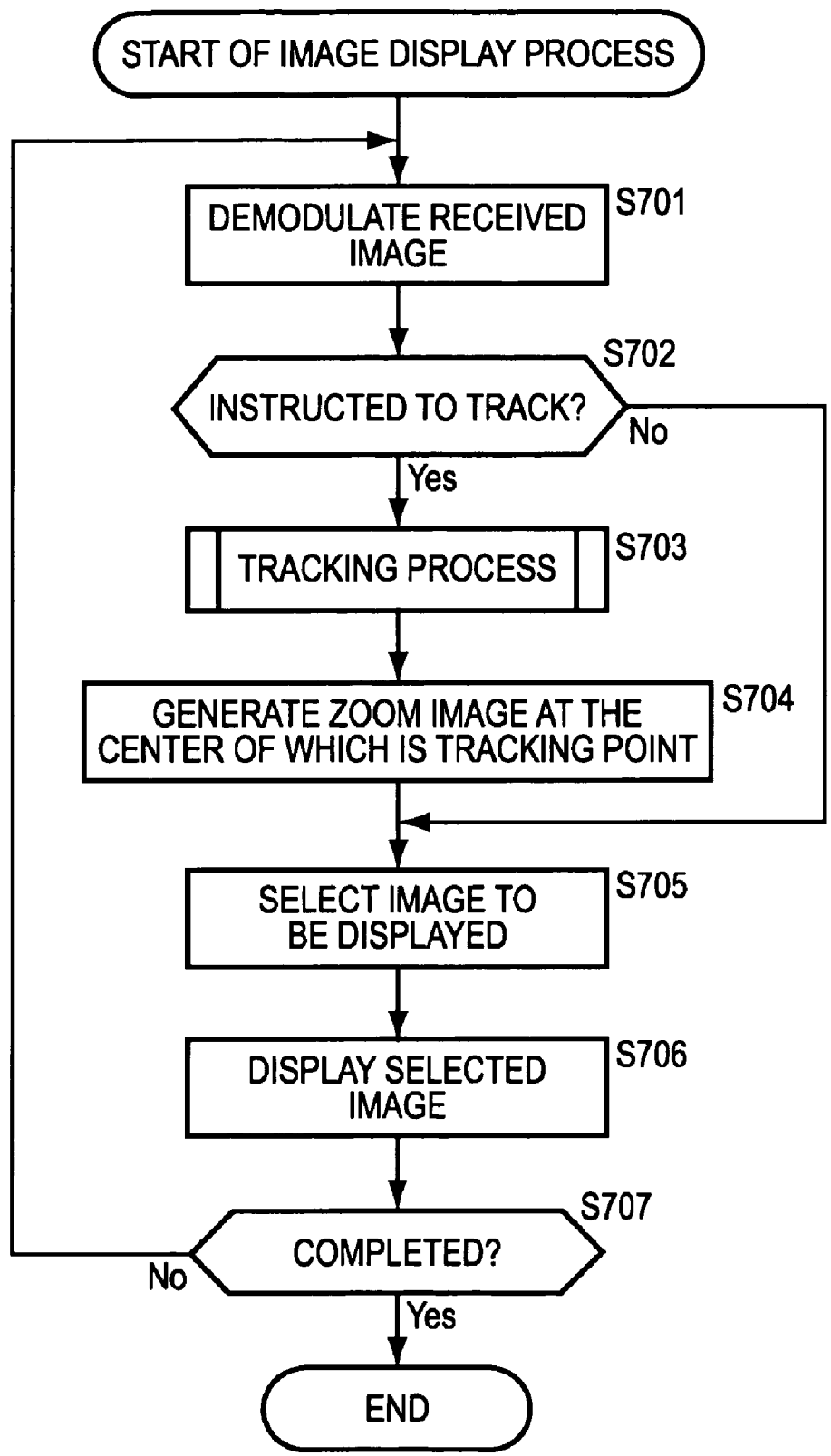
FIG. 63 is a flow chart illustrating the image display process of the television receiver.

The process of the television receiver 1700 is described next with reference to a flow chart shown in FIG. 63.

At step S701, the tuner 1701 receives an RF signal via an antenna (not shown) and demodulates a signal for a channel specified by the user. The tuner 1701 then outputs an image signal to the image processing unit 1702 and outputs an audio signal to the audio processing unit 1707. The audio signal is demodulated by the audio processing unit 1707 and is output from the speaker 1708.

The image processing unit 1702 demodulates the input image signal and outputs the image signal to the object tracking unit 1703, the zoom image generation unit 1704, and the selection unit 1705.

At step S702, the object tracking unit 1703 determines whether tracking is enabled by the user. If the object tracking unit 1703 determines that tracking is not enabled, the object tracking unit 1703 skips the processes at steps S703 and S704. At step S705, the selection unit 1705 selects one of the image signal delivered from the image processing unit 1702 and the image signal input from the zoom image generation unit 1704 on the basis of a control from the control unit 1709. In this case, since a user instruction is not received, the control unit 1709 instructs the selection unit 1705 to select the image signal from the image processing unit 1702. At step S706, the image display 1706 displays the image selected by the selection unit 1705.

At step S707, the control unit 1709 determines whether the image display process is completed on the basis of a user instruction. That is, to terminate the image display process, the user operates the remote controller 1710 to instruct the control unit 1709 to terminate the image display process. If the control unit 1709 has not received the user instruction, the process returns to step S701 and the process subsequent to step S701 is repeatedly executed.

Thus, the normal processing to directly display an image corresponding to a signal received by the tuner 1701 is executed.

When an image that the user wants to track is displayed on the image display 1706, the user operates the tuner 1701 to specify the image. When this operation is carried out, the control unit 1709, at step S702, determines that tracking is enabled and controls the object tracking unit 1703. Under the control of the control unit 1709, the object tracking unit 1703 starts tracking the tracking point specified by the user. This process is the same as the process performed by the above-described object tracking apparatus 1.

At step S704, the zoom image generation unit 1704 generates a zoom image at the center of which is the tracking point tracked by the object tracking unit 1703 and outputs the zoom image to the selection unit 1705.

This zoom process can be executed by using an adaptive classification technique proposed by the present inventor. For example, Japanese Unexamined Patent Application Publication No. 2002-196737 describes a technology in which a 525i signal is converted to a 1080i signal using a coefficient obtained by a pre-training process. This process is virtually the same process to enlarge an image by a factor of 9/4 in both vertical direction and horizontal direction. However, the number of pixels in the image display 1706 is fixed. Accordingly, in order to, for example, generate a 9/4 times larger image, the zoom image generation unit 1704 can generate a zoom image by converting a 525i signal to a 1080i signal and selecting a predetermined number of pixels at the center of which is the tracking point (the number of pixels corresponding to the image display 1706). In order to reduce the image, the reverse operation is executed.

An image zoomed by any scale factor can be generated on the basis of this principal.

If the tracking instruction is received, the selection unit 1705, at step S705, selects the zoom image generated by the zoom image generation unit 1704. As a result of the selection, the image display 1706, at step S706, displays the zoom image generated by the zoom image generation unit 1704.

Thus, the zoom image at the center of which is the tracking point specified by the user is displayed on the image display 1706. If the scale factor is set to 1, only the tracking is performed.

Figure 64:
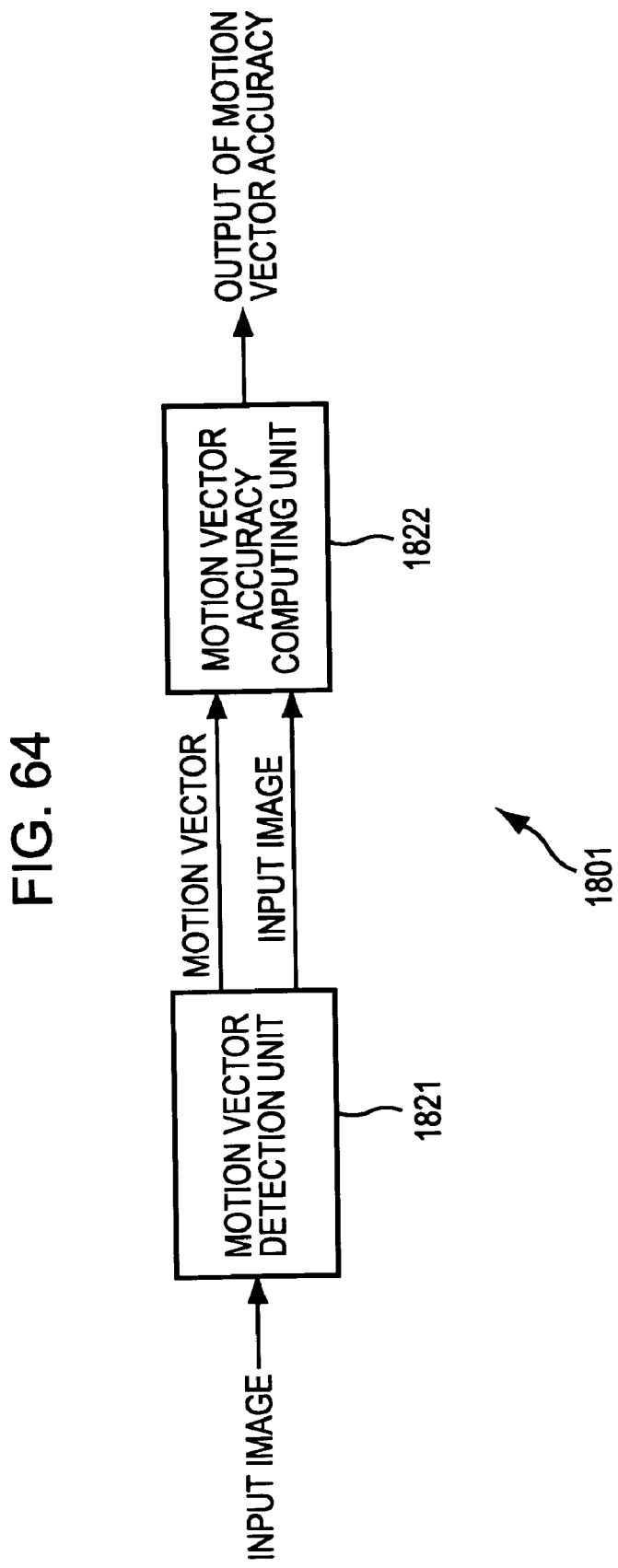
FIG. 64 is a block diagram of an exemplary configuration of an image processing apparatus according to the present invention.

FIG. 64 illustrates the functional structure of an image processing apparatus 1801 according to the present invention. The image processing apparatus 1801 includes a motion vector detection unit 1821 and a motion vector accuracy computing unit 1822.

The motion vector detection unit 1821 detects a motion vector from an input image and delivers the detected motion vector and the input image to the motion vector accuracy computing unit 1822. Additionally, when the input image already contains a motion vector, the motion vector detection unit 1821 separates the image data from the motion vector and delivers the image data and the motion vector to the motion vector accuracy computing unit 1822. If the input data and the motion vector are separately input, the need for the motion vector detection unit 1821 can be eliminated.

The motion vector accuracy computing unit 1822 computes the accuracy of the corresponding motion vector on the basis of the input image (image data) (hereinafter referred to as "motion vector accuracy") and outputs the obtained accuracy to an apparatus (not shown).

Figure 65:
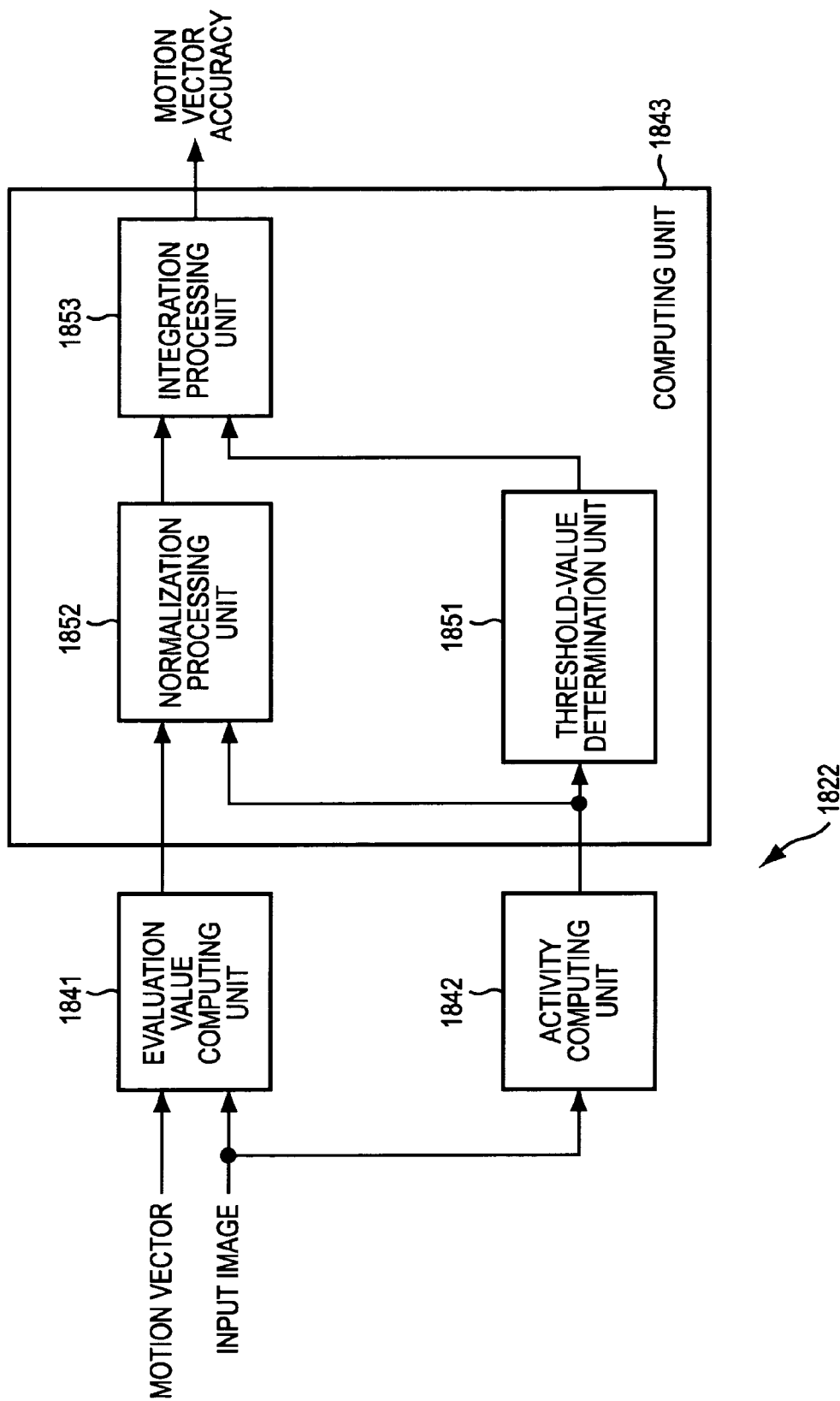
FIG. 65 is a block diagram of an exemplary configuration of a motion vector accuracy computing unit.

FIG. 65 illustrates an exemplary configuration of the motion vector accuracy computing unit 1822 shown in FIG. 64. In this embodiment, the motion vector accuracy computing unit 1822 includes an evaluation value computing unit 1841, an activity computing unit 1842, and a computing unit 1843. The computing unit 1843 includes a threshold-value determination unit 1851, a normalization processing unit 1852, and the integration processing unit 1853.

The motion vector output from the motion vector detection unit 1821 shown in FIG. 64 is input to the evaluation value computing unit 1841. The input image (image data) is input to the evaluation value computing unit 1841 and the activity computing unit 1842.

The evaluation value computing unit 1841 computes the evaluation value of the input image and delivers the evaluation value to the normalization processing unit 1852. The activity computing unit 1842 computes the activity of the input image and delivers the activity to the threshold-value determination unit 1851 and the normalization processing unit 1852 of the computing unit 1843.

The normalization processing unit 1852 normalizes the evaluation value delivered from the evaluation value computing unit 1841 on the basis of the activity delivered from the activity computing unit 1842 and delivers the obtained value to the integration processing unit 1853. The threshold-value determination unit 1851 compares the activity delivered from the activity computing unit 1842 with a predetermined threshold value and delivers the determination result to the integration processing unit 1853. The integration processing unit 1853 computes the motion vector accuracy on the basis of the normalization information delivered from the normalization processing unit 1852 and the determination result delivered from the threshold-value determination unit 1851. The integration processing unit 1853 then outputs the obtained motion vector accuracy to an apparatus (not shown).

The motion vector detection unit 1821, the motion vector accuracy computing unit 1822, the evaluation value computing unit 1841, the activity computing unit 1842, the computing unit 1843, the threshold-value determination unit 1851, the normalization processing unit 1852, and the integration processing unit 1853 have basically the same configuration as those of the above-described motion vector detection unit 606-1, the motion vector accuracy computing unit 606-2, the evaluation value computing unit 601, the activity computing unit 602, the computing unit 606-3, the threshold-value determination unit 603, the normalization processing unit 604, and the integration processing unit 605 shown in FIG. 43, respectively. Therefore, the detailed descriptions thereof are not repeated.

The above-described image processing apparatus 1801 can be composed of, for example, a personal computer.

Figure 66:
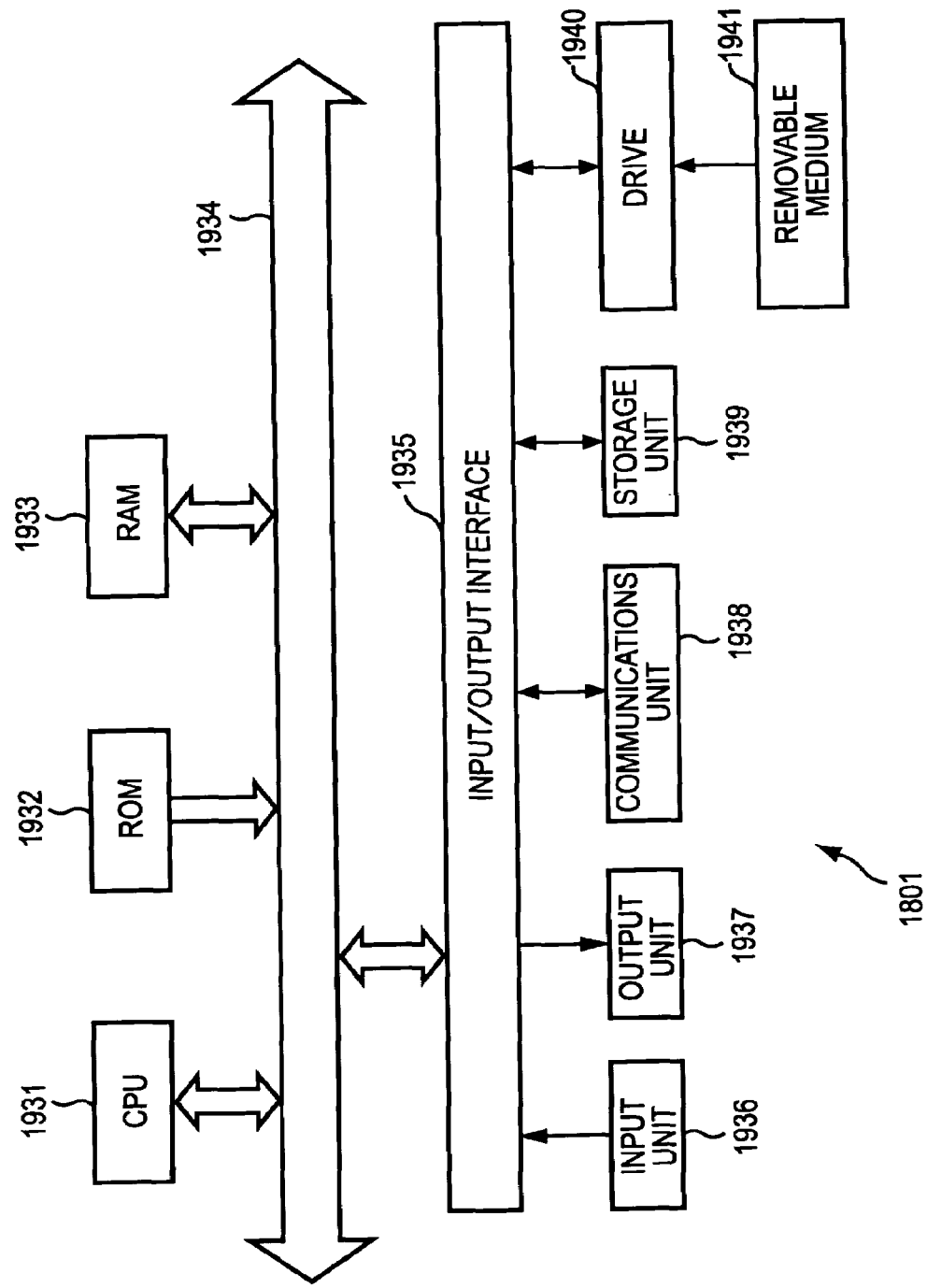
FIG. 66 is a block diagram of an exemplary configuration of the image processing apparatus.

In this case, the image processing apparatus 1801 is configured as described in, for example, FIG. 66. A central processing unit (CPU) 1931 executes various processing in accordance with a program stored in a read only memory (ROM) 1932 or a program loaded from a storage unit 1939 into a random access memory (RAM) 1933. The RAM 1933 also stores data needed for the CPU 1931 to execute the various processing as needed.

The CPU 1931, the ROM 1932, and the RAM 1933 are connected to each other via a bus 1934. An input/output interface 1935 is also connected to the bus 1934.

The following components are connected to the input/output interface 1935: an input unit 1936 including, for example, a keyboard and a mouse, a display including, for example, a cathode ray tube (CRT) or a liquid crystal display (LCD), an output unit 1937 including, for example, a speaker, a communications unit 1938 including, for example, a modem or a terminal adaptor, and a storage unit 1939 including, for example, a hard disk. The communications unit 1938 carries out a process to communicate with a different apparatus via a LAN or the Internet (not shown).

A drive 1940 is also connected to the input/output interface 1935. A removable medium 1941 including a magnetic disk, an optical disk, a magnetooptical disk, or a semiconductor memory is mounted in the drive 1940 as needed. A computer program read out of these media is installed in the storage unit 1939 as needed.

Figure 67:
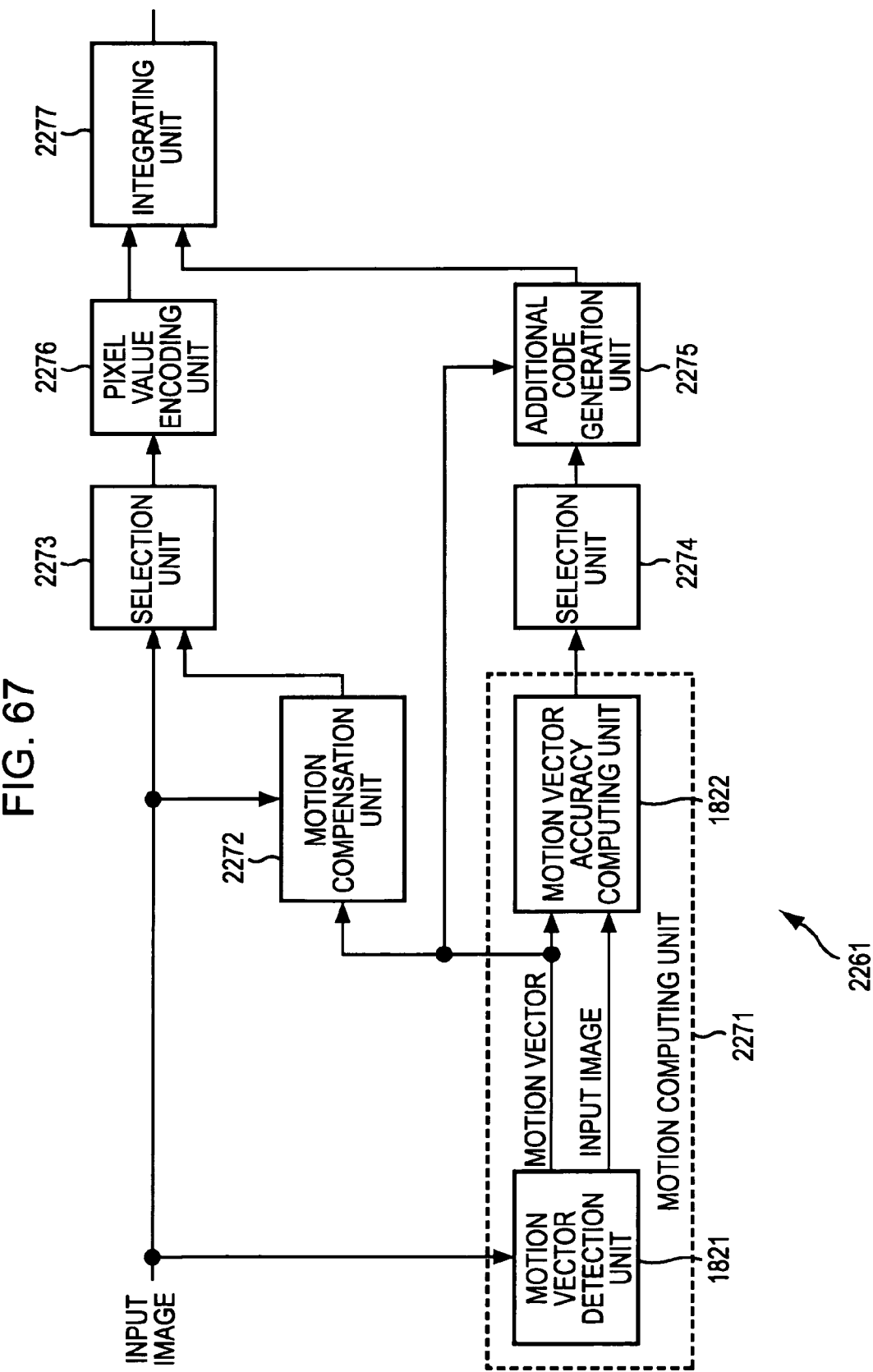
FIG. 67 is a block diagram of an exemplary configuration of an encoding unit.

A encoding unit 2261 according to the present invention is described next with reference to FIG. 67.

In the encoding unit 2261, an input image is delivered to the motion vector detection unit 1821, a motion compensation unit 2272, and a selection unit 2273 of a motion computing unit 2271. The motion computing unit 2271 has virtually the same configuration as that of the above-described image processing apparatus 1801 shown in FIG. 64. The motion vector detection unit 1821 detects a motion vector from the input image and outputs the detected motion vector to the motion compensation unit 2272 and an additional code generation unit 2275. Additionally, the motion vector detection unit 1821 outputs the motion vector and the input image to the motion vector accuracy computing unit 1822.

The motion vector accuracy computing unit 1822 computes the motion vector accuracy on the basis of the motion vector input from the motion vector detection unit 1821 and the input image and outputs the computed motion vector accuracy to a control unit 2274. The control unit 2274 controls the selection unit 2273 and the additional code generation unit 2275 on the basis of the input motion vector accuracy.

The motion compensation unit 2272 compensates for the motion on the basis of the delivered input image and the motion vector delivered from the motion vector detection unit 1821 and delivers the motion-compensated image to the selection unit 2273. The selection unit 2273 selects the input image or the motion-compensated image and outputs the selected image to a pixel value encoding unit 2276 under the control of the control unit 2274. The pixel value encoding unit 2276 encodes the received image and output to an integrating unit 2277.

The additional code generation unit 2275 generates an additional code that indicates whether the motion of an image of each frame is compensated for under the control of the control unit 2274 and combines the additional code with the motion vector input from the motion vector detection unit 1821. The additional code generation unit 2275 adds the motion vector accuracy to the image if needed. The additional code generation unit 2275 then outputs the combined image to the integrating unit 2277.

The integrating unit 2277 integrates the code input from the pixel value encoding unit 2276 and the additional code input from the additional code generation unit 2275, and outputs the integrated code to an apparatus (not shown).

Figure 68:
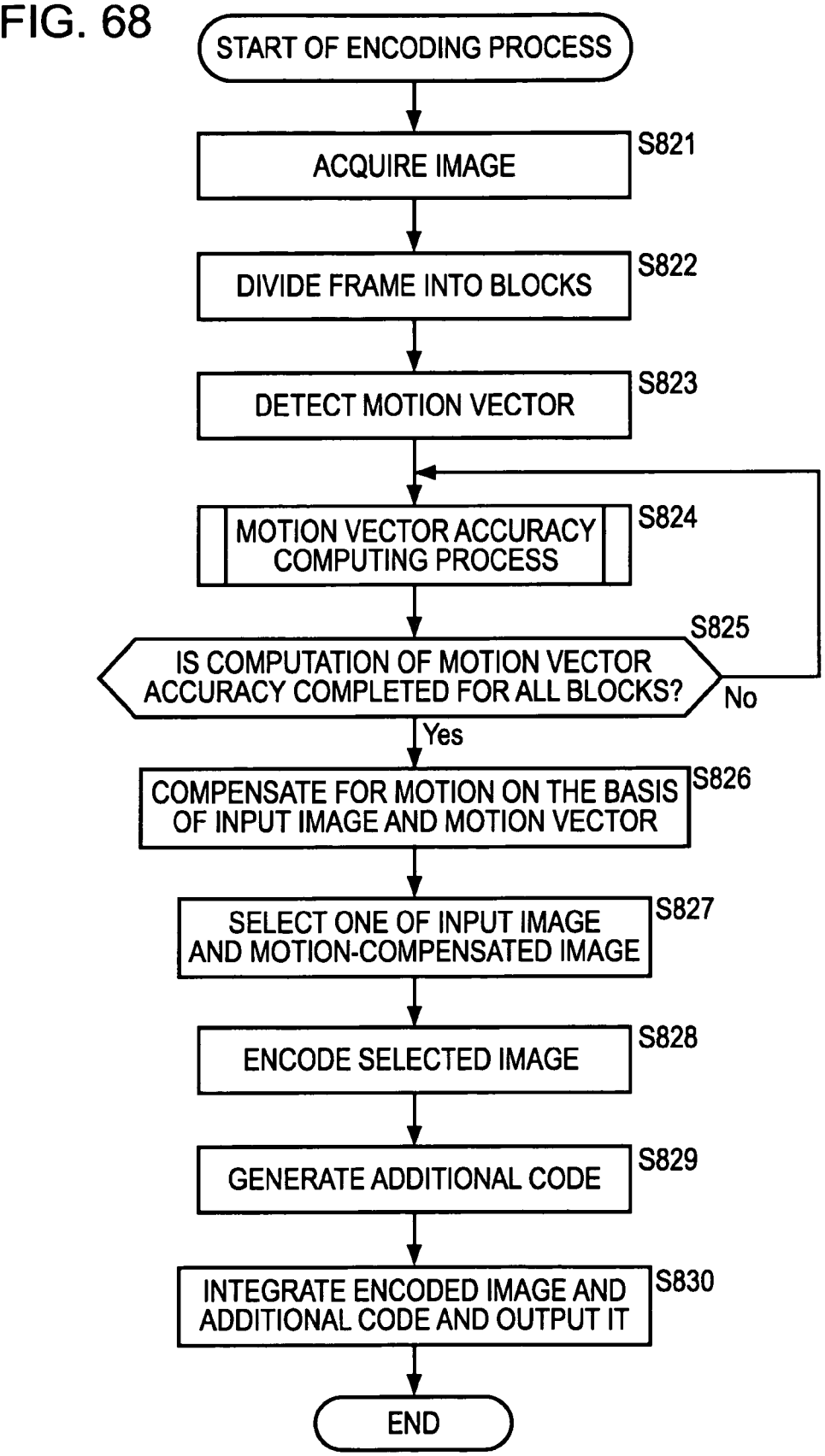
FIG. 68 is a flow chart illustrating the encoding process of the encoding unit.

The process of the encoding unit 2261 is described next with reference to a flow chart shown in FIG. 68. At steps S821 through S825, the image is input and each frame of the image is divided into predetermined blocks. A motion vector is detected on the basis of the divided blocks. The accuracy of each motion vector (the motion vector accuracy) is computed. The same processes are repeated until the motion vector accuracy is detected for all the blocks.

Thereafter, at step S826, the motion compensation unit 2272 compensates for the motion on the basis of the input image and the motion vector. That is, a difference between images of the consecutive two frames is computed on the basis of the motion vector and a difference image (motion-compensated image) is generated.

At step S827, under the control of the control unit 2274, the selection unit 2273 selects one of the input image and the motion-compensated image delivered from the motion compensation unit 2272. That is, when the motion vector accuracy is sufficiently high, the control unit 2274 instructs the selection unit 2273 to select the motion-compensated image as an image to be encoded. When the motion vector accuracy is not sufficiently high, the control unit 2274 instructs the selection unit 2273 to select the input image. Since one of the input image and the motion-compensated image is selected on the basis of the motion vector accuracy, an image that is motion-compensated on the basis of low reliable accuracy can be prevented from being used. The selection unit 2273 delivers the selected image to the pixel value encoding unit 2276.

At step S828, the pixel value encoding unit 2276 encodes the image selected at step S828 (the input image or the motion-compensated image).

At step S829, the additional code generation unit 2275 generates an additional code for indicating whether or not an encoded image required for decoding is a motion-compensated image under the control of the control unit 2274. This additional code can include the motion vector accuracy.

At step S830, the integrating unit 2277 integrates the image encoded at step S828 and the additional code generated at step S829. The integrating unit 2277 then outputs the integrated image and additional code to an apparatus (not shown).

Thus, the image is encoded so that the image that is motion-compensated on the basis of a motion vector that may be incorrect (that may be a wrong vector) can be prevented from being used. Accordingly, the damage of an image caused by motion compensation using an unreliable motion vector can be prevented, and therefore, a high-quality image can be obtained at a decoding time.

Figure 69:
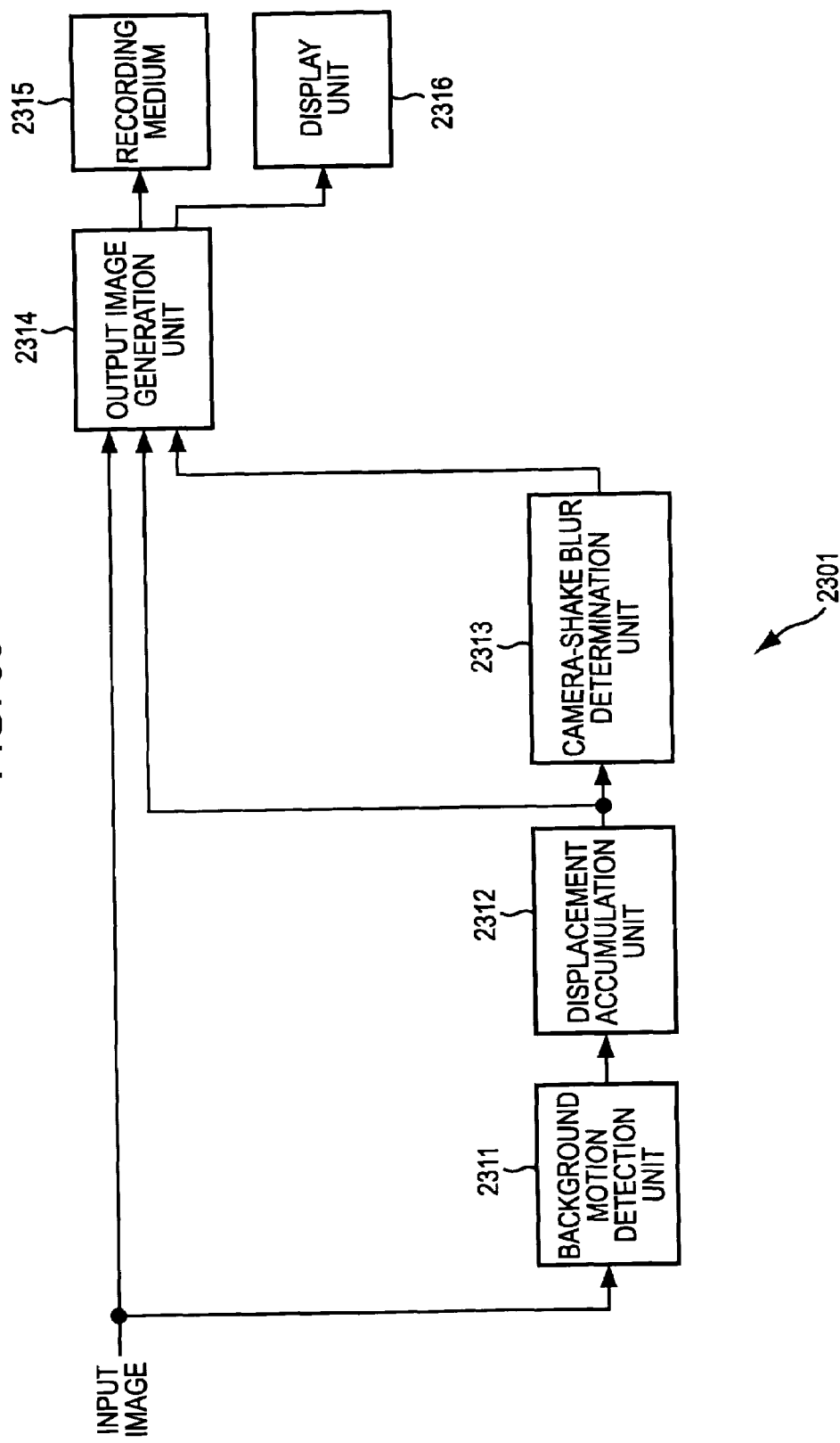
FIG. 69 is a block diagram of an exemplary configuration of a camera-shake blur correction apparatus.

FIG. 69 illustrates an example in which the present invention is applied to a camera-shake blur correction apparatus 2301. For example, the camera-shake blur correction apparatus 2301 is applied to a digital video camera.

An input image is input to a background motion detection unit 2311 and an output image generation unit 2314. The background motion detection unit 2311 detects a background motion from the input image and outputs the detected background motion to a displacement accumulation unit 2312. The configuration of the background motion detection unit 2311 is described in detail below with reference to FIG. 70. The displacement accumulation unit 2312 accumulates the amounts of displacement from the input background motion and outputs the accumulated amount of displacement to a camera-shake blur determination unit 2313 and the output image generation unit 2314. The camera-shake blur determination unit 2313 determines whether the input displacement information corresponds to camera-shake blur on the basis of a predetermined threshold value and outputs the determination result to the output image generation unit 2314.

The output image generation unit 2314 generates an output image from the delivered input image on the basis of the amount of displacement input from the displacement accumulation unit 2312 and the determination result input from the camera-shake blur determination unit 2313. The output image generation unit 2314 then records the output image on a writable recording medium 315, such as a hard disk drive (HDD) and a video tape. Additionally, the output image generation unit 2314 outputs the generated image to a display unit 2316 including, for example, a liquid crystal display (LCD), which displays the generated image.

Figure 70:
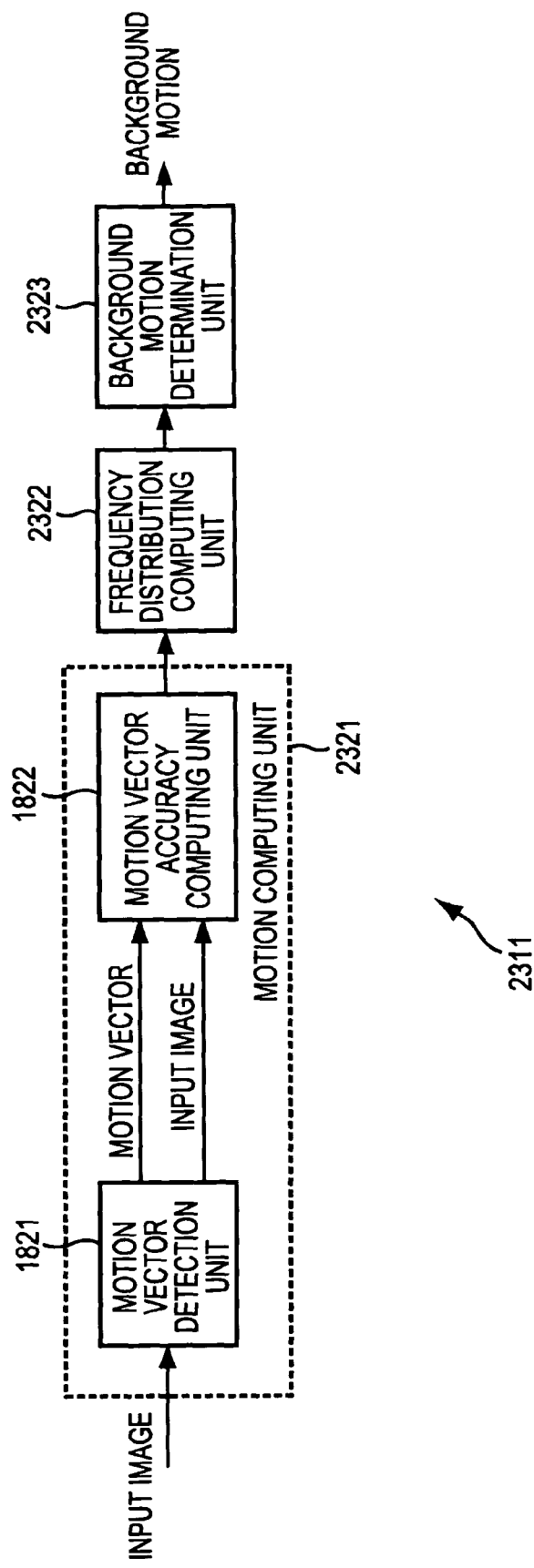
FIG. 70 is a block diagram of an exemplary configuration of a background motion detection unit.

FIG. 70 illustrates the configuration of the background motion detection unit 2311 shown in FIG. 69 in detail. In this configuration, the background motion detection unit 2311 includes a motion computing unit 2321, a frequency distribution computing unit 2322, and a background motion determination unit 2323. The motion computing unit 2321 has a configuration virtually the same as that of the above-described image processing apparatus 1801 shown in FIG. 63.

The input image is delivered to the motion vector detection unit 1821 of the motion computing unit 2321. The motion vector detection unit 1821 detects a motion vector from the input image and outputs the detected motion vector and the input image to the motion vector accuracy computing unit 1822. The motion vector accuracy computing unit 1822 computes the accuracy of the corresponding motion vector (the motion vector accuracy) on the basis of the input motion vector and the input image and delivers the motion vector accuracy to the frequency distribution computing unit 2322.

The frequency distribution computing unit 2322 computes the frequency distribution of motion vectors. It is noted weighting is applied to the frequency by using the motion vector accuracy VC delivered from the motion computing unit 2321 so as to weight a motion that is likely to be reliable. The background motion determination unit 2323 determines a motion having a maximum frequency to be the background motion on the basis of the frequency distribution computed by the frequency distribution computing unit 2322.

Figure 71:
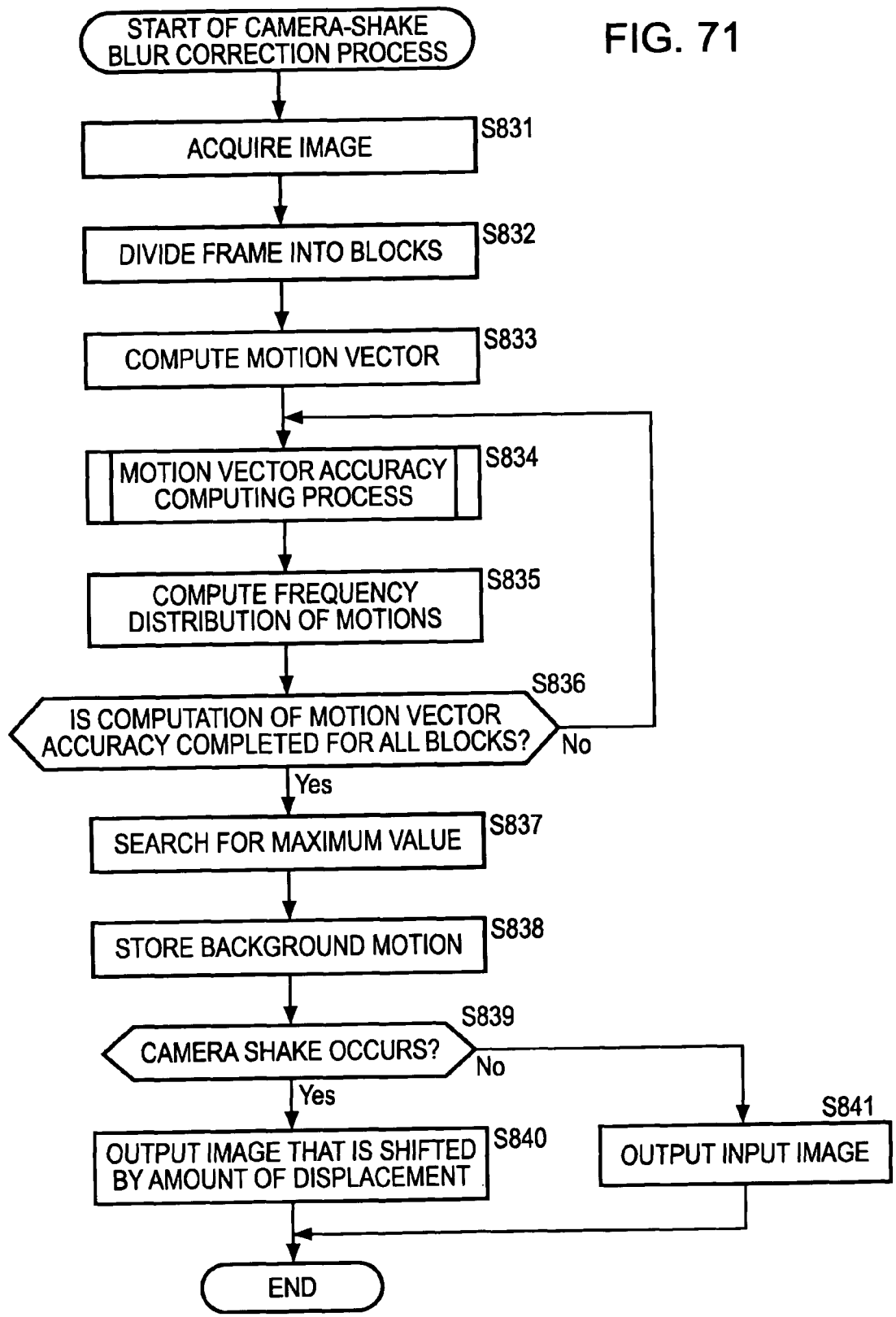
FIG. 71 is a flow chart illustrating the camera-shake blur correction process of the camera-shake blur correction apparatus.

The camera-shake blur correction process performed by the camera-shake blur correction apparatus 2301 is described next with reference to a flow chart shown in FIG. 71. At steps S831 through S834, the input image is acquired and a frame of the image is divided into predetermined blocks. A motion vector is detected on the basis of the divided blocks using, for example, the block matching method. The accuracy of each motion vector (the motion vector accuracy) is then computed.

At step S835, the frequency distribution computing unit 2322 computes the frequency distribution of motions. More specifically, when an x coordinate and a y coordinate of a motion vector serving as a candidate of a background motion are represented in the range of ±16 pixels from a reference point, the frequency distribution computing unit 2322 prepares 1089 ((=16×2+1)×(16×2+1)) boxes, that is, boxes corresponding to the coordinates of the possible points of the motion vector. When a motion vector occurs, the frequency distribution computing unit 2322 increments the coordinates corresponding to the motion vector by 1. Thus, the frequency distribution of motion vectors can be computed.

However, if a value of 1 is added when one motion vector occurs and if the frequency of occurrence of a low-accuracy motion vector is high, that low-accuracy motion vector is possibly determined to be the background motion. Therefore, when a motion vector occurs, the frequency distribution computing unit 2322 does not add a value of 1 to the box (coordinates) corresponding to that motion vector/but adds a value of 1 multiplied by the motion vector accuracy VC (=the value of the motion vector accuracy VC) to the box. The value of the motion vector accuracy VC is normalized to a value in the range of 0 to 1. As this value is closer to 1, the accuracy is higher. Accordingly, the frequency distribution obtained using the above-described method becomes the frequency distribution in which a motion vector is weighted on the basis of the accuracy thereof. Thus, the risk that a low-accuracy motion is determined to be the background motion is reduced.

At step S836, the motion vector accuracy computing unit 1822 determines whether it has completed the process to compute the frequency distribution of motions for all the blocks. If the unprocessed block is present, the process returns to step S834, where the processes at steps S834 and S835 are executed for the next block.

After the process to compute the frequency distribution of motions has been executed for the full screen, the process proceeds to step S837. At step S837, the background motion determination unit 2323 executes a process to search for a maximum value of the frequency distribution. That is, the background motion determination unit 2323 selects a maximum frequency from among the frequencies computed by the frequency distribution computing unit 2322 and determines the motion vector corresponding to the selected frequency to be the motion vector of the background motion. This motion vector of the background motion is delivered to the displacement accumulation unit 2312.

At step S838, the displacement accumulation unit 2312 sequentially stores the motion vector representing the background motion for each frame.

At step S839, the camera-shake blur determination unit 2313 determines whether the displacement (absolute value) of the motion vector representing the background motion is greater than a predetermined threshold value so as to determine whether the input image is blurred due to camera shake. If the displacement is greater than the threshold value, it is determined that the hand vibration occurs. In contrast, if the displacement is less than the threshold value, it is determined that no hand vibration occurs. The camera-shake blur determination unit 2313 delivers the determination result to the output image generation unit 2314.

If, at step S839, the camera-shake blur determination unit 2313 determines that the hand vibration occurs, the output image generation unit 2314, at step S840, generates an image that is shifted by the displacement in the opposite direction and outputs the image. Thus, the user can record or view the image in which blurring due to hand vibration is reduced.

In contrast, if, at step S839, the camera-shake blur determination unit 2313 determines that no hand vibration occurs, the process proceeds to step S841, where the output image generation unit 2314 directly outputs the input image. The output image is recorded on a recording medium 2315 and is displayed on the display unit 2316.

Thus, the camera-shake blur is detected and corrected. The use of the motion vector accuracy allows the background motion to be precisely detected, thereby providing an image with little blurring to the user.

Figure 72:
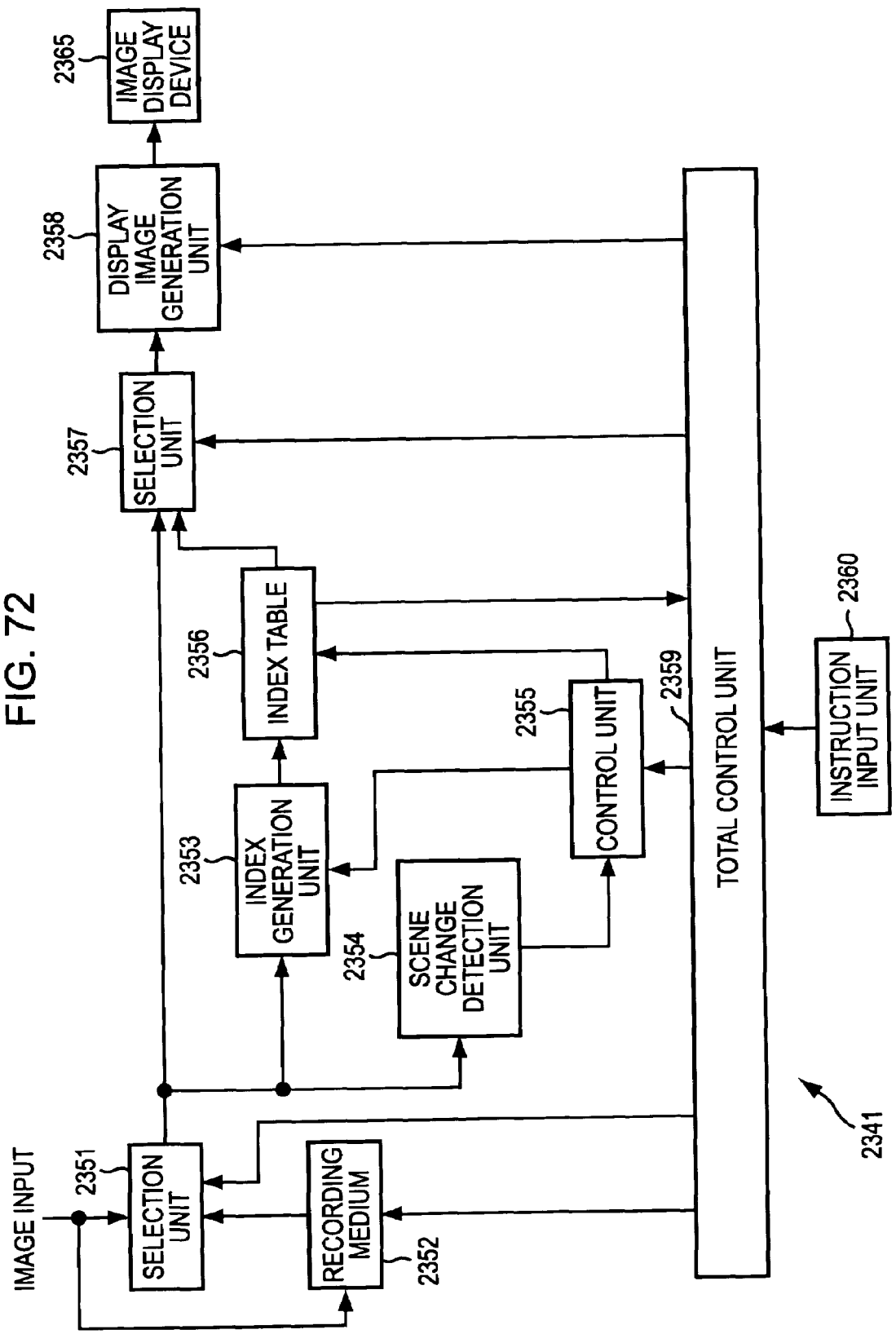
FIG. 72 is a block diagram of an exemplary configuration of an accumulating apparatus.

FIG. 72 illustrates an exemplary accumulating apparatus 2341 according to the present invention. The accumulating apparatus 2341 serving as a hard disk drive (HDD) recorder includes a selection unit 2351, a recording medium (HDD) 2352, an index generation unit 2353, a scene change detection unit 2354, a control unit 2355, an index table 2356, a selection unit 2357, a display image generation unit 2358, a total control unit 2359, and an instruction input unit 2360.

The selection unit 2351 selects one of an image recorded on the recording medium 2352 and an input image under the control of the total control unit 2359 and delivers the selected image to the index generation unit 2353, the scene change detection unit 2354, and the selection unit 2357. An image is recorded on the recording medium 2352 composed of an HDD under the control of the total control unit 2359.

The scene change detection unit 2354 detects a scene change from the delivered image and delivers the detection result to the control unit 2355. The control unit 2355 controls the index generation unit 2353 and the index table 2356 on the basis of the delivered detection result.

The index generation unit 2353 extracts an index image recorded on the recording medium 2352 and additional information (time code, address, etc.) for identifying the position of the index image on the recording medium 2352 and delivers them to the index table 2356 under the control of the control unit 2355. The index image is a reduced image of the start image of each scene when it is determined that a scene change occurs.

The index table 2356 stores the delivered index image and the corresponding additional information. The index table 2356 delivers the additional information corresponding to the stored index image to the total control unit 2359 under the control of the control unit 2355.

The selection unit 2357 selects one of the image delivered from the selection unit 2351 and the index image input from the index table 2356 and outputs the selected image to the display image generation unit 2358 under the control of the total control unit 2359. The display image generation unit 2358 generates an image in a format that an image display device 2365 can display from the delivered image and output the image to be displayed under the control of the total control unit 2359.

Under the control of a scene change flag output from the scene change detection unit 2354 and under the control of the total control unit 2359, the control unit 2355 controls the index generation unit 2353 and the index table 2356.

The total control unit 2359 includes, for example, a microcomputer and controls each component. The instruction input unit 2360 includes a variety of buttons and switches, and a remote controller. The instruction input unit 2360 outputs a signal corresponding to the user instruction to the total control unit 2359.

Figure 73:
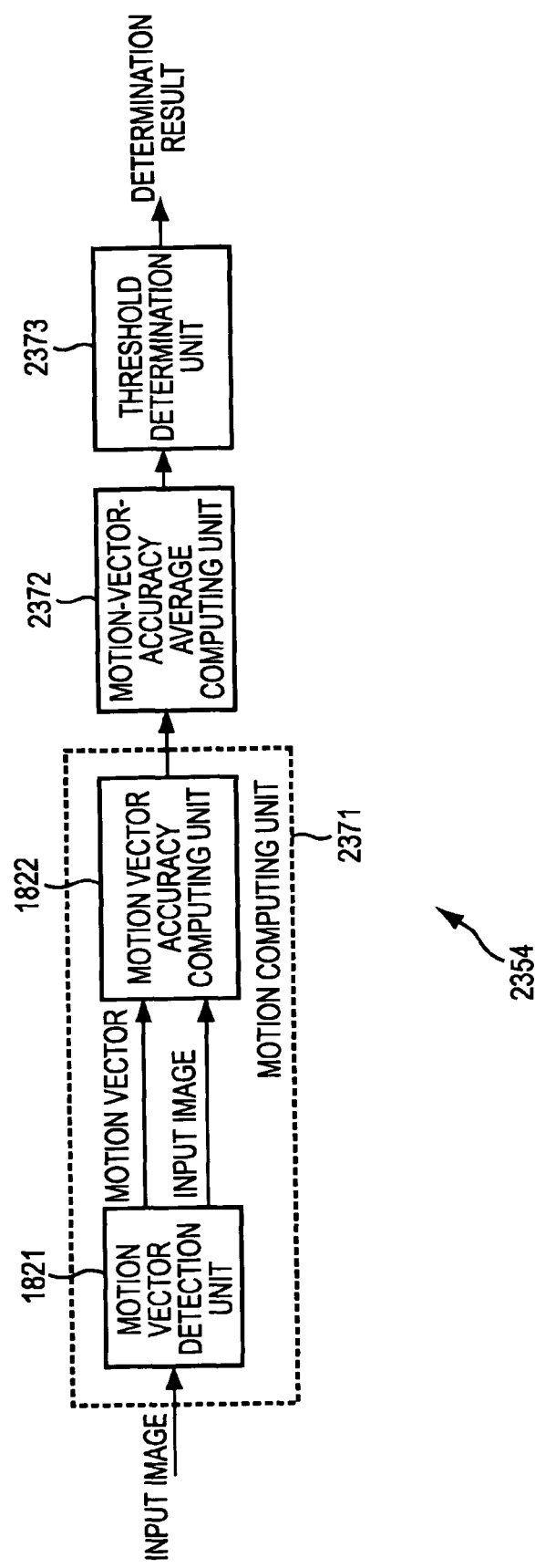
FIG. 73 is a block diagram of an exemplary configuration of a scene change detection unit.

FIG. 73 illustrates an exemplary configuration of the scene change detection unit 2354 shown in FIG. 72 in detail. In this example, the scene change detection unit 2354 includes a motion computing unit 2371, a motion-vector-accuracy average computing unit 2372, and a threshold determination unit 2373. The motion computing unit 2371 has virtually the same configuration as that of the above-described image processing apparatus 1801 shown in FIG. 64.

The motion vector detection unit 1821 detects a motion vector from an input image and delivers the detected motion vector and the input image to the motion vector accuracy computing unit 1822. On the basis of the input motion vector and image, the motion vector accuracy computing unit computes the accuracy of the corresponding motion vector (motion vector accuracy) and outputs the obtained motion vector accuracy to the motion-vector-accuracy average computing unit 2372.

The motion-vector-accuracy average computing unit 2372 computes the average of the motion vector accuracy VC delivered from the motion computing unit 2371 for the full screen and outputs the average to the threshold determination unit 2373. The threshold determination unit 2373 compares the average delivered from the motion-vector-accuracy average computing unit 2372 with a predetermined threshold value. The threshold determination unit 2373 then determines whether a scene change occurs on the basis of the comparison result and outputs the determination result to the control unit 2355.

Figure 74:
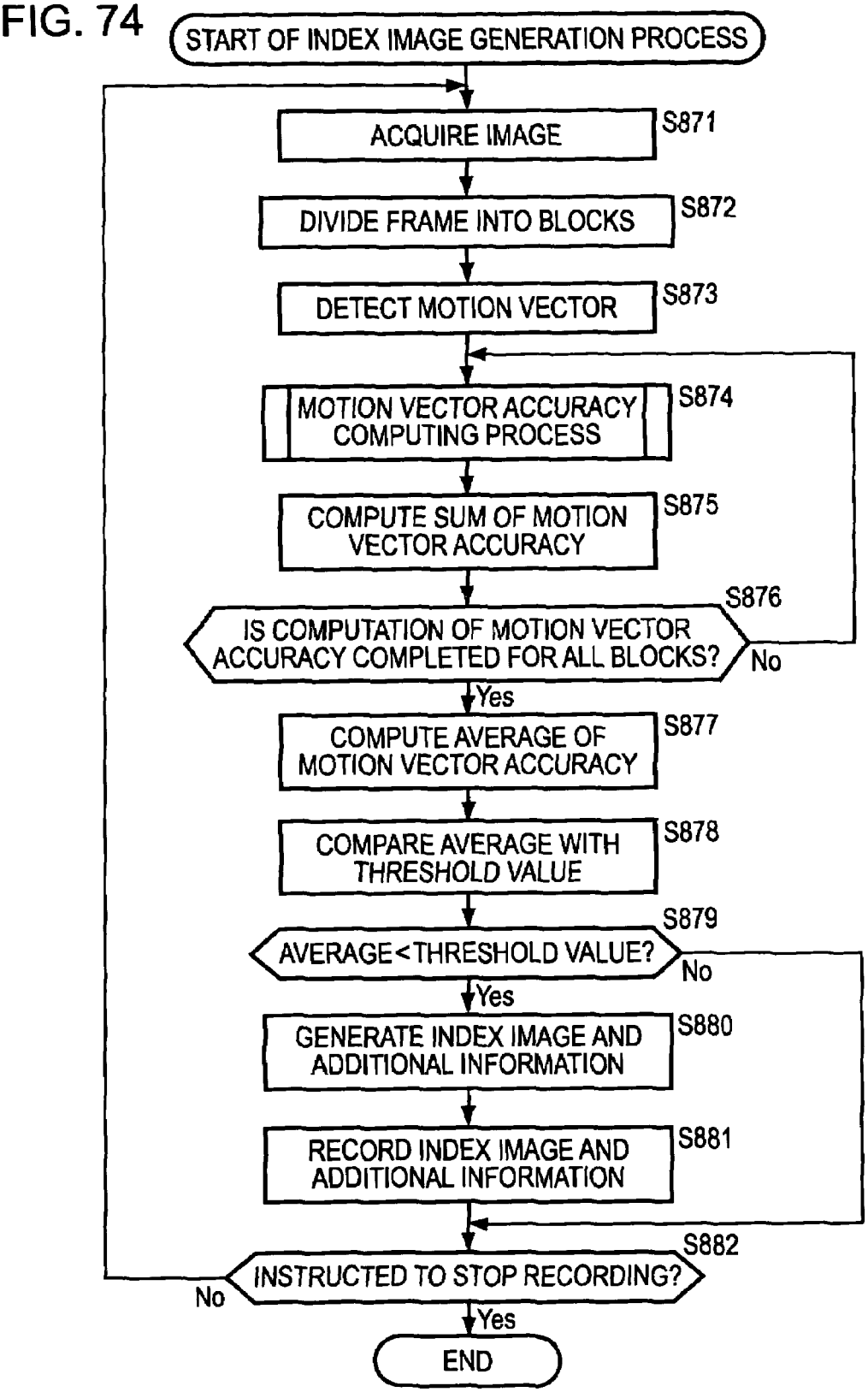
FIG. 74 is a flow chart illustrating the index image generation process of the accumulating apparatus.

The index image generation process executed when the accumulating apparatus 2341 records an image on the recording medium 2352 is described in detail next with reference to a flow chart shown in FIG. 74. This process is executed while the input is being recorded on the recording medium 2352.

The processes at steps S871 to S874 are the same as the processes at steps S501 to S504 described in relation to FIG. 44, respectively. That is, in these processes, an image is input and the frame of the image is divided into predetermined blocks. A motion vector is detected on the basis of the divided blocks using, for example, the block matching method. The accuracy of each motion vector (the motion vector accuracy) is then computed.

At step S875, the motion-vector-accuracy average computing unit 2372 computes the sum of the motion vector accuracy of the image input from the selection unit 2351 (the image being recorded on the recording medium 2352). More specifically, the motion-vector-accuracy average computing unit 2372 summarizes the values of the motion vector accuracy VC computed for each block output from the integration processing unit 1853 of the motion vector accuracy computing unit 1822 of the motion computing unit 2371. At step S876, the motion vector accuracy computing unit 1822 determines whether the process to compute the sum of the motion vector accuracy VC has been completed for all the blocks. If the process has not been completed for all the blocks, the motion vector accuracy computing unit 1822 repeats the processes at steps S874 and S875. By repeating these processes, the sum of the motion vector accuracy VC for all the blocks in one screen is computed. If, at step S876, it is determined that the process to compute the sum of the motion vector accuracy VC for all the blocks in one screen is completed, the process proceeds to step S877. At step S877, the motion-vector-accuracy average computing unit 2372 executes the process to compute the average of the motion vector accuracy VC. More specifically, the sum of the vector accuracy VC for one screen computed at step S875 is divided by the number of blocks of the addition. The resultant value is defined as the average. Accordingly, one average is obtained for one screen (one frame).

At step S878, the threshold determination unit 2373 compares the average of the motion vector accuracy VC computed by the threshold determination unit 2373 at step S877 with a predetermined threshold value and outputs the comparison result to the control unit 2355. At step S879, the control unit 2355 determines whether the average is less than the threshold value. In general, if a scene change occurs between two consecutive frames of a moving picture, the corresponding image disappears. Therefore, even though the motion vector is computed, the accuracy of that motion vector is low. Thus, if the average of the motion vector accuracy VC is less than the threshold value, the control unit 2355, at step S880, controls the index generation unit 2353 to generate an index image.

That is, at step S881, under the control of the control unit 2355, the index generation unit 2353 reduces the size of the image in the start frame of the new scene to generate an index image. When, for example, 3×3 index images are displayed in a screen, the index image is generated by reducing the sizes of the original image into ⅓ in the vertical and horizontal directions. Additionally, at that time, the index generation unit 2353 extracts the additional information (time code, address, etc.) for identifying the recording position of the image of the frame on the recording medium 2352.

At step S881, the index generation unit 2353 stores the index image generated at step S880 and the corresponding additional information in the index table 2356.

If, at step S879, it is determined the average of the motion vector accuracy VC is greater than or equal to the threshold value, a scene change is likely not to occur. Therefore, the processes at steps S880 and S881 are skipped and the index image is not generated.

Subsequently, at step S882, the control unit 2355 determines whether the user instructs to stop recording. If the user has not instructed to stop recording, the process returns to step S871 and the processes subsequent to S871 are repeated. If the user has instructed to stop recording, the process is completed.

Thus, a scene change is automatically detected during a recording operation and the index image is automatically generated.

Figure 75:
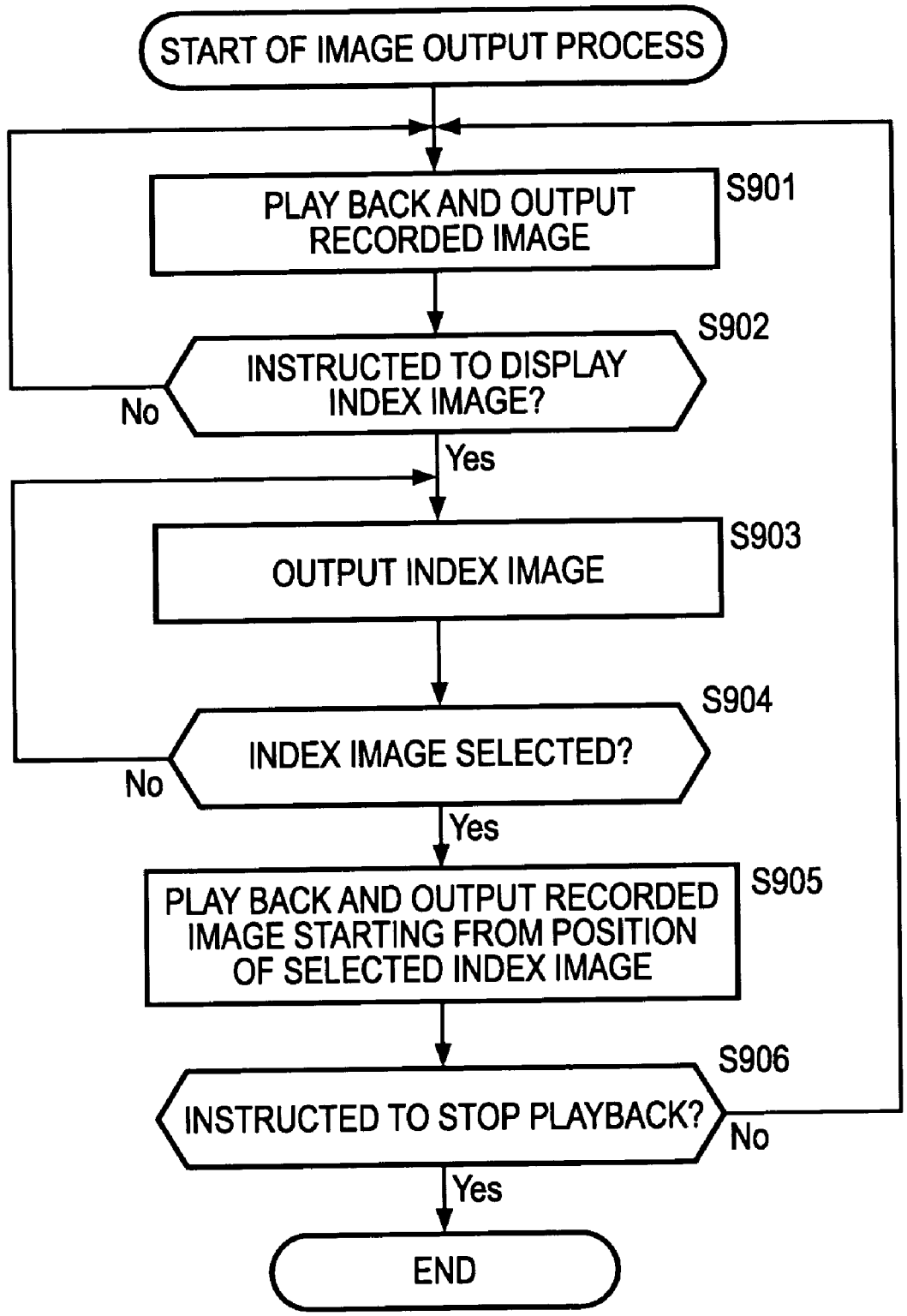
FIG. 75 is a flow chart illustrating the image output process of the accumulating apparatus.

The image output process to output an image to the image display device 2365 of the accumulating apparatus 2341 is described next with reference to a flow chart shown in FIG. 75. This process is executed when a user instructs to play back the recording image and output it.

At step S901, in response to the operation of the instruction input unit 2360 by the user, the total control unit 2359 causes an image recorded on the recording medium 2352 to be played back and to be output. The selection unit 2351 delivers an image played back from the recording medium 2352 to the display image generation unit 2358 via the selection unit 2357. The display image generation unit 2358 converts the received image into a format that the image display device 2365 can display and outputs the converted image to the image display device 2365, which displays the image.

At step S902, in response to the operation of the instruction input unit 2360 by the user, the total control unit 2359 determines whether the user has instructed to display the index image. If the user has not instructed to display the index image, the process returns to step S901 and the processes subsequent to step S901 are repeatedly executed. That is, the process to play back and output (display) the image recorded on the recording medium 2352 on the image display device 2365 continues.

In contrast, if the user has instructed to display the index image, the total control unit 2359, at step S903, controls the index table 2356 to output the index image recorded in the index table 2356. That is, the index table 2356 reads out a list of the index images and outputs the list to the display image generation unit 2358 via the selection unit 2357. The display image generation unit 2358 outputs the list of the index images to the image display device 2365, which displays the list. Thus, the list in which 3×3 index images are arranged is displayed on a screen.

By operating the instruction input unit 2360, the user can select one of the plurality of displayed index images (the list of the index images). Thereafter, at step S906, the total control unit 2359 determines whether one of the index images displayed on the image display device 2365 is selected. If it is determined that no index image is selected, the process returns to step S903 and the processes subsequent to step S903 are repeatedly executed. That is, the list of the index images is continuously displayed by the image display device 2365.

In contrast, if it is determined that one of the index image is selected (the user selects the desired index image from among the index images in the list), the total control unit 2359, at step S905, plays back the recorded image starting from an image corresponding to the selected index image from the recording medium 2352. The recorded image is output to the image display device 2365 via the selection unit 2351, the selection unit 2357, and the display image generation unit 2358. The image display device 2365 displays the image. That is, if it is determined that one of the index image is selected, the total control unit 2359 reads out the additional information (time code, address, etc.) corresponding to the index image selected at step S904 from the index table 2356. The total control unit 2359 then controls the recording medium 2352 to play back the images starting from the image corresponding to the index image and output the images to the image display device 2365, which displays the images.

At step S906, the total control unit 2359 determines whether the user has instructed to stop outputting the images. It is determined whether the user has instructed to stop outputting (displaying) the images by checking the operation of the instruction input unit 2360 by the user. If it is determined that the user has not input the stop instruction, the process returns to step S901 and the processes subsequent to step S901 are repeatedly executed. However, if it is determined that the user has input the stop instruction, the process is completed.

In addition, the accumulating apparatus 2341 can be applied even when the recording medium is, for example, a DVD or a video tape.

The above-described series of processes can be executed not only by hardware but also by software. When the above-described series of processes are executed by software, the programs of the software are downloaded from a network or a recording medium into a computer incorporated in dedicated hardware or a computer that can execute a variety of function by installing a variety of programs therein (e.g., a general-purpose personal computer).

In the present specification, the steps that describe the above-described series of processes include not only processes executed in the above-described sequence, but also processes that may be executed in parallel or independently.

Figure 76:
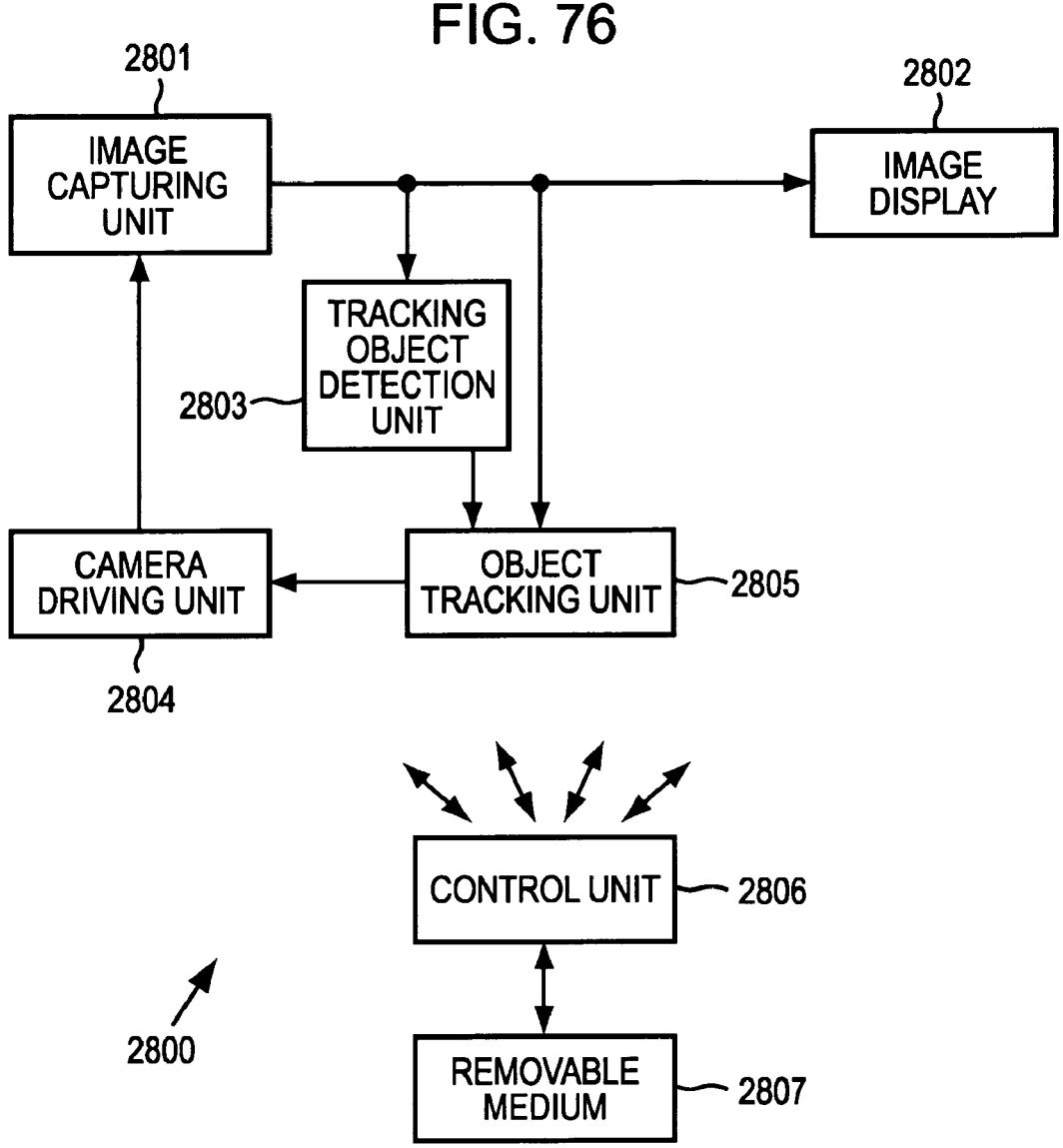
FIG. 76 is a block diagram of an exemplary configuration of a security camera system.

FIG. 76 illustrates an example in which the present invention is applied to a security camera system. In a security camera system 2800, an image captured by an image capturing unit 2801 including a CCD video camera is displayed on an image display 2802. A tracking object detection unit 2803 detects an object to be tracked from an image input from the image capturing unit 2801 and outputs the detection result to an object tracking unit 2805. The object tracking unit 2805 operates so as to track the object to be tracked specified by the tracking object detection unit 2803 in the image delivered from the image capturing unit 2801. The object tracking unit 2805 basically has a configuration that is the same as that of the above-described object tracking apparatus 1 shown in FIG. 1. A camera driving unit 2804 drives the image capturing unit 2801 to capture an image at the center of which is a tracking point of the object to be tracked under the control of the object tracking unit 2805.

A control unit 2806 includes, for example, a microcomputer and controls each component. A removable medium 2807 including a semiconductor memory, a magnetic disk, an optical disk, or a magnetooptical disk is connected to the control unit 2806 as needed. The removable medium 1711 provides a program and various types of data to the control unit 2806 as needed.

Figure 77:
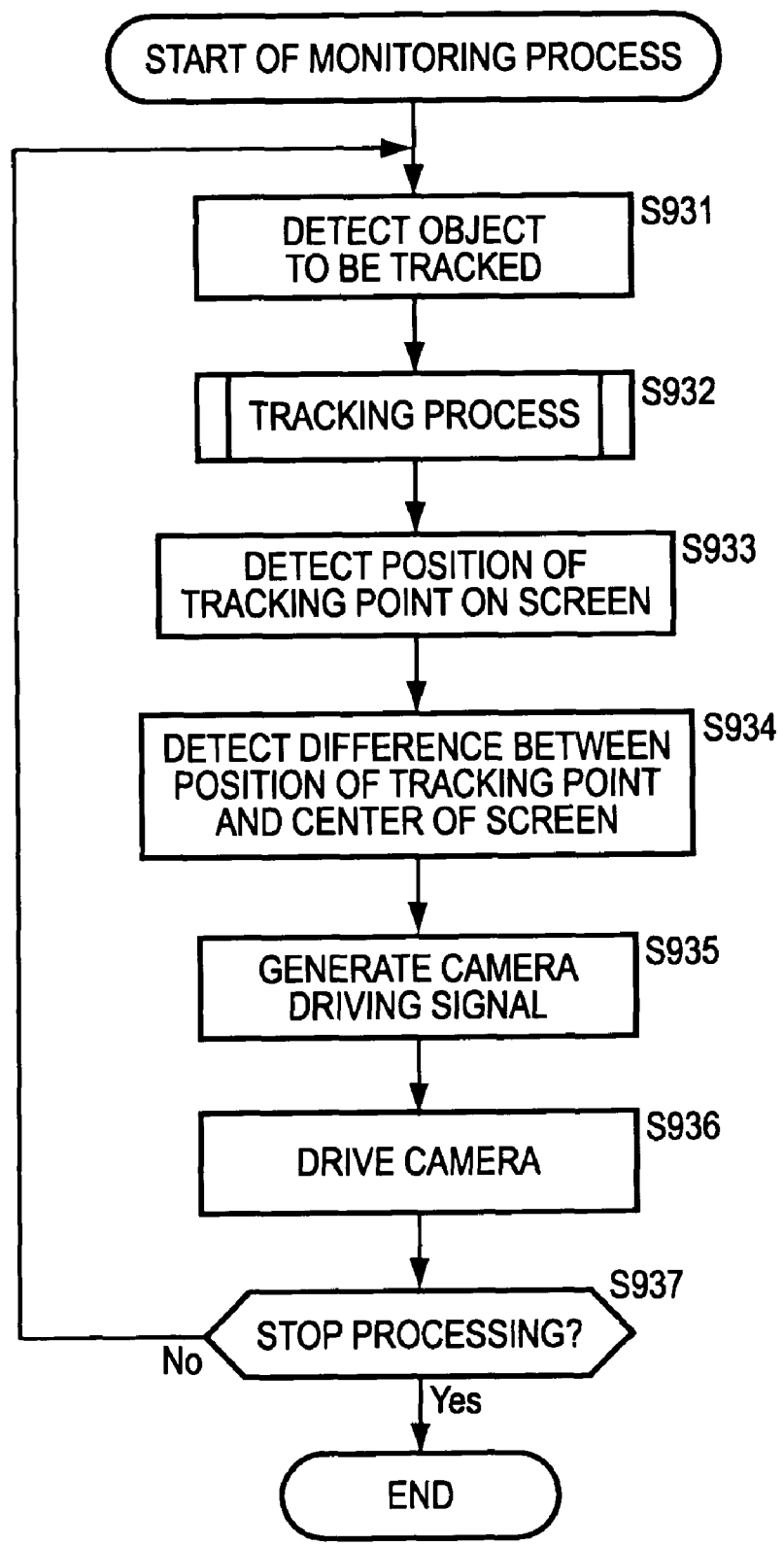
FIG. 77 is a flow chart illustrating the monitoring process of the security camera system.

The operation of the monitoring process is described next with reference to a flow chart shown in FIG. 77. When the security camera system 2800 is powered on, the image capturing unit 2801 captures the image of a security area and outputs the captured image to the tracking object detection unit 2803, the object tracking unit 2805, and the image display 2802. At step S931, the tracking object detection unit 2803 executes a process to detect the object to be tracked from the image input from the image capturing unit 2801. For example, when a moving object is detected, the tracking object detection unit 2803 detects the moving object as the object to be tracked. The tracking object detection unit 2803 detects, for example, a point having the highest brightness or the center point of the object to be tracked as the tracking point and delivers information about the determined tracking point to the object tracking unit 2805.

At step S932, the object tracking unit 2805 executes a tracking process to track the tracking point detected at step S931. This tracking process is the same as that of the above-described object tracking apparatus 1 shown in FIG. 1.

At step S933, the object tracking unit 2805 detects the position of the tracking point on the screen. At step S934, the object tracking unit 2805 detects a difference between the position of the tracking point detected at step S933 and the center of the image. At step S935, the object tracking unit 2805 generates a camera driving signal corresponding to the difference detected at step S934 and outputs the camera driving signal to the camera driving unit 2804. At step S936, the camera driving unit 2804 drives the image capturing unit 2801 on the basis of the camera driving signal. Thus, the image capturing unit 2801 pans or tilts so that the tracking point is located at the center of the image.

At step S937, the control unit 2806 determines whether to terminate the monitoring process on the basis of the user instruction. If the user has not instructed to stop the monitoring process, the process returns to step S931 and the processes subsequent to step S931 are repeatedly executed. If the user has instructed to stop the monitoring process, it is determined at step S937 that the process is completed. Thus, the control unit 2806 terminates the monitoring process.

As noted above, in the security camera system 2800, a moving object is automatically detected as the tracking point and the image at the center of which is the tracking point is displayed on the image display 2802. Thus, the monitoring process can be more simply and more reliably executed.

Figure 78:
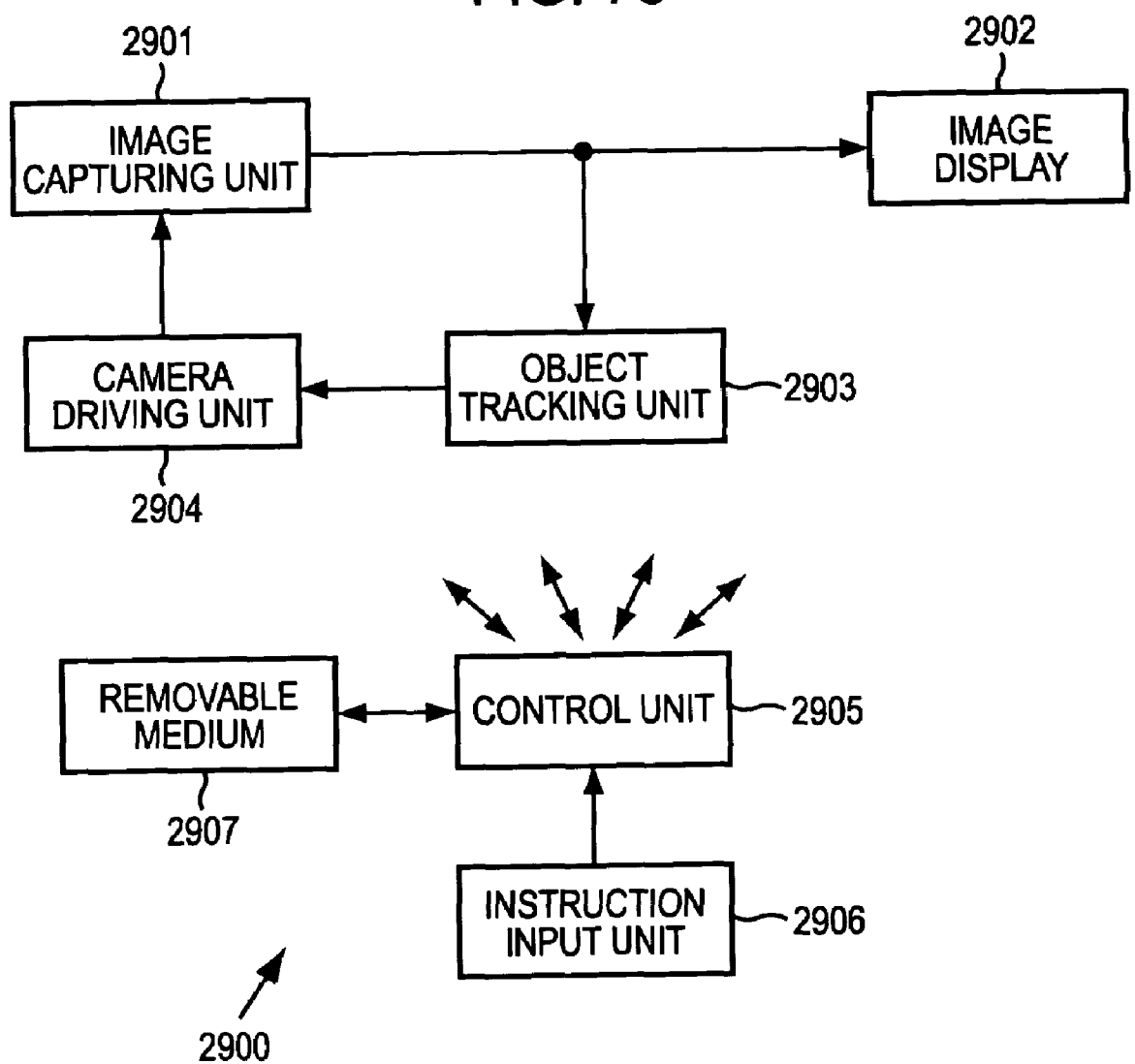
FIG. 78 is a block diagram of another configuration of the security camera system.

FIG. 78 illustrates another example of the configuration of the security camera system according the present invention. A security camera system 2900 includes an image capturing unit 2901, an image display 2902, an object tracking unit 2903, a camera driving unit 2904, a control unit 2905, an instruction input unit 2906, and a removable medium 2907.

Like the image capturing unit 2801, the image capturing unit 2901 includes, for example, a CCD video camera. The image capturing unit 2901 outputs a captured image to the image display 2902 and the object tracking unit 2903. The image display 2902 displays the input image. The object tracking unit 2903 basically has a configuration that is the same as that of the above-described object tracking apparatus 1 shown in FIG. 1. The camera driving unit 2904 drives the image capturing unit 2901 to pan or tilt in a predetermined direction under the control of the object tracking unit 2903.

The control unit 2905 includes, for example, a microcomputer and controls each component. The instruction input unit 2906 includes a variety of buttons and switches, and a remote controller. The instruction input unit 2906 outputs a signal corresponding to the user instruction to the control unit 2905. A removable medium 2907 including a semiconductor memory, a magnetic disk, an optical disk, or a magnetooptical disk is connected to the control unit 2905 as needed. The removable medium 2907 provides a program and various types of data to the control unit 2905 as needed.

Figure 79:
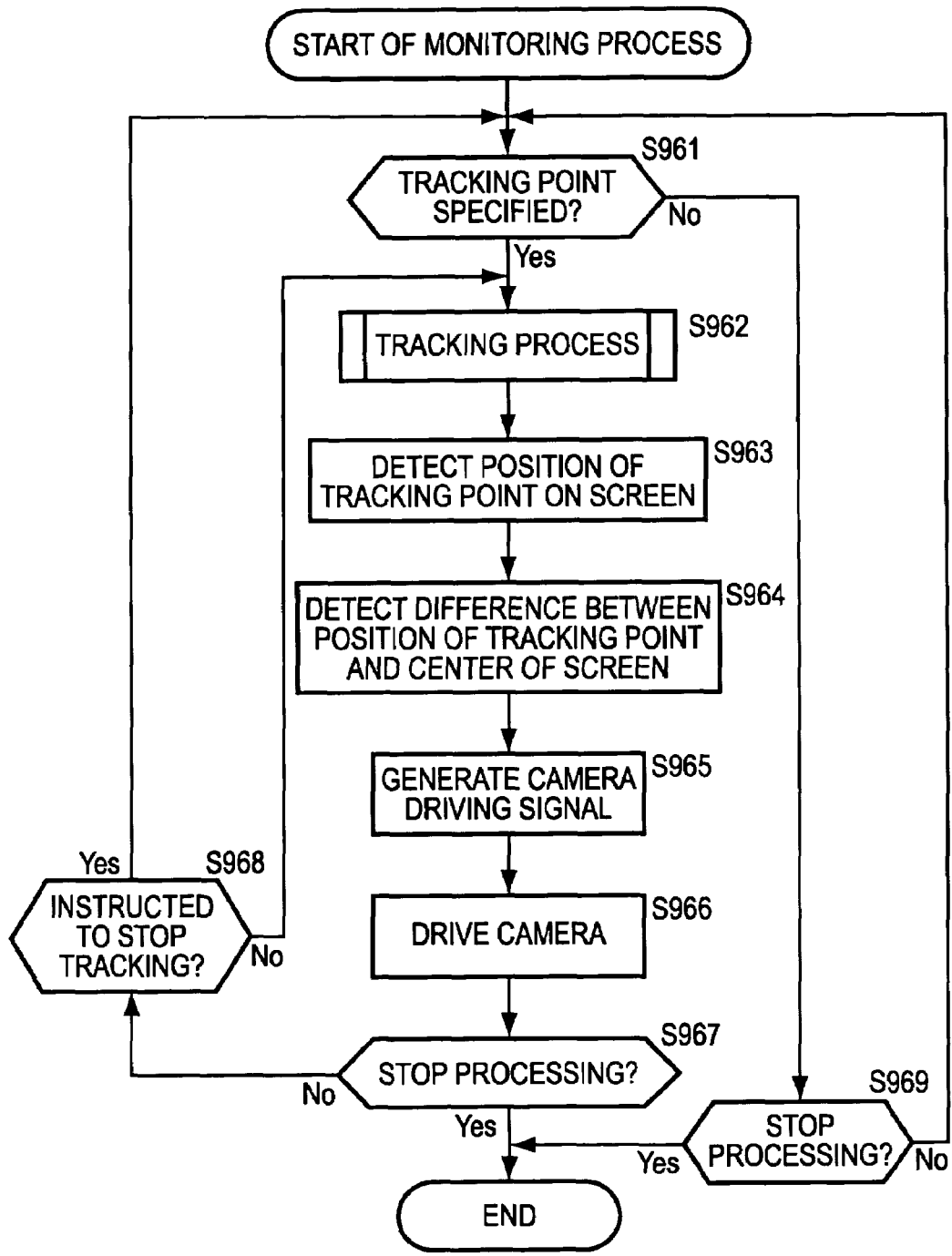
FIG. 79 is a flow chart illustrating the monitoring process of the security camera system.

The operation of the control unit 2905 is described next with reference to a flow chart shown in FIG. 79.

At step S961, the control unit 2905 determines whether a tracking point is specified by a user. If the tracking point is not specified, the process proceeds to step S969, where the control unit 2905 determines whether the user has instructed to stop the processing. If the user has not instructed to stop the processing, the process returns to step S961 and the processes subsequent to step S961 are repeatedly executed.

That is, during this process, an image of the image capturing area captured by the image capturing unit 2901 is output to the image display 2902, which displays the image. If the user (observer) stops the process to monitor the security area, the user operates the instruction input unit 2906 to instruct the control unit 2905 to stop the process. When the control unit 2905 is instructed to stop the process, the control unit 2905 stops the monitoring process.

On the other hand, if the user watches the image displayed on the image display 2902 and finds any potential prowler, the user specifies a point at which that potential prowler is displayed as the tracking point. A user specifies this point by operating the instruction input unit 2906. When user specifies the tracking point, it is determined at step S961 that the tracking point is specified and the process proceeds to step S962, where the tracking process is executed. The processes executed at steps S962 through S967 are the same as the processes executed at steps S932 through S937 shown in FIG. 77. That is, by performing this operation, the image capturing unit 2901 is driven so that the specified tracking point is located at the center of the screen.

At step S967, the control unit 2905 determines whether it is instructed to stop monitoring. If the control unit 2905 is instructed to stop monitoring, the control unit 2905 stops the process. However, if the control unit 2905 is not instructed to stop monitoring, the process proceeds to step S968, where the control unit 2905 determines whether it is instructed to stop tracking. For example, when the user identifies that the potential prowler who is specified as the tracking point is not a prowler, the user can operate the instruction input unit 2906 to instruct the control unit 2905 to stop tracking. If, at step S968, the control unit 2905 determines that it has not instructed to stop the tracking, the process returns to step S962 and the processes subsequent to step S962 are executed. That is, in this case, the operation to track the tracking point continues.

If, at step S968, the control unit 2905 determines that it has been instructed to stop the tracking, the tracking operation is stopped. The process returns to step S961 and the processes subsequent to step S961 are repeatedly executed.

Thus, in the security camera system 2900, the image of the tracking point specified by the user is displayed at the center of the image display 2902. Accordingly, the user can select any desired image and can carefully monitor the image.

The present invention can be applied to not only a television receiver and a security camera system but also a variety types of image processing apparatuses.

While the foregoing description is made with reference to image processing on a frame basis, the present invention is applicable to image processing on a field basis.

The above-described series of processes can be executed not only by hardware but also by software. When the above-described series of processes are executed by software, the programs of the software are downloaded from a network or a recording medium into a computer incorporated in dedicated hardware or a computer that can execute a variety of function by installing a variety of programs therein (e.g., a general-purpose personal computer).

As shown in FIG. 76 or 78, examples of this recording medium include not only the removable medium 2807 or 2907 distributed to users separately from the apparatus in order to provide users with a program, such as a magnetic disk (including a floppy disk), an optical disk (including a compact disk-read only memory (CD-ROM) and a digital versatile disk (DVD)), a magnetooptical disk (including a mini-disc (MD)), and a semiconductor memory, but also a ROM and a hard disk storing the program and incorporated in the apparatus that is provided to the users.

In the present specification, the steps that describe the program stored in the recording media include not only processes executed in the above-described sequence, but also processes that may be executed in parallel or independently.

In addition, as used in the present specification, "system" refers to a logical combination of a plurality of devices; the plurality of devices is not necessarily included in one body.

Figure 80:
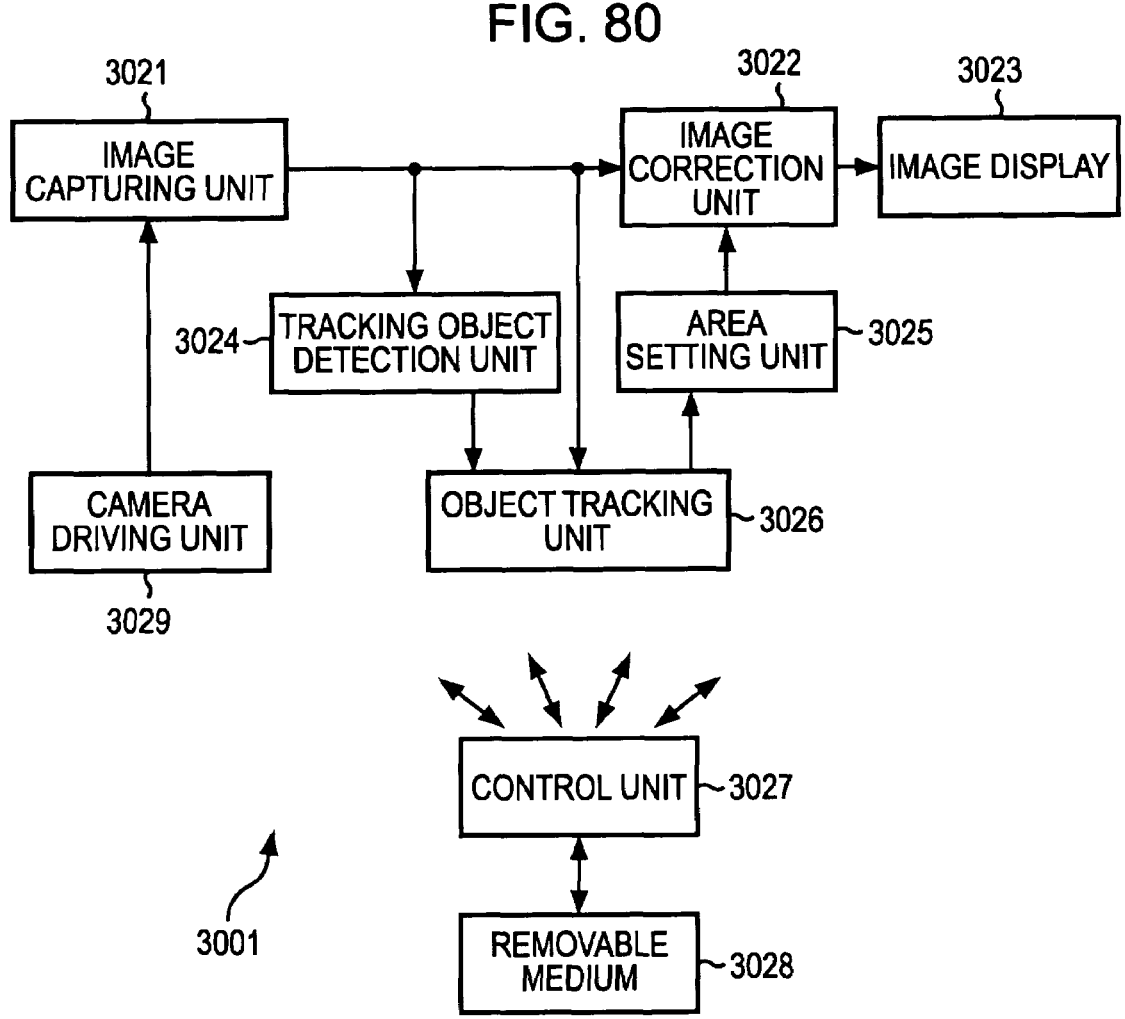
FIG. 80 is a block diagram of an exemplary configuration of a security camera system according to the present invention.

FIG. 80 illustrates an exemplary configuration of a security camera system according to the present invention. In a security camera system 3001, an image captured by an image capturing unit 3021 including, for example, a CCD video camera is displayed on an image display 3023. A tracking object detection unit 3024 detects an object to be tracked from the image input from the image capturing unit and output the detection result to an object tracking unit 3026. The object tracking unit 3026 basically has the same structure as that of the above-described object tracking apparatus 1 shown in FIG. 1.

The object tracking unit 3026 operates so as to track a tracking point specified by the tracking object detection unit 3024 in the image delivered from the image capturing unit 3021. An area setting unit 3025 sets a predetermined area around the object including the tracking point in the image captured by the image capturing unit 3021 and outputs positional information representing the position of the area to the image correction unit 3022. The image correction unit 3022 corrects an image in the area set by the area setting unit 3025 in the image captured by the image capturing unit 3021 so as to remove blurring (blurring out of focus) from the image in the area and outputs that image to the image display 3023. A camera driving unit 3029 drives the image capturing unit 3021 to capture an image at the center of which is the tracking point under the control of the object tracking unit 3026.

A control unit 3027 includes, for example, a microcomputer and controls each component. A removable medium 3028 including a semiconductor memory, a magnetic disk, an optical disk, or a magnetooptical disk is connected to the control unit 3027 as needed. The removable medium 3028 provides a program and various types of data to the control unit 3027 as needed. The control unit 3027 also receives the user instruction (e.g., a command) via an input/output interface (not shown).

A monitoring process is described next with reference to a flow chart shown FIG. 81. When the security camera system 3001 is powered on, the image capturing unit 3021 captures an image of the security area and outputs the captured image to the image display 3023 via the tracking object detection unit 3024, the object tracking unit 3026, and the image correction unit 3022. At step S1001, the tracking object detection unit 3024 executes a process to detect an object to be tracked from the image input from the image capturing unit 3021. For example, when a moving object is detected, the tracking object detection unit 3024 detects, for example, a point having the highest brightness or the center point of the object to be tracked as the tracking point and outputs information about the determined tracking point to the object tracking unit 3026.

At step S1002, the object tracking unit 3026 executes a tracking process to track the tracking point detected at step S1001. Thus, the tracking point (e.g., the eye or a center of a head) of the object (e.g., human being or animal) to be tracked in the image captured by the image capturing unit 3021 is tracked. The positional information indicating the tracking point is output to the area setting unit 3025.

At step S1003, the area setting unit 3025 sets a predetermined area around the object to be tracked (e.g., a rectangle having a predetermined size at the center of which is the tracking point) to a correction area on the basis of the output from the object tracking unit 3026.

At step S1004, the image correction unit 3022 executes an image correction process to correct the image inside the correction area set by the area setting unit 3025 in the image captured by the image capturing unit 3021. The image correction process is described in detail below with reference to FIG. 93. This process results in the creation of a clear image without blurring of the image in the correction area.

At step S1005, the image display 3023 outputs the image corrected at step S1004, namely, the image captured by the image capturing unit 3021 in which only the image in the correction area is particularly clear.

At step S1006, the object tracking unit 3026 detects the movement of the object on the basis of the tracking result from the process at step S1002 and generates a camera driving signal to drive the camera so that the image of the moving object can be captured. The object tracking unit 3026 then output the camera driving signal to the control unit 3029. At step S1007, the camera driving unit 3027 drives the image capturing unit 3021 on the basis of the camera driving signal. Thus, the image capturing unit 3021 pans or tilts so that the tracking point is always located inside the screen.

At step S1008, the control unit 3027 determines whether to terminate the monitoring process on the basis of the user instruction. If the user has not instructed to stop the monitoring process, the process returns to step S1001 and the processes subsequent to step S1001 are repeatedly executed. If the user has instructed to stop the monitoring process, it is determined at step S1008 that the process is completed. Thus, the control unit 3027 terminates the monitoring process.

Additionally, the control signal is output to the camera driving unit 3029 to drive the camera (the image capturing unit 3021) so that the camera tracks the detected object to be tracked on the basis of the information about the tracking point output from the tracking object detection unit 3024 and the tracking point is displayed inside the screen of the image display 3023 (the tracking point does not move outside the screen). Furthermore, the tracking result, such as the positional information about the tracking point on the screen, is output to the area setting unit 3025 and the control unit 3027.

Figure 82A:
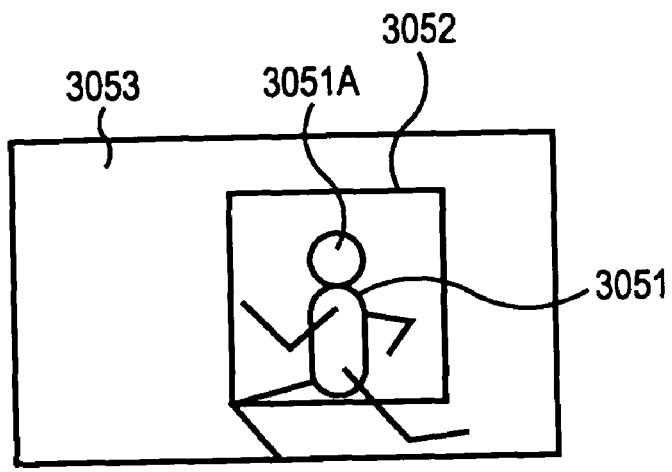
FIG. 82A is a diagram illustrating an example of an image displayed by the security camera system.
Figure 82B:
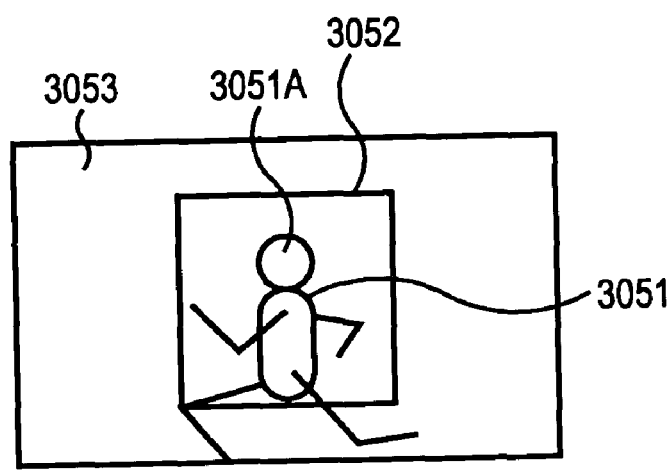
FIG. 82B is a diagram illustrating an example of an image displayed by the security camera system.
Figure 82C:
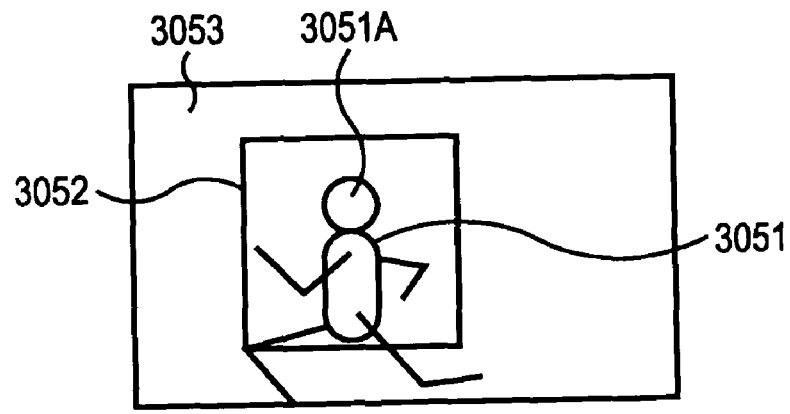
FIG. 82C is a diagram illustrating an example of an image displayed by the security camera system.

FIGS. 82A-C illustrate examples of time-series images displayed on the image display 3023 in such a case. FIG. 82A illustrates an image of an object 3051 to be tracked captured by the image capturing unit 3021. In these examples, the image of a human running to the left is captured as the object 3051. In FIG. 82B, the object 3051 moves from the position shown in FIG. 82A to the left. In FIG. 82C, the object 3051 further moves from the position shown in FIG. 82B to the left.

Figure 81:
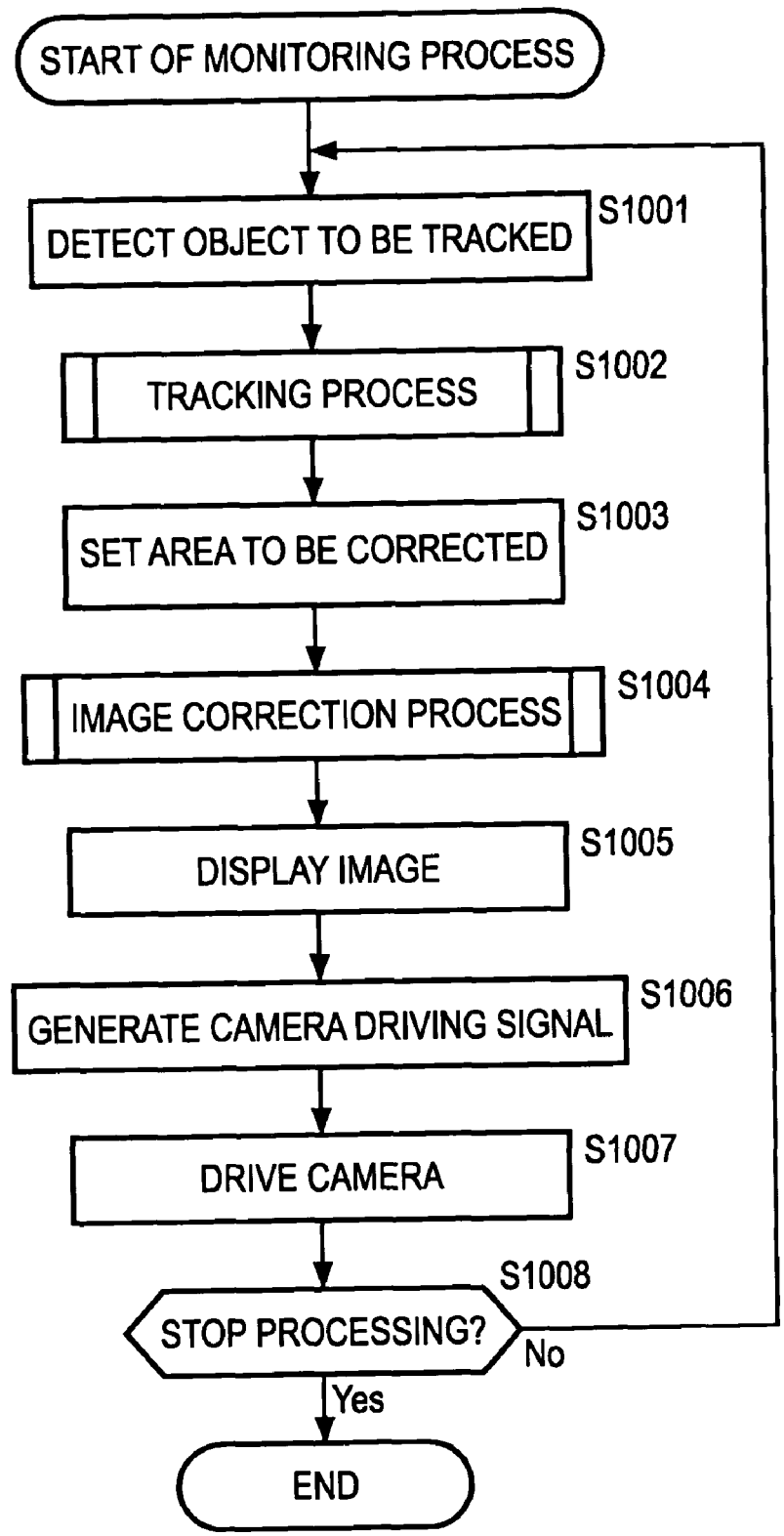
FIG. 81 is a flow chart illustrating a monitoring process.

The tracking object detection unit 3024 detects the object 3051 at step S1001 shown in FIG. 81 and outputs the eye of the object 3051 (human) to the object tracking unit 3026 as a tracking point 3051A. At step S1002, the object tracking unit 3026 executes a tracking process. At step S1003, the area setting unit 3025 sets a predetermined area around the object 3051 to be tracked (the tracking point 3051A) to a correction area 3052.

As noted above, the object tracking unit 3026 tracks the object 3051 on the basis of the tracking point 3051A. Accordingly, when the object 3051 moves, the tracking point 3051A also moves and the tracking result (the position) is output to the area setting unit 3025. Thus, as shown in FIGS. 82A to 82C, as the object 3051 moves to the left, the correction area 3052 also moves to the left.

Figure 83:
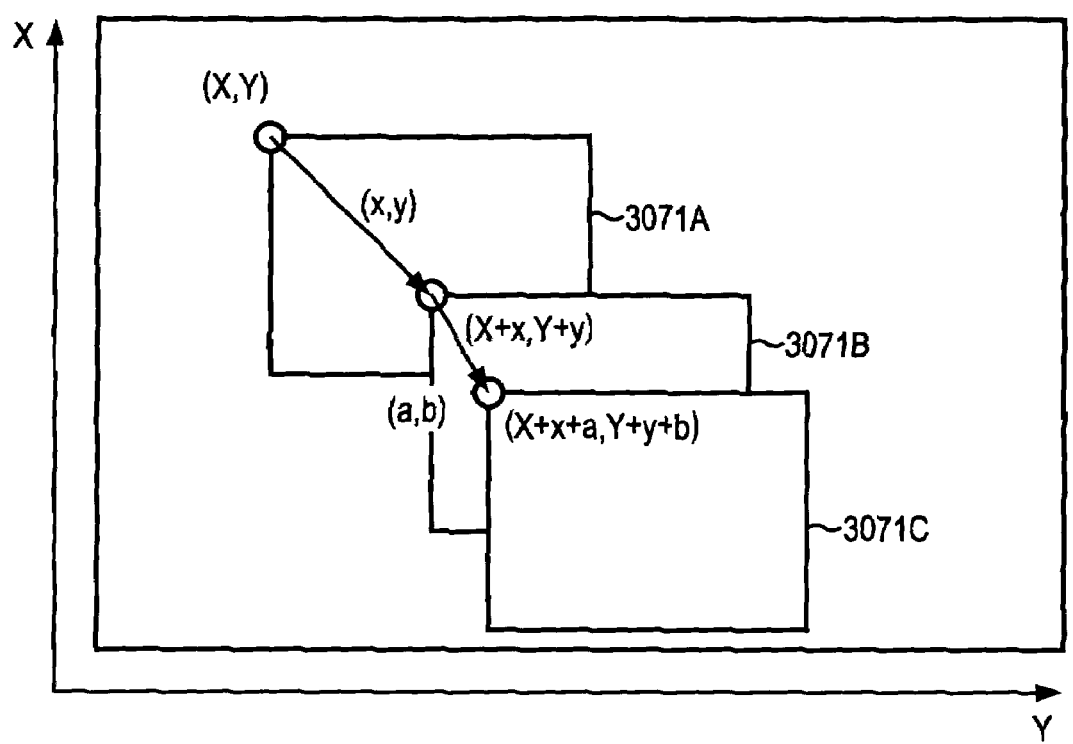
FIG. 83 is a diagram illustrating an example of the movement of a correction area.

The correction area 3052 corresponding to the moving object 3051 (the tracking point 3051A) is set as follows, for example. FIG. 83 illustrates an example in which a rectangular area having a predetermined size is set around the tracking point as a correction area. In FIG. 83, a correction area 3071A is set first. For example, a predetermined area at the center of which is the tracking point 3051A is set as the first correction area 3071A. If a user specifies the correction area, this area is set as the first correction area 3071A. At that time, the area setting unit 3025 stores the coordinates (X,Y) of the upper left corner of the correction area 3071A in the internal memory thereof. If the tracking point 3051A of the object 3051 moves, the object tracking unit 3026 starts tracking so that information about the positions (or the moving distance) of the tracking point 3051A in the X-axis direction (horizontal direction in the drawing) and in the Y-axis direction (vertical direction in the drawing) is delivered to the area setting unit 3025 as the tracking result.

Subsequently, the correction area is set on the basis of the above-described coordinates of the upper left corner. For example, when the tracking point 3051A moves by x in the X-axis direction and by y in the Y-axis direction on the screen, the area setting unit 3025 adds x and y to the coordinates (X, Y) of the upper left corner of the correction area 3071A to compute the coordinates (X+x, Y+y). The area setting unit 3025 stores these coordinates as the coordinates of the upper left corner of a new correction area 3071B and sets the correction area 3071B. If the tracking point 3051A further moves by a in the X-axis direction and by b in the Y-axis direction, the area setting unit 3025 adds a and b to the coordinates (X+x, Y+y) of the upper left corner of the correction area 3071A so as to compute the coordinates (X+x+a, Y+y+b). The area setting unit 3025 stores these coordinates as the coordinates of the upper left corner of a new correction area 3071C and sets the correction area 3071C.

Thus, as the object (the tracking point) moves, the correction area moves.

Additionally, as noted above, an image inside the correction area 3052 is subjected to the image correction process (at step S1004 shown in FIG. 81) performed by the image correction unit 3022 so that blurring of the image is removed. The image is then displayed on the image display 3023. Accordingly, partial images of the images shown in FIGS. 82A-C inside the correction area 3052 are clearly displayed. In contrast, the image of the background 3053 outside the correction area 3052 is not clearly displayed compared with the image inside the area 3052.

Thus, the object 3051 in the correction area 3052 of the image displayed on the image display 3023 is clearly displayed at all times. Therefore, a user watching the image display 3023 automatically views the object 3051. As a result, for example, the user can find a prowler or a moving object more rapidly. In addition, since the object 3051 is clearly displayed, the user can correctly identify what (who) the moving object (e.g., human being) is.

As noted above, since the object tracking unit 3026 basically has the same structure as that of the above-described object tracking apparatus 1 shown in FIG. 1, the description is not repeated.

By configuring the object tracking unit 3026 shown in FIG. 80 in the above-described manner, even when the object 3051 (see FIG. 82) to be tracked rotates or even when the occlusion occurs, or even when the tracking point 3051A of the object 3051 is not temporarily displayed due to a scene change, the object 3051 (the tracking point 3051A) moving in the image can be accurately tracked.

Thus, the positional information about the tracking point 3051A of the object 3051 to be tracked is output the area setting unit 3025 as the tracking result of the object tracking unit 3026 shown in FIG. 80. Accordingly, the area setting unit 3025 can set the above-described correction area 3052. Thereafter, the image correction unit 3022 removes blurring (blurring out of focus) of the image in the area 3052.

Figure 84:
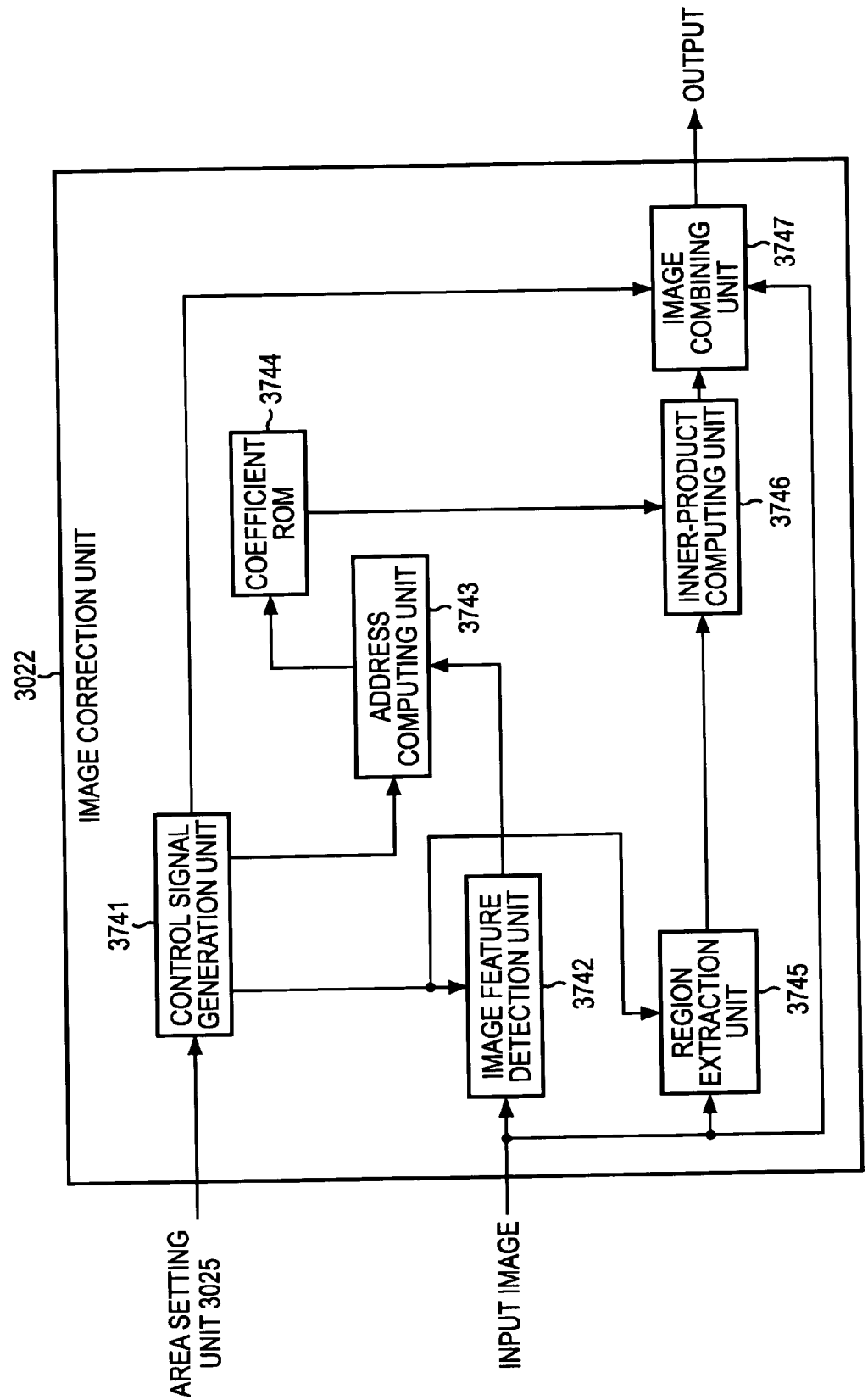
FIG. 84 is a block diagram of an exemplary configuration of an image correction unit.

The configuration and the operation of the image correction unit 3022 shown in FIG. 80 are described in detail next. FIG. 84 is a block diagram of the detailed configuration of the image correction unit 3022. In this example, the image correction unit 3022 includes a control signal generation unit 3741 for generating a control signal on the basis of the output signal of the area setting unit 3025 and delivering this control signal to each component, an image feature detection unit 3742 for detecting the feature of an input image, an address computing unit 3743 for computing an address on the basis of the control signal, a coefficient ROM 3744 for outputting a prestored predetermined coefficient on the basis of the address computed by the address computing unit 3743, and a region extraction unit 3745 for extracting a plurality of pixels corresponding to a predetermined region in the input image.

The image correction unit 3022 further includes an inner-product computing unit 3746 and an image combining unit 3747. The inner-product computing unit 3746 computes the inner product of the level of a pixel output from the region extraction unit 3745 and a coefficient output from the coefficient ROM 3744 and outputting the modified pixel level. The image combining unit 3747 combines the image in the correction area 3052 with the background 3053 and outputs the combined image.

FIG. 85 is a diagram illustrating control signals generated by the control signal generation unit 3741. A control signal A is a signal used for identifying an area (the correction area 3052) to be modified in the input image. The control signal A is generated on the basis of the output from the area setting unit 3025 and is delivered to the region extraction unit 3745 and the image combining unit 3747. A control signal B is a signal used for identifying a parameter a representing the level of blurring, which is described below. The control signal B is delivered to the address computing unit 3743. The value of the parameter a may be determined by, for example, the user instruction via the control unit 3027 or may be determined in advance.

A control signal C is a signal used for instructing to switch a weight Wa of a relational expression used for solving a model expression of blurring, which is described below. The control signal C is delivered to the address computing unit 3743. A control signal D is a signal used for instructing to switch a threshold value used for detecting the feature of an image. The control signal D is delivered to the image feature detection unit 3742. The control signals C and D may be predetermined in consideration of the characteristic of the security camera system 3001. Alternatively, the control signals C and D may be generated on the basis of the user instruction via the control unit 3027.

The principal of blurring of an image is described next. Suppose that the focus of a camera is properly set and let a level X of a pixel of an image without blurring be a real value. Let a level Y of a pixel of an image with blurring out of focus be an observed value. When the coordinate of the image in the horizontal direction is represented by x and the coordinate of the image in the vertical direction is represented by y to identify a plurality of pixels of the image, the real value can is expressed as X(x, y) and the observed value can be expressed as Y(x, y).

According to the present invention, the following equation (6) is used as the model expression of blurring. In equation (6), the Gaussian function expressed by the following equation (7) is used. By convoluting the real value X(x, y) with the Gaussian function, the observed value Y(x, y) can be obtained.

$$Y(x, y) = \sum_{-r<j<r}^{-r<i<r} [W(i, j) \times X(x+i, y+j)] \quad (6)$$

$$W(j, i) = \frac{1}{2\pi\sigma^2} e^{-\frac{j^2+i^2}{2\sigma^2}} \quad (7)$$

In equation (6), the parameter σ denotes the level of blurring.

According to equation (6), one observed value Y(x, y) can be obtained by weighting a plurality of real values X(x+i, y+j) that varies in accordance with variables i and j (−r<i<r, and −r<j<r) with a coefficient W. Accordingly, the level of one pixel of an image without blurring can be obtained on the basis of the levels of a plurality of pixels of an image with blurring.

In addition, the level of blurring varies depending on the above-described parameter σ. When the value of the parameter σ is relatively small, information about the real value does not widely spread with respect to the observed value. Thus, an image with less blurring is obtained. In contrast, when the value of the parameter σ is relatively large, information about the real value widely spreads with respect to the observed value. Thus, an image with relatively strong blurring is obtained.

As noted above, the level of blurring varies depending on the above-described parameter σ. Therefore, to accurately correct the blurring of an image, the value of the parameter σ needs to be appropriately determined. According to the present invention, the user specifies the value of the parameter σ. Alternatively, an optimum value may be preset in consideration of the characteristic of the security camera system 3001.

Figure 86A:
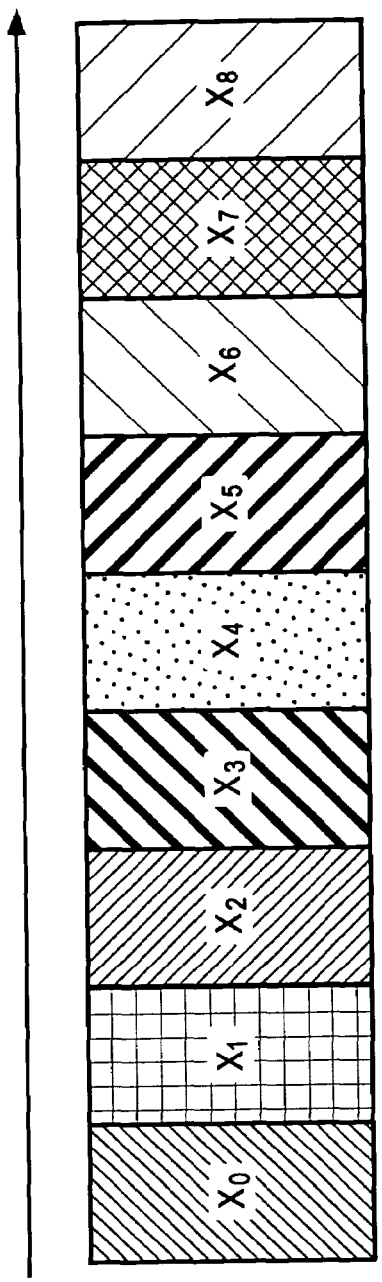
FIG. 86A is a diagram illustrating the principle of image blurring.
Figure 86B:
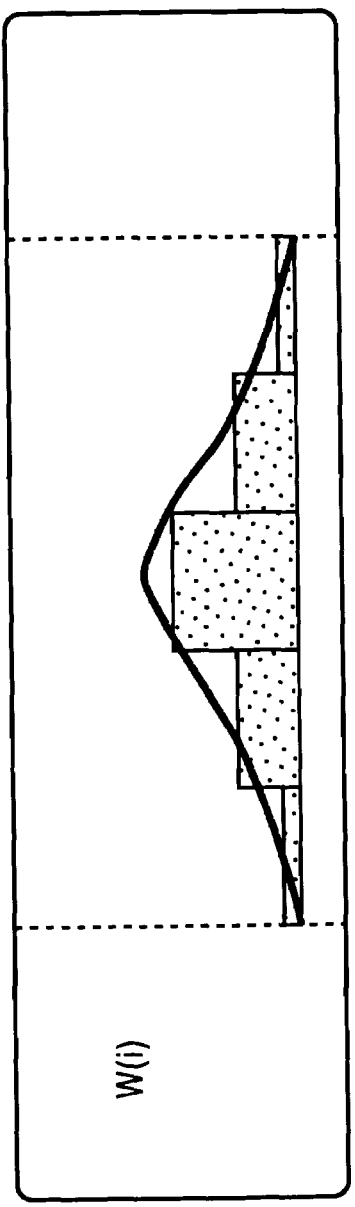
FIG. 86B is a diagram illustrating the principle of image blurring.
Figure 86C:
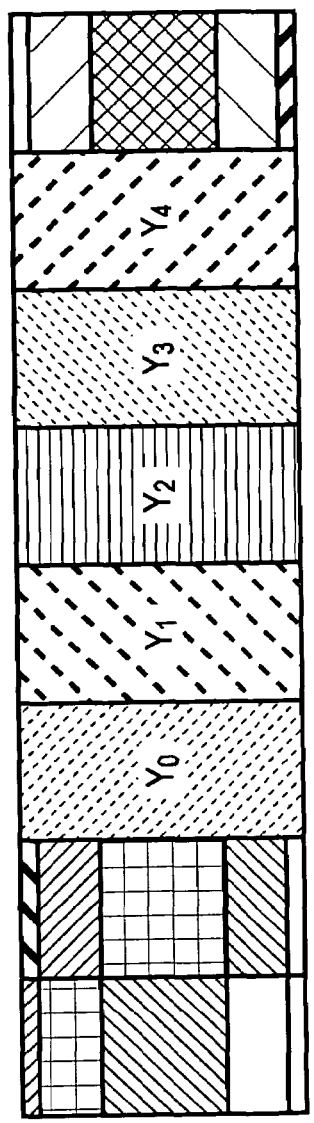
FIG. 86C is a diagram illustrating the principle of image blurring.

The principal of blurring of an image is described in more detail next with reference to FIGS. 86 to 89. FIG. 86A is a diagram illustrating real values X0 to X8 of a given image when, for simplicity, pixels are horizontally arranged in one dimension. FIG. 86C is a diagram illustrating the observed values corresponding to FIG. 86A. FIG. 86B is a diagram illustrating the magnitude of a coefficient W(i) in the form of a bar graph. In this example, the range of the variable i is −2<i<2. The middle bar represents a coefficient W(0). The bars represent W(−2), W(−1), W(0), W(1), and W(2) from the leftmost to the rightmost.

Here, the observed value Y2 in FIG. 86C can be obtained according to equation (6) as follows:

$$Y2 = W(-2)X2 + W(-1)X3 + W(0)X4 + W(1)X5 + W(2)X6$$

Figure 87:
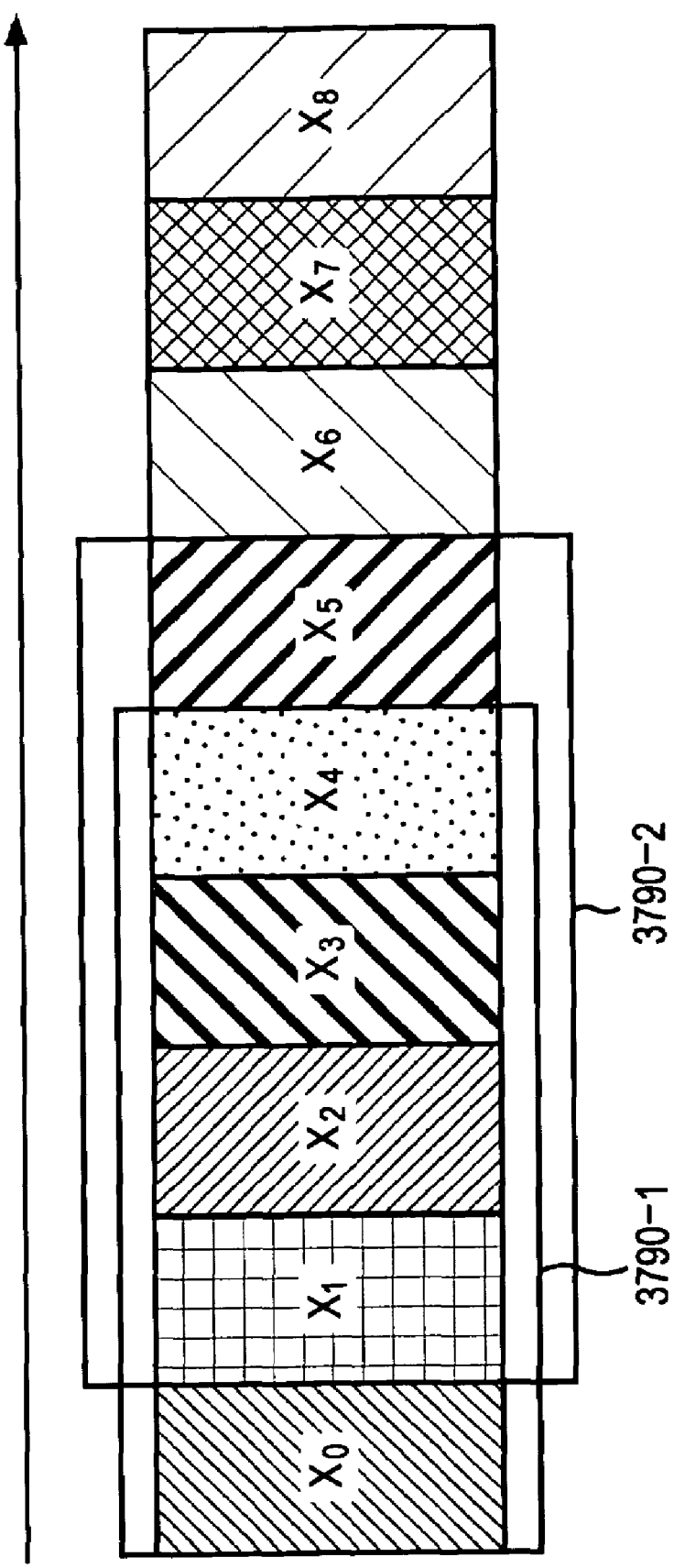
FIG. 87 is a diagram illustrating the principle of image blurring.

Similarly, to obtain the observed value Y0 in FIG. 86C, by performing the computation about the real values in a frame 3790-1 shown in FIG. 87, the observed value Y0 can be obtained as follows:

$$Y0 = W(-2)X0 + W(-1)X1 + W(0)X2 + W(1)X3 + W(2)X4$$

Furthermore, to obtain the observed value Y1, by performing the computation about the real values in a frame 3790-2 shown in FIG. 87, the observed value Y1 can be obtained as follows:

$$Y1 = W(-2)X1 + W(-1)X2 + W(0)X3 + W(1)X4 + W(2)X5$$

Still furthermore, the observed values Y3 and Y4 can be obtained in the same manner.

Figure 88:
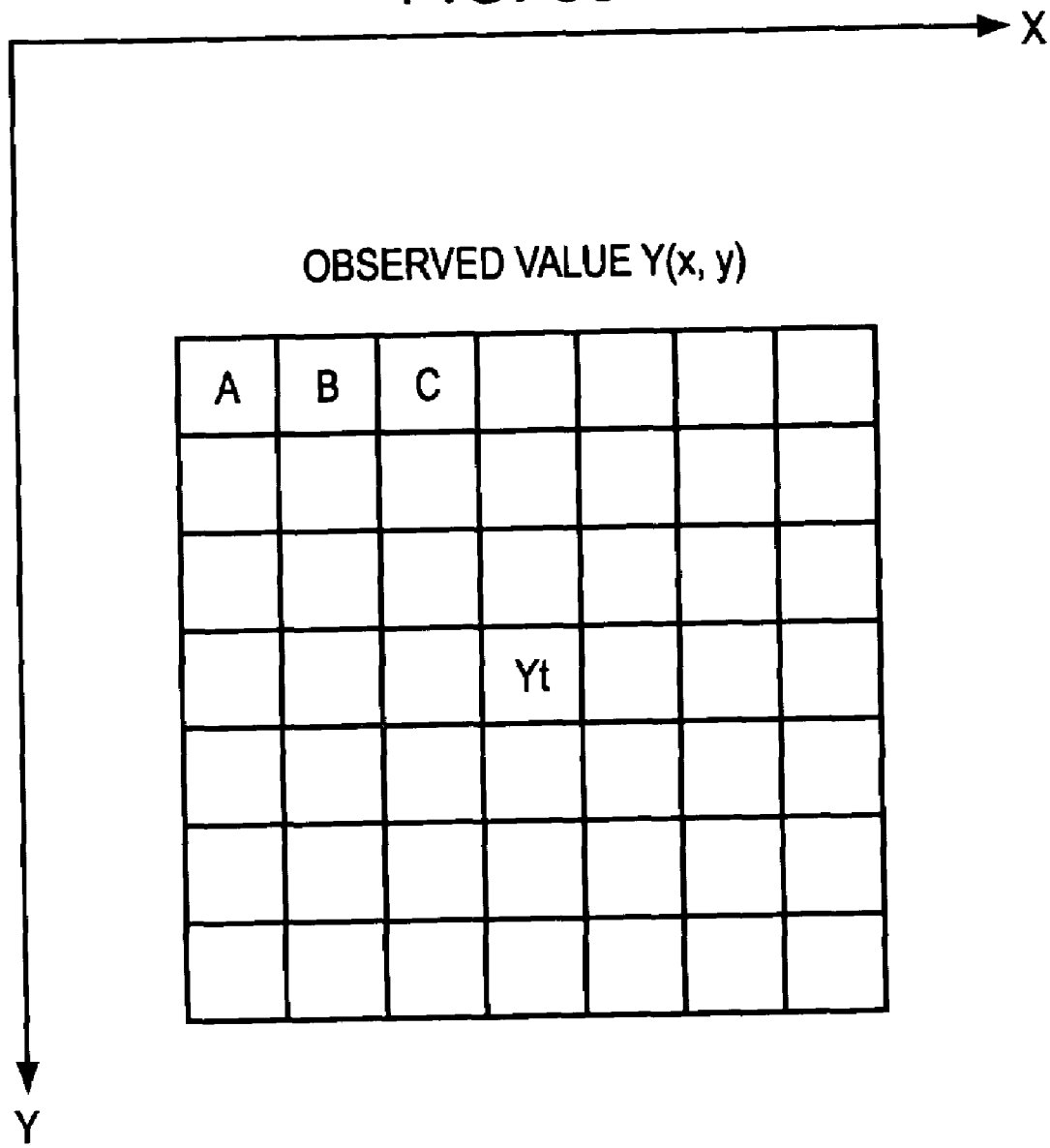
FIG. 88 is a diagram illustrating the principle of image blurring.
Figure 89:
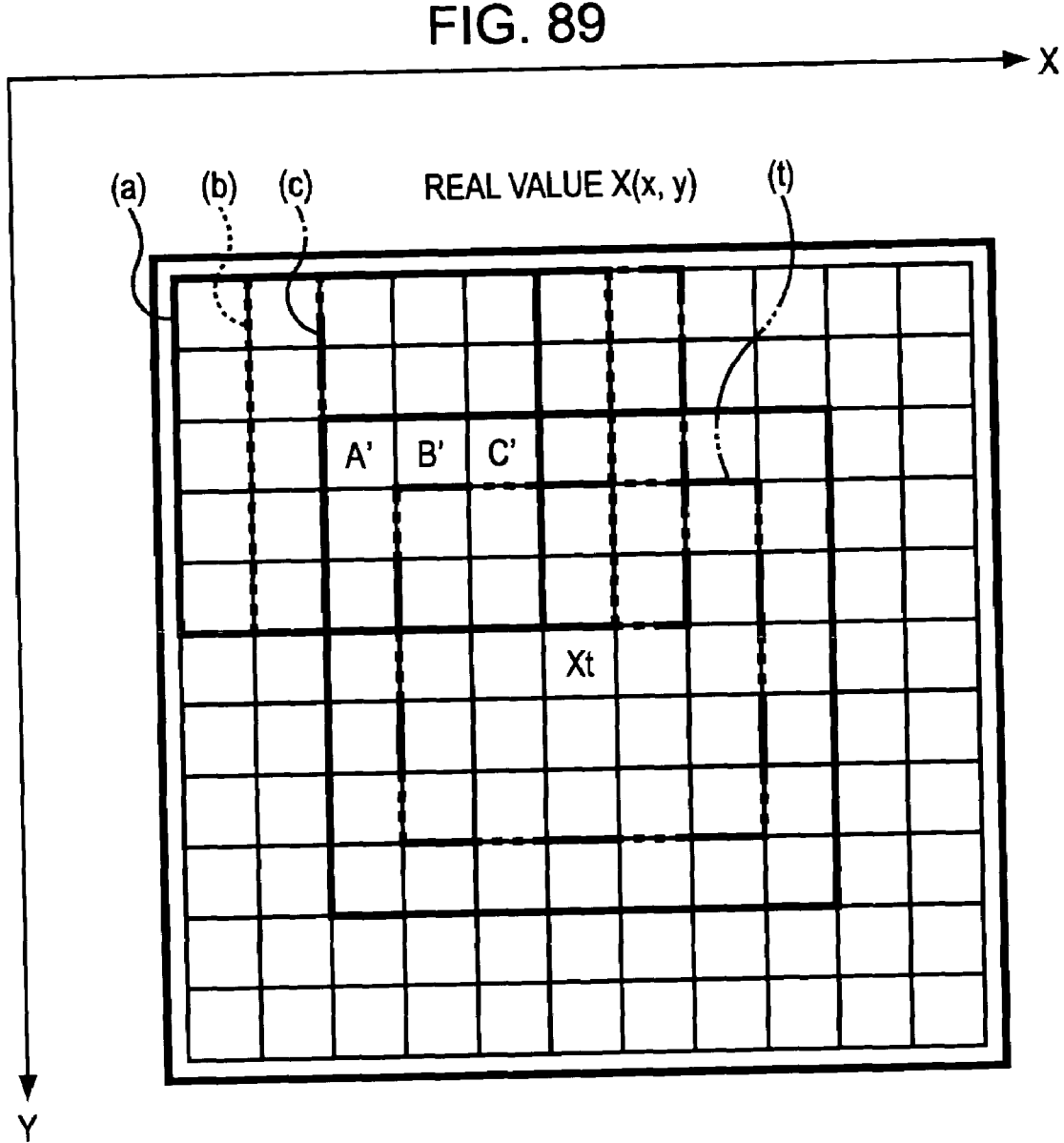
FIG. 89 is a diagram illustrating the principle of image blurring.

FIGS. 88 and 89 illustrate a relationship between FIG. 86A and FIG. 86C in two dimensions. That is, the level of each pixel in FIG. 88 is an observed value and is obtained using the level of each pixel in FIG. 89 as a real value. In this case, the observed value Y(x, y) corresponding to a pixel A shown in FIG. 88 can be obtained as follows:

$$Y(x,y) = W(-2,-2)X(x-2,y-2) + W(-1,-2)X(x-1,y-2) + W(0,2)X(x,y-2) \ldots + W(2,2)X(x+2,y+2)$$

That is, the observed value corresponding to the pixel A shown in FIG. 88 can be obtained on the basis of the real values corresponding to 25 (=5×5) pixels indicated by a frame a at the center of which is a pixel A' (corresponding to the pixel A) shown in FIG. 89. Similarly, the observed value corresponding to a pixel B (pixel on the right of the pixel A)

shown in FIG. 88 can be obtained on the basis of the real values corresponding to 25 pixels at the center of which is a pixel B' (corresponding to the pixel B) shown in FIG. 89. The observed value corresponding to a pixel C shown in FIG. 88 can be obtained on the basis of the real values corresponding to 25 pixels at the center of which is a pixel C' (corresponding to the pixel C) shown in FIG. 89. The observed values Y(x+1, y) and Y(x+2, y) respectively corresponding to the pixels B and C shown in FIG. 88 can be obtained by the following equations:

$$Y(x+1,y)=W(-2,-2)X(x-1,y-2)+W(-1,-2)X(x,y-2)+W(0,-2)X(x-1,y-2)\ldots+W(2,2)X(x+3,y+2)$$

$$Y(x+2,y)=W(-2,-2)X(x,y-2)+W(-1,-2)X(x+1,y-2)+W(0,-2)X(x+2,y-2)\ldots+W(2,2)X(x+4,y+2)$$

After the observed values corresponding to all the pixels shown in FIG. 88 are computed, the determinants of matrix expressed by the following equations (8) to (11) can be obtained:

$$Y_f = \begin{pmatrix} Y(x, y) \\ Y(x+1, y) \\ Y(x+2, y) \\ Y(x+3, y) \\ \vdots \\ Y(x, y+1) \\ Y(x+1, y+1) \\ \vdots \\ Y(x+7, y+7) \end{pmatrix} \quad (8)$$

$$W_f = \begin{pmatrix} W(-2,-2) & W(-1,-2) & \ldots & W(2,2) \\ W(-2,-2) & W(-1,-2) & \ldots & W(2,2) \\ \vdots & \vdots & \vdots & \vdots \\ W(-2,-2) & W(-1,y-2) & \ldots & W(2,2) \end{pmatrix} \quad (9)$$

$$X_f = \begin{pmatrix} X(x-2,y-2) & X(x-1,y-2) & \ldots & X(x,y-2) \\ X(x-1,y-2) & X(x,y-2) & \ldots & X(x+1,y-2) \\ \vdots & \vdots & \vdots & \vdots \\ X(x+2,y+2) & X(x+3,y+2) & \ldots & X(x+9,y+9) \end{pmatrix} \quad (10)$$

$$Y_f = W_f X_f \quad (11)$$

Here, if the inverse matrix of the matrix $W_f$ in equation (11) can be solved, the real value $X_f$ can be obtained on the basis of the observed value $Y_f$. That is, pixels of an image without blurring can be obtained on the basis of pixels of an image with blurring, thus correcting the blurred image.

However, as described in relation to FIGS. 86 to 89, the determinants of matrix expressed by equations (8) to (11) include many pixels of a real value relative to pixels of an observed value. Therefore, it is difficult to obtain the inverse matrix (e.g., in the example shown in FIG. 87, five pixels of a real value are required for one pixel of an observed value).

Accordingly, in addition to equations (8) to (11), the relational expressions expressed by the following equations (12) to (15) are introduced:

$$W_a(p_1)W_1(p_2)(X(x,y)-X(x,y-1))=0 \quad (12)$$

$$W_a(p_1)W_2(p_2)(X(x,y)-X(x+1,y))=0 \quad (13)$$

$$W_a(p_1)W_3(p_2)(X(x,y)-X(x,y+1))=0 \quad (14)$$

$$W_a(p_1)W_4(p_2)(X(x,y)-X(x-1,y))=0 \quad (15)$$

Equations (12) to (15) set limits to the difference between the levels of two adjacent pixels. When the real value to be obtained lies in a flat portion (a portion whose level has no significant difference from that of the adjacent pixel) of the image, there is no inconsistency. However, when the real value to be obtained lies in an edge portion (a portion whose level has a significant difference from that of the adjacent pixel) of the image, there is inconsistency. Thus, the corrected image may deteriorate. For this reason, to properly correct a blurred image, one of the four equations (12) to (15) needs to be appropriately used for each pixel so that the adjacent pixels do not cross the edge portion of the real values.

Therefore, the image feature detection unit 3742 determines the edge portion and the flat portion of the image to generate a code p2 that indicates in which direction the image becomes flat (e.g., horizontal direction or vertical direction). The operation of the image feature detection unit 3742 is described in detail below with reference to FIG. 94. According to the present invention, it is assumed that the determination result of an edge portion and a flat portion in an input image (observed values) is equal to the determination result of an edge portion and a flat portion of the real values.

In equations (12) to (15), the functions W1 to W4, which are functions of the code p2, are weighting functions. According to the present invention, by controlling these functions W1 to W4 in accordance with the code p2, one of the relational expressions can be selected and used for each pixel. FIG. 90 illustrates the values of the functions W1 to W4 corresponding to the code p2. As the value of this weighting function increases, the portion becomes more flat. In contrast, as the value of this weighting function decreases, the portion becomes less flat (the possibility of being an edge increases).

The code p2 consists of 4 bits. The bits indicate whether an image is flat in the upward direction, the right direction, the downward direction, and the left direction from the leftmost bit, respectively. If the image is flat in one of the directions, the corresponding bit is set to "1". For example, the code p2 of "0001" indicates that the image is flat from a pixel of interest in the left direction, but not flat in the other directions (i.e., an edge is present). Therefore, when the code p2 is "0001", the value of the weighting function W4 increases and the weight of equation (15) has a large value compared with the weights of other equations (12) to (14). Thus, the code p2 can change the weights of the four relational expressions. Accordingly, one of the four equations can be appropriately selected and used for each pixel so that the adjacent pixels do not cross the edge.

Figure 91:
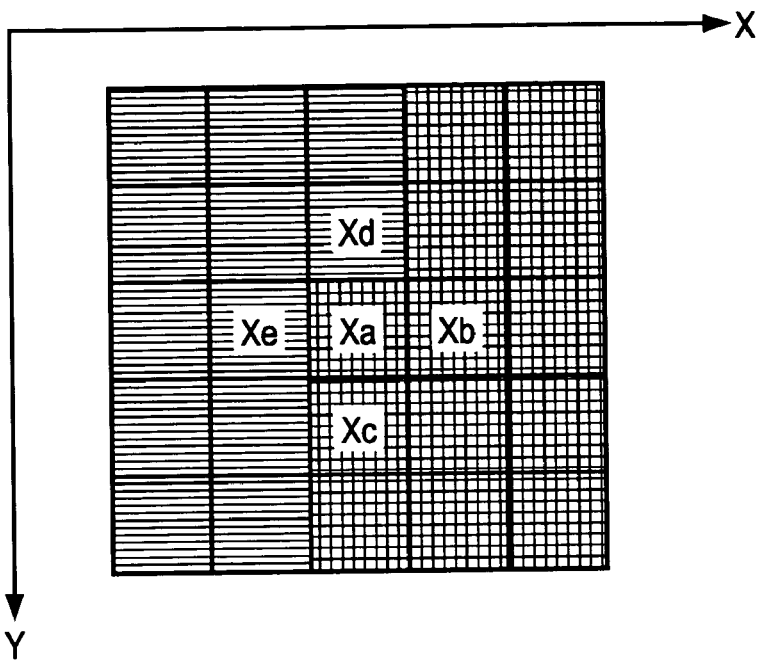
FIG. 91 is a diagram illustrating an edge portion of an image.

For example, as shown in FIG. 91, suppose that the image is flat from a pixel of interest in the upward direction and the left direction, and the image has edges in the right direction and the downward direction. By changing the weights of four equations (12) to (15), the limitations "Xa−Xb=0" and "Xa−Xc=0" are applied to the difference between the levels of adjacent pixels. However, the limitations "Xa−Xd=0" and "Xa−Xe=0" are not applied. It is noted that Xb, Xc, Xd, and Xe denote pixels adjacent to the pixel X of interest in the right direction, downward direction, upward direction, and left direction, respectively.

Additionally, in equations (12) to (15), a function Wa is a different weighting function. The value of the function Wa also varies in accordance with a code p1. By changing the value of the function Wa, the total noise and details of the corrected image can be controlled. When the value of the function Wa is large, the user feels little effect of noise in the corrected image, and therefore, the sense of noise decreases. In contrast, when the value of the function Wa is small, the user feels an enhanced effect of details in the corrected image, and therefore, the sense of details increases. It is noted that the code p1 that changes the value of the function Wa corresponds to a control signal C shown in FIG. 85.

As noted above, the relational expressions expressed by equations (12) to (15) are introduced in addition to equations (8) to (11). Thus, the inverse matrix expressed as equation (16) can be solved. As a result, the real values can be obtained on the basis of the observed values.

$$X_s = W_s^{-1} Y_s \qquad (16)$$

According to the present invention, a coefficient $W_s-1$ to be multiplied by the observed value $Y_s$ is prestored in the coefficient ROM 3744. The determinant of matrix expressed by equation (16) (inner product) is computed by the inner-product computing unit 3746 with respect to the input image extracted by the region extraction unit 3745. Thus, the computation of the inverse matrix is not necessary every time the image is corrected. The blurring can be corrected only by the inner-product computation. However, since the parameter σ and the above-described four relational expressions vary depending on an input image, the inverse matrix is computed for every possible combination of the parameter σ and the above-described four relational expressions. Thereafter, the addresses corresponding to the parameter σ and the code p2 are determined. The different coefficients for those addresses are stored in the coefficient ROM 3744.

However, if, for example, the combination of the weighting functions W1 to W4 is changed for each of 25 (=5×5) pixels in a frame (t) shown in FIG. 89 and the four relational expressions are changed, the number of combinations is 15 (the number of combinations of the functions W1 to W4) powered by 25 (the number of pixels in the frame (t)). If the reverse matrix is computed for every combination, the number of coefficients becomes large. Since the capacity of the coefficient ROM 3744 is limited, the coefficient ROM 3744 could not store all the coefficients. In such a case, the code p2 that is located at the center of the frame (t) is changed only for a pixel Xt so as to switch the relational expression. For pixels other than the pixel Xt in the frame (t), the code p2 may be fixed to a pseudo value of "1111", for example. Thus, the number of the combinations of the coefficient can be limited to 15.

In the foregoing description, to describe the principal of blurring (a model expression), the domain of the Gaussian function is determined to be $-2 \leq (x, y) \leq 2$. In practice, the domain of the Gaussian function is determined so as to support the parameter σ of a sufficiently large value. In addition, the relational expressions expressed as equations (12) to (15) are not limited thereto if the relational expressions can describe the feature of the image. Furthermore, in the case of the coefficient ROM 3744 having a limited capacity, the relational expressions are switched only for the center phase (Xt) of blurring. However, the present invention is not limited thereto. The method for switching the relational expressions may be changed depending on the capacity of the coefficient ROM 3744.

A blur correction process performed by the image correction unit 3022 is described next with reference to FIG. 92. At step S1801, the image correction unit 3022 detects an area to be processed. The area to be processed is an area where blurring is corrected, namely, the correction area 3052. This area is detected on the basis of a signal output from the area setting unit 3025.

At step S1802, the image correction unit 3022 acquires the value of the parameter a. The value of the parameter σ may be specified by the user or may be determined in advance. At step S1803, the image correction unit 3022 also executes an image correction process, which is described below with reference to FIG. 93. By this process, the blurred image is corrected and is output.

Thus, blurring of the image in the correction area 3052 is removed, and therefore, a clear image can be obtained.

Figure 92:
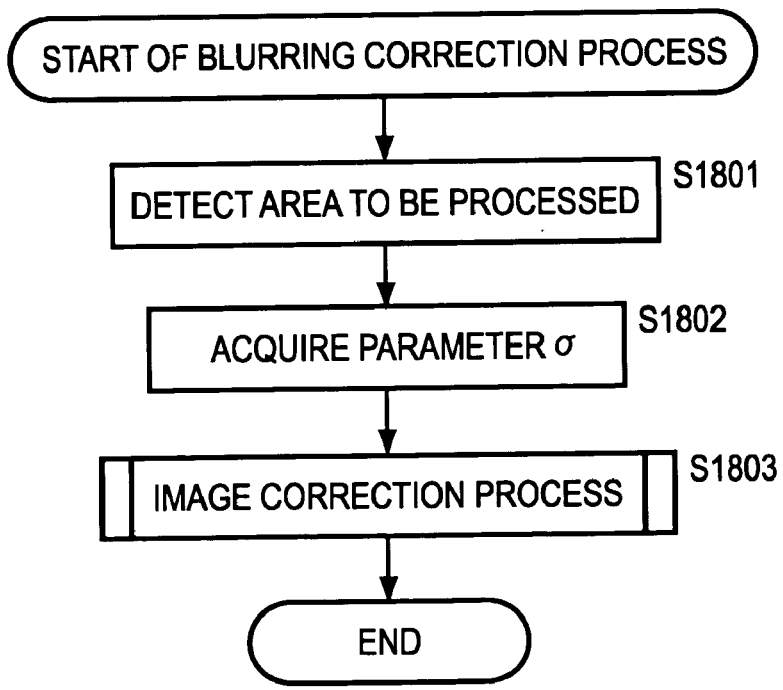
FIG. 92 is a flow chart illustrating a blur correction process.

The image correction process at step S1803 shown in FIG. 92 is described in detail with reference to FIG. 93.

Figure 94:
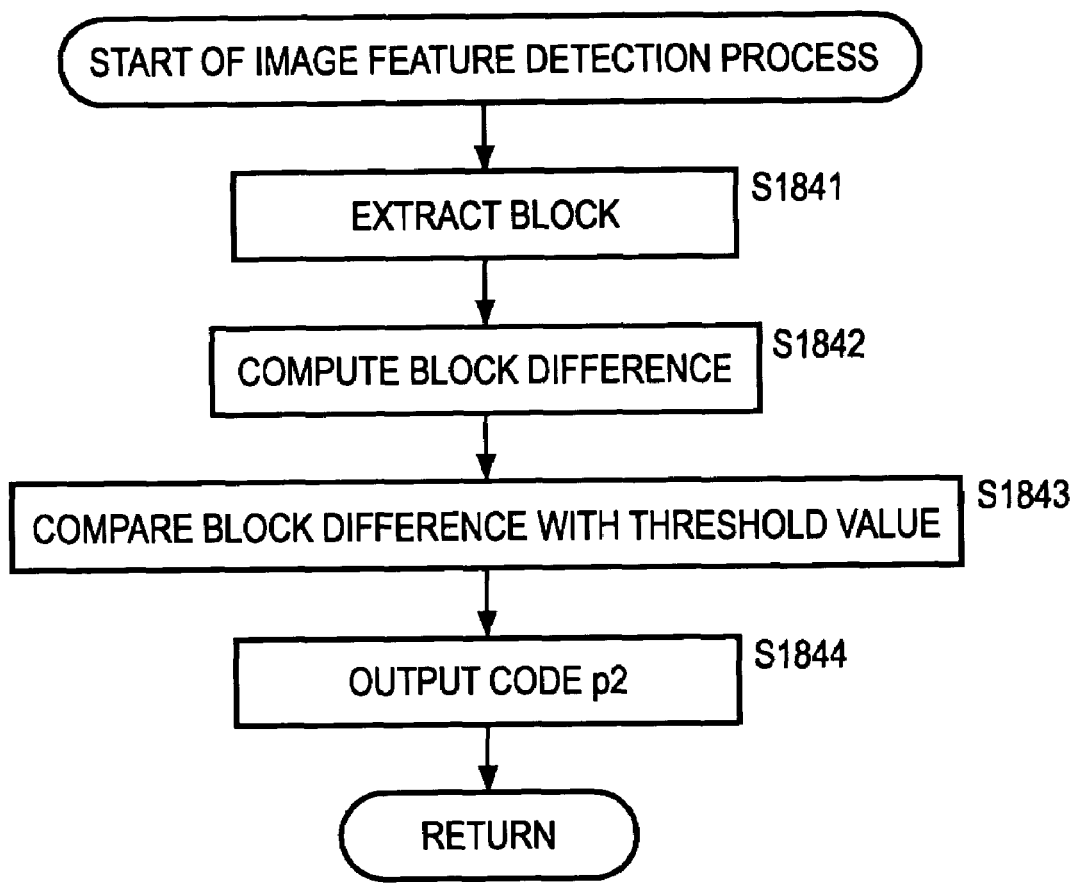
FIG. 94 is a flow chart illustrating an image feature detection process.

At step S1821, the image feature detection unit 3742 executes an image feature extracting process, which is described below with reference to FIG. 94. Thus, it is determined in which direction the image is flat with respect to the pixel of interest. The code p2, which is described with reference to FIG. 90, is generated and is output to the address computing unit 3743.

At step S1822, the address computing unit 3743 computes the address of the coefficient ROM 3744. For example, the address of the coefficient ROM 3744 consists of 4 bits corresponding to the code p2 (the output of the image feature detection unit 3742), 4 bits indicating the value of the parameter σ (the control signal B shown in FIG. 85), and 2 bits corresponding to the code p1 used for switching the weighting functions Wa of the above-described four relational expressions (the control signal C shown in FIG. 85). This address has 1024 ($2^{10}$) values ranging from 0 to 1023. The address computing unit 3743 computes the corresponding address on the basis of the output of the image feature detection unit 3742, the control signal B, and the control signal C.

At step S1823, the address computing unit 3743 reads the coefficient from the coefficient ROM 3744 on the basis of the address computed at step S1822 and delivers the readout coefficient to the inner-product computing unit 3746.

At step S1824, the inner-product computing unit 3746 computes the inner product for each pixel on the basis of the coefficient read out at step S1823 and outputs the result of the inner product computation to the image combining unit 3747. Thus, as noted above, the real values can be obtained from the observed values, and therefore, the blurred image can be corrected.

At step S1825, the image combining unit 3747 executes an image combining process, which is described below with reference to FIG. 97. Thus, it is determined whether the processing result of the inner-product computing unit 3746 is output or the input image is directly output for each pixel. At step S1826, the image combining unit 3747 outputs the corrected and selected image.

Figure 93:
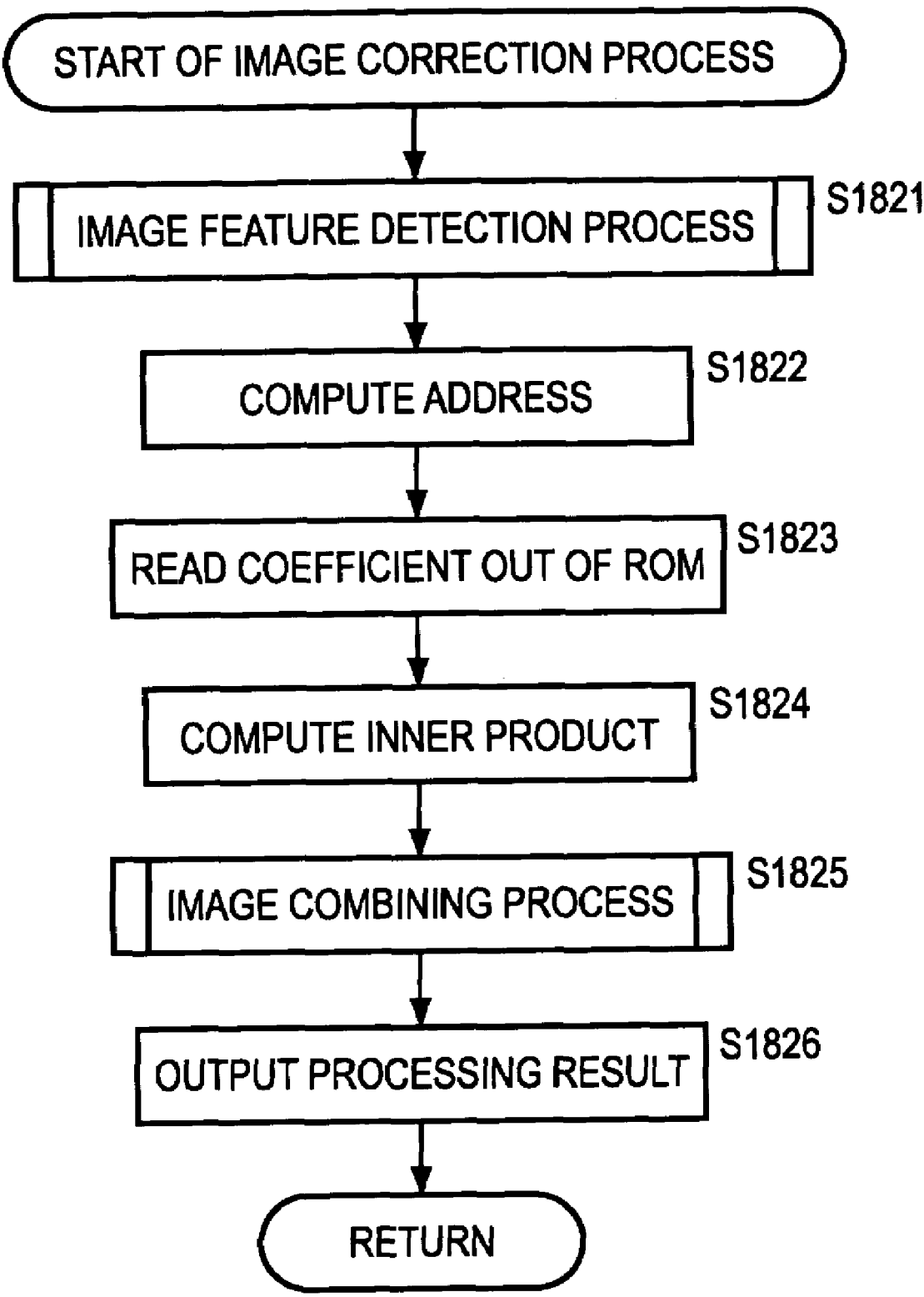
FIG. 93 is a flow chart illustrating an image correction process.

The image feature detecting process at step S1821 shown in FIG. 93 is described next with reference to FIG. 94. At step S1841, the image feature detection unit 3742 extracts blocks. At step S1842, the image feature detection unit 3742 computes the difference between the blocks extracted at step S1841 (the details are described below with reference to FIG. 96). At step S1843, the image feature detection unit 3742 compares the block difference computed at step S1842 with a predetermined threshold value. At step S1844, the image feature detection unit 3742 outputs the code p2, which represents the direction in which the image is flat with respect to the pixel of interest, on the basis of the comparison result.

Figure 95:
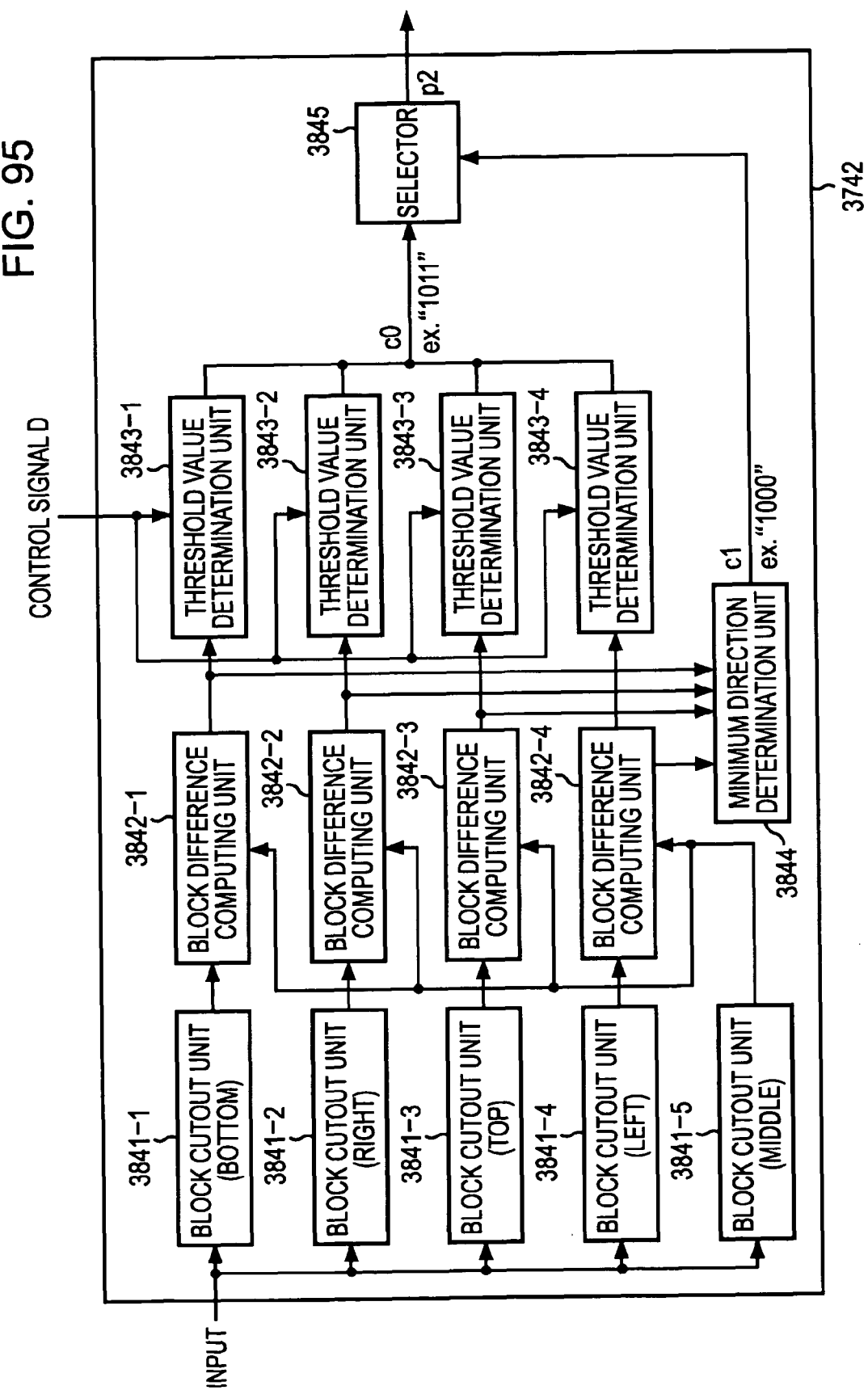

The image feature detecting process is described in more detail with reference to FIGS. 95 and 96. FIG. 95 is a block diagram of the detailed configuration of the image feature detection unit 3742. On the left side of the drawing, block cutout units 3841-1 to 3841-5 are provided. For example, as shown in FIGS. 96A to 96E, the block cutout units 3841-1 to 3841-5 extract 5 blocks, each including 9 (=3×3) pixels one of which is the pixel of interest indicated by a black circle (a pixel to be corrected at that time).

Figure 96C:
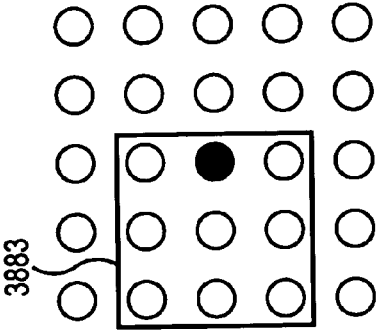
Figure 96E:
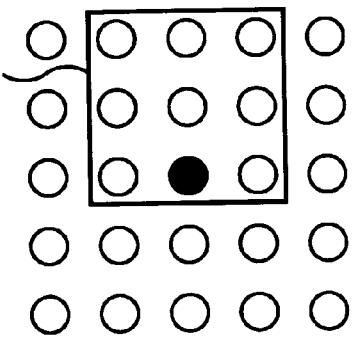
Figure 96B:
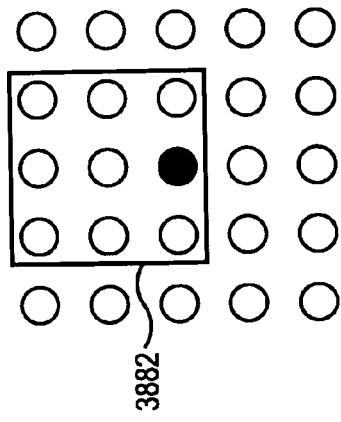
Figure 96D:
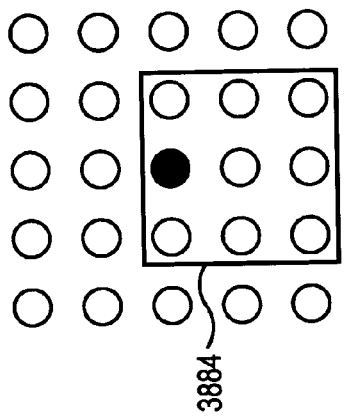
Figure 96A:
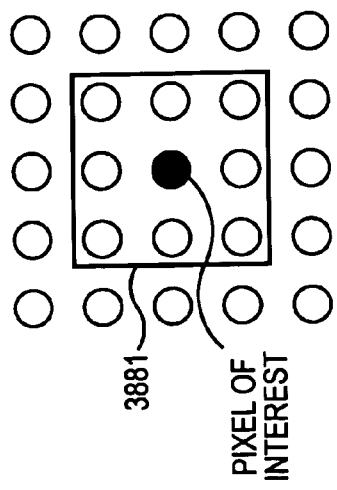

A block 3881 shown in FIG. 96A is a middle block at the center of which is the pixel of interest. The block 3881 is extracted by the block cutout unit 3841-5. A block 3882 shown in FIG. 96B is a top block that is obtained by shifting the block 3881 upwards by one pixel. The block 3882 is extracted by the block cutout unit 3841-3. A block 3883 shown in FIG. 96C is a left block that is obtained by shifting the block 3881 to the left by one pixel. The block 3883 is extracted by the block cutout unit 3841-4.

A block 3884 shown in FIG. 96D is a bottom block that is obtained by shifting the block 3881 downwards by one pixel. The block 3884 is extracted by the block cutout unit 3841-1. A block 3885 shown in FIG. 96E is a right block that is obtained by shifting the block 3881 to the right by one pixel. The block 3885 is extracted by the block cutout unit 3841-2. At step S1841, the five blocks 3881 to 3885 are extracted for each pixel of interest.

Information about the pixels of each block extracted by the block cutout units 3841-1 to 3841-5 is output to block difference computing units 3842-1 to 3842-4. For example, the block difference computing units 3842-1 to 3842-4 compute the difference between pixels in each block as follows.

Of the 9 pixels of the block 3881, three pixels (levels of the pixels) in the uppermost row are denoted as a(3881), b(3881), and c(3881) from the leftmost pixel. Three pixels in the middle row are denoted as d(3881), e(3881), and f(3881) from the leftmost pixel. Three pixels in the lowermost row are denoted as g(3881), h(3881), and i(3881) from the leftmost pixel. Similarly, of the 9 pixels of the block 3884, three pixels (levels of the pixels) in the uppermost row are denoted as a(3884), b(3884), and c(3884) from the leftmost pixel. Three pixels in the middle row are denoted as d(3884), e(3884), and f(3884) from the leftmost pixel. Three pixels in the lowermost row are denoted as g(3884), h(3884), and i(3884) from the leftmost pixel. The block difference computing unit 3842-1 computes a block difference B(1) as follows:

$$B(1)=|a(3881)-a(3884)|+|b(3881)-b(3884)|+|c(3881)-c(3884)|+\ldots+|i(3881)-i(3884)|$$

That is, the block difference B(1) is the sum of absolute differences between the levels of pixels in the block 3881 (middle) and the levels of the corresponding pixels in the block 3884 (bottom). Similarly, the block difference computing unit 3842-2 computes the sum of absolute differences between the levels of pixels in the block 3881 (middle) and the levels of the corresponding pixels in the block 3885 (right) so as to obtain a block difference B(2). Furthermore, the block difference computing unit 3842-4 computes the sum of absolute differences between the levels of pixels in the block 3881 (middle) and the levels of the corresponding pixels in the block 3882 (top) so as to obtain a block difference B(3). The block difference computing unit 3842-3 computes the sum of absolute differences between the levels of pixels in the block 3881 (middle) and the levels of the corresponding pixels in the block 3883 (left) so as to obtain a block difference B(4).

At step S1842, as noted above, the block differences B(1) to B(4), which are the differences between the middle block and each of the blocks in the four horizontal and vertical directions, are computed. The results are output to the corresponding threshold value determination units 3843-1 to 3843-4 and a minimum direction determination unit 3844.

The threshold value determination units 3843-1 to 3843-4 compare the block difference B(1) to B(4) with predetermined threshold values, respectively. It is noted that the threshold values are switched on the basis of the control signal D. If the block difference B(1) to B(4) are greater than the predetermined threshold values, respectively, the threshold value determination units 3843-1 to 3843-4 determine that the direction is an edge portion, and therefore, the threshold value determination units 3843-1 to 3843-4 output "0". If the block difference B(1) to B(4) are less than the predetermined threshold values, respectively, the threshold value determination units 3843-1 to 3843-4 determine that the direction is an flat portion, and therefore, the threshold value determination units 3843-1 to 3843-4 output "1".

At step S1843, the block difference is compared with the threshold value, as noted above. The output results of the threshold value determination units 3843-1 to 3843-4 are output to a selector 845 in the form of a 4-bit code. For example, if each of the block differences B(1), B(3), and B(4) is less than the threshold value and the block difference B(2) is greater than the threshold value, a code of "1011" is output.

In some cases, all of the block differences B(1) to B(4) are greater than the threshold values (i.e., the image has no flat portion). In such cases, a code of "0000" is output from the threshold value determination units 3843-1 to 3843-4. However, as shown in FIG. 90, when the code p2 is "0000", the corresponding weighting functions W1 to W4 cannot be identified. Therefore, a selector 3845 determines whether the output result from the threshold value determination units 3843-1 to 3843-4 is "0000". If the selector 3845 determines that the output result from the threshold value determination units 3843-1 to 3843-4 is "0000", the selector 3845 outputs the output from the minimum direction determination unit 3844 as the code p2.

The minimum direction determination unit 3844 determines the minimum value among the block differences B(1) to B(4) and outputs a 4-bit code corresponding to the determination result to the selector 3845 at the same time as the threshold value determination units 3843-1 to 3843-4 output the code. For example, if it is determined that the block difference B(1) is the minimum among the block differences B(1) to B(4), the minimum direction determination unit 3844 outputs a code of "1000" to the selector 3845.

This design allows the code "1000" to be output from the minimum direction determination unit 3844 as the code p2 even when the threshold value determination units 3843-1 to 3843-4 output the code "0000". When the output result from the threshold value determination units 3843-1 to 3843-4 is not "0000", the output result from the threshold value determination units 3843-1 to 3843-4 is output as the code p2. At step S3844, the code p2 is thus generated and is output to the address computing unit 3743.

The image combining process at step S1825 shown in FIG. 93 is described next with reference to FIG. 97. At step S1861, the image combining unit 3747 computes the degree of dispersion of pixels on the basis of the output result from the inner-product computing unit 3746. Thus, the degree of dispersion of the pixels around the pixel of interest can be computed. At step S1862, the image combining unit 3747 determines whether the degree of dispersion computed at step S1862 is greater than a predetermined threshold value.

If, at step S1862, it is determined that the degree of dispersion is greater than the threshold value, the image combining unit 3747, at step S1863, sets an input-image switching flag to ON. In contrast, if it is determined that the degree of dispersion is not greater than the threshold value, the image combining unit 3747, at step S1864, sets an input-image switching flag to OFF.

If the inner-product computing unit 3746 performs the inner product computation on a pixel in a partial area of the input image where blurring does not occur, the activity of the image around the pixel may increase, and therefore, the quality of the image may deteriorate. So, if the degree of dispersion is greater than the predetermined threshold value, it is determined that the pixel is a deteriorated pixel and the input-image switching flag is set to ON. The pixel whose input-image switching flag is set to ON is replaced with the pixel of the input image (i.e., the pixel is returned to the original pixel) when the pixel is output.

At step S1865, the image combining unit 3747 determines whether all the pixels are checked. If it is determined that all the pixels have not been checked, the process returns to step S1861 and the processes subsequent to step S1861 are repeatedly executed. If, at step S1865, it is determined that all the pixels have been checked, the image combining unit 3747, at step S1866, combines the image having no blurring in the correction area 3052 with the image of the background 3053 and outputs the combined image to the image display 3023.

Thus, it is determined whether the result of the inner product computation is to be output or the pixel of the input image is to be directly output for each pixel. This design can prevent an image from deteriorating by correcting a partial image without blurring in the input image.

Figure 98:
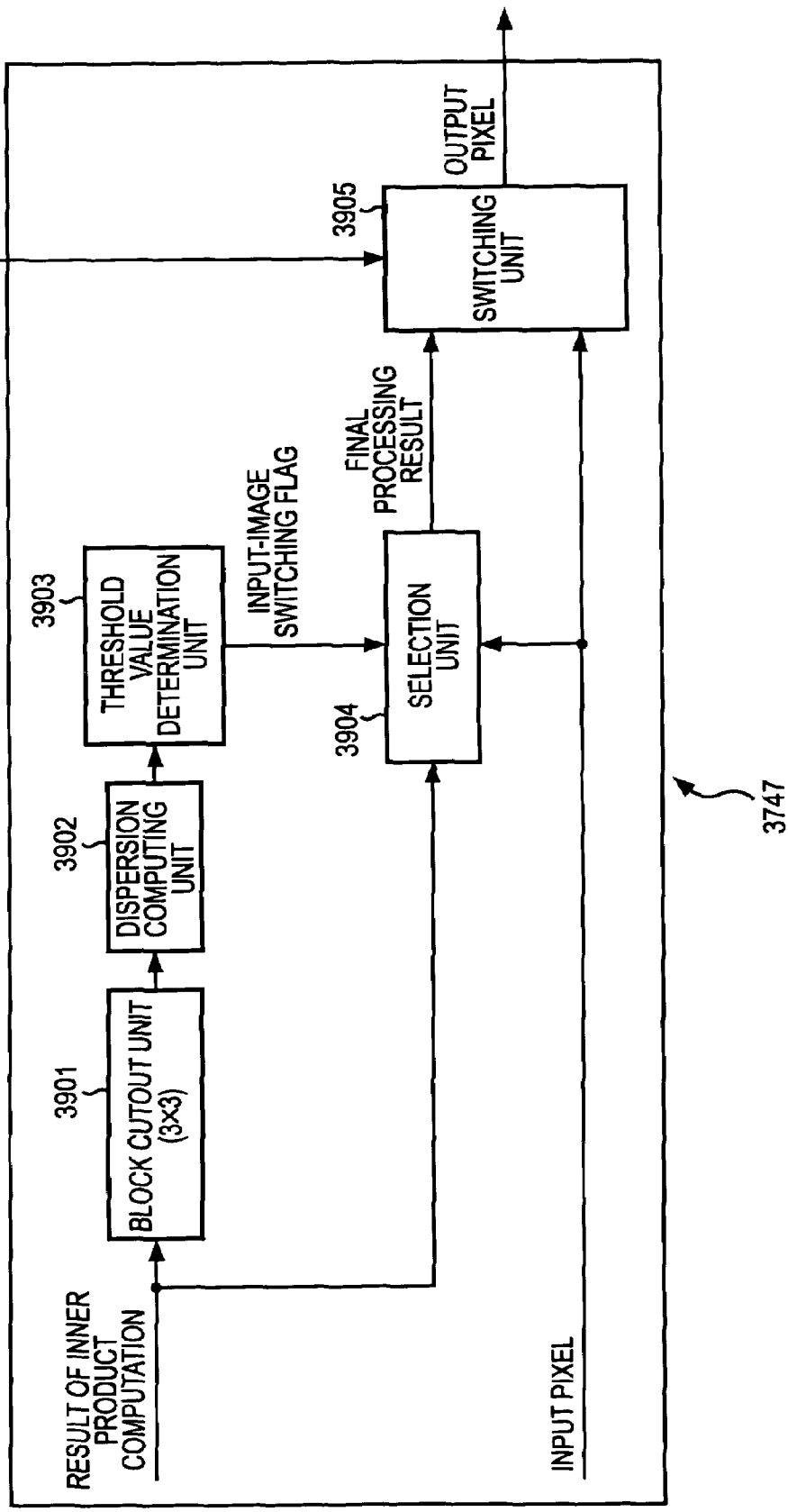
Figure 99:
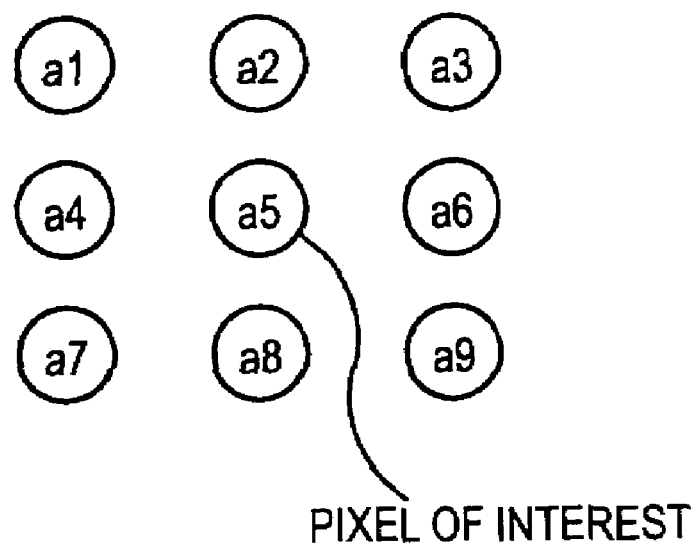

This phenomenon is now herein discussed in more detail with reference to FIGS. 98 and 99. FIG. 98 is a block diagram of an exemplary configuration of the image combining unit 3747. The output result of the inner-product computing unit 3746 is input to a block cutout unit 3901. As shown in FIG. 99, the block cutout unit 3901 cuts out 9 (=3×3) pixels a1 to a9 at the center of which is a pixel of interest a5 and outputs these pixels to a dispersion computing unit 3802. The dispersion computing unit 3802 computes the degree of dispersion as follows:

$$v = \sum_{*=1}^{9} (a^* - m)^2 \tag{17}$$

where m denotes the average of the 9 pixels (the pixel level) in a block, and v denotes the sum of square differences between each pixel and the average, namely, the degree of dispersion of the pixels in the block. At step S1861, the degree of dispersion is thus computed and the computation result is output to a threshold value determination unit 3903.

The threshold value determination unit 3903 compares the output result (the degree of dispersion) from a dispersion computing unit 3902 with a predetermined threshold value. If it is determined that the degree of dispersion is greater than the threshold value, the image combining unit 3747 controls a selection unit 3904 to set the input-image switching flag corresponding to the pixel of interest to ON. If it is determined that the degree of dispersion is not greater than the threshold value, the image combining unit 3747 controls a selection unit 3904 to set the input-image switching flag corresponding to the pixel of interest to OFF. At steps S1862 through S1864, it is thus determined whether the degree of dispersion is greater than the threshold value. The input-image switching flag is set on the basis of the determination result.

Subsequently, a switching unit 3905 switches between the final processing result of the selection unit 3904 and a pixel of the input image. The switching unit 3905 then outputs the selected one. That is, the pixels of the image in the correction area 3052 represent the final processing result of the selection unit 3904, whereas the pixels of the image of the background 3053 represent the pixels of the input image. The image is thus switched.

Thus, the object 3051 (FIG. 82) is tracked. Only the image in the correction area 3052 including the object 3051 is updated (corrected) so that blurring of the image is removed, and therefore, is clearly displayed. In contrast, since the image of the background 3053 is displayed without the blurring removed, the user can automatically and carefully watch the object 3051.

In the foregoing description, the image correction unit 3022 corrects the image in the correction area 3052 of the image captured by the image capturing unit 3021 so that the blurring of the image is removed. However, the image correction unit 3022 may correct the image in the correction area 3052 without removing blurring of the image so that the brightness and color setting of each pixel in the area are changed and the image in the area is simply highlighted. According to this design, although the user could not accurately view the object 3051, the user can automatically and carefully watch the object 3051. Additionally, compared with the correction to remove blurring of the image, the configuration of the image correction unit 3022 can be simplified. As a result, the object tracking apparatus 1 can be achieved at a low cost.

The above-described series of processes can be realized not only by hardware but also by software. When the above-described series of processes are executed by software, the programs of the software are downloaded from a network or a recording medium into a computer incorporated in dedicated hardware or a computer that can execute a variety of function by installing a variety of programs therein (e.g., a general-purpose personal computer).

In the present specification, the steps that describe the program stored in the recording media include not only processes executed in the above-described sequence, but also processes that may be executed in parallel or independently.

REFERENCE NUMERALS 1 object tracking apparatus, 11 template matching unit, 12 motion estimation unit, 13 scene change detection unit, 14 background motion estimation unit, 15 region-estimation related processing unit, 16 transfer candidate storage unit, 17 tracking point determination unit, 18 template storage unit, 19 control unit

The invention claimed is:

1. An image processing apparatus comprising:
 position estimating means for estimating the position of a second point representing a tracking point in an image of a temporally next unit of processing, the second point corresponding to a first point representing the tracking point in an image of a temporally previous unit of processing;
 generating means for generating estimated points serving as candidates of the first point when the position of the second point is inestimable;
 determining means for determining the second point in the next unit of processing on the basis of the estimation result of the position estimating means when the position of the second point in the next unit of processing is estimable; and
 selecting means for selecting the first point from among the estimated points when the position of the second point is inestimable, wherein
 the determining means includes:
  evaluation value computing means for computing an evaluation value representing a correlation between pixels of interest representing at least one pixel including the first point in the temporally previous unit of processing and the corresponding pixels representing at least one pixel in the temporally next unit of processing and defined on the basis of a motion vector of the pixels of interest;

variable value computing means for computing a variable value representing the variation of a pixel value with respect to the pixels of interest; and accuracy computing means for computing the accuracy of the motion vector, and the variable value computing means computes the variable value representing the sum of values obtained by dividing the sum of absolute differences between the pixels of interest and the adjacent pixels that are adjacent to the pixels of interest in a block including the pixels of interest by the number of the adjacent pixels.

2. The image processing apparatus according to claim 1, wherein the unit of processing is a frame.

3. The image processing apparatus according to claim 1, wherein the position estimating means further computes the accuracy of the estimation of the position and wherein, if the computed accuracy is greater than a reference value, the position estimating means determines that the position of the second point is estimable.

4. The image processing apparatus according to claim 1, wherein, if the position of the second point in the next unit of processing is inestimable, the position estimating means estimates the position of the second point on the basis of the first point selected by the selecting means.

5. The image processing apparatus according to claim 1, wherein, if the position of the second point is estimable, the position estimating means considers the position of the second point to be a new first point and estimates the position of the tracking point in the image of the next unit of processing.

6. The image processing apparatus according to claim 1, wherein the generating means includes region estimating means for estimating a set of at least one point, the set belonging to an object including the first point, to be a target region in the previous unit of processing or in a more previous unit of processing than the previous unit of processing and estimated point generating means for generating the estimated points on the basis of the target region.

7. The image processing apparatus according to claim 6, wherein the region estimating means finds a position that overlaps at least the target region serving as an object to be estimated by prediction, determines a region estimation range at the predicted point including the tracking point in the unit of processing for estimating the target region, sets sample points in the determined region estimation range, and estimates a region consisting of a set of the sample points having the same motion and having the largest dimensions among the sample points to be the target region.

8. The image processing apparatus according to claim 7, wherein the shape of the region estimation range is fixed.

9. The image processing apparatus according to claim 7, wherein the shape of the region estimation range is variable.

10. The image processing apparatus according to claim 7, wherein the region estimating means estimates the target region in a more previous unit of processing than the previous unit of processing and wherein the generating means generates a point in the estimated target region in the more previous unit of processing than the previous unit of processing as the estimated point.

11. The image processing apparatus according to claim 7, wherein the region estimating means estimates the target region in the previous unit of processing and wherein the generating means generates a point forming the target region as the estimated point.

12. The image processing apparatus according to claim 6, wherein the region estimating means estimates points that are adjacent to the first point and that have pixel values similar to the pixel value of the first point and points that are adjacent to the points adjacent to the first point to be the target region.

13. The image processing apparatus according to claim 6, wherein the region estimating means extracts sample points in a region having a predetermined size and including the first point in a more previous unit of processing than the previous unit of processing and wherein the region estimating means estimates a region including the points in the previous unit of processing obtained by shifting a region of the sample points having the same motion and having the largest dimensions by an amount of the same motion to be the target region.

14. The image processing apparatus according to claim 6, further comprising:

template generating means for generating a template; and correlation computing means for computing a correlation between a block representing a predetermined region in the next unit of processing and a block representing a predetermined region of the template in a unit of processing more previous than the unit of processing of the block by one or more units of processing when the second point is not determined on the basis of the estimated points;

wherein the tracking point is detected by using at least the determining means when the correlation is determined to be high on the basis of the correlation computed by the correlation computing means.

15. The image processing apparatus according to claim 14, wherein the template generating means determines a predetermined region around the tracking point to be the template.

16. The image processing apparatus according to claim 14, wherein the template generating means generates the template on the basis of the target region.

17. The image processing apparatus according to claim 14, wherein, when the correlation is determined to be high on the basis of the correlation computed by the correlation computing means, the second point is determined on the basis of a relationship between the block representing the predetermined region of the template in a unit of processing more previous than a block representing the predetermined region in the next unit of processing by one or more units of processing and the tracking point and on the basis of the position of the block having the correlation determined to be high.

18. The image processing apparatus according to claim 14, wherein the template generating means determines a region formed from a sample point in the target region and a predetermined area around the sample point to be the template.

19. The image processing apparatus according to claim 14, wherein the correlation computing means determines the correlation by computing an error between the block in the next unit of processing and a block of the template in a unit of processing more previous than the unit of processing of the block by one or more units of processing.

20. The image processing apparatus according to claim 1, further comprising:

detecting means for detecting a scene change;

wherein the position estimating means and the selecting means terminate the processes thereof on the basis of a predetermined condition and change the condition on the basis of the presence of the scene change when the position estimating means and the selecting means are unable to select the second point from among the estimated points.

21. The image processing apparatus according to claim 1, wherein the number of the pixels of interest is equal to the number of the corresponding pixels.

22. The image processing apparatus according to claim 1, wherein the variable value indicates the variation of a pixel value in the spatial direction.

23. The image processing apparatus according to claim 1, wherein the variable value indicates one of a degree of dispersion and a dynamic range.

24. The image processing apparatus according to claim 1, wherein the unit of processing is one of a frame and a field.

25. The image processing apparatus according to claim 1, wherein the accuracy computing means computes the accuracy of the motion vector on the basis of a value normalized from the evaluation value with respect to the variable value.

26. The image processing apparatus according to claim 1, wherein the accuracy computing means determines a value normalized from the evaluation value with respect to the variable value to be the accuracy of the motion vector when the variable value is greater than a predetermined threshold value and wherein the accuracy computing means determines a fixed value indicating that the accuracy of the motion vector is low when the variable value is less than the predetermined threshold value.

27. The image processing apparatus according to claim 1, wherein the evaluation value computing means computes the evaluation value representing the sum of absolute differences between pixels in a block including the pixels of interest and pixels in a block including the corresponding pixels.

28. The image processing apparatus according to claim 1, wherein the accuracy computing means includes:
    comparing means for comparing the variable value with a first reference value;
    difference computing means for computing the difference between a second reference value and the value normalized from the evaluation value with respect to the variable value; and
    outputting means for computing the accuracy of the motion vector on the basis of the comparison result of the comparing means and the difference computed by the difference computing means and outputting the accuracy of the motion vector.

29. The image processing apparatus according to claim 1, further comprising:
    motion vector detecting means for detecting the motion vector from an input image and delivering the motion vector to the evaluation value computing means;
    motion compensating means for motion-compensating the input image on the basis of the motion vector detected by the motion vector detecting means;
    selecting means for selecting one of the image that is motion-compensated by the motion compensating means and the image that is not motion-compensated on the basis of the accuracy of the motion vector; and
    encoding means for encoding the image selected by the selecting means.

30. The image processing apparatus according to claim 1, further comprising:
    frequency distribution computing means for computing a frequency distribution weighted with the accuracy of the motion vector; and
    maximum value detecting means for detecting a maximum value of the frequency distribution computed by the frequency distribution computing means and detecting a background motion on the basis of the detected maximum value.

31. The image processing apparatus according to claim 1, further comprising:

average value computing means for computing the average of the accuracy of the motion vectors in the unit of processing; and
determining means for comparing the average computed by the average value computing means with a reference value and determining the presence of a scene change on the basis of the comparison result.

32. The image processing apparatus according to claim 31, wherein the average value computing means computes one average for one unit of processing.

33. The image processing apparatus according to claim 1, further comprising:
    first-point detecting means for detecting the first point of a moving object in an image;
    correction area setting means for setting a correction area having a predetermined size around the object in the image on the basis of the estimation result;
    correcting means for correcting the image in the correction area in the image; and
    display control means for controlling the display of the image including the image in the correction area corrected by the correcting means.

34. The image processing apparatus according to claim 33, wherein the correcting means corrects blurring of the image.

35. The image processing apparatus according to claim 34, wherein the correcting means includes:
    delivering means for delivering a control signal for identifying an image in the correction area and a parameter indicating the level of blurring of the image;
    feature detecting means for detecting the feature of the image in the correction area identified on the basis of the control signal and outputting a feature code representing the detected feature;
    storage means for storing the parameter representing the level of blurring of the image and a coefficient corresponding to the feature code output from the feature detecting means;
    readout means for reading out the parameter and the coefficient corresponding to the feature code output from the feature detecting means from the storage means;
    inner-product computing means for computing the inner product of the values of pixels in the input image on the basis of the coefficient read out by the readout means; and
    selectively-outputting means for selecting one of the computation result from the inner-product computing means and the value of the pixel of the input image and outputting the selected one;
    wherein the image in the correction area is corrected so that blurring of the image is removed.

36. The image processing apparatus according to claim 35, wherein the first-point detecting means includes:
    first extracting means for extracting a plurality of pixels around the pixel to be subjected to the inner product computation in a predetermined first area from the input image;
    second extracting means for extracting a plurality of pixels in each of a plurality of second areas contiguous to the first area in a plurality of vertical and horizontal directions;
    block difference computing means for computing a plurality of block differences by computing the sum of absolute differences between the values of the pixels extracted by the first extracting means and the values of the corresponding pixels extracted by the second extracting means; and difference determining means for determining whether the block difference is greater than a predetermined threshold value.

37. The image processing apparatus according to claim 35, wherein the parameter is a parameter of the Gaussian function in a model expression representing a relationship between a pixel of a blurred image and a pixel of an unblurred image.

38. The image processing apparatus according to claim 37, wherein the coefficient stored by the storage means is a coefficient obtained by computing the inverse matrix of the model expression.

39. The image processing apparatus according to claim 35, wherein the selectively-outputting means includes:
first extracting means for extracting a plurality of pixels subjected to the inner product computation by the inner-product computing means;
dispersion computing means for computing the degree of dispersion representing the level of dispersion of the plurality of pixels extracted by the first extracting means; and
dispersion determining means for determining whether the degree of dispersion computed by the dispersion computing means is greater than a predetermined threshold value.

40. The image processing apparatus according to claim 39, wherein the selectively-outputting means further includes pixel selecting means for selecting one of the computation result of the inner-product computing means and the value of the pixel of the input image as an output value of the pixel on the basis of the determination result of the dispersion determining means.

41. An image processing method comprising:
an estimating step for estimating the position of a second point representing a tracking point in an image of a temporally next unit of processing, the second point corresponding to a first point representing the tracking point in an image of a temporally previous unit of processing;
a generating step for generating estimated points serving as candidates of the first point when the position of the second point is inestimable;
a determining step for determining the second point in the next unit of processing on the basis of the estimation result of the position estimating step when the position of the second point in the next unit of processing is estimable; and
a selecting step for selecting the first point from among the estimated points when the position of the second point is inestimable, wherein
the determining step includes
an evaluation value computing step for computing an evaluation value representing a correlation between pixels of interest representing at least one pixel including the first point in the temporally previous unit of processing and the corresponding pixels representing at least one pixel in the temporally next unit of processing and defined on the basis of a motion vector of the pixel of interest;
a variable value computing step for computing a variable value representing the variation of a pixel value with respect to the pixel of interest; and
an accuracy computing step for computing the accuracy of the motion vector, and
the variable value computing step includes computing the variable value representing the sum of values obtained by dividing the sum of absolute differences between the pixels of interest and the adjacent pixels that are adjacent to the pixels of interest in a block including the pixels of interest by the number of the adjacent pixels.

42. The image processing method according to claim 41, further comprising:
first-point detecting step for detecting the first point of a moving object in an image;
a correction area setting step for setting a correction area having a predetermined size around the object in the image on the basis of the estimation result;
a correcting step for correcting an image in the correction area in the image; and
a display control step for controlling the display of the image including the image in the correction area corrected by the correcting step.

43. A non-transitory recording medium storing a computer-readable program, the computer-readable program comprising:
an estimating step for estimating the position of a second point representing a tracking point in an image of a temporally next unit of processing, the second point corresponding to a first point representing the tracking point in an image of a temporally previous unit of processing;
a generating step for generating estimated points serving as candidates of the first point when the position of the second point is inestimable;
a determining step for determining the second point in the next unit of processing on the basis of the estimation result of the position estimating step when the position of the second point in the next unit of processing is estimable; and
a selecting step for selecting the first point from among the estimated points when the position of the second point is inestimable, wherein
the determining step includes
an evaluation value computing step for computing an evaluation value representing a correlation between pixels of interest representing at least one pixel including the first point in the temporally previous unit of processing and the corresponding pixels representing at least one pixel in the temporally next unit of processing and defined on the basis of a motion vector of the pixel of interest;
a variable value computing step for computing a variable value representing the variation of a pixel value with respect to the pixel of interest; and
an accuracy computing step for computing the accuracy of the motion vector, and
the variable value computing step includes computing the variable value representing the sum of values obtained by dividing the sum of absolute differences between the pixels of interest and the adjacent pixels that are adjacent to the pixels of interest in a block including the pixels of interest by the number of the adjacent pixels.

* * * * *